US012210262B2

(12) United States Patent
Trikha et al.

(10) Patent No.: US 12,210,262 B2
(45) Date of Patent: Jan. 28, 2025

(54) TANDEM VISION WINDOW AND MEDIA DISPLAY

(71) Applicant: View, Inc., Milpitas, CA (US)

(72) Inventors: Nitesh Trikha, Pleasanton, CA (US); Robert Michael Martinson, Palo Alto, CA (US); Anthony Young, San Jose, CA (US); Vinh N. Nguyen, Lathrop, CA (US); Matthew Burton Sheffield, San Ramon, CA (US); Chee Yung Chan, Cupertino, CA (US); Todd Daniel Antes, San Jose, CA (US); Sridhar Karthik Kailasam, Fremont, CA (US)

(73) Assignee: View, Inc., San Jose, CA (US)

(*) Notice: Subject to any disclaimer, the term of this patent is extended or adjusted under 35 U.S.C. 154(b) by 3 days.

(21) Appl. No.: 18/514,589

(22) Filed: Nov. 20, 2023

(65) Prior Publication Data
US 2024/0085755 A1    Mar. 14, 2024

Related U.S. Application Data

(63) Continuation of application No. 17/985,720, filed on Nov. 11, 2022, now Pat. No. 11,892,738, which is a (Continued)

(51) Int. Cl.
G02F 1/163    (2006.01)
E06B 9/24    (2006.01)
(Continued)

(52) U.S. Cl.
CPC ............... *G02F 1/163* (2013.01); *E06B 9/24* (2013.01); *G05B 19/042* (2013.01); *H02J 50/20* (2016.02);
(Continued)

(58) Field of Classification Search
CPC ...... G02F 1/163; G02F 1/153; G02F 1/13318; G02F 1/13338; G02F 1/133528;
(Continued)

(56) References Cited

U.S. PATENT DOCUMENTS 4,129,861 A    12/1978 Giglia
4,231,135 A    11/1980 Fradin
(Continued)

FOREIGN PATENT DOCUMENTS

CN    102388340 A    3/2012
CN    103003739 A    3/2013
(Continued)

OTHER PUBLICATIONS

CA Office Action dated Oct. 11, 2023 in CA Application No. CA3062818.
(Continued)

Primary Examiner — Mouloucoulaye Inoussa
(74) Attorney, Agent, or Firm — Weaver Austin Villeneuve & Sampson LLP; Brian D. Griedel

(57) ABSTRACT

Disclosed herein are systems, apparatuses, methods, and non-transitory computer readable media related to a display construct coupled to a structure (e.g., a vision window). The structure can be a supportive structure such as a fixture. The display construct is configured to facilitate media display and is at least partially transparent. The vision window may be a tintable window, e.g., a window in which its tint is electrically controllable (e.g., an electrochromic window). Various interactive capabilities with the display construct are disclosed (e.g., via a touch screen).

18 Claims, 43 Drawing Sheets

Related U.S. Application Data continuation of application No. 17/232,598, filed on Apr. 16, 2021, now Pat. No. 11,747,696, which is a continuation of application No. PCT/US2020/053641, filed on Sep. 30, 2020, said application No. 17/232,598 is a continuation-in-part of application No. 16/950,774, filed on Nov. 17, 2020, which is a continuation-in-part of application No. 16/608,157, filed as application No. PCT/US2018/029476 on Apr. 25, 2018, said application No. 17/232,598 is a continuation-in-part of application No. 17/083,128, filed on Oct. 28, 2020, now abandoned, which is a continuation of application No. 16/664,089, filed on Oct. 25, 2019, now Pat. No. 11,294,254, which is a continuation-in-part of application No. PCT/US2019/030467, filed on May 2, 2019, said application No. 17/083,128 is a continuation-in-part of application No. PCT/US2018/029460, filed on Apr. 25, 2018, said application No. 17/232,598 is a continuation-in-part of application No. 17/081,809, filed on Oct. 27, 2020, now Pat. No. 11,460,749, which is a continuation of application No. 16/608,159, filed as application No. PCT/US2018/029406 on Apr. 25, 2018, now Pat. No. 11,300,849.

(60) Provisional application No. 62/911,271, filed on Oct. 5, 2019, provisional application No. 62/952,207, filed on Dec. 20, 2019, provisional application No. 62/975,706, filed on Feb. 12, 2020, provisional application No. 63/085,254, filed on Sep. 30, 2020, provisional application No. 62/607,618, filed on Dec. 19, 2017, provisional application No. 62/523,606, filed on Jun. 22, 2017, provisional application No. 62/507,704, filed on May 17, 2017, provisional application No. 62/506,514, filed on May 15, 2017, provisional application No. 62/490,457, filed on Apr. 26, 2017, provisional application No. 62/666,033, filed on May 2, 2018, provisional application No. 62/607,618, filed on Dec. 19, 2017, provisional application No. 62/523,606, filed on Jun. 22, 2017, provisional application No. 62/506,514, filed on May 15, 2017.

(51) Int. Cl.
  *G05B 19/042*   (2006.01)
  *H02J 50/20*    (2016.01)
  *H02J 50/80*    (2016.01)

(52) U.S. Cl.
  CPC ....... *H02J 50/80* (2016.02); *E06B 2009/2417* (2013.01); *E06B 2009/2464* (2013.01); *G05B 2219/25011* (2013.01); *G05B 2219/25252* (2013.01); *G05B 2219/2614* (2013.01); *G05B 2219/2628* (2013.01)

(58) Field of Classification Search
  CPC ........... G02F 1/133302; G02F 1/13306; G02F 1/137; G02F 2201/44; G02F 1/13324; H02J 50/20; H02J 50/80; H02J 7/0042; H02J 7/35; E06B 9/24; E06B 3/66; E06B 7/02; E06B 7/10; E06B 9/52; E06B 7/03; E06B 7/28; E06B 2009/2464; E06B 2009/2417; E06B 2007/023; E06B 2009/2476; E06B 2007/026; E06B 2009/247; G05B 19/042; G05B 2219/25252; G05B 2219/25011; G05B 2219/2628; G05B 2219/2614; G06F 3/02; G06F 3/1423; G06F 1/26; G06F 3/0412; G06F 3/013; G06F 2200/261; G09G 3/2096; G09G 3/2003; G09G 3/38; G09G 3/3413; G09G 3/36; G09G 2354/00; G09G 2320/08; G09G 2360/144; G09G 2320/0626; G09G 2320/064; G09G 2320/0666; G09G 2340/0492; H01R 25/003; H02S 40/32; H02S 20/26; H02S 40/38; H01L 31/0488; F24S 20/63; C09K 9/02; Y02B 10/10; Y02B 10/20; Y02E 10/40; Y02E 10/50; Y02E 70/30; B60R 1/088; B60R 1/12; B60R 2001/1253
  See application file for complete search history.

(56) References Cited

U.S. PATENT DOCUMENTS

| | | |
|---|---|---|
| 5,416,617 A | 5/1995 | Loiseaux et al. |
| D364,234 S | 11/1995 | Caley |
| D375,446 S | 11/1996 | Nelson |
| 5,684,619 A | 11/1997 | Shabrang et al. |
| 5,754,329 A | 5/1998 | Coleman |
| 5,847,858 A | 12/1998 | Krings et al. |
| D411,434 S | 6/1999 | Russell |
| 6,389,644 B1 | 5/2002 | Russo |
| 6,481,851 B1 | 11/2002 | McNelley et al. |
| 6,588,250 B2 | 7/2003 | Schell |
| 6,795,226 B2 | 9/2004 | Agrawal et al. |
| D541,623 S | 5/2007 | Hord et al. |
| 7,347,608 B2 | 3/2008 | Emde |
| D623,041 S | 9/2010 | Ayrest |
| D628,409 S | 12/2010 | Anzai |
| 8,022,977 B2 | 9/2011 | Kanade et al. |
| 8,213,074 B1 | 7/2012 | Shrivastava et al. |
| 8,218,224 B2 | 7/2012 | Kwak et al. |
| 8,363,178 B2 | 1/2013 | Chung et al. |
| D679,418 S | 4/2013 | Nolan et al. |
| 8,584,319 B1 | 11/2013 | Ludin et al. |
| D700,717 S | 3/2014 | Campacci |
| 8,686,984 B2 | 4/2014 | Hummel et al. |
| 8,705,162 B2 | 4/2014 | Brown et al. |
| 8,800,221 B1 | 8/2014 | Header |
| 9,261,751 B2 | 2/2016 | Pradhan et al. |
| 9,341,912 B2 | 5/2016 | Shrivastava et al. |
| D764,075 S | 8/2016 | Honda |
| 9,412,290 B2 | 8/2016 | Jack et al. |
| 9,442,338 B2 | 9/2016 | Uhm et al. |
| 9,454,055 B2 | 9/2016 | Brown et al. |
| 9,470,947 B2 | 10/2016 | Nagel et al. |
| 9,483,083 B1 | 11/2016 | Zaloom |
| 9,551,913 B2 | 1/2017 | Kim et al. |
| 9,690,174 B2 | 6/2017 | Wang |
| D792,190 S | 7/2017 | Lewis et al. |
| 9,709,869 B2 | 7/2017 | Baumann et al. |
| 9,740,074 B2 | 8/2017 | Agrawal et al. |
| 9,778,533 B2 | 10/2017 | Bertolini |
| 9,791,701 B2 | 10/2017 | Ato et al. |
| 9,898,912 B1 | 2/2018 | Jordan, II et al. |
| 9,917,867 B2 | 3/2018 | Sallam |
| D818,340 S | 5/2018 | Smalls |
| 9,965,865 B1 | 5/2018 | Agrawal et al. |
| 10,048,561 B2 | 8/2018 | Brown |
| 10,049,402 B1 | 8/2018 | Miranda |
| 10,067,344 B2 | 9/2018 | Kilcher et al. |
| D834,917 S | 12/2018 | Alberti et al. |
| 10,190,349 B1 | 1/2019 | Jacobson et al. |
| 10,191,318 B2 | 1/2019 | Park et al. |
| 10,288,971 B2 | 5/2019 | Phillips et al. |
| 10,322,680 B2 | 6/2019 | Terashima et al. |
| 10,359,681 B2 | 7/2019 | Brown |
| 10,379,265 B2 | 8/2019 | Brown |
| 10,394,070 B2 | 8/2019 | Park et al. |
| 10,400,509 B2 | 9/2019 | Fasi et al. |
| 10,416,520 B2 | 9/2019 | Jovanovic |
| 10,460,636 B2 | 10/2019 | Salmimaa et al. |

(56) References Cited

U.S. PATENT DOCUMENTS

| | | |
|---|---|---|
| 10,488,837 B2 | 11/2019 | Cirino |
| 10,591,798 B1 | 3/2020 | Nagel et al. |
| D881,614 S | 4/2020 | Wilke |
| D888,530 S | 6/2020 | Smalls |
| D888,531 S | 6/2020 | Smalls |
| D888,532 S | 6/2020 | Smalls |
| 10,699,604 B2 | 6/2020 | Hicks et al. |
| D894,713 S | 9/2020 | Hall |
| D898,545 S | 10/2020 | Becker |
| D902,687 S | 11/2020 | Van Cronenburg |
| 10,824,040 B2 | 11/2020 | Agrawal et al. |
| 10,917,259 B1 | 2/2021 | Chein et al. |
| 10,921,675 B2 | 2/2021 | Barnum et al. |
| 10,923,226 B2 | 2/2021 | Macary et al. |
| 10,954,677 B1 | 3/2021 | Scanlin |
| 10,968,688 B1 | 4/2021 | Bedford |
| 10,982,487 B2 | 4/2021 | Ramirez |
| D939,321 S | 12/2021 | Leimkuehler et al. |
| 11,229,301 B2 | 1/2022 | Schwarz et al. |
| 11,231,633 B2 | 1/2022 | Trikha et al. |
| 11,300,849 B2 | 4/2022 | Trikha et al. |
| 11,335,232 B2 | 5/2022 | Huang et al. |
| D959,031 S | 7/2022 | Wagner |
| 11,454,854 B2 | 9/2022 | Trikha et al. |
| 11,460,749 B2 | 10/2022 | Trikha et al. |
| 11,467,464 B2 | 10/2022 | Trikha et al. |
| 11,493,819 B2 | 11/2022 | Trikha et al. |
| 11,513,412 B2 | 11/2022 | Trikha et al. |
| 11,747,696 B2 | 9/2023 | Trikha et al. |
| 11,747,698 B2 | 9/2023 | Trikha et al. |
| 2002/0149829 A1 | 10/2002 | Mochizuka et al. |
| 2003/0196297 A1 | 10/2003 | Gerali et al. |
| 2004/0158494 A1 | 8/2004 | Suthar |
| 2005/0198777 A1 | 9/2005 | Mabe |
| 2006/0026798 A1 | 2/2006 | Gerali |
| 2006/0077126 A1 | 4/2006 | Kothari |
| 2006/0279518 A1 | 12/2006 | Jang et al. |
| 2007/0097482 A1 | 5/2007 | Park et al. |
| 2007/0188676 A1 | 8/2007 | Choi et al. |
| 2008/0088821 A1 | 4/2008 | Hurvitz et al. |
| 2008/0182506 A1 | 7/2008 | Jackson et al. |
| 2008/0198584 A1 | 8/2008 | Fouraux et al. |
| 2008/0239192 A1 | 10/2008 | Oohira |
| 2008/0259416 A1 | 10/2008 | Peters et al. |
| 2008/0277486 A1 | 11/2008 | Seem et al. |
| 2009/0217485 A1 | 9/2009 | Springer |
| 2009/0230263 A1 | 9/2009 | Burge |
| 2009/0231662 A1 | 9/2009 | Sorensson et al. |
| 2010/0218010 A1 | 8/2010 | Musti et al. |
| 2010/0243427 A1 | 9/2010 | Kozlowski et al. |
| 2010/0245973 A1 | 9/2010 | Wang et al. |
| 2011/0148218 A1 | 6/2011 | Rozbicki |
| 2011/0164317 A1 | 7/2011 | Vergohl et al. |
| 2011/0299149 A1 | 12/2011 | Park et al. |
| 2012/0268369 A1 | 10/2012 | Kikkeri |
| 2012/0275008 A1 | 11/2012 | Pradhan et al. |
| 2013/0057937 A1 | 3/2013 | Berman et al. |
| 2013/0099447 A1 | 4/2013 | Patton |
| 2013/0157493 A1 | 6/2013 | Brown |
| 2013/0241299 A1 | 9/2013 | Snyker et al. |
| 2013/0242370 A1 | 9/2013 | Wang |
| 2013/0271813 A1 | 10/2013 | Brown |
| 2013/0271814 A1 | 10/2013 | Brown |
| 2013/0278989 A1 | 10/2013 | Lam et al. |
| 2013/0319756 A1 | 12/2013 | Snyker et al. |
| 2013/0335350 A1 | 12/2013 | Choi |
| 2014/0001977 A1 | 1/2014 | Zacharchuk et al. |
| 2014/0021903 A1 | 1/2014 | Seiling |
| 2014/0098007 A1 | 4/2014 | Delpier et al. |
| 2014/0144083 A1 | 5/2014 | Artwohl et al. |
| 2014/0168745 A1 | 6/2014 | Satou et al. |
| 2014/0177028 A1 | 6/2014 | Shrivastava et al. |
| 2014/0236323 A1 | 8/2014 | Brown et al. |
| 2014/0259931 A1 | 9/2014 | Plummer |
| 2014/0267384 A1 | 9/2014 | Kwon et al. |
| 2014/0300945 A1 | 10/2014 | Parker |
| 2014/0320950 A1 | 10/2014 | Saxe et al. |
| 2014/0331598 A1 | 11/2014 | White |
| 2014/0333899 A1 | 11/2014 | Smithwick |
| 2014/0368899 A1 | 12/2014 | Greer |
| 2015/0032264 A1 | 1/2015 | Emmons et al. |
| 2015/0092259 A1 | 4/2015 | Greer et al. |
| 2015/0116811 A1 | 4/2015 | Shrivastava et al. |
| 2015/0160525 A1 | 6/2015 | Shi |
| 2015/0195644 A1 | 7/2015 | Wilson et al. |
| 2015/0219975 A1 | 8/2015 | Phillips et al. |
| 2015/0325167 A1 | 11/2015 | Eom |
| 2015/0327304 A1 | 11/2015 | Tinnakornsrisuphap et al. |
| 2015/0331295 A1 | 11/2015 | Takahashi et al. |
| 2015/0338713 A1 | 11/2015 | Brown |
| 2015/0355521 A1 | 12/2015 | Alton et al. |
| 2015/0368967 A1 | 12/2015 | Lundy et al. |
| 2016/0024827 A1 | 1/2016 | Lambright et al. |
| 2016/0026060 A1 | 1/2016 | Koo et al. |
| 2016/0027391 A1 | 1/2016 | Gibson et al. |
| 2016/0054633 A1 | 2/2016 | Brown et al. |
| 2016/0054634 A1 | 2/2016 | Brown et al. |
| 2016/0071183 A1 | 3/2016 | Joshi et al. |
| 2016/0109778 A1 | 4/2016 | Shrivastava et al. |
| 2016/0133222 A1 | 5/2016 | Paxson |
| 2016/0154290 A1 | 6/2016 | Brown et al. |
| 2016/0203403 A1 | 7/2016 | Nagel et al. |
| 2016/0225832 A1 | 8/2016 | Kwon et al. |
| 2016/0255279 A1 | 9/2016 | Sudo |
| 2016/0261837 A1 | 9/2016 | Thompson et al. |
| 2016/0318525 A1 | 11/2016 | Lardy |
| 2016/0330042 A1 | 11/2016 | Andersen |
| 2016/0363831 A1 | 12/2016 | Ash et al. |
| 2016/0372083 A1 | 12/2016 | Taite et al. |
| 2017/0044057 A1 | 2/2017 | Rozbicki et al. |
| 2017/0052289 A1 | 2/2017 | Boissevain et al. |
| 2017/0075183 A1 | 3/2017 | Brown |
| 2017/0075323 A1 | 3/2017 | Shrivastava et al. |
| 2017/0082903 A1 | 3/2017 | Vigano et al. |
| 2017/0085834 A1 | 3/2017 | Kim et al. |
| 2017/0102907 A1 | 4/2017 | Kuo et al. |
| 2017/0122802 A1 | 5/2017 | Brown et al. |
| 2017/0132976 A1 | 5/2017 | Yang et al. |
| 2017/0139301 A1 | 5/2017 | Messere et al. |
| 2017/0146884 A1 | 5/2017 | Vigano et al. |
| 2017/0157466 A1 | 6/2017 | Korpela et al. |
| 2017/0170776 A1 | 6/2017 | Janowski |
| 2017/0197494 A1 | 7/2017 | Li |
| 2017/0200424 A1 | 7/2017 | Xu et al. |
| 2017/0212399 A1 | 7/2017 | Tarng et al. |
| 2017/0213503 A1 | 7/2017 | Zhang et al. |
| 2017/0221425 A1 | 8/2017 | Lu et al. |
| 2017/0234067 A1 | 8/2017 | Fasi et al. |
| 2017/0248564 A1 | 8/2017 | Miyajima |
| 2017/0253801 A1 | 9/2017 | Bae et al. |
| 2017/0264865 A1 | 9/2017 | Huangfu |
| 2017/0277342 A1 | 9/2017 | Hong et al. |
| 2017/0297498 A1 | 10/2017 | Larson et al. |
| 2017/0309215 A1 | 10/2017 | Perdices-Gonzalez et al. |
| 2017/0310956 A1 | 10/2017 | Perdices-Gonzalez et al. |
| 2017/0328121 A1 | 11/2017 | Purdy et al. |
| 2017/0336692 A1 | 11/2017 | Park et al. |
| 2017/0347129 A1 | 11/2017 | Levi et al. |
| 2018/0011383 A1 | 1/2018 | Higashihara et al. |
| 2018/0025679 A1 | 1/2018 | Park et al. |
| 2018/0106098 A1 | 4/2018 | Unveren et al. |
| 2018/0129172 A1 | 5/2018 | Shrivastava et al. |
| 2018/0130455 A1 | 5/2018 | Plummer et al. |
| 2018/0144696 A1 | 5/2018 | Zhang et al. |
| 2018/0144712 A1 | 5/2018 | Threlkel et al. |
| 2018/0157141 A1 | 6/2018 | Brown et al. |
| 2018/0188627 A1 | 7/2018 | Vigano et al. |
| 2018/0217429 A1 | 8/2018 | Busch |
| 2018/0231860 A1 | 8/2018 | Podbelski et al. |
| 2018/0252423 A1 | 9/2018 | Hieke et al. |
| 2018/0259804 A1 | 9/2018 | Bae et al. |
| 2018/0270542 A1 | 9/2018 | Ramalingam et al. |
| 2018/0284555 A1 | 10/2018 | Klawuhn et al. |
| 2018/0347258 A1 | 12/2018 | Wexler |

(56) References Cited

U.S. PATENT DOCUMENTS

| | | |
|---|---|---|
| 2019/0011798 A9 | 1/2019 | Brown et al. |
| 2019/0025661 A9 | 1/2019 | Brown et al. |
| 2019/0134940 A1 | 5/2019 | Inoue et al. |
| 2019/0221148 A1 | 7/2019 | Pradhan et al. |
| 2019/0243206 A1 | 8/2019 | Brown et al. |
| 2019/0267933 A1 | 8/2019 | Janowski |
| 2019/0294018 A1 | 9/2019 | Shrivastava et al. |
| 2019/0303086 A1 | 10/2019 | Nagayama et al. |
| 2019/0317458 A1 | 10/2019 | Shrivastava et al. |
| 2019/0346417 A1 | 11/2019 | Benefield |
| 2019/0356508 A1 | 11/2019 | Trikha et al. |
| 2020/0004096 A1 | 1/2020 | Brown et al. |
| 2020/0022072 A1 | 1/2020 | Cho et al. |
| 2020/0033163 A1 | 1/2020 | Agarwal et al. |
| 2020/0045261 A1 | 2/2020 | Lim et al. |
| 2020/0056423 A1 | 2/2020 | Bjergaard et al. |
| 2020/0057421 A1 | 2/2020 | Trikha et al. |
| 2020/0073193 A1 | 3/2020 | Pradhan et al. |
| 2020/0096775 A1 | 3/2020 | Franklin et al. |
| 2020/0103068 A1 | 4/2020 | Ahn |
| 2020/0103841 A1 | 4/2020 | Pillai et al. |
| 2020/0104090 A1 | 4/2020 | Kim et al. |
| 2020/0133615 A1 | 4/2020 | Kim et al. |
| 2020/0150508 A1 | 5/2020 | Patterson et al. |
| 2020/0150602 A1 | 5/2020 | Trikha et al. |
| 2020/0256118 A1 | 8/2020 | Hicks et al. |
| 2020/0259237 A1 | 8/2020 | Shrivastava et al. |
| 2020/0260556 A1 | 8/2020 | Rozbicki et al. |
| 2020/0319765 A1 | 10/2020 | Badr et al. |
| 2021/0021788 A1 | 1/2021 | Mcnelley et al. |
| 2021/0041759 A1 | 2/2021 | Trikha et al. |
| 2021/0063836 A1 | 3/2021 | Patterson et al. |
| 2021/0126063 A1 | 4/2021 | Vanderveen et al. |
| 2021/0132458 A1 | 5/2021 | Trikha et al. |
| 2021/0191218 A1 | 6/2021 | Trikha et al. |
| 2021/0210053 A1 | 7/2021 | Ng et al. |
| 2021/0325753 A1 | 10/2021 | Trikha et al. |
| 2021/0383804 A1 | 12/2021 | Makker et al. |
| 2021/0390953 A1 | 12/2021 | Makker et al. |
| 2021/0405493 A1 | 12/2021 | Tinianov et al. |
| 2022/0137474 A1 | 5/2022 | Trikha et al. |
| 2022/0137475 A1 | 5/2022 | Trikha et al. |
| 2022/0137476 A1 | 5/2022 | Trikha et al. |
| 2022/0179274 A1 | 6/2022 | Trikha et al. |
| 2022/0179275 A1 | 6/2022 | Patterson et al. |
| 2022/0413351 A1 | 12/2022 | Trikha et al. |
| 2023/0065864 A1 | 3/2023 | Trikha et al. |
| 2023/0070288 A1 | 3/2023 | Trikha et al. |
| 2023/0077008 A1 | 3/2023 | Trikha et al. |
| 2023/0096768 A1 | 3/2023 | Trikha et al. |
| 2023/0288770 A1 | 9/2023 | Gupta et al. |
| 2023/0324952 A1 | 10/2023 | Martinson et al. |
| 2023/0350260 A1 | 11/2023 | Martinson et al. |
| 2023/0393443 A1 | 12/2023 | Marquez et al. |

FOREIGN PATENT DOCUMENTS

| | | |
|---|---|---|
| CN | 103168269 A | 6/2013 |
| CN | 103207493 A | 7/2013 |
| CN | 103266828 A | 8/2013 |
| CN | 103701694 A | 4/2014 |
| CN | 104885002 A | 9/2015 |
| CN | 205264276 U | 5/2016 |
| CN | 105676556 A | 6/2016 |
| CN | 106125442 A | 11/2016 |
| CN | 106364442 A | 2/2017 |
| CN | 106462023 A | 2/2017 |
| CN | 205992531 U | 3/2017 |
| CN | 106575064 A | 4/2017 |
| CN | 207409225 U | 5/2018 |
| CN | 208537871 U | 2/2019 |
| CN | 110515425 A | 11/2019 |
| CN | 110543057 A | 12/2019 |
| EP | 2837205 A1 | 2/2015 |
| EP | 3015915 A1 | 5/2016 |
| EP | 2837205 B1 | 2/2017 |
| EP | 3352053 A1 | 7/2018 |
| GB | 6147609 | 7/2021 |
| GB | 6147618 | 7/2021 |
| JP | H0611477 A | 1/1994 |
| JP | H06242044 A | 9/1994 |
| JP | H06308073 A | 11/1994 |
| JP | 2008293024 A | 12/2008 |
| JP | 2019502145 A | 1/2019 |
| JP | 2019520552 A | 7/2019 |
| KR | 20060069742 A | 6/2006 |
| KR | 20070024837 A | 3/2007 |
| KR | 20110003698 A | 1/2011 |
| KR | 20120092921 A | 8/2012 |
| KR | 101254602 B1 | 4/2013 |
| KR | 101346862 B1 | 1/2014 |
| KR | 20140004175 A | 1/2014 |
| KR | 101471443 B1 | 12/2014 |
| KR | 20150060051 A | 6/2015 |
| KR | 20150136981 A | 12/2015 |
| KR | 20160012564 A | 2/2016 |
| KR | 20160105005 A | 9/2016 |
| KR | 20170022132 A | 3/2017 |
| KR | 20170095892 A | 8/2017 |
| KR | 20170121858 A | 11/2017 |
| KR | 101799323 B1 | 12/2017 |
| KR | 20190077583 A | 7/2019 |
| TW | 201348828 A | 12/2013 |
| TW | 201621138 A | 6/2016 |
| WO | WO-02054086 A1 | 7/2002 |
| WO | WO-2013159778 A1 | 10/2013 |
| WO | WO-2015120045 A1 | 8/2015 |
| WO | WO-2015134789 A1 | 9/2015 |
| WO | WO-2016086017 A1 | 6/2016 |
| WO | WO-2016094139 A1 | 6/2016 |
| WO | WO-2016183059 A1 | 11/2016 |
| WO | WO-2017007841 A1 | 1/2017 |
| WO | WO-2017035650 A1 | 3/2017 |
| WO | WO-2017062592 A1 | 4/2017 |
| WO | WO-2017075059 A1 | 5/2017 |
| WO | WO-2017137904 A1 | 8/2017 |
| WO | WO-2017155833 A1 | 9/2017 |
| WO | WO-2017180734 A1 | 10/2017 |
| WO | WO-2017189618 A1 | 11/2017 |
| WO | WO-2017192881 A1 | 11/2017 |
| WO | WO-2018063919 A1 | 4/2018 |
| WO | WO-2018098089 A1 | 5/2018 |
| WO | WO-2018102103 A1 | 6/2018 |
| WO | WO-2018200702 A1 | 11/2018 |
| WO | WO-2018200740 A2 | 11/2018 |
| WO | WO-2018200752 A1 | 11/2018 |
| WO | WO-2019040809 A1 | 2/2019 |
| WO | WO-2020146766 A1 | 7/2020 |
| WO | WO-2021067505 A1 | 4/2021 |
| WO | WO-2021154915 A1 | 8/2021 |
| WO | WO-2021211798 A1 | 10/2021 |

OTHER PUBLICATIONS

CAN in Automation (CiA): PDO protocol, 2016; can-cia.org, http://www.can-cia.org/can-knowledge/canopen/pdo-protocol. Retrived from https://web.archive.org/web/20161028171403/http:1/www.can-cia.org/can-knowledge/canopen/pdo-protocol on Feb. 8, 2023, Year: 2016.
Chinese Office Action dated Nov. 1, 2022 in CN Application No. CN201880035570 with English translation.
CN Office Action dated Feb. 9, 2023, in Application No. CN201880035614.X with English translation.
CN Office Action dated Jan. 13, 2024 in CN Application No. 202080078084.4, with English Translation.
CN Office Action dated Jul. 29, 2023, in Application No. CN201880035570.0 with English Translation.
CN Office Action dated Mar. 8, 2022, in Application No. CN201880035614.X with English translation.
CN Office Action dated Oct. 24, 2022, in Application No. CN201880035614.X with English translation.

(56) References Cited

OTHER PUBLICATIONS

EP Office Action dated Feb. 6, 2023 in Application No. EP20797262.1.
European Extended Search Report dated Nov. 11, 2020 in EP Application No. 18791268.8.
European Extended Search Report dated Nov. 12, 2020 in EP Application No. 18791669.7.
"Halio Rooftop Sensor Kit (Model SR500)," Product Data Sheet, Kinestral Technologies, 2020, 4 pp.
IN Office Action dated Jan. 24, 2022 in Application No. IN201937044699.
IN Office Action dated Oct. 31, 2022 in Application No. IN202238012864.
IN Office action dated Sep. 28, 2021, in IN Application No. IN201937045203.
International Preliminary Report on Patentability dated Apr. 13, 2023 in PCT Application No. No. PCT/US2021/052595.
International Preliminary Report on Patentability dated Apr. 13, 2023 in PCT Application No. No. PCT/US2021/052597.
International Preliminary Report on Patentability dated Aug. 10, 2023, in PCT Application No. PCT/US2022/014135.
International Preliminary Report on Patentability dated Aug. 11, 2022 in PCT Application No. PCT/US2021/015378.
International Preliminary Report on Patentability dated Feb. 9, 2023 in PCT Application No. PCT/US2021/043143.
International Preliminary Report on Patentability dated May 19, 2023 in PCT Application No. PCT/US2021/057678.
International Preliminary Report on Patentability dated Nov. 7, 2019 in PCT Application No. PCT/US2018/029406.
International Preliminary Report on Patentability dated Nov. 7, 2019 in PCT Application No. PCT/US2018/029476.
International Preliminary Report on Patentability dated Oct. 26, 2023, in Application No. PCT/US2022/024812.
International Preliminary Reporton Patentability dated Apr. 13, 2023 in PCT Application No. No. PCT/US2021/052587.
International Search Report and Written Opinion dated Apr. 19, 2022 in PCT Application No. PCT/U S2021 /0576 78.
International Search Report and Written Opinion dated Jan. 20, 2022 in PCT Application No. PCT/US2021/052597.
International Search Report and Written Opinion dated Jun. 23, 2021 in PCT Application No. PCT/US2021/015378.
International Search Report and Written Opinion dated Mar. 8, 2022 in PCT Application No. PCT/US2021/052587.
International Search Report and Written Opinion dated Mar. 15, 2021 in PCT Application No. PCT/US2020/053641.
International Search Report and Written Opinion dated Mar. 15, 2022 in PCT Application No. PCT/US2021/052595.
International Search Report and Written Opinion dated May 4, 2022, in PCT Application No. PCT/US2022/014135.
International Search Report and Written Opinion dated Nov. 10, 2021 in PCT Application No. PCT/US2021/043143.
International Search Report and Written Opinion dated Oct. 15, 2018 in PCT Application No. PCT/US2018/029406.
International Search Report and Written Opinion dated Sep. 1, 2022, in Application No. PCT/US2022/024812.
Joseph, J., "Xiaomi shows off near perfect Under Screen Camera Technology," Gizchina.com, Aug. 28, 2020, 7 pp., "title="Link: https://www.gizmochina.com/2020/08/28/xiaomi-perfected-third-gen-under-screen-camera-technology-prototype/>">https://www.gizmochina.com/2020/08/28/xiaomi-perfected-third-gen-under-screen-camera-technology-prototype/ , retrieved Apr. 21, 2021.
JP Office Action dated Jul. 26, 2023 in Application No. JP2022-520878 with English translation.
JP Office Action dated Mar. 9, 2023 in Application No. JP2022-520878 with English translation.
JP Office Action dated Oct. 6, 2022 in Application No. JP2022-520878 with English translation.
KR Office Action dated Mar. 31, 2023, in Application No. KR10-2022-7014814 with English translation.
KR Office Action dated Sep. 27, 2022, in Application No. KR10-2022-7014814 withEnglish Translation.
Lululemon athletica, "Mirror", The Mirror Gym product brochure, known Dec. 8, 2020, 9 pp, >https://shop.lululemon.com/story/mirror-home-gym , retrieved Jan. 29, 2021.
PCT Application No. PCT/US2021/052587 filed Sep. 29, 2021.
PCT Application No. PCT/US2021/052595 filed Sep. 29, 2021.
PCT Application No. PCT/US2021/052597 filed Sep. 29, 2021.
PCT International Search Report and Written Opinion (ISA:KIPO) dated Aug. 13, 2018 for PCT Application No. PCT/US2018/029476.
Porter, J., "LG developing sliding doors made of transparent OLED displays," The Verge, Dec. 7, 2020, 2 pp, "title="Link: https://www.theverge.com/2020/12/7/22158335/lg-assa-abloy-automatic-sliding-doors-transparent-oled-displays>">https://www.theverge.com/2020/12/7/22158335/lg-assa-abloy-automatic-sliding-doors-transparent-oled-displays , retrieved Dec. 8, 2020.
Science News, "New technique could help spot snooping drones", Jan. 23, 2018, 2 pp, "title="Link: https://www.sciencenews.org/article/new-technique-could-help-spot-snooping-drones>">https://www.sciencenews.org/article/new-technique-could-help-spot-snooping-drones retrieved Jan. 24, 2018.
TW Office Action dated Feb. 24, 2022, in Application No. TW107114102 with English Translation.
TW Office Action dated May 4, 2023 in Application No. TW20180114105 with English translation.
TW Office Action dated Oct. 18, 2023 in TW Application No. 112127320 with English Translation.
TW Office Action dated Oct. 31, 2022, in Application No. TW107114102 with English Translation.
TW Office Action dated Sep. 13, 2022 In Application No. TW20180114105 with English translation.
U.S. Corrected Notice of Allowance dated Aug. 10, 2022 in U.S. Appl. No. 17/578,196.
U.S. Corrected Notice of Allowance dated Aug. 31, 2022 in U.S. Appl. No. 17/578,226.
U.S. Non-Final office Action dated Sep. 14, 2022 in U.S. Appl. No. 16/950,774.
U.S. Notice of Allowance dated Aug. 3, 2022 in U.S. Appl. No. 17/578,218.
U.S. Notice of Allowance dated Aug. 4, 2022 in U.S. Appl. No. 17/578,226.
U.S. Notice of Allowance dated Aug. 11, 2022 in U.S. Appl. No. 17/578,234.
U.S. Restriction Requirement dated May 12, 2022 in U.S. Appl. No. 16/950,774.
U.S. Advisory Action dated Dec. 23, 2022 in U.S. Appl. No. 17/232,598.
U.S. Advisory Action dated Feb. 3, 2023 in U.S. Appl. No. 16/608,157.
U.S Advisory Action dated Jan. 14, 2022 in U.S. Appl. No. 16/608,159.
U.S Advisory Action dated Jun. 9, 2023 in U.S. Appl. No. 16/950,774.
U.S. Appl. No. 63/057,120, Inventors Gupta et al., filed Jul. 27, 2020.
U.S. Appl. No. 63/078,805, Inventors Gupta et al., filed Sep. 15, 2020.
U.S. Co-pending Application dated Nov. 11, 2022 in U.S. Appl. No. 17/985,726.
US Corrected Notice of Allowability dated Sep. 22, 2021, in U.S. Appl. No. 17/338,562.
U.S. Corrected Notice of Allowance dated Oct. 24, 2022 in U.S. Appl. No. 17/578,234.
U.S. Corrected Notice of Allowance dated Sep. 18, 2023, in U.S. Appl. No. 16/608,157.
U.S. Corrected Notice of Allowance dated Sep. 25, 2023, in U.S. Appl. No. 16/608,157.
U.S. Final office Action dated Nov. 23, 2022 in U.S. Appl. No. 16/608,157.
U.S. Final Office Action dated Apr. 6, 2023 in U.S. Appl. No. 16/950,774.
US Final Office Action dated Aug. 19, 2021 in U.S. Appl. No. 16/608,159.
U.S. Final Rejection dated Oct. 18, 2022, in U.S. Appl. No. 17/232,598.

(56) References Cited

OTHER PUBLICATIONS

U.S. Non Final office action dated Mar. 28, 2022, in U.S. Appl. No. 17/578,196.
U.S. Non Final office action dated Mar. 28, 2022, in U.S. Appl. No. 17/578,226.
U.S. Non-Final Office Action dated Apr. 14, 2023 in U.S. Appl. No. 29/652,916.
U.S. Non-Final Office Action dated Apr. 25, 2023 in U.S. Appl. No. 17/985,720.
U.S. Non-Final Office Action dated Feb. 15, 2023 in U.S. Appl. No. 17/083,128.
U.S. Non-Final office Action dated Jan. 27, 2023 in U.S. Appl. No. 17/985,743.
U.S. Non-Final Office Action dated Jul. 15, 2022, in U.S. Appl. No. 16/608,157.
U.S. Non-Final Office Action dated Jul. 24, 2023, in U.S. Appl. No. 16/950,774.
U.S. Non-Final Office Action dated Mar. 3, 2023 in U.S. Appl. No. 16/608,157.
U.S. Non-Final Office Action dated Mar. 29, 2022, in U.S. Appl. No. 17/578,234.
U.S. Notice of Allowance dated Apr. 11, 2023 in U.S. Appl. No. 17/232,598.
U.S. Notice of Allowance dated Apr. 25, 2023 in U.S. Appl. No. 17/985,726.
U.S. Notice of Allowance dated Apr. 26, 2023 in U.S. Appl. No. 17/232,598.
U.S. Notice of Allowance dated Aug. 1, 2022 in U.S. Appl. No. 17/578,196.
U.S. Notice of Allowance dated Dec. 7, 2023 in U.S. Appl. No. 17/985,720.
U.S. Notice of Allowance dated Feb. 9, 2023 in U.S. Appl. No. 17/232,598.
U.S. Notice of Allowance dated Feb. 14, 2022 in U.S. Appl. No. 16/608,159.
U.S. Notice of Allowance dated Jun. 9, 2023 in U.S. Appl. No. 17/985,743.
U.S. Notice of Allowance dated Jun. 13, 2022, in U.S. Appl. No. 17/081,809.
U.S. Notice of Allowance dated Jun. 22, 2023, in U.S. Appl. No. 17/985,726.
U.S. Notice of Allowance dated Jun. 23, 2023, in U.S. Appl. No. 17/985,743.
U.S. Notice of Allowance dated May 18, 2022, in U.S. Appl. No. 17/081,809.
U.S. Notice of Allowance dated Oct. 17, 2023 in U.S. Appl. No. 17/985,720.
US Notice of Allowance dated Sep. 3, 2021, in U.S. Appl. No. 17/338,562.
U.S. Notice of Allowance dated Sep. 12, 2023 in U.S. Appl. No. 16/608,157.
US Office Action dated Apr. 1, 2022 in U.S. Appl. No. 17/578,218.
U.S. Office Action dated Apr. 4, 2022, in U.S. Appl. No. 16/608,157.
US Office Action dated Jan. 19, 2021 in U.S. Appl. No. 16/608,159.
U.S. Appl. No. 17/338,562, inventors Trikha et al., filed Jun. 3, 2021.
U.S. Appl. No. 63/135,021, inventors Martinson et al., filed Jan. 8, 2021.
U.S. Appl. No. 63/181,648, inventors Makker et al., filed Apr. 29, 2021.
U.S. Appl. No. 63/211,400, inventors Martinson et al., filed Jun. 16, 2021.
U.S. Appl. No. 63/085,254, Inventors Young et al., filed Sep. 30, 2020.
U.S. Appl. No. 63/115,842, Inventors Martinson et al., filed Nov. 19, 2020.
U.S. Appl. No. 63/154,352, Inventors Martinson et al., filed Feb. 26, 2021.
U.S. Appl. No. 63/170,245, Inventors Martinson et al., filed Apr. 2, 2021.
U.S. Appl. No. 63/212,483, inventors Martinson et al., filed Jun. 18, 2021.
U.S. Appl. No. 63/246,770, Inventors Martinson et al., filed Sep. 21, 2021.
U.S. Appl. No. 63/247,684, Inventors Martinson et al., filed Sep. 23, 2021.
U.S. Appl. No. 63/214,741, inventors Marquez et al., filed Jun. 24, 2021.
U.S. Appl. No. 17/899,019, inventors Trikha et al., filed Aug. 30, 2022.
U.S. Appl. No. 18/028,292, inventors Martinson et al., filed Mar. 24, 2023.
U.S. Appl. No. 18/028,297, inventors Martinson et al., filed Mar. 24, 2023.
U.S. Appl. No. 18/492,495, inventors Trikha N, et al., filed Oct. 23, 2023.
U.S. Appl. No. 18/555,129, inventors MakkerT, et al., filed Oct. 12, 2023.
U.S. Appl. No. 29/652,916, inventors Martinson et al., filed Jan. 8, 2021.
US Preliminary Amendment dated Dec. 31, 2019 in U.S. Appl. No. 16/608,159.
US Preliminary Amendment dated Mar. 31, 2020 in U.S. Appl. No. 16/608,157.
U.S. Restriction Requirement dated Dec. 12, 2022 in U.S. Appl. No. 29/652,916.

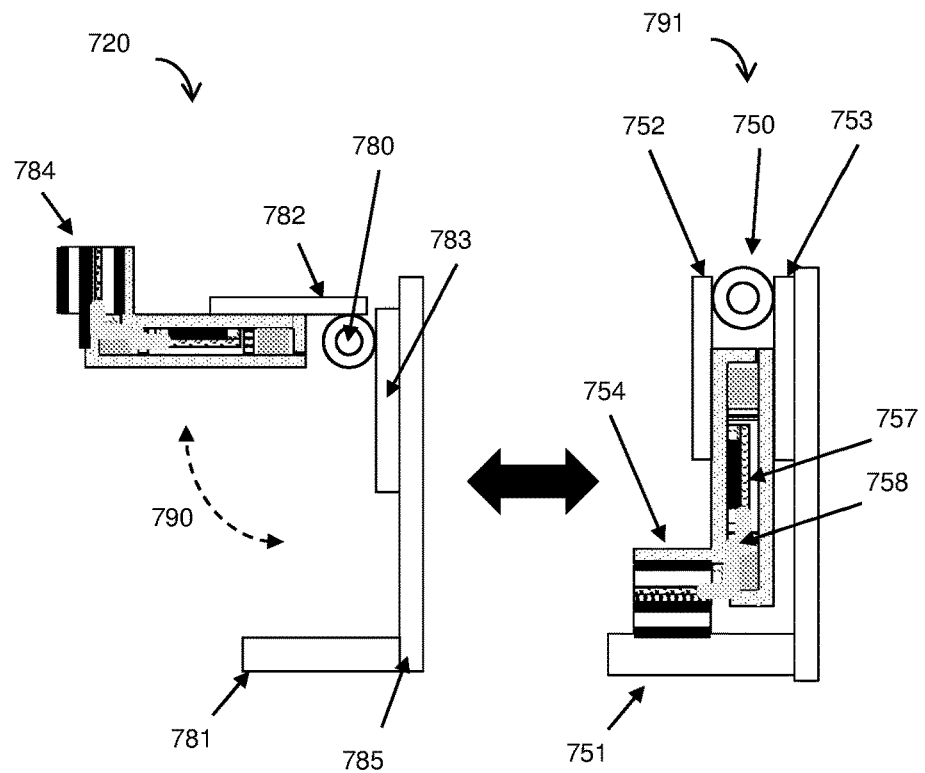
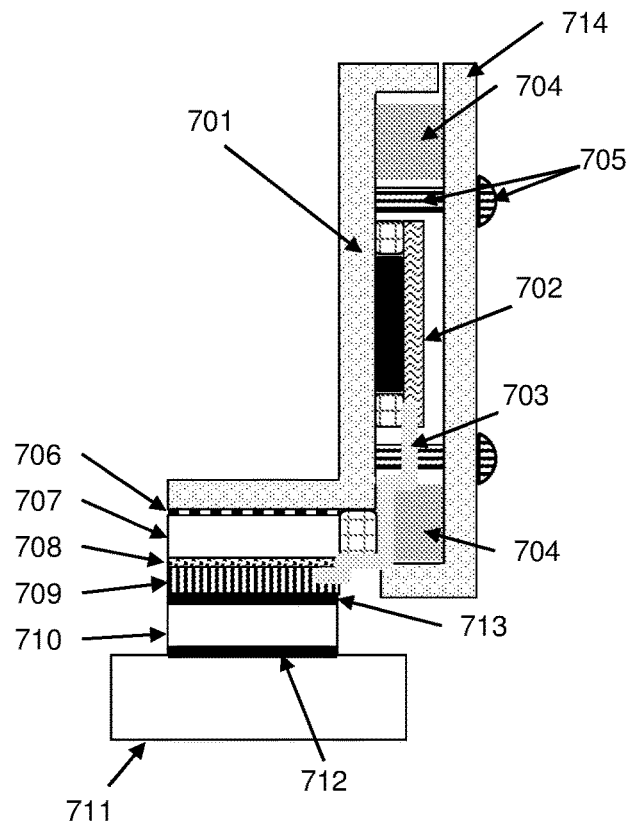
Figure 7

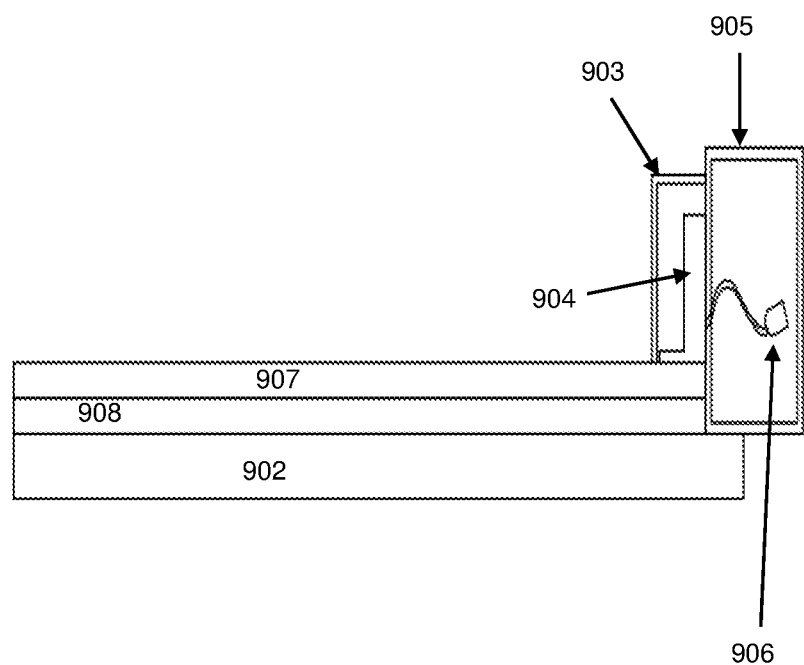
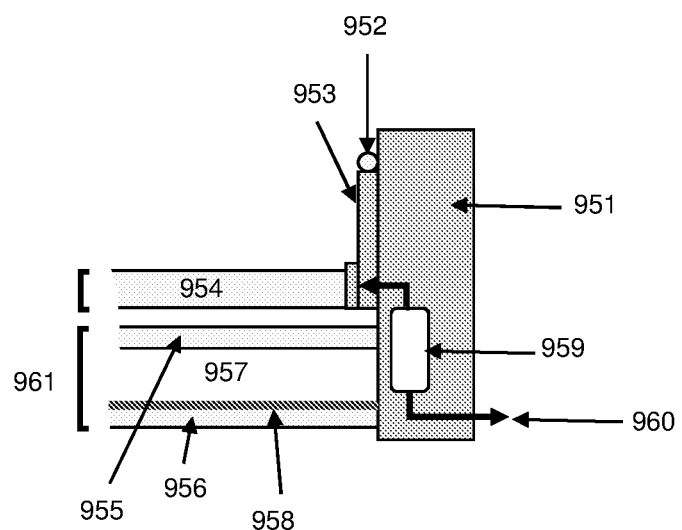
Figure 9

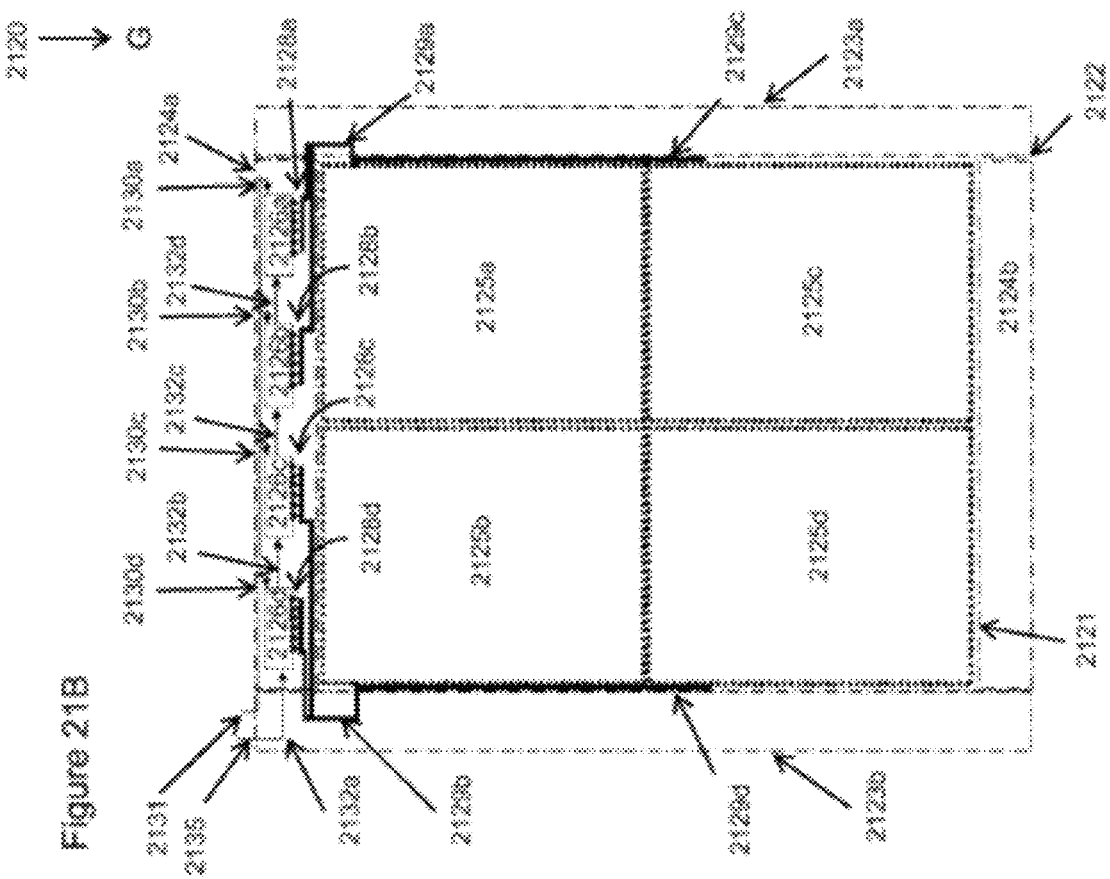
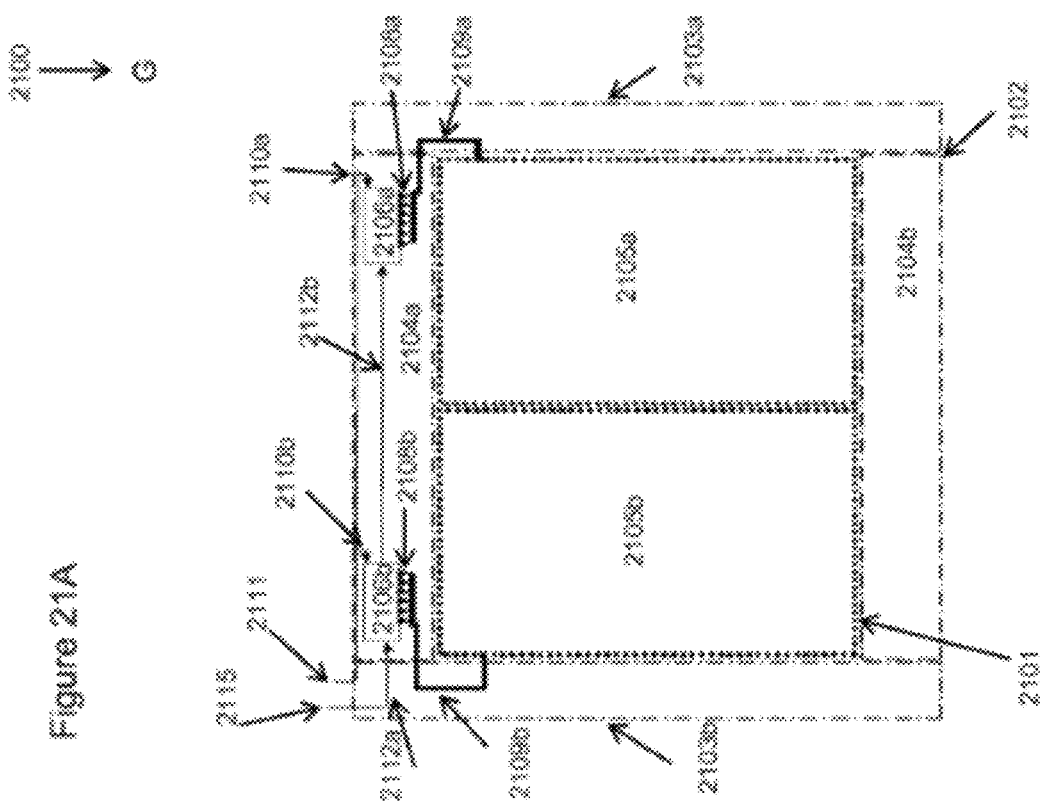
Figure 21A
Figure 21B

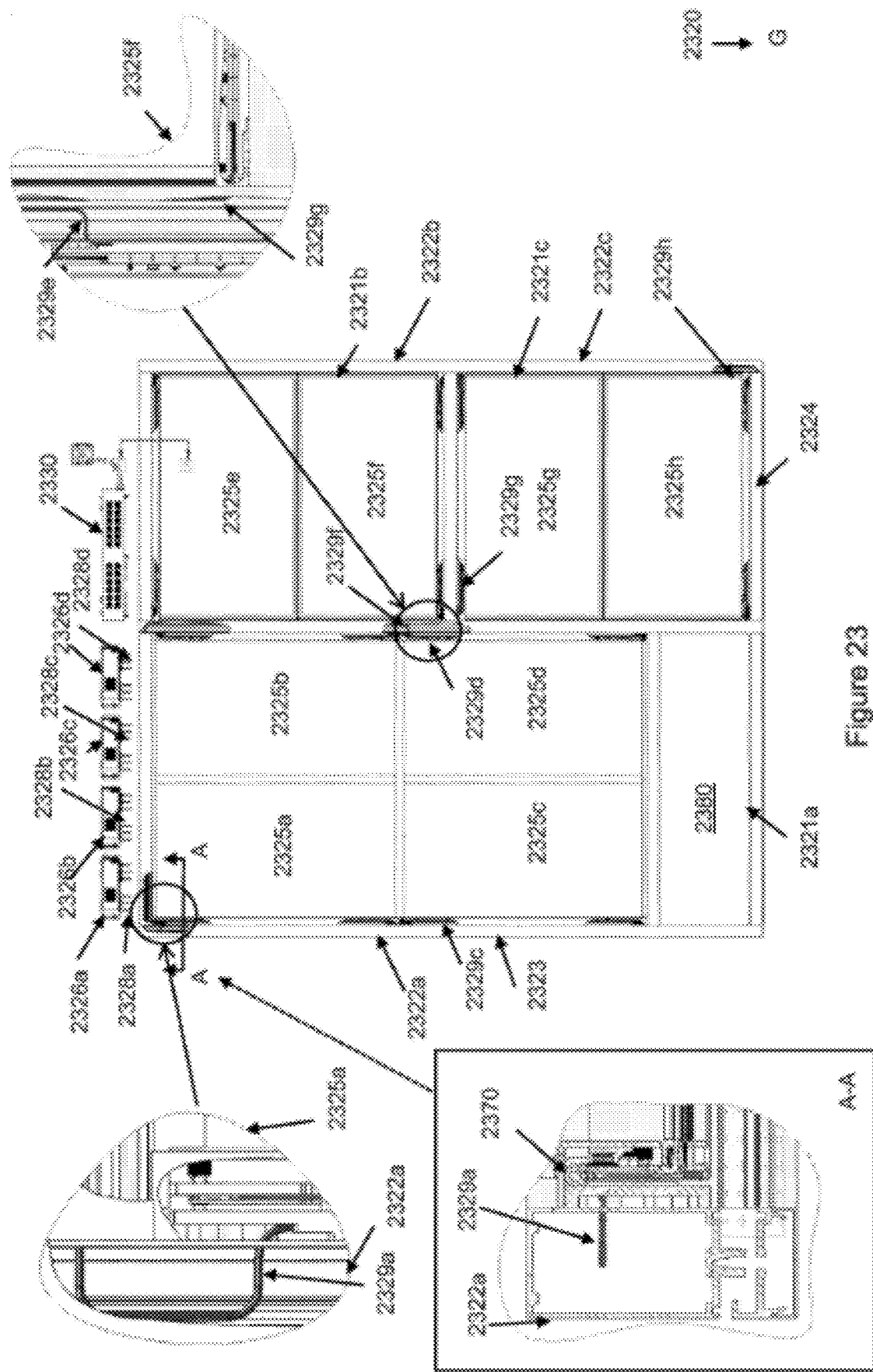

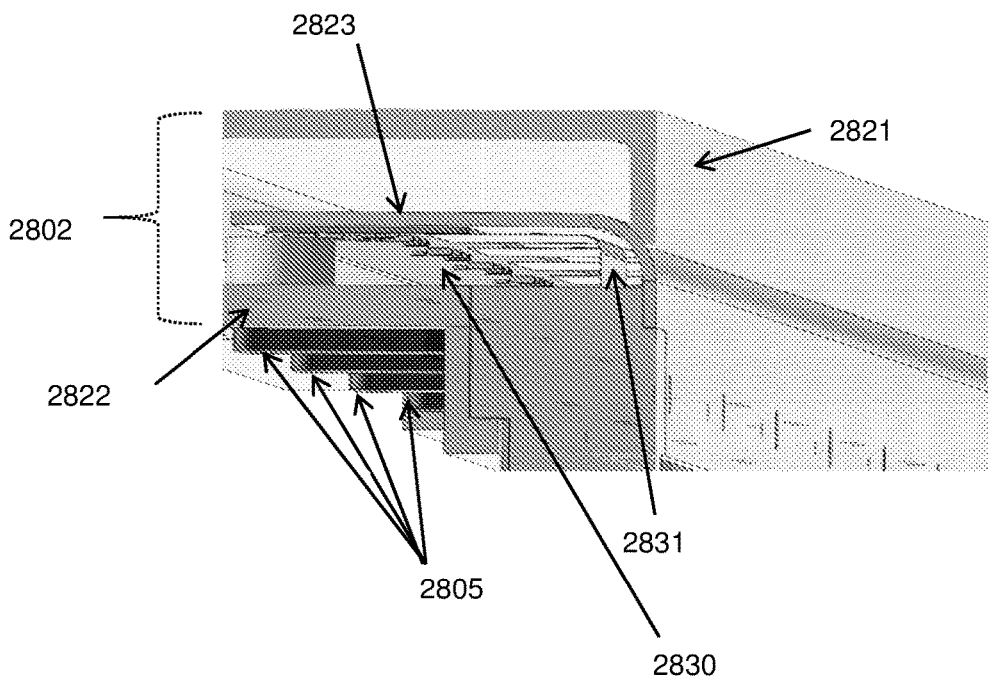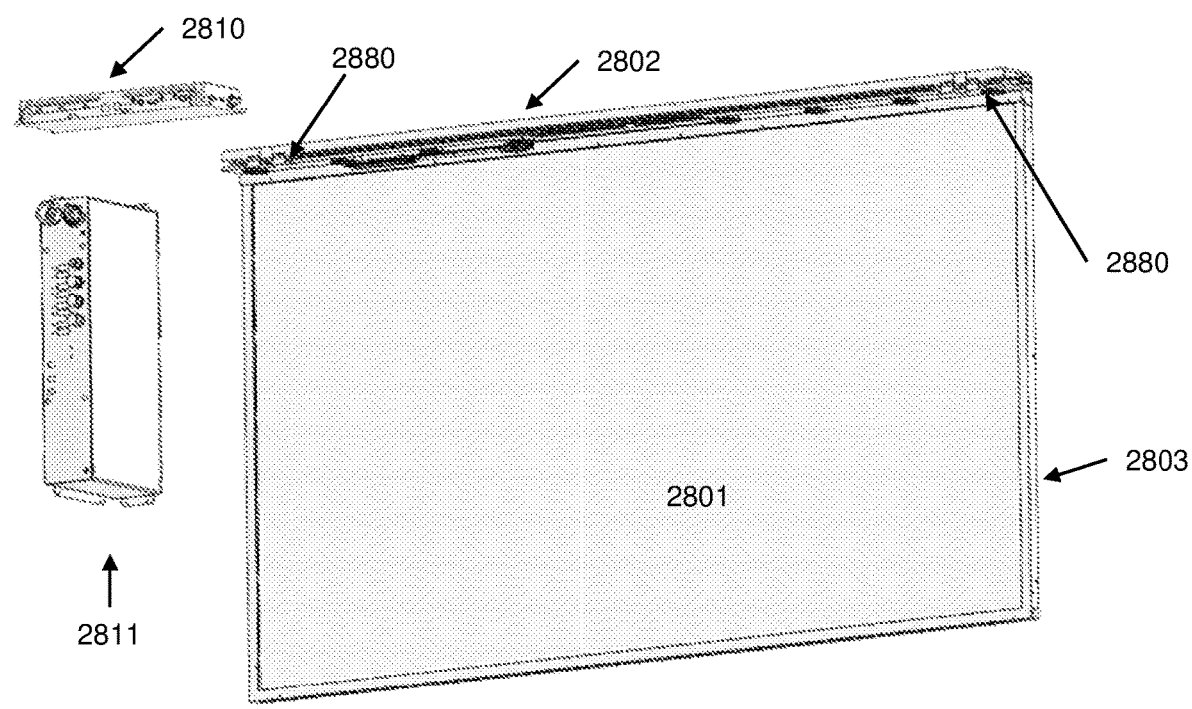
Figure 28

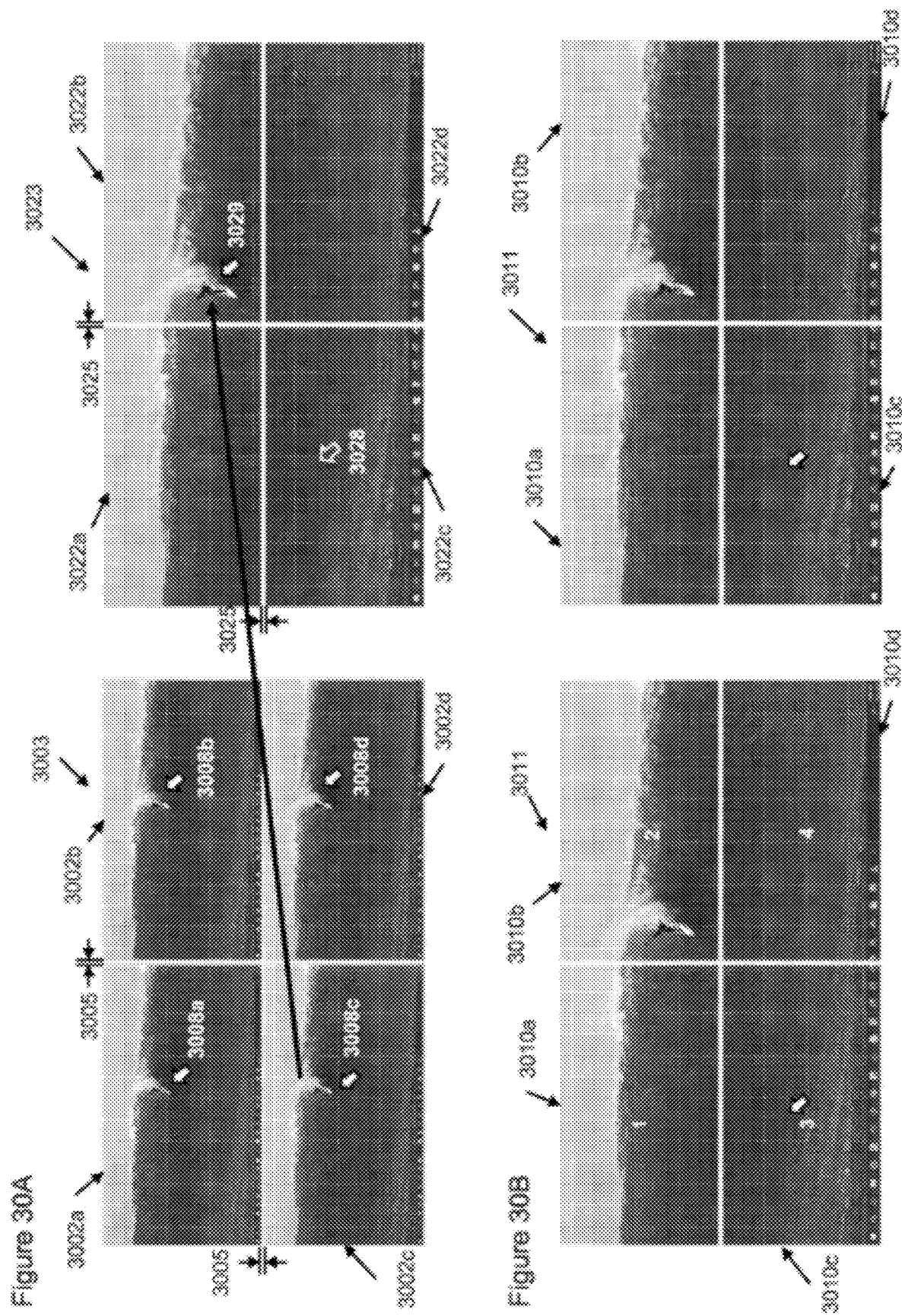

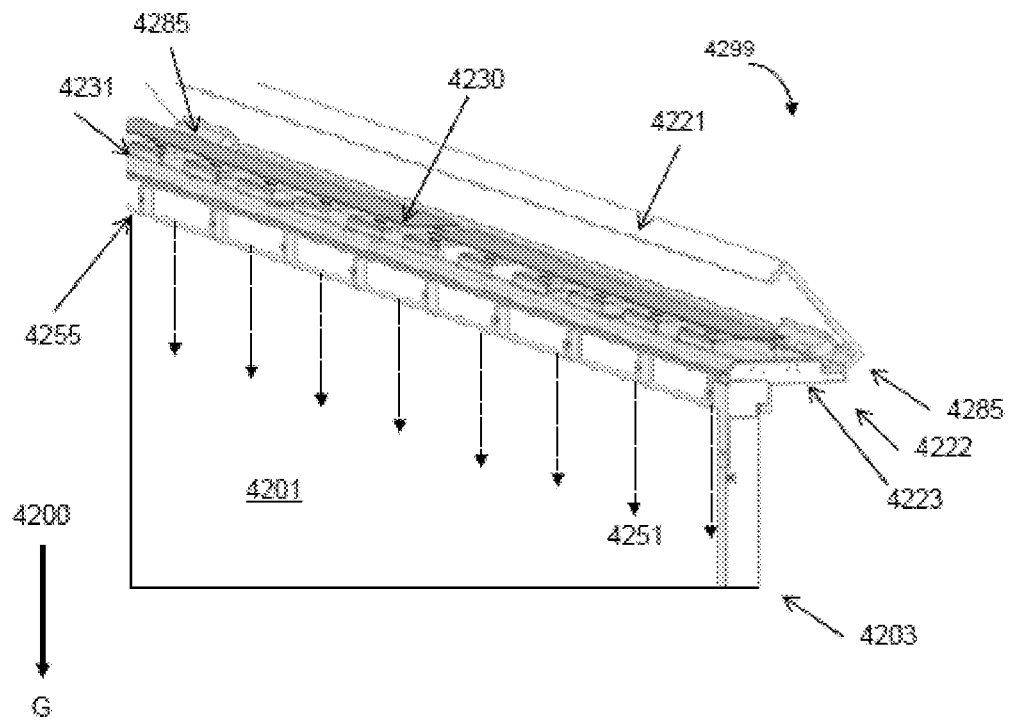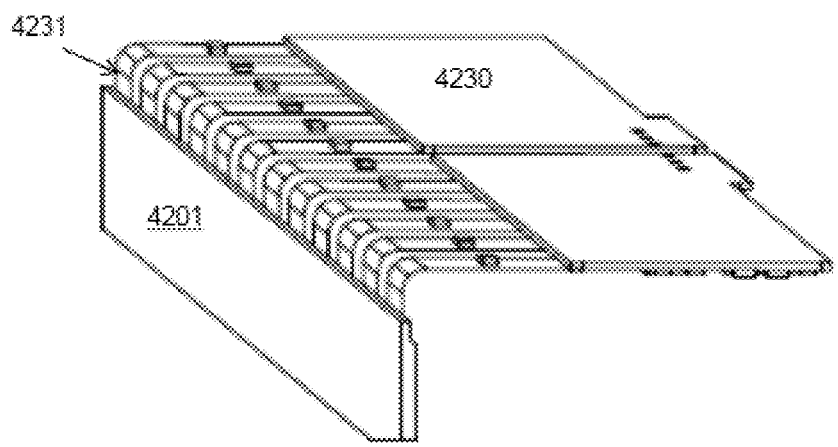
Figure 42

TANDEM VISION WINDOW AND MEDIA DISPLAY

RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Various facilities (e.g., buildings) have windows installed, e.g., in their facades. The windows provide a way to view an environment external to the facility. In some facilities, the window may take a substantial portion of a facility facade. Users may request utilization of the window surface area to view various media (e.g., for entertainment purposes, to process data, and/or to conduct a video conference). At times, a user may want to optimize usage of interior space to visualize the media (e.g., by using the window surface). The media may be electronic media and/or optical media. A user may request viewing the media with minimal impact on visibility through the window. The media may be displayed via a display that is at least partially transparent. At times viewing the media may require a tinted (e.g., darker) backdrop. At times, the user may want to shade its interior surrounding. At times, the lifetime of the media display, (e.g. an OLED display) may be damaged over time, e.g., by Ultra-Violet (UV) irradiation, heat, and atmosphere constituents. Such harm may reduce prolonged use of the media display. At times a user may want to augment external view with overlays, augmented reality, and/or lighting. The present inventions offer a solution to this and other problems.

SUMMARY

In an aspect disclosed herein is a display construct that is coupled with a window (e.g., a viewing window such as a tintable window). The viewing window may include an integrated glass unit. The display construct may include one or more glass panes. The display may comprise a display matrix. The display matrix may comprise a light emitting diode (LED), e.g., that is at least partially transparent. The display may comprise liquid crystal display (LCD).

In another aspect, at least a portion of a window surface in a facility is utilized to display the various media using the glass display construct. The display may be utilized for (e.g., at least partial) viewing an environment external to the window (e.g., outdoor environment), e.g. when the display is not operating. The display may be used to augment the external view with (e.g., optical) overlays, augmented reality, and/or lighting (e.g., the display may act as a light source). Such usage of the window surface portion may optimize efficient space usage of a facility interior (e.g., a room therein), e.g., as the media screen will take at least a portion of the space in which the window(s) is installed.

In another aspect, a viewing (e.g., tintable) window is used (e.g., as a backdrop) to aid in the shading and/or contrast of the display construct. The shading may be outboard of the display construct (e.g., in the direction away from the viewer). The supporting structure portion behind the display construct may be shaded or shad able (e.g., using a tintable or a tinted window). The viewing window may be active (e.g., tintable), or passive. For example, the viewing window can comprise a tint that cannot be (e.g., controllably and/or electronically) altered. The viewing window can comprise a tint (e.g., shading) that (i) cannot be electronically altered, and/or (ii) can be optically altered (e.g., due to irradiation of the viewing window by external lighting such as sunlight and/or streetlight). The shading may comprise phosphor coating, application of black pigment, and/or glass coloration. The ting (e.g., shading) may be static or dynamic (e.g., using tintable glass). The shading may or may not be electronically controlled. The shading can be passive. The tint (e.g., shading) may be transparent or opaque. The tint may comprise a visible color (e.g., any color of the rainbow such as blue, or yellow. E.g., the color may be brown, gray, or black). The tint may be at least partially transparent. The transparent tint may facilitate transition of a substantial portion (e.g., greater than about 30%, 40%, 50%, 60%, 80%, 90% or 95%) of the intensity and/or wavelength to which an average human eye senses, or the tint may be fully transparent (e.g., relative to an average human eye senses). The shading may be disposed on the back side of the display construct (e.g., as an added and/or laminated layer). The back side of the display construct is the side opposing the viewer side (e.g., the surface of display construct 101 that faces window 102 (partial view shown)). The shading may be disposed on the structure coupled to the display construct and disposed behind the display construct (e.g., on a wall, board, or window coupled to and disposed behind the display construct such as the one in FIG. 1, 102).

In another aspect, the display construct may comprise a material (e.g., as a backdrop) to aid in the shading and/or contrast of the media displayed as part of the display construct. The shading may be outboard of the transparent display. The material may be incorporated in a polymer, resin, and/or glass as part of the display construct.

In another aspect, a material (e.g., in the viewing window and/or in the media construct) extends the lifetime of the transparent display.

In another aspect, the display may be controlled separately or together with control of the tintable window (e.g., by separate controllers or by the same controller).

In another aspect, a system for viewing comprises: a viewing (e.g., tintable) window having at least a bleached state and a tinted state; and a display construct configured to display and/or manipulate electronic media, which display construct is disposed adjacent to and registered with the viewing (e.g., tintable) window such that a user is able to view, through (i) the display construct and (ii) the viewing (e.g., tintable) window (e.g., at least when the tintable window is in the bleached state), which display construct is transparent at least in part.

In some embodiments, viewing is of an outside environment external to the viewing (e.g., tintable) window. In some embodiments, viewing is of a media projected by the display construct. In some embodiments, the display construct is communicatively coupled to a network transmitting the electronic media. In some embodiments, the network is communicatively coupled to a building management system. In some embodiments, the display construct is communicatively coupled to one or more controllers controlling the display of the electronic media by the display construct. In some embodiments, the display construct is communicatively coupled to a first controller, and wherein the viewing (e.g., tintable) window is communicatively coupled to a second controller. In some embodiments, the first controller and the second controller are the same controller. In some embodiments, the first controller and the second controller are different controllers that are communicatively coupled.

In some embodiments, the first controller and the second controller are communicatively coupled to a third controller. In some embodiments, the display construct is communicatively coupled to a first controller (e.g., timing controller) disposed in a window frame housing the viewing (e.g., tintable) window. In some embodiments, the display construct is electrically coupled to a power source disposed in a building fixture adjacent to the viewing (e.g., tintable) window. In some embodiments, the building fixture is a wall, ceiling, floor or a window frame housing the viewing (e.g., tintable) window. In some embodiments, the display construct is electrically coupled to a power source disposed at a shortest distance from the display construct that is at least about fifteen (15) feet. In some embodiments, the display construct is communicatively coupled to a controller (e.g., timing controller) controlling the display construct, which controller is disposed at a shortest distance from the display construct that is at least about five (5) feet. In some embodiments, the tintable window comprises an electrochromic glass construct. In some embodiments, the display construct comprises a first glass pane, a second glass pane, and a display matrix (e.g., a light array) disposed between the first glass pane and the second glass pane. In some embodiments, the display matrix comprises a light emitting diode (LED) array. In some embodiments, the display matrix comprises transparent organic light emitting diode (TOLED) array. In some embodiments, the display matrix has at least about 2000 pixels at its fundamental length scale. In some embodiments, the fundamental length scale of the display matrix is a height or a width of the display matrix. In some embodiments, the display matrix is a high resolution or an ultra high resolution display matrix. In some embodiments, the display construct is coupled to the viewing (e.g., tintable) window by a fastener. In some embodiments, the fastener comprises a hinge, a bracket, or a cover. In some embodiments, the hinge is (i) connected to the bracket that is connected to the display construct and (ii) connected to the cover that is connected to a fixture, which hinge facilitates swiveling of the display construct with respect to the fixture about a hinge joint. In some embodiments, the hinge is (i) reversibly connected to the bracket that is irreversibly connected to the display construct and (ii) reversibly connected to the cover that is reversibly connected to a fixture, which hinge facilitates swiveling of the display construct with respect to the fixture about a hinge joint. In some embodiments, the cover comprises a swiveling portion that can be reversibly opened and closed. In some embodiments, a circuitry and/or wiring is covered from a viewer by the cover, which circuitry and/or wiring can be exposed at least in part by opening the swiveling portion. In some embodiments, when the tintable window is in its darkest tint state and the display construct projects the media, a user cannot see through (i) the display construct and (ii) the tintable window. In some embodiments, a tint level of the tintable window considers a position of a sun, weather condition, transmittance of light through the tintable windows, and/or reading of one or more sensors. In some embodiments, at least one of the one or more sensors are disposed externally to the building in which the tintable window is disposed. In some embodiments, the weather condition comprises any cloud coverage. In some embodiments, transmittance of light through the tintable windows is with respect to external light impinging on the viewing (e.g., tintable) window. In some embodiments, the transmittance of light through the viewing (e.g., tintable) window depends on the material properties of the viewing (e.g., tintable) window.

In another aspect, a system for media viewing comprises: a viewing (e.g., tintable) window; a display construct disposed adjacent to and/or registered with the viewing (e.g., tintable) window such that a viewer is able to view an external environment through the display construct and the viewing (e.g., tintable) window, the display construct comprising: (i) a pair of substrates, and (ii) a display matrix laminated between the pair of substrates, which display matrix has at least about 2000 pixels at its fundamental length scale; and a fastener configured to support the display construct, which fastener is affixed to a framing element of the viewing (e.g., tintable) window.

In some embodiments, viewing is of an outside environment external to the viewing (e.g., tintable) window. In some embodiments, viewing is of a media projected by the display construct. In some embodiments, the display construct is at least thirty percent (30%) transparent. In some embodiments, the viewing (e.g., tintable) window is an electrochromic window. In some embodiments, the fastener comprises at least one hinge, and wherein the display construct is affixed to the viewing (e.g., tintable) window by the at least one hinge. In some embodiments, the hinge is configured to facilitate servicing the display construct. In some embodiments, a driver board communicatively coupled to the display construct is hidden from the viewer by at least one hinge leaf. In some embodiments, the system includes a control board and a power source. In some embodiments, a shortest distance between the display construct and the power source is at least fifteen feet (15'). In some embodiments, a shortest distance between the control board and the power source is at least five feet (5'). In some embodiments, the display construct is coupled to one or more controllers and/or to a network by a coaxial cable. In some embodiments, the coaxial cable comprises a micro coaxial cable. In some embodiments, the fundamental length scale of the display matrix is a height or a width of the display matrix. In some embodiments, the display matrix is a high resolution or an ultra high resolution display matrix.

In another aspect, a system for media viewing, comprises: a tintable window having at least a bleached state and a tinted state; a display construct configured to display and/or manipulate electronic media, which display construct is disposed adjacent to and registered with the tintable window such that a user is able to view, through (i) the display construct and (ii) the tintable window at least when the tintable window is in the bleached state, which display construct is transparent at least in part; and optionally a display circuitry directly wired to the display construct.

In some embodiments, the display construct is communicatively coupled to a network transmitting the electronic media. In some embodiments, the network is communicatively coupled to a building management system. In some embodiments, the display circuitry is configured for being at least partially accessible during its operation and/or after its installment, e.g., without disassembling (I) the fastener from its supporting structure, (II) the display construct from the fastener, and/or (III) the E-Box and/or power supply. The electrical box (e.g., E-Box) may comprise the timing controller of the display construct. In some embodiments, the system further comprises a hinge that is configured to facilitate reversible access or confinement to the display circuitry operation and/or after installment of the display construct. In some embodiments, the display construct is communicatively coupled to one or more controllers controlling the display of the electronic media by the display construct. In some embodiments, the display construct is communicatively coupled to a first controller, and wherein the tintable window is communicatively coupled to a second controller. In some embodiments, the first controller and the second controller are the same controller. In some embodiments, the first controller and the second controller are different controllers that are communicatively coupled. In some embodiments, the first controller and the second controller are communicatively coupled to a third controller. In some embodiments, the display construct is communicatively coupled to a first controller disposed in a window frame housing the tintable window. In some embodiments, the display construct is electrically coupled to a power source disposed in a building fixture adjacent to the tintable window. In some embodiments, the building fixture is a wall, ceiling, floor or a window frame housing the tintable window. In some embodiments, the display construct is electrically coupled to a power source disposed at a shortest distance from the display construct that is at least about fifteen (15) feet. In some embodiments, the display construct is communicatively coupled to a controller controlling the display construct, which controller is disposed at a shortest distance from the display construct that is at least about five (5) feet. In some embodiments, the tintable window comprises an electrochromic glass construct. In some embodiments, the display construct comprises a first glass pane, a second glass pane, and a display matrix (e.g., a light array) disposed between the first glass pane and the second glass pane. In some embodiments, the display matrix comprises a light emitting diode (LED) array. In some embodiments, the display matrix comprises transparent organic light emitting diode (TOLED) array. In some embodiments, the display matrix has at least about 2000 pixels at its fundamental length scale. In some embodiments, the fundamental length scale of the display matrix is a height or a width of the display matrix. In some embodiments, the display matrix is a high resolution or an ultra high resolution display matrix. In some embodiments, the display construct is coupled to the tintable window by a (e.g., at most one) fastener. In some embodiments, the fastener comprises a hinge, a bracket, or a plank. In some embodiments, the hinge is (i) connected to the bracket that is connected to the display construct and (ii) connected to the plank that is connected to a fixture, which hinge facilitates swiveling of the display construct with respect to the fixture about a hinge joint. In some embodiments, the hinge is (i) reversibly connected to the bracket that is irreversibly connected to the display construct and (ii) reversibly connected to the plank that is reversibly connected to a fixture, which hinge facilitates swiveling of the display construct with respect to the fixture about a hinge joint. In some embodiments, the plank comprises a swiveling portion that can be reversibly opened and closed. In some embodiments, a circuitry (e.g., the display circuitry and/or a touch screen circuitry) and/or wiring is covered from a viewer by the plank, which circuitry and/or wiring can be exposed at least in part by opening the swiveling portion. In some embodiments, when the tintable window is in its darkest tint state and the display construct projects the media, a user cannot see through (i) the display construct and (ii) the tintable window. In some embodiments, the tintable window is configured for tint adjustment in conjunction with the media displayed by the display construct. In some embodiments, tintable window is configured for manual and/or automatic tint adjustment. In some embodiments, the tintable window is configured for tint adjustment while the display construct projects the media. In some embodiments, is the media has a passive content that is static at least during the tint adjustment. In some embodiments, the media has an active content that changes at least during the tint adjustment. In some embodiments, wherein the tintable window is configured for tint adjustment by considering a position of a sun, a time of day, a date, geographic location of an enclosure in which the display construct is disposed, weather condition, transmittance of light through the tintable windows, and/or reading of one or more sensors. In some embodiments, at least one of the one or more sensors are disposed externally to the building in which the tintable window is disposed. In some embodiments, the weather condition comprises any cloud coverage. In some embodiments, transmittance of light through the tintable windows is with respect to external light impinging on the tintable window. In some embodiments, the transmittance of light through the tintable window depends on material properties of the tintable window. In some embodiments, at least one touch screen is disposed proximate to the at least one display construct, which at least one touch screen in disposed such that the at least one touch screen overlaps at least a portion of a viewing surface of the at least one display construct. In some embodiments, at least one controller is configured to operatively couple to the at least one touch screen, and wherein the at least one controller is configured to adjust the media displayed on the at least one display construct based at least in part on user tactile interaction with the at least one touch screen. In some embodiments, the at least one display construct is a plurality of display constructs configured to display a portion of a screen image, and wherein at least one controller is configured to adjust the media displayed on the plurality of constructs based at least in part on user tactile interaction with the at least one touch screen. In some embodiments, the at least one touch screen is a plurality of touch screens configured such that the user can use the plurality of touch screens as if it was a single touch screen spanning the plurality of touch screen. In some embodiments, the at least one touch screen is a plurality of touch screens including a first touch screen having a first side immediately adjacent to a second side of a second touch screen. In some embodiments, immediately adjacent is devoid of another intervening touch screen. In some embodiments, the first side contacts the second side through a binder. In some embodiments, the first side is devoid of a first panel, and wherein the second side is devoid of a second panel. In some embodiments, the first side is bordered by a first panel, and wherein the second side is bordered by a second panel. In some embodiments, the first panel comprises a sensor and an emitter, and wherein the second panel comprises a sensor and an emitter. In some embodiments, the at least one touch screen is configured to operatively engage at least two sensor and emitter panels disposed (a) parallel or substantially parallel to each other and (b) at a distance from each other in which distance at least a portion of the at least one touch screen is disposed. In some embodiments, the at least one touch screen is configured to operatively engage at least two sensor and emitter panels disposed (a) parallel or substantially parallel to each other and (b) at a distance from each other in which distance exceeds one touch screen of the at least one touch screen is disposed.

In another aspect, a system for media viewing, comprises: a tintable window having at least a bleached state and a tinted state; a display construct configured to display and/or manipulate electronic media, which display construct is disposed adjacent to and registered with the tintable window such that a user is able to view, through (i) the display construct and (ii) the tintable window at least when the tintable window is in the bleached state, which display construct is transparent at least in part; and optionally a (e.g., at most one) fastener configured to couple to the display construct.

In some embodiments, the fastener (I) is configured to facilitate accessing at least a portion of the display circuitry, (II) is configured to span at least thirty percent (30%) of a side length of the display construct, (III) is configured to facilitate heat exchange, and/or (IV) comprises a plurality of hinges. In some embodiments, the fastener comprises a hinge that is configured to facilitate reversible access and confinement to the display circuitry. In some embodiments, the display construct comprises: (i) a pair of substrates, and (ii) a display matrix laminated between the pair of substrates. In some embodiments, the display matrix has at least about 2000 pixels at its fundamental length scale. In some embodiments, the display construct is at least thirty percent (30%) transparent. In some embodiments, the tintable window is an electrochromic window. In some embodiments, the fastener comprises at least one hinge, and wherein the display construct is affixed to the tintable window by the at least one hinge. In some embodiments, the hinge is configured to facilitate servicing the display construct. In some embodiments, a driver board communicatively coupled to the display construct is hidden from the viewer by at least one hinge leaf. In some embodiments, the system includes a control board and a power source. In some embodiments, a shortest distance between the display construct and the power source is at least fifteen feet (15'). In some embodiments, a shortest distance between the control board and the power source is at least five feet (5'). In some embodiments, the display construct is coupled to one or more controllers and/or to a network by a coaxial cable. In some embodiments, the coaxial cable comprises a micro coaxial cable. In some embodiments, the fundamental length scale of the display matrix is a height or a width of the display matrix. In some embodiments, the display matrix is a high resolution or an ultra high resolution display matrix. In some embodiments, the tintable window is configured for tint adjustment in conjunction with the media displayed by the display construct. In some embodiments, tintable window is configured for manual and/or automatic tint adjustment. In some embodiments, the tintable window is configured for tint adjustment while the display construct projects the media. In some embodiments, the media has a passive content that is static at least during the tint adjustment. In some embodiments, the media has an active content that changes at least during the tint adjustment. In some embodiments, the tintable window is configured for tint adjustment by considering a position of a sun, a time of day, a date, geographic location of an enclosure in which the display construct is disposed, weather condition, transmittance of light through the tintable windows, and/or reading of one or more sensors. In some embodiments, at least one touch screen is disposed proximate to the at least one display construct, which at least one touch screen in disposed such that the at least one touch screen overlaps at least a portion of a viewing surface of the at least one display construct. In some embodiments, at least one controller is configured to operatively couple to the at least one touch screen, and wherein the at least one controller is configured to adjust the media displayed on the at least one display construct based at least in part on user tactile interaction with the at least one touch screen. In some embodiments, the at least one display construct is a plurality of display constructs, wherein each of the plurality of display constructs is configured to display a portion of a screen image, and wherein at least one controller is configured to adjust the media displayed on the plurality of constructs based at least in part on user tactile interaction with the at least one touch screen. In some embodiments, the at least one touch screen is a plurality of touch screens configured such that the user can use the plurality of touch screens as if it was a single touch screen spanning the plurality of touch screen. In some embodiments, the at least one touch screen is a plurality of touch screens including a first touch screen having a first side immediately adjacent to a second side of a second touch screen. In some embodiments, immediately adjacent is devoid of another intervening touch screen. In some embodiments, the first side contacts the second side through a binder. In some embodiments, the first side is devoid of a first panel, and/or wherein the second side is devoid of a second panel. In some embodiments, the first side is bordered by a first panel, and/or wherein the second side is bordered by a second panel. In some embodiments, the first panel comprises a sensor and an emitter, and/or wherein the second panel comprises a sensor and an emitter. In some embodiments, the at least one touch screen is configured to operatively engage at least two sensor and emitter panels disposed (a) parallel or substantially parallel to each other and/or (b) at a distance from each other in which distance at least a portion of the at least one touch screen is disposed. In some embodiments, the at least one touch screen is configured to operatively engage at least two sensor and emitter panels disposed (a) parallel or substantially parallel to each other and/or (b) at a distance from each other in which distance exceeds one touch screen of the at least one touch screen is disposed. In some embodiments, the at least two sensor and emitter panels are disposed such that radiation emitted emitters in a first panel can be sensed by sensors of a second panel that is disposed parallel or substantially parallel to the first panel, wherein the first panel and the second panel are included in the at least two sensor and emitter panels.

In another aspect, an apparatus for controlling media viewing, the apparatus comprising at least one controller comprising control circuitry, which at least one controller is configured to: (a) operatively coupled to a display construct configured to display and/or manipulate electronic media, which display construct is disposed adjacent to and registered with a tintable window such that a user is able to view, through (i) the display construct and (ii) the tintable window, at least when the tintable window is in a bleached state, which display construct is transparent at least in part, which tintable window has at least one bleached state and one tinted state, which display construct is optionally (A) coupled to a display circuitry wired to the display construct, and/or (B) coupled to a (e.g., at most one) fastener configured to couple to the display construct; and (b) control, or direct control of, the display construct.

In some embodiments, the display circuitry is configured for being at least partially accessible during its operation and/or after its installment e.g., without disassembling (A) the fastener from its supporting structure, (B) the display construct from the fastener, and/or (C) the E-Box and/or power supply. The electrical box (e.g., E-Box) may comprise the timing controller of the display construct. In some embodiments, the fastener is configured to (I) facilitate accessing at least a portion of the display circuitry, (II) span at least thirty percent (30%) of a side length of the display construct, (III) facilitate heat exchange, and/or (IV) comprise a plurality of hinges. In some embodiments, the display circuitry comprises at least a portion of the control circuitry. The display construct is coupled to a hinge configured to facilitate reversible access and confinement to the display circuitry. In some embodiments, the at least one controller is part of a hierarchical control system. In some embodiments, the at least one controller configured to diagnose, or direct diagnosis of, the display construct. In some embodiments, the at least one controller is configured to compensate or direct compensation of, operation of the display construct. In some embodiments, the at least one controller configured to (i) diagnose, or direct diagnosis of, the display construct to generate a diagnostics, and (ii) compensate or direct compensation of, operation of the display construct by using the diagnostics. In some embodiments, the at least one controller is configured to adjust, or direct adjustment of, the display construct to compensate for deviation from an intended operation of the display construct. In some embodiments, the at least one controller is configured to monitor, or direct monitor of, condition of a filter configured to filter an atmosphere. In some embodiments, the at least one controller is configured to monitor, or directing monitor of, a life of the filter. In some embodiments, the condition comprises effectiveness of the filter. In some embodiments, the condition comprises congestion status of the filter, flow rate of the atmosphere through the filter, accumulated operation time, and/or durability. In some embodiments, the filter comprises a high-efficiency particulate air (HEPA) filter. In some embodiments, the filter is configured to filter particles of at most a milli, micro, or nano scale. In some embodiments, the filter is configured to filter pathogens and/or particulate matter. In some embodiments, the filter is configured to filter animate and/or inanimate matter. In some embodiments, the filter is included in a ventilation system. In some embodiments, the filter is disposed in a vent leading to an enclosure in which the display construct is disposed, or in the enclosure. In some embodiments, the filter is disposed externally to an enclosure in which the display construct is disposed. In some embodiments, the filter is disposed in a fixture. In some embodiments, the fixture is a wall or a window frame. In some embodiments, the at least one controller is configured to monitor, or directing monitor of, temperature of the display construct. In some embodiments, the at least one controller is configured to diagnose, or direct diagnosis of, the display construct at least in part by monitoring, or directing monitor of, temperature of the display construct. In some embodiments, at least one controller is configured to compensate, or directing compensation of, operation of the display construct using the temperature of the display construct. In some embodiments, the at least one controller is configured to monitor, or direct monitoring of, a state of one or more pixels of the display construct. In some embodiments, the at least one controller is configured to diagnose, or direct diagnosis of, of the display construct at least in part by monitoring, or directing monitor of, a state of one or more pixels of the display construct. In some embodiments, the at least one controller is configured to adjust, or direct adjustment of, operation of the display construct based at least in part on a state of one or more pixels of the display construct. In some embodiments, at least one controller is configured to monitor, or directing monitor of, operation of at least one fan configured to operate in conjunction with the display construct. In some embodiments, at least one controller is configured to diagnose, or direct diagnosis of, of the display construct at least in part by monitoring, or directing monitor of, operation of at least one fan configured to operate in conjunction with the display construct. In some embodiments, the at least one controller is configured to adjust, or direct adjustment of, the operation of the display construct based at least in part on the operation of the at least one fan. In some embodiments, the at least one controller is configured to adjust, or direct adjustment, of the display construct based at least in part on usage of at least one pixel of the display construct. In some embodiments, the at least one controller is configured to adjust, or direct adjustment, of the display construct based at least in part on temperature of the display construct. In some embodiments, the at least one controller is configured to operatively couple to at least one sensor comprising a pressure sensor, gas flow sensor, a temperature sensor, or an electromagnetic sensor, and wherein the at least one controller is configured to adjust, or direct adjustment of, the operation of the display construct based at least in part on the operation of the at least one sensor. In some embodiments, the at least one controller is configured to adjust, or direct adjustment of, the operation of the display construct based at least in part on current, voltage, and/or power supplied to the display construct to achieve an intended purpose. In some embodiments, the at least one controller is configured to adjust, or direct adjustment of, the operation of the display construct based at least in part on current, voltage, and/or power supplied to at least one pixel of the display construct to achieve an intended purpose. In some embodiments, the at least one controller is configured to cycle, or direct cycling of, the display construct after a predetermined time interval, in which the cycling of the display construct comprises modifying the media displayed over time in order to reduce degradation of one or more pixels of the display construct. In some embodiments, the one or more pixels comprise a light emitting diode. In some embodiments, the light emitting diode is an organic light emitting diode. In some embodiments, the light emitting diode is at least partially transparent. In some embodiments, the predetermined time interval is adjusted based at least in part on a type of viewing of the display construct during a previous predetermined time interval. In some embodiments, the at least one controller is configured to operatively couple to at least one touch screen disposed proximate to the display construct, and wherein the at least one controller is configured to adjust the media displayed on the display construct based at least in part on user tactile interaction with the at least one touch screen. In some embodiments, the at least one display construct is a plurality of display constructs configured to display a portion of a screen image, and wherein at least one controller is configured to adjust the media displayed on the plurality of constructs based at least in part on user tactile interaction with the at least one touch screen. In some embodiments, the at least one touch screen is a plurality of touch screens and the at least one controller is configured such that the user can use the plurality of touch screens as if it was a single touch screen spanning the plurality of touch screen. In some embodiments, the at least one touch screen is a plurality of touch screens including a first touch screen having a first side immediately adjacent to a second side of a second touch screen. In some embodiments, immediately adjacent is devoid of another intervening touch screen. In some embodiments, the first side contacts the second side through a binder. In some embodiments, the first side is devoid of a first panel, and/or wherein the second side is devoid of a second panel. In some embodiments, the first side is bordered by a first panel, and/or wherein the second side is bordered by a second panel. In some embodiments, the first panel comprises a sensor and an emitter, and/or wherein the second panel comprises a sensor and an emitter. In some embodiments, the at least one touch screen is configured to operatively engage at least two sensor and emitter panels disposed (a) parallel or substantially parallel to each other and (b) at a distance from each other in which distance at least a portion of the at least one touch screen is disposed.

In some embodiments, the at least one touch screen is configured to operatively engage at least two sensor and emitter panels disposed (a) parallel or substantially parallel to each other and (b) at a distance from each other in which distance exceeds one touch screen of the at least one touch screen is disposed. In some embodiments, the at least two sensor and emitter panels are disposed such that radiation emitted emitters in a first panel can be sensed by sensors of a second panel that is disposed parallel or substantially parallel to the first panel, wherein the first panel and the second panel are included in the at least two sensor and emitter panels.

In another aspect, a non-transitory computer program product for controlling media viewing, which non-transitory computer program product contains instructions inscribed thereon which, when executed by one or more processors, cause the one or more processors to execute operations comprising any operations of the apparatus of recited above.

In another aspect, a method for controlling media viewing, comprises: displaying and/or manipulating electronic media on a display construct, the display construct disposed adjacent to and registered with a tintable window such that a user is able to view, through (i) the display construct and (ii) the tintable window, at least when the tintable window is in a bleached state, which display construct is transparent at least in part, which tintable window has at least one bleached state and one tinted state; and optionally using (A) a display circuitry configured for communication with the display construct, and/or (B) a (e.g., at most one) fastener configured to couple to the display construct.

In some embodiments, the display circuitry is configured for being at least partially accessible during its operation and/or after its installment e.g., without disassembling (A) the fastener from its supporting structure, (B) the display construct from the fastener, and/or (C) the E-Box and/or power supply. The electrical box (e.g., E-Box) may comprise the timing controller of the display construct. In some embodiments, the fastener is configured to (I) facilitate accessing at least a portion of the display circuitry (II) spanning at least thirty percent (30%) of a side length of the display construct and/or (III) exchanging heat, and/or (IV) comprising a plurality of hinges. In some embodiments, the display circuitry is reversibly accessible or confined by using at least one hinge of the fastener e.g., without disassembling (A) the fastener from its supporting structure, (B) the display construct from the fastener, and/or (C) the E-Box and/or power supply. The electrical box (e.g., E-Box) may comprise the timing controller of the display construct. In some embodiments, the method further comprises diagnosing the display construct to form a diagnosis. In some embodiments, diagnosing the display construct is performed by at least one controller of a hierarchical control system. In some embodiments, the method further comprises using the diagnosis in compensating one or more operations of the display construct. In some embodiments, the method further comprises adjusting the media displayed on the display construct based at least in part on user tactile interaction with at least one touch screen disposed proximate to the display construct. In some embodiments, the display construct is a plurality of display constructs displaying a portion of a screen image. In some embodiments, the method further comprises adjusting the media displayed on the plurality of display constructs based at least in part on user tactile interaction with the at least one touch screen. In some embodiments, the at least one touch screen is a plurality of touch screens. In some embodiments, the method further comprises the user using the plurality of touch screens as if the plurality of touch screens was a single touch screen spanning the plurality of touch screens.

In another aspect, a non-transitory computer program product for controlling media viewing, which non-transitory computer program product contains instructions inscribed thereon which, when executed by one or more processors, cause the one or more processors to execute operations comprising any operations of the methods recited above.

In another aspect, a method of maintaining a media display, comprises: (a) displaying electronic media on a display construct comprising light irradiating components; (b) using at least one sensor to sense the media displayed by the light projecting components of the display construct, to generate sensor data; (c) using the sensor data to assess a status of at least one of the light irradiating components by comparing the media displayed with the media requested to be displayed; and (d) using a control system to (i) adjust irradiation of the at least one of the light irradiating components to irradiate a requested irradiation level of the media to be displayed, and/or (ii) predict maintenance of the display construct when the status of the at least one of the light irradiating components is below a threshold, wherein the control system is operatively coupled to the display construct and to the at least one sensor.

In some embodiments, maintaining the display construct comprises replacing of the display construct. In some embodiments, the control comprises a hierarchy of controllers. In some embodiments, the method further comprises using the control system to control the enclosure in which the display construct is disposed. In some embodiments, the method further comprises using the control system to control at atmosphere of the enclosure in which the display construct is disposed. In some embodiments, the method further comprises using a building management system controlling a building in which the display construct is disposed, which control system is coupled to and/or controls the building management system. In some embodiments, the method further comprises using the control system to control cycling irradiation of the at least one of the light irradiating components. In some embodiments, the method further comprises using the control system to use, or direct usage of, a learning module to predict maintenance of the at least one of the light irradiating components. In some embodiments, the control system is communicatively coupled to a network configured to provide data and/or power to the display construct.

In another aspect, a non-transitory computer program product for maintaining a media display, which non-transitory computer program product contains instructions inscribed thereon which, when executed by one or more processors, cause the one or more processors to execute operations comprising any operations of the methods recited above.

In another aspect, an apparatus for maintaining a media display, the apparatus comprising at least one controller comprising circuitry, which at least one controller is configured to: (a) operatively coupled to a display construct and to at least one sensor, (b) direct the display construct to display electronic media, which display construct comprises light irradiating components; (c) direct the at least one sensor to sense the media displayed by the light projecting components of the display construct, to generate sensor data; (d) use, or direct usage of, the sensor data to assess a status of at least one of the light irradiating components by comparing the media displayed with the media requested to be displayed; and: (e) direct the at least one of the light irradiating components to adjust irradiation such that the at least one of the light irradiating components will irradiate a requested irradiation level of the media to be displayed, and/or (f) predict, or direct prediction of, maintenance of the display construct when the status of the at least one of the light irradiating components is below a threshold.

In some embodiments, maintenance of the display construct comprises replacement of the display construct. In some embodiments, the control comprises a hierarchy of controllers. In some embodiments, the control system is configured to control the enclosure in which the display construct is disposed. In some embodiments, the control system is configured to control at atmosphere of the enclosure in which the display construct is disposed. In some embodiments, the control system is configured to a building management system controlling a building in which the display construct is disposed. In some embodiments, the control system is configured to control cycling irradiation of the at least one of the light irradiating components. In some embodiments, the control system is configured to use, or direct utilization of, a learning module to predict maintenance of the at least one of the light irradiating components. In some embodiments, the learning module comprise neural network. In some embodiments, the learning module comprises one or more deep learning algorithms. In some embodiments, the control system is communicatively coupled to a network configured to provide data and/or power to the display construct.

In another aspect, a non-transitory computer program product for maintaining a media display, which non-transitory computer program product contains instructions inscribed thereon which, when executed by one or more processors, cause the one or more processors to execute operations comprising any operations of the at least one controller recited above.

In some embodiments, a method for viewing media discloses using any of the systems and/or apparatuses disclosed herein to view a media on the display construct that is operatively coupled to the viewing (e.g., tintable) window.

In some embodiments, a method for viewing an outside environment of a viewing window discloses using any of the systems and/or apparatuses disclosed herein to view a the outside environment of the viewing (e.g., tintable) window while the display construct is that is operatively coupled to the viewing (e.g., tintable) window, e.g., and is in the line of view of a user and the outside environment.

In another aspect, the present disclosure provides methods that use any of the systems and/or apparatuses disclosed herein, e.g., for their intended purpose.

In another aspect, the present disclosure provides systems, apparatuses (e.g., controllers), and/or non-transitory computer-readable medium (e.g., software) that implement any of the methods disclosed herein.

In another aspect, an apparatus comprises at least one controller that is programmed to direct a mechanism used to implement (e.g., effectuate) any of the method disclosed herein, wherein the at least one controller is operatively coupled to the mechanism.

In another aspect, an apparatus comprises at least one controller that is configured (e.g., programmed) to implement (e.g., effectuate) the method disclosed herein. The at least one controller may implement any of the methods disclosed herein.

In another aspect, a system comprises at least one controller that is programmed to direct operation of at least one another apparatus (or component thereof), and the apparatus (or component thereof), wherein the at least one controller is operatively coupled to the apparatus (or to the component thereof). The apparatus (or component thereof) may include any apparatus (or component thereof) disclosed herein. The at least one controller may direct any apparatus (or component thereof) disclosed herein.

In another aspect, a computer software product, comprising a non-transitory computer-readable medium in which program instructions are stored, which instructions, when read by a computer, cause the computer to direct a mechanism (e.g., apparatus and/or any of its components) disclosed herein to implement (e.g., effectuate) any of the method disclosed herein, wherein the non-transitory computer-readable medium is operatively coupled to the mechanism. The mechanism can comprise any apparatus (or any component thereof) disclosed herein.

In another aspect, the present disclosure provides a non-transitory computer-readable medium comprising machine-executable code that, upon execution by one or more computer processors, implements any of the methods disclosed herein.

In another aspect, the present disclosure provides a non-transitory computer-readable medium comprising machine-executable code that, upon execution by one or more computer processors, effectuates directions of the controller(s) (e.g., as disclosed herein).

In another aspect, the present disclosure provides a computer system comprising one or more computer processors and a non-transitory computer-readable medium coupled thereto. The non-transitory computer-readable medium comprises machine-executable code that, upon execution by the one or more computer processors, implements any of the methods disclosed herein and/or effectuates directions of the controller(s) disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

These and other features and embodiments will be described in more detail with reference to the drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "Fig." and "Figs." herein), of which:

FIG. 7 schematically shows various fasteners and display construct assemblies;

FIG. 9 schematically shows various views of a display construct assembly;

FIGS. 21A-B schematically show various windows and display constructs;

FIG. 23 schematically shows various windows and display constructs;

FIG. 28 schematically shows a display construct and associated components;

FIGS. 30A-B schematically show various display constructs;

FIG. 42 schematically show various views of portion of a display constructs and associated components.

Figure 1A:
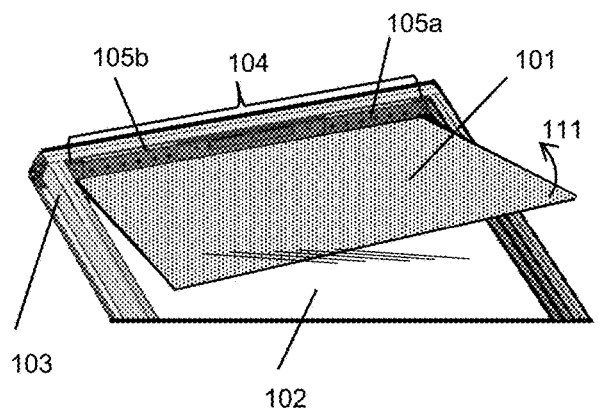
FIGS. 1A-1B show various windows and display constructs.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an," and "the" are not intended to refer to only a singular entity but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to."

The term "operatively coupled" or "operatively connected" refers to a first element (e.g., mechanism) that is coupled (e.g., connected) to a second element, to allow the intended operation of the second and/or first element. The coupling may comprise physical or non-physical coupling. The non-physical coupling may comprise signal-induced coupling (e.g., wireless coupling). Coupled can include physical coupling (e.g., physically connected), or non-physical coupling (e.g., via wireless communication).

An element (e.g., mechanism) that is "configured to" perform a function includes a structural feature that causes the element to perform this function. A structural feature may include an electrical feature, such as a circuitry or a circuit element. A structural feature may include a circuitry (e.g., comprising electrical or optical circuitry). Electrical circuitry may comprise one or more wires. Optical circuitry may comprise at least one optical element (e.g., beam splitter, mirror, lens and/or optical fiber). A structural feature may include a mechanical feature. A mechanical feature may comprise a latch, a spring, a closure, a hinge, a chassis, a support, a fastener, or a cantilever, and so forth. Performing the function may comprise utilizing a logical feature. A logical feature may include programming instructions. Programming instructions may be executable by at least one processor. Programming instructions may be stored or encoded on a (e.g., non-transitory) medium accessible by one or more processors.

In some embodiments, a display construct that is coupled with a viewing (e.g., a tintable viewing) window. The viewing window may include an integrated glass unit. The display construct may include one or more glass panes. The display (e.g., display matrix) may comprise a light emitting diode (LED). The LED may comprise an organic material (e.g., organic light emitting diode abbreviated herein as "OLED"). The OLED may comprise a transparent organic light emitting diode display (abbreviated herein as "TOLED"), which TOLED is at least partially transparent. The display may have at its fundamental length scale 2000, 3000, 4000, 5000, 6000, 7000, or 8000 pixels. The display may have at its fundamental length scale any number of pixels between the aforementioned number of pixels (e.g., from about 2000 pixels to about 4000 pixels, from about 4000 pixels to about 8000 pixels, or from about 2000 pixels to about 8000 pixels). A fundamental length scale may comprise a diameter of a bounding circle, a length, a width, or a height. The fundamental length scale may be abbreviated herein as "FLS." The display construct may comprise a high resolution display. For example, the display construct may have a resolution of at least about 550, 576, 680, 720, 768, 1024, 1080, 1920, 1280, 2160, 3840, 4096, 4320, or 7680 pixels, by at least about 550, 576, 680, 720, 768, 1024, 1080, 1280, 1920, 2160, 3840, 4096, 4320, or 7680 pixels (at 30 Hz or at 60 Hz). The first number of pixels may designate the height of the display and the second pixels may designates the length of the display. For example, the display may be a high resolution display having a resolution of 1920×1080, 3840×2160, 4096×2160, or 7680×4320. The display may be a standard definition display, enhanced definition display, high definition display, or an ultra-high definition display. The display may be rectangular. The image projected by the display matrix may be refreshed at a frequency (e.g., at a refresh rate) of at least about 20 Hz, 30 Hz, 60 Hz, 70 Hz, 75 Hz, 80 Hz, 100 Hz, or 120 Hertz (Hz). The FLS of the display construct may be at least 20", 25", 30", 35", 40", 45", 50", 55", 60", 65", 80", or 90 inches ("). The FLS of the display construct can be of any value between the aforementioned values (e.g., from about 20" to about 55", from about 55" to about 100", or from about 20" to about 100").

In some embodiments, at least a portion of a window surface in a facility is utilized to display the various media using the glass display construct. The display may be utilized for (e.g., at least partial) viewing an environment external to the window (e.g., outdoor environment), e.g. when the display is not operating. The display may be used to display media (e.g., as disclosed herein), to augment the external view with (e.g., optical) overlays, augmented reality, and/or lighting (e.g., the display may act as a light source). The media may be used for entertainment and non-entertainment purposes. The media may be used for work (e.g., data analysis, drafting, and/or video conferencing). The media may be manipulated (e.g., by utilizing the display construct). Utilizing the display construct can be direct or indirect. Indirect utilization of the media may be using an input device such as an electronic mouse, or a keyboard. The input device may be communicatively (e.g., wired and/or wirelessly) coupled to the media. Direct utilization may be by using the display construct as a touch screen using a user (e.g., finger) or a directing device (e.g., an electronic pen or stylus). The directing device may be made or, and/or coated with a low abrasive material (e.g., a polymer). The low abrasive material may be configured to facilitate (e.g., repeatedly) contacting the display construct with minimal damage (e.g., scratching) to the display construct. The low abrasive material may comprise a polymer or resin (e.g., plastic). The directing device may be passive or active. The active directing device may operatively couple to the display construct and/or network. The active directing device may comprise a circuitry. The active directing device may comprise a remote controller. The directing device may facilitate direction of operations related to media presented by the display construct. The directing device may facilitate (e.g., real time and/or in situ) interaction with the media presented by the display construct.

Embodiments described herein relate to vision windows with a tandem (e.g., transparent) display construct. In certain embodiments, the vision window is an electrochromic window. The electrochromic window may comprise a solid state and/or inorganic electrochromic (EC) device. The vision window may be in the form of an integrated glass unit (IGU). When the IGU includes an electrochromic (abbreviated herein as "EC") device, it may be termed an "EC IGU." The EC IGU can tint (e.g., darken) a room in which it is disposed and/or provide a tinted (e.g., darker) background as compared to a non-tinted IGU. The tinted IGU can provide a background preferable (e.g., necessary) for acceptable (e.g., good) contrast on the (e.g., transparent) display construct. In another example, windows with (e.g., transparent) display constructs can replace televisions (abbreviated herein as "TVs") in commercial and residential applications. Together, the (e.g., transparent) display construct and EC IGU can provide visual privacy glass function, e.g. because the display can augment the privacy provided by EC glass alone. Embodiments disclosed herein also describe particular methods, apparatus and systems for mounting display constructs (e.g., transparent display) to framing systems of vision windows.

FIG. 1A shows an example of a window 102 framed in a window frame 103 (partial view shown), and a fastener structure 104 comprising a first hinge 105a and a second hinge 105b, which hinges facilitate rotating display construct 101 about the hinge axis, e.g., in a direction of arrow 111. The window may be an electrochromic window. The window may be in the form of an EC IGU. In one embodiment, mounted to window frame (e.g., 103) is one or more display constructs (e.g., transparent display) (e.g., 101) that is transparent at least in part. In one embodiment, the one or more display constructs (e.g., transparent display) comprises T-OLED technology, but it should be understood that the present invention should not be limited by or to such technology. In one embodiment, one or more display constructs (e.g., transparent display) is mounted to frame (e.g., 103) via a fastener structure (e.g., 104). In one embodiment the fastener structure (also referred to herein as a "fastener") comprises a bracket. In one embodiment, the fastener structure comprises an L-bracket. In one embodiment, L-bracket comprises a length that approximates or equals a length of a side of window (e.g., and in the example shown in FIG. 1A, also the length of the fastener 104). In embodiments, the fundamental length scale (e.g., length) of a window is up to 60 feet ('), 50', 40', 30', 25', 20', 15', 10', 5' or F. The FLS of the window can be of any value between the aforementioned values (e.g., from 1' to 60', from 1' to 30', from 30' to 60', or from 10' to 40'). In embodiments, the fundamental length scale (e.g., length) of a window is at least about 50', 60', 80', or 100'. In one embodiment, the display construct (e.g., transparent display) encompasses an area that (e.g., substantially) matches a surface area of the lite (e.g., pane). The fastener structure may be mounted to the structure (e.g., frame portion such as a mullion) via a locking mechanism (e.g., snap lock) and/or via screw(s), e.g., may be configured for a slip and snap attachment. The fastener may comprise a mounting plate. The fastener may be configured to allow its associated cabling and/or wiring to reside in the supporting structure cavity (e.g., framing portion) without exerting pressure on the supporting structure (e.g., fixture). The supporting structure may comprise a clip (e.g., spring clip) to hold the fastener in place.

Figure 1B:
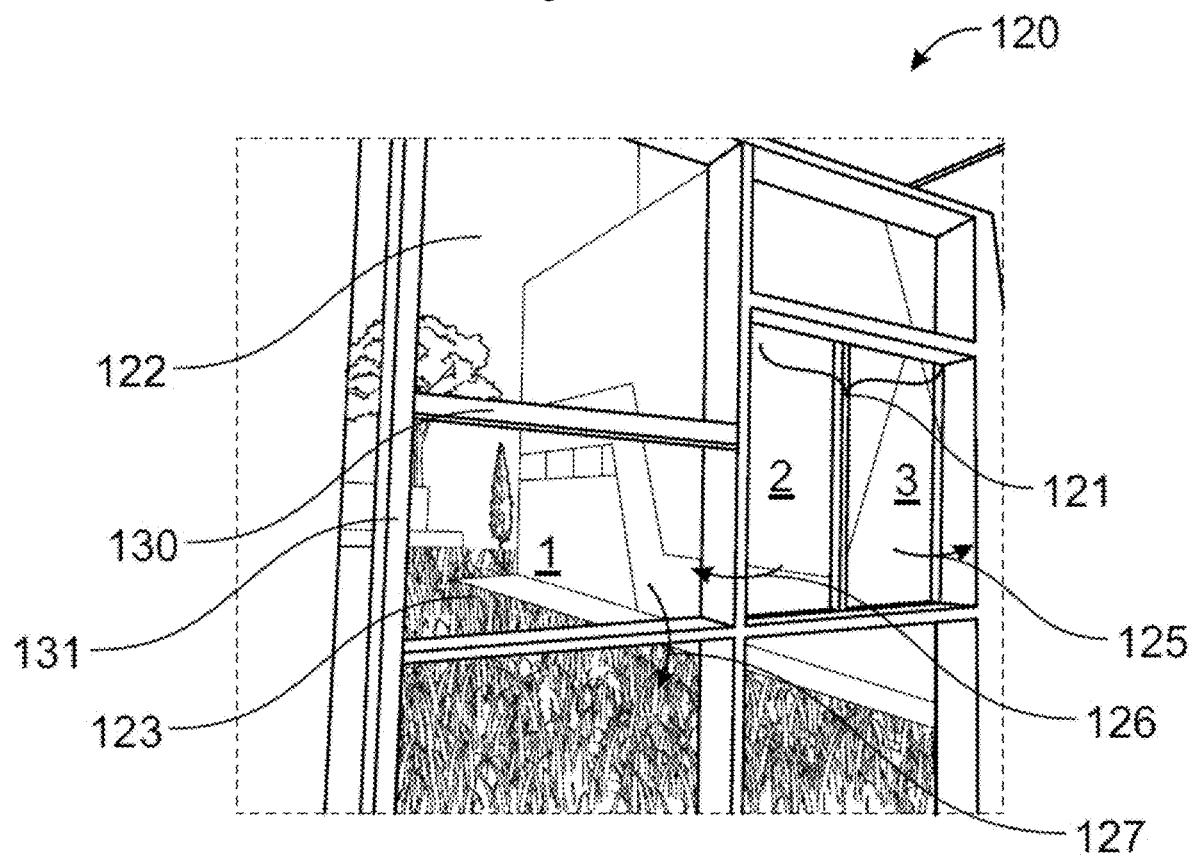

In particular embodiments, the area of the display approximates the vision area of a window (e.g., the area within the framing system of the window (e.g., see 1 in FIG. 1B)). In one embodiment, one or more display constructs (e.g., transparent display), together, (e.g., approximately and/or substantially) cover the vision area of a window (e.g., see 2 and 3 in FIG. 1b). In one embodiment, a transparent display encompasses an area that is about half of the vision area of a (e.g., tintable) window. In one embodiment, two or more displays are mounted over a single vision window (see 2 and 3 in FIG. 1b). The display construct can cover at least a portion of the (e.g., tintable) window. The display construct can cover at least about 10%, 20%, 30%, 40%, 50%, 60%, 70%, 80%, 90%, 95%, or 99% of the visible portion of the (e.g., tintable) window. The area occupied by the display construct can be the entire (100%) of the visible portion of the (e.g., tintable) window. The area occupied by the display construct can be any percentage of the visible portion of the (e.g., tintable) window between the aforementioned percentages (e.g., from about 10% to about 100%, from about 10% to about 50%, or from about 50% to about 100%). At times a plurality of display constructs can cover the (e.g., tintable) window. The display construct can be mounted in one or more layouts and/or configurations, e.g., to maximize design flexibility. A plurality of fasteners can be coupled (e.g., respectively) to the plurality of display constructs (e.g., to allow swiveling of the display constructs). FIG. 1B shows an example of various windows in a facade 120 of a building, which facade comprises windows 122, 123, and 121, and display constructs 1, 2, and 3. In the example shown in FIG. 1B, display construct 1 is transparent at least in part and is disposed over window 123 (e.g., display construct 1 is super positioned over window 123) such that the entirety of window 123 is covered by the display construct, and a user can view through the display construct 1 and the window 123 the external environment (e.g., flowers, glass, and trees). Display construct 1 is coupled to the window with a fastener that facilitates rotation of the display construct about an axis parallel to the window bottom horizontal edge, which rotation is in the direction of arrow 127. In the example shown in FIG. 1B, display constructs 2 and 3 are transparent at least in part and are disposed over window 121 such that the entirety of window 121 is covered by the two display construct each covering (e.g., extending to) about half of the surface area of window 121, and a user can view through the display constructs 2 and 3 and the window 121 the external environment (e.g., flowers, glass, and trees). Display construct 2 is coupled to the window 121 with a fastener that facilitates rotation of the display construct about an axis parallel to the window left vertical edge, which rotation is in the direction of arrow 126. Display construct 3 is coupled to the window with a fastener that facilitates rotation of the display construct about an axis parallel to the window 121 right vertical edge, which rotation is in the direction of arrow 125.

In some embodiments, the display construct is coupled to a structure (e.g., a fixture). The structure may comprise a window, a wall, or a board. The display construct may be coupled to the structure with a fastener. There may be a distance between the display construct and the structure, e.g., when the display construct is operational. The distance may be at most about 0.5 meters (m), 0.4 m, 0.3 m, 0.2 m, 0.1 m, 0.05 m, 0.025 m, or 0.01 m.

In some embodiments, the E-box is operatively coupled to, or includes, a power supply. The power supply can be an electrical device that supplies electric power to an electrical load. The power supply can convert electric current from a source to the correct voltage, current, and/or frequency to power the load. The power supply may limit the current drawn by the load to safe levels (e.g., according to jurisdictional and/or safety standards), shut off the current (e.g., in the event of an electrical fault), condition power (e.g., to prevent electronic noise and/or voltage surges on the input from reaching the load), correct power-factor, and/or store energy (e.g., to facilitate continued operation of the load in the event of a temporary interruption in the source power). The load may be the media display (e.g., OLED display). The power supply may be an electric power converter. The power supply can be a separate standalone device. The power supply can be included in the E-box. The standalone power supply device can be disposed in a structure such as a fixture. The structure can comprise a window frame portion (e.g., mullion or transom), or a wall. The power supply device can be disposed at a distance from the E-box and/or timing controller. The distance may be at least about 30 feet ('), 50', 100', 200', 300'. The E-box may or may not be part of the fastener (e.g., attached to the fastener). In some embodiments, the E-box (e.g., including any analogue to digital converter) may be disposed at a distance from the fastener (e.g., not be part of the fastener).

In some embodiments, housing of an electronic component (e.g., circuitry) comprises at least one heat exchanger. For example, the E-box, power supply housing, and/or timing controller housing (e.g., fastener) may comprise one or more heat exchangers (e.g., as disclosed herein). The heat exchangers may be fans. The heat exchangers may be passive or active. The heat exchangers may comprise a heat pipe. The heat exchangers may comprise a component configured to efficiently absorb and/or transfer heat. For example, the heat exchanger may comprise a metal slab (e.g., heat sink). The metal slap may comprise elemental metal or metal alloy.

In some embodiments, the housing of an electronic component (e.g., fastener) may comprise one or more fans. The fans may direct gas (e.g., air) from one of its sides to the other (e.g., pushing gas into the ambient environment or puling gas out of the ambient environment). The direction of the fan rotation may determine its pushing/pulling gas functionality. The fan may have a fundamental length scale (e.g., height, length, width, radius, or radius of a bounding circle). The fundamental length scale (FLS) of the fan may be at most about 5 centimeters (cm), 4 cm, 3 cm, 2.5 cm, 2 cm, 1.5 cm, 1 cm, or 0.5 cm. The FLS may have any value between the aforementioned values (e.g., from about 5 cm to about 0.5 cm, from about 5 cm to about 2 cm, or from about 2 cm to about 0.5 cm). The height and the length of the fan may be (e.g., substantially) equal. The width of the fan may be at most about half, third, fourth, or fifth of the height and/or length of the fan. The fan may have a plurality of blades (e.g., at least 3, 4, 5, 6, 7, 8, 9, or 10 blades). In some embodiments, the fan may be bladeless. The fan may require low voltage, e.g., of at most about 1.5 volts (V), 2V, 3V, 4V, 5V, 6V, 7V, 8V, 9V, or 10V. The speed of the fan may be at least about 5 thousand revolutions per minutes (KRPM), 5.5 KRPM, 6 KRPM, 6.5 KRPM, 7 KRPM, 7.5 KRPM, 8 KRPM, 8.5 KRPM, 9 KRPM, 9.5 KRPM, 10 KRPM, 10.5 KRPM, 11 KRPM, 11.5 KRPM, or 12 KRPM. The fan may have a low noise signature. The low noise signature may be of at most about 10.0 decibels (dbA), 15 dbA, 20, 25 dbA, or 30 dbA, wherein dbA values are adjusted for varying sensitivity of a human ear to different frequencies of sound. The low noise signature may be below a speaking sound (e.g., of about 65 dbA). The low noise signature may be at most in the order of a breathing noise (e.g., of about 10 dbA), of a silent study room (e.g., of about 20 dbA), of a soft whisper (e.g., of about 40 dbA), or of an office environment (e.g., from about 50 dbA to about 65 dbA). The noise level of the fan may abide by jurisdictional standards, e.g., by standards promulgated by the Occupational Safety and Health Administration (OSHA). The fan may have a weight of at most about 5 grams (g), 6 g, 8 g, or 10 g. The fan may have a conduction capacity of air of at least about 0.02 cubic meters per minute ($M^3$/min), 0.03 $M^3$/min, 0.04 $M^3$/min, 0.05 $M^3$/min, 0.06 $M^3$/min, 0.07 $M^3$/min, 0.08 $M^3$/min, 0.09 $M^3$/min, 0.1 $M^3$/min, 0.15 $M^3$/min, 0.2 $M^3$/min, 0.3 $M^3$/min, 0.4 $M^3$/min, or 0.5 $M^3$/min. The fan may have a conduction capacity between any of the conduction capacities mentioned herein (e.g., from about 0.02 $M^3$/min to about 0.05 $M^3$/min, from about 0.05 $M^3$/min to about 0.1 $M^3$/min, or from about 0.1 $M^3$/min to about 0.5 $M^3$/min).

In some embodiments, at least two of the plurality of circuit boards may be disposed in a manner that facilitates shielding, heat exchange and/or cooling element disposed therebetween. At least one shielding element may be disposed between a first circuit board and a second circuit board that are located (e.g., directly) adjacent to each other. The shielding element may comprise electrical and/or electromagnetic (e.g., radio frequency) shielding. The shielding may or may not act as a heat exchanger and/or cooling element. The housing of an electronic component may comprise a heat exchanger and/or cooling element that is separate from the shielding. The heat exchanger and/or cooling element may comprise a heat pipe, or a metallic slab. Metallic may comprise elemental metal or metal alloy. The metal may be configured for (e.g., efficient and/or rapid) heat conduction. The metal may comprise copper, aluminum, brass, steel, or bronze. The cooling element may comprise a fluid, gaseous, or semisolid (e.g., gel) material. The cooling element may be active and/or passive. The cooling element may comprise a circulating substance. The cooling element may be operatively coupled to an active cooling device (e.g., thermostat, cooler, and/or refrigerator). The active cooling device may be disposed externally to the device ensemble housing. The cooling element may be disposed in a fixture (e.g., the floor, ceiling, wall, or framing) of the enclosure (e.g., building or room) in which the housing of an electronic component is disposed. The fixture may comprise a mullion or transom.

Figure 17:
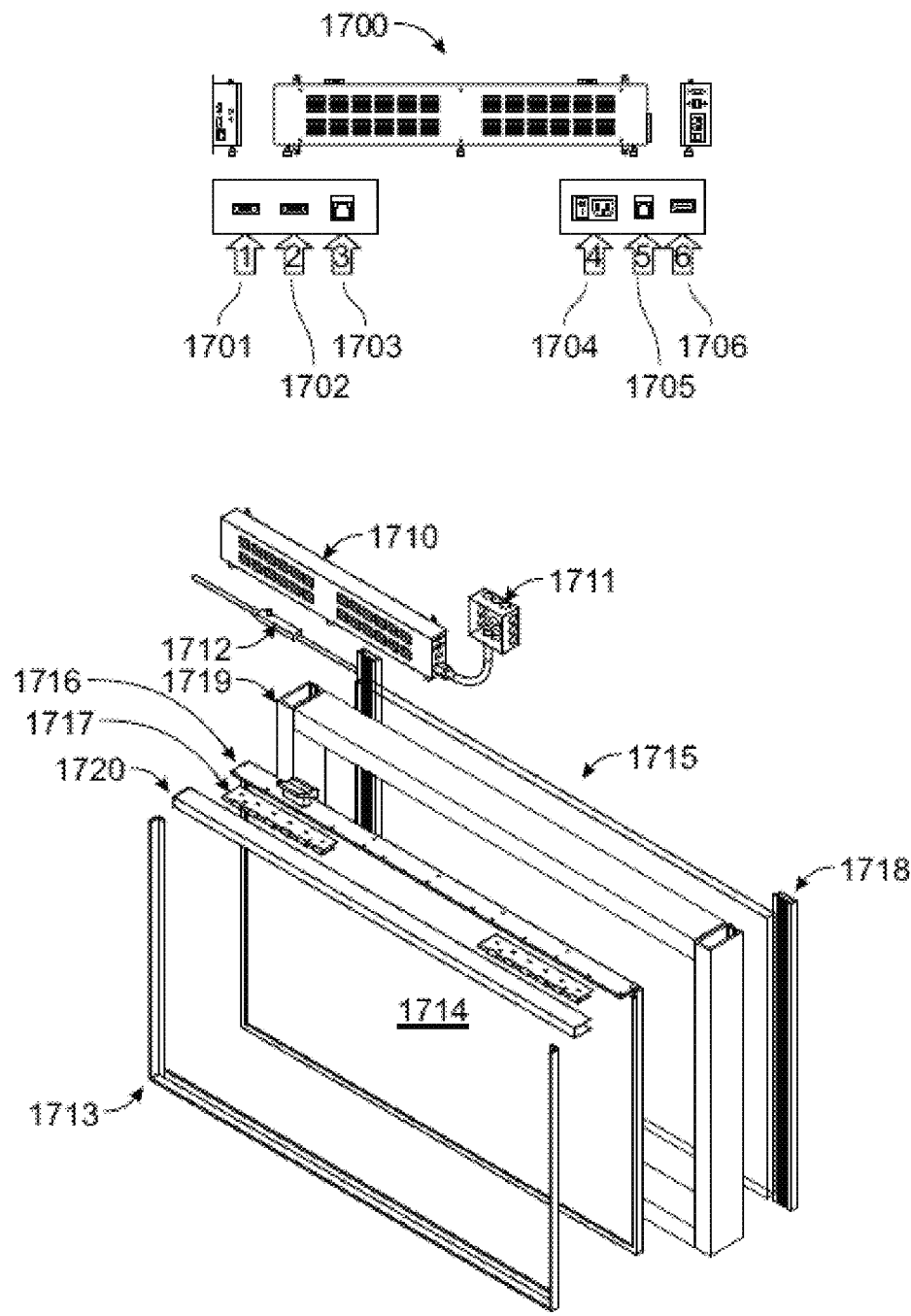
FIG. 17 schematically shows a display construct assembly and a controller and power supply assembly.

In some embodiments, the display construct assembly can accept one or more connector types for media signal and/or electricity. For example, at least one connector and/or socket to one or more drivers and/or receivers, e.g., for use in serial communications systems (e.g., RS485 (input and output)). The connector and/or socket types may comprise HDMI, display port (DP) input and/or output or alternating current (AC) input and/or switch. FIG. 17 shows an example of a side of a controller and power supply assembly 1700 that includes HDMI input 1701, DPI input 1702, RS485 input 1703, AC switch and AC input 1704, RS485 output 1705, and DP output 1706. FIG. 17 shows a perspective disassembled (e.g., exploded) view of a controller and power supply assembly 1710 connected to a main power line 1711, a window controller 1712, an IGU 1715, framing cap 1718 (sometimes referred to as "beauty cap"), window frame 1719, circuitry 1716 (e.g., comprising a booster and/or driver for the display matrix), hinges (e.g., hinge 1717), display construct 1714, cover 1720, and a display construct frame (e.g., edge bezel) 1713 for the display construct. The display construct frame can be a cover for the touch screen component(s). The window controller may be disposed to the side of the window, closer or further from the window. The window controller may be disposed in (or on) the window frame, in (or on) a wall, in (or on) a ceiling, in (or on) a floor. The hinge may or may not be temporarily locked (e.g., using insertions (e.g., slits or crevices), protrusions, and/or spring (e.g., spring plunger)).

In some embodiments, the display construct is registered with a viewing window (e.g., Integrated glass unit abbreviated herein as "IGU"). The display construct may be configured to be positioned on at least a portion of a (e.g., tintable) window. For example, the display construct may be configured to be super positioned with at least a portion of the window. The display construct may be configured to facilitate simultaneous viewing from one side of a window (e.g., internal environment) to its opposing side (e.g., external environment). The display construct may be position in the light of sight of a user viewing through a window (or any portion thereof).

In some embodiments, a controller is operatively coupled (e.g., communicatively coupled) with the display construct. The communication may be wired and/or wireless. The controller may control the display construct at least partially automatically. The controller may be a timing controller (e.g., T-CON), e.g., as disclosed herein. The control may include electronic and/or optical control. The controller may comprise a microcontroller. The controller may be disposed adjacent to the glass (e.g., IGU) and/or display construct. The controller may be disposed in a window frame (e.g., transom or mullion). In some embodiments, a mullion (e.g., FIG. 1B, 131) is a vertical run of window framing, and a transom (e.g., FIG. 1B, 130) is a horizontal run of window framing. The window frame may (e.g., directly or indirectly) hold the glass and/or display construct. The glass may be a tintable glass. The tintable glass may be controlled (e.g., using at least one controller). For example, the tintable glass may be controlled by a hierarchy of controllers (e.g., see FIG. 15). The hierarchy of controllers may be static or dynamic (e.g., in which the hierarchical designation of controllers is dynamically altered). The one or more controllers that control the viewing (e.g., tintable) window may or may not control the display construct (also referred to herein as "media display construct").

In some embodiments, the display construct comprises glass. The glass may be in the form of one or more glass pane. For example, the display construct may include a display matrix (e.g., an array of lights) disposed between two glass panes. The array of lights may include an array of colored lights. For example, an array of red, green, and blue colored lights. For example, an array of cyan, magenta, and yellow colored lights. The array of lights may include light colors used in electronic screen display. The array of lights may comprise an array of LEDs (e.g., OLEDs, e.g., TOLEDs). The matrix display (e.g., array of lights) may be at least partially transparent (e.g., to an average human eye).

Figure 2:
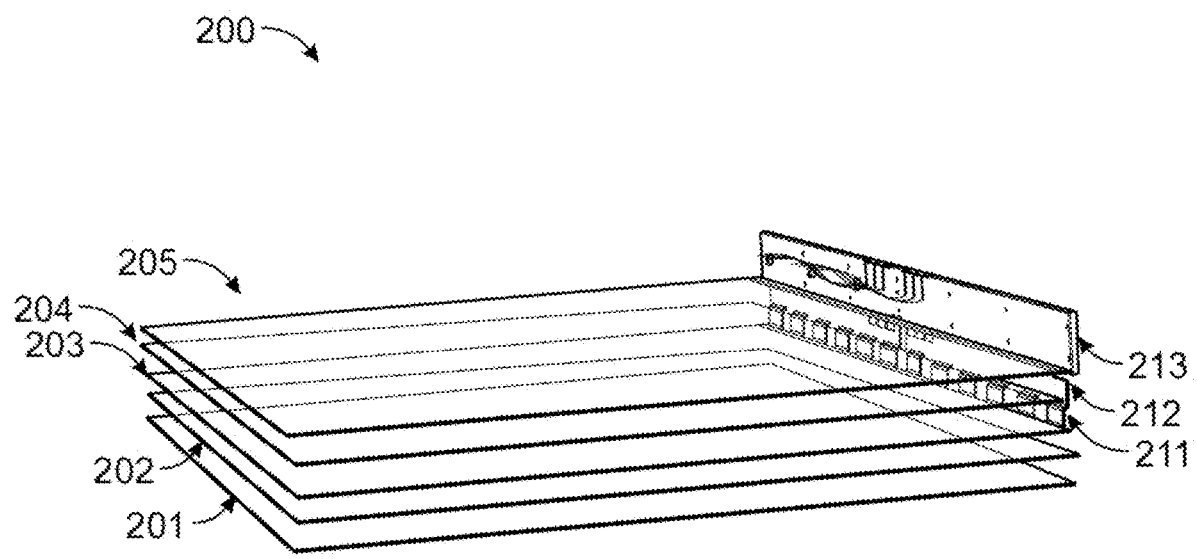
FIG. 2 schematically shows a display construct assembly.

The transparent OLED may facilitate transition of a substantial portion (e.g., greater than about 30%, 40%, 50%, 60%, 80%, 90% or 95%) of the intensity and/or wavelength to which an average human eye senses. The matrix display may form minimal disturbance to a user looking through the array. The array of lights may form minimal disturbance to a user looking through a window on which the array is disposed. The display matrix (e.g., array of lights) may be maximally transparent. At least one glass pane of the display construct may be of a regular glass thickness. The regular glass may have a thickness of at least about 1 millimeters (mm), 2 mm, 3 mm, 4 mm, 5 mm, or 6 mm. The regular glass may have a thickness of a value between any of the aforementioned values (e.g., from 1 mm to 6 mm, from 1 mm to 3 mm, from 3 mm to about 4 mm, or from 4 mm to 6 mm). At least one glass pane of the display construct may be of a thin glass thickness. The thin glass may have a thickness of at most about 0.4 millimeters (mm), 0.5 mm, 0.6 mm, 0.7 mm, 0.8 mm, or 0.9 mm thick. The thin glass may have a thickness of a value between any of the aforementioned values (e.g., from 0.4 mm to 0.9 mm, from 0.4 mm to 0.7 mm, or from 0.5 mm to 0.9 mm). The glass of the display construct may be at least transmissive (e.g., in the visible spectrum). For example, the glass may be at least about 80%, 85%, 90%, 95%, or 99% transmissive. The glass may have a transmissivity percentage value between any of the aforementioned percentages (e.g., from about 80% to about 99%). The display construct may comprise one or more panes (e.g., glass panes). For example, the display construct may comprise a plurality (e.g., two) of panes. The glass panes may have (e.g., substantially) the same thickness, or different thickness. The front facing pane may be thicker than the back facing pane. The back facing pane may be thicker than the front facing pane. Front may be in a direction of a prospective viewer (e.g., in front of display construct 101, looking at display construct 101). Back may be in the direction of a (e.g., tintable) window (e.g., 102). One glass may be thicker relative to another glass. The thicker glass may be at least about 1.25*, 1.5*, 2*, 2.5*, 3*, 3.5*, or 4* thicker than the thinner glass. The symbol "*" designates the mathematical operation of "times." The transmissivity of the display construct (that including the one or more panes and the display matrix (e.g., light-array or LCD)) may be of at least about 20%, 30%, 35%, 40%, 45%, 50%, 60%, 70%, 80%, or 90%. The display construct may have a transmissivity percentage value between any of the aforementioned percentages (e.g., from about 20% to about 90%, from about 20% to about 50%, from about 20% to about 40%, from about 30% to about 40%, from about 40% to about 80%, or from about 50% to about 90%). A higher transmissivity parentage refers higher intensity and/or broader spectrum of light that passes through a material (e.g., glass). The transmissivity may be of visible light. The transmissivity may be measured as visible transmittance (abbreviated herein as "Tvis") referring to the amount of light in the visible portion of the spectrum that passes through a material. The transmissivity may be relative to the intensity of incoming light. The display construct may transmit at least about 80%, 85%, 90%, 95%, or 99% of the visible spectrum of light (e.g., wavelength spectrum) therethrough. The display construct may transmit a percentage value between any of the aforementioned percentages (e.g., from about 80% to about 99%). In some embodiments, instead of an array of lights, a liquid crystal display is utilized. FIG. 2 shows a schematic example of a display construct assembly 200 prior to its lamination, which display construct that includes a thicker glass pane 205, a first adhesive layer 204, a display matrix 203, a second adhesive layer 202, and a thinner glass pane 201, which matrix is connected via wiring 211 to a circuitry 212 that controls at least an aspect of the display construct, which display construct is coupled to a fastener 213.

The display matrix has reflectance and/or color properties. The display matrix can be colored, gray scale, or black and white. The display matrix may have a color depth. The color depth may be at least about 0.25, 0.5, 1, 1.25, or 1.5 billion colors. The color depth may be of any value between the aforementioned values (e.g., from about 0.25 billion colors to about 1.5 billion colors, from about 0.25 billion colors to about 1.25 billion colors, or from about 1 billion colors to about 1.5 billion colors). The display construct may have a contrast ratio of at least about 100000, 120000, 150000, 170000, or 200000, to one. The display construct may have a contrast ratio relative to one between any of the above reference values (e.g., from about 100000:1 to about 200000:1, from about 100000:1 to about 150000:1, or from about 150000:1 to 200000:1). The reflectance of the display construct may be at most about 2%, 4%, 8%, 10%, 14%, or 18%. The reflectance of the display construct may have any value between the aforementioned values (e.g., from about 2% to about 18%, or from about 2% to about 14%).

In some embodiments, the at least one glass pane of the display construct and/or in the IGU, is strengthened. At least one glass of the display construct and/or IGU may be a native glass (e.g., that did not undergo strengthening and/or tempering process). The glass may be a strengthened glass. The strengthened glass may be heat strengthened, heat tempered, or chemically strengthened. The chemically strengthen glass may be chemically tempered glass. The chemically strengthened glass may include Gorilla glass. The glass may comprise used SentryGlass®. The chemically strengthened glass may comprise one or more ion (e.g., cation) doped glass. The cation may be an alkali (e.g., potassium) or alkali earth cation. The glass may comprise one or more pigments. The glass may allow transition of (e.g., the wavelength and/or intensity of) UV light therethrough. The glass may reduce (e.g., prevent) penetration of (e.g., the wavelength and/or intensity of) UV light therethrough. The glass may absorb at least part of (e.g., the wavelength and/or intensity of) UV light. In some embodiments, the glass may comprise a surface treatment (e.g., sanding).

In some embodiments, the display construct may include a binder (e.g., a laminate and/or adhesive). In some embodiments, the display construct may include a binder that includes a polymer and/or resin. The binder may be disposed between a glass pane and the display matrix. The binder may be chosen to facilitate formation of the construct (e.g., adhesion of the display matrix to the glass pane) with minimally (e.g., without) damaging the display matrix. The binder may be cured by heat and/or UV treatment. The temperature of the heat treatment may be such that minimally damages the display matrix (e.g., not damages the display matrix to a measurable and/or substantial degree). Not damage the array to a substantial degree may refer to not damaging the array to a degree that affects its intended purpose (e.g., performance as a display according to its specification). The binder may include at least one organic polymer. The at least one organic polymer may include Polyvinyl butyral (PVB), Ethylene-vinyl acetate (EVA), Polyacrylamide, SGP resin (e.g., SGP 5000 of DuPont). The binder may comprise OCA, e.g., by 3M (e.g., 3M 8211, 3M 8212, 3M 8213, 3M 8214, 3M 8215, 3M 8171, or 3M 8172). The polymer(s) may allow transition of (e.g., the wavelength and/or intensity of) UV light therethrough. The polymer may reduce (e.g., prevent) penetration of (e.g., the wavelength and/or intensity of) UV light therethrough. The polymer may absorb at least part of (e.g., the wavelength and/or intensity of) UV light.

In some embodiments, the display construct comprises lamination. The display construct may comprise a tintable device (e.g., electrochromic device). The tintable device may be laminated onto the display construct (to form a single display construct unit). For example, the display construct may comprise deposited electrochromic layer construct (e.g., deposited on the back side of the media display (e.g., back side of the LEDs). The display construct may comprise one or more layers (e.g., deposited and/or laminated layers) to protect the media display from radiation (e.g., UV and/or IR radiation). The added layering may constitute a film (e.g., electrochromic device, UV protective layering, and/or IR protective layering). The film may be part of the display construct. The film may facilitate longer operational lifetime of the display construct. The film may facilitate greater contrast of the media displayed. The display construct (e.g., including the electrochromic film) may be coupled to a tintable (e.g., electrochromic) window. The film may constitute any tintable window capability (e.g., liquid crystals device, suspended particle device, microelectromechanical system (MEMS) device (such as micro shutters), or any technology configured to control light transmission through a window). The liquid crystal device may comprise a polymer dispersed liquid crystal layer.

In some embodiments, the display construct may comprise a binder in a form of at least one layer. The binder may include at least one optically clear adhesive layer (abbreviated herein as "OCA" layer). For example, the display construct may comprise two binder layers. The binder layers may have a thickness of at least about 0.2 mm, 0.3 mm, 0.4 mm, 0.5 mm, 0.6 mm, 0.7 mm, 0.8 mm, 0.9 mm, or 1 mm. The binder layers may have a thickness of any value between the aforementioned values (e.g., from about 0.2 mm to about 1 mm, from about 0.2 mm to about 0.6 mm, or from about 0.7 to about 1 mm). The binder thickness may be chosen to minimize weight, e.g., while sufficiently binding the construct to form a high tolerance construct that can be machine cut (e.g., have a high die-cut machine tolerance). The binder may increase durability and/or optical characteristics of the display construct, as compared to a display construct devoid the binder. The binder may be (e.g., substantially and/or entirely) transparent (e.g., to the visible light). The binder may be uncolored. The binder may contact the (e.g., largest) surface of the display matrix and the (e.g., largest) surface of a pane (e.g., glass pane), thus binding the display matrix to the pane. The binder may minimally (e.g., not) contribute to an optically and/or visibly distort the displayed media by the display.

In some embodiments, the pane(s), binder, and display matrix are cured before deployment. The curing can be by UV light, moisture, and/or heat. The curing method may be selected to preserve the functionality of the display matrix, and minimize any optical distortion (e.g., maximize transmittance, reduce haze, and/or gas gaps such as air gaps). The binder may increase the durability of the display construct. For example, the binder can reduce the breakage susceptible of the display construct, and/or reduce its flammability. The binder may facilitate adjustment of a refractive index of a pane to ambient air (e.g., where the viewer is), e.g., to (i) minimize loss due to any Fresnel reflection, (ii) transmit all colors with minimal distortion through the display construct, and/or (iii) enhance the image projected by the display construct. The distortion of colors may be due to their passage through the binder, through the glass pane, and to the ambient air. The display construct (e.g., the binder therein) may improve preserve and/or improve an operating temperature range of the display matrix. The binder may prevent one or more gasses and/or debris (e.g., dust or sebaceous) to reach the display matrix. The display construct (e.g., binder, glass, and/or any coating) may prevent physical disturbance to the display matrix (e.g., due to contact). The contact can be direct contact by a user.

In some embodiments, the IGU and/or display construct may comprise a coating (e.g., an anti-reflective coating). The coating may improve optical performance of the glass and/or display construct. The coating may be applied on a glass pane, binder layer, display matrix, and/or electrochromic construct. The coating may be deposited in the form of an anti-reflective, anti-glare, anti-condensation, anti-scratch, anti-smudge treatment, and/or anti-UV, treatment.

In some embodiments, the display construct may comprise a seal. The seal may be disposed between two glasses of the display construct between which the display matrix is disposed. The seal may comprise a polymer/resin (e.g., any polymer/resin disclosed herein). The seal may comprise a carbon based (e.g., organic) polymer or a silicon based polymer. The seal may protect the display construct from light (e.g., UV), humidity, oxygen, physical contact (e.g., physical damage), debris, and/or other environmental components.

In some embodiments, the display construct is durable over a prolonged lifetime. The expected lifetime can be at least about 2 y, 5 y, 10 y, 15 y, 25 y, 50 y, 75 y, or 100 (y) years. The expected lifetime can be any value between the aforementioned values (e.g., from about 5 y to about 100 y, from about 2 y to about 25 y, from about 25 y to about 50 y, or from about 50 y to about 100 y). The prolonged lifetime may be at least 20 Kh, 30 Kh, 50 Kh, 100 Kh, 500 Kh, or 1000 Kh (thousand hours). The prolonged lifetime of the display construct may have any value between the aforementioned values (e.g., from about 20 Kh to about 1000 Kh, from about 20 Kh to about 100 Kh, or from about 100 Kh to about 1000 Kh). The number of hours may refer to the number of hours in which the display construct operates, e.g., for its intended purpose. The lifetime of the display construct may depend on its operating hours and/or any environmental conditions (e.g., UV light, humidity, and/or temperature at its deployed site.

Figure 3:
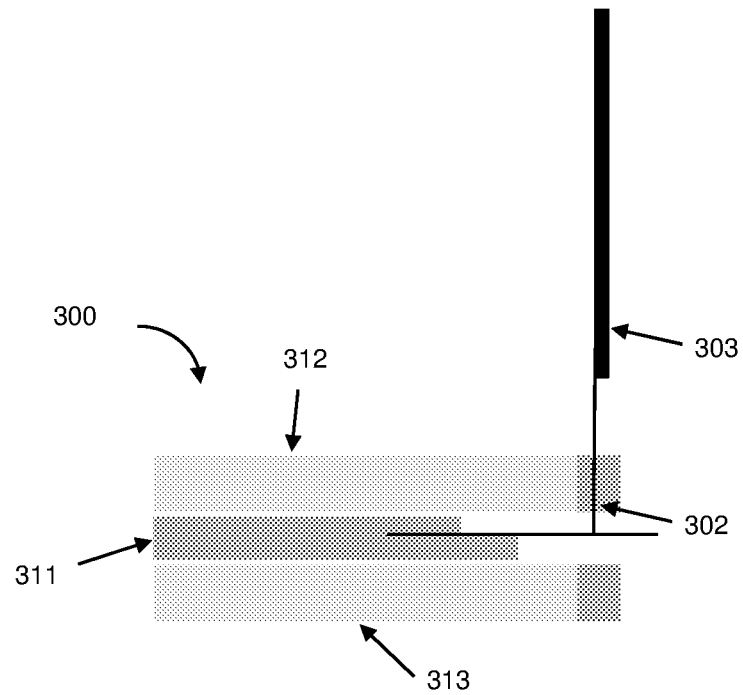
FIG. 3 schematically shows a display construct assembly.

In some embodiments, the display construct is fastened to a fixture (e.g., window frame or wall) that holds the (e.g., tintable) window, e.g., by a fastening mechanism (also referred to herein as a "fastener."). The fastener may comprise one or more components. For example, the fastener can comprise a bracket, a hinge, a cover. The fastener can be permanent or impermanent. The impermanent fastener may be removed by manual labor and/or automatically. For example, the fastener may comprise one or more screws that fasten it to the window frame. The fastener may comprise a hinge and/or bracket. The hinge may be flexible. The bracket and/or cover (or any portion thereof) may be inflexible or non-flexible. The fastener (e.g., including hinge and/or bracket) may be non-transparent. The fastener (e.g., any of its components) may comprise an elemental metal, metal alloy, an allotrope of elemental carbon, a polymer, or a composite material. At least two components of the fastener can be made of (e.g., substantially) the same type. At least two components of the fastener can be made of different material types. The elemental metal may comprise aluminum. The metal alloy may comprise steel. The fastener may comprise a non-corrosive material. At least a portion of the fastener (e.g., the bracket and/or cover) may be configured to carry the weight of the display construct, e.g., without (e.g., substantial) deformation over its intended lifetime (e.g., as disclosed herein). The display construct may weigh at least about 5 Kg, 10 Kg, 15 Kg, 20 Kg, 25 Kg, 30 Kg, 35 Kg, 40 Kg, or 50 kilograms (Kg). The display construct may weigh any weight between the aforementioned weights (e.g., from 5 Kg to 50 Kg, from 5 Kg to 25 Kg, or from 25 Kg to 50 Kg). FIG. 3 shows an example of a vertical cross section of an assembly 300 (partial view shown) in which a display matrix 311 is disposed between a first pane 312 and a second pane 313 as part of a display construct, and an L shaped bracket 302 disposed between the two glass panes 312 and 313 and coupled to the display construct, which L bracket is coupled to a hinge 303.

The fastener may be configured for easy install and/or removal of the display construct from the supporting structure (e.g., window frame and/or wall). Removal may be for servicing, replacement, and/or upgrade of any portion of the display construct and/or structure (or any associated device). For example, the fastener may allow (e.g., easy) removal and/or insertion of display construct. For example, the fastener may allow (e.g., easy) removal and/or insertion of a framing portion to which the fastener is attached. For example, the fastener may allow (e.g., easy) removal and/or insertion of a tintable window that is supported by the frame to which the fastener is attached. Easy may refer to low labor cost, low labor grade (e.g., low labor qualification), and/or short labor time. The fastener may be configured to slide and/or lock for installation onto a supporting structure (e.g., a fixture).

In some embodiments, a connecting material is disposed between the display construct and the fastener (e.g., and the bracket and/or cover). The connecting material may comprise a polymer (e.g., as disclosed herein). The connecting material may comprise a sealing gasket. The connecting material may be curable (e.g., by heat, humidity and/or UV). The connecting material may have low resistance. The connecting material may comprise at least one polymer and/or at least one resin. The connecting material may have a low electrical resistance such that it is suitable for usage as a packing material in the electronic industry (e.g., for smartphones, packaging, liquid crystal displays, and personal computers. The connecting material may comprise polyethylene terephthalate (PET), very high bond (VHB) material (e.g., 3M VHB 4926), or SR, or SRS-40P. The connective material may comprise an acrylic material. The connecting material may retain its property and shape in ambient temperatures. The tensile strength of the connecting material may be at least about 0.60 MPa, 0.63 MPa, 0.66 MPa, 0.68 MPa, or 0.70 Mega Pascal (MPa). The shear strength of the connecting material may be at least about 0.54 MPa, 0.60 MPa, 0.620 MPa, 0.64 MPa, or 0.68 MPa. The shear strength may be smaller than the tensile strength. The shear strength and/or tensile strength may be such that they will be able to facilitate holding the display construct by the fastener (or any portion of the fattener to which the display construct is connected by the connecting material (e.g., adhesive)), e.g., for the projected life time and/or use time of the display construct. The connecting material may be hard and/or flexible. The connecting material may be an adhesive. The connecting material may be softer before its curing, and harder after its curing. The connecting material may be chosen to carry at least the load (e.g., weight) of the display construct, e.g., during constant and/or varying conditions (e.g., per its intended purpose). The bracket may include a straight portion, a curved portion, and/or a corner. The bracket may be devoid of a corner. The bracket may be straight or bent. The bracket may comprise two straight portions (e.g., two arms) that form (e.g., about) an angle. The angle may be a right angle or an obtuse angle. The bracket can be "L" shaped. An arm of the bracket and/or cover may be disposed between two panes, contact the display matrix, and/or contact the binder.

In some embodiments, wires are hidden from view of a user by the fastener (e.g., or any component thereof). For example, the bracket and/or cover may hide one or more (e.g., electrical) wires connected to the display matrix, e.g., from a user. The wires may be connected to the bracket and/or cover. The bracket and/or cover may comprise a recessed portion that is configured to accommodate the wire(s). In some embodiments, the cover and the bracket are the same component (e.g., 531). The recessed portion may be hidden from view of a user (e.g., may be disposed in the back portion of the bracket and/or cover). The wire(s) may connect to the display matrix (e.g., light array or LCD). The wire(s) may connect to a controller. The controller may comprise a timing controller and/or a microcontroller. The connecting material (e.g., connectors) may be disposed along the width (e.g., along fastener structure 104) of display construct. The connecting material may be disposed along at least about 50%, 80%, or 90% of the display construct width. The fastener may comprise a curved portion. The fastener may comprise a non-curved portion.

In some embodiments, the fastener comprises a hinge. In some embodiments, the hinge includes two leaves connected by a joint that forms an axis about which the leaves are configured to move about. A first leaf of the hinge may be operatively coupled (e.g., connected) to the bracket and/or cover. A second leaf of the hinge may be operatively coupled (e.g., connected) to a fixture. The fixture may be a wall or a window frame. The hinge may facilitate movement of the display construct around the hinge axis. The joint may facilitate opening of the hinge to an acute angle, a right angle, an obtuse angle, a flat angle (e.g., 180°), or complete rotation (e.g., ~360°). Fastening the hinge to a fixture and to the display construct (e.g., via the bracket and/or cover) facilitates movement of the display construct about the axis of the hinge joint. Such movement may facilitate servicing the display construct without disturbance to the window (e.g., IGU) and/or to the fixture. Servicing may include cleaning, repairing, and/or replacing e.g., the display construct and any portion or component thereof.

Figure 37:
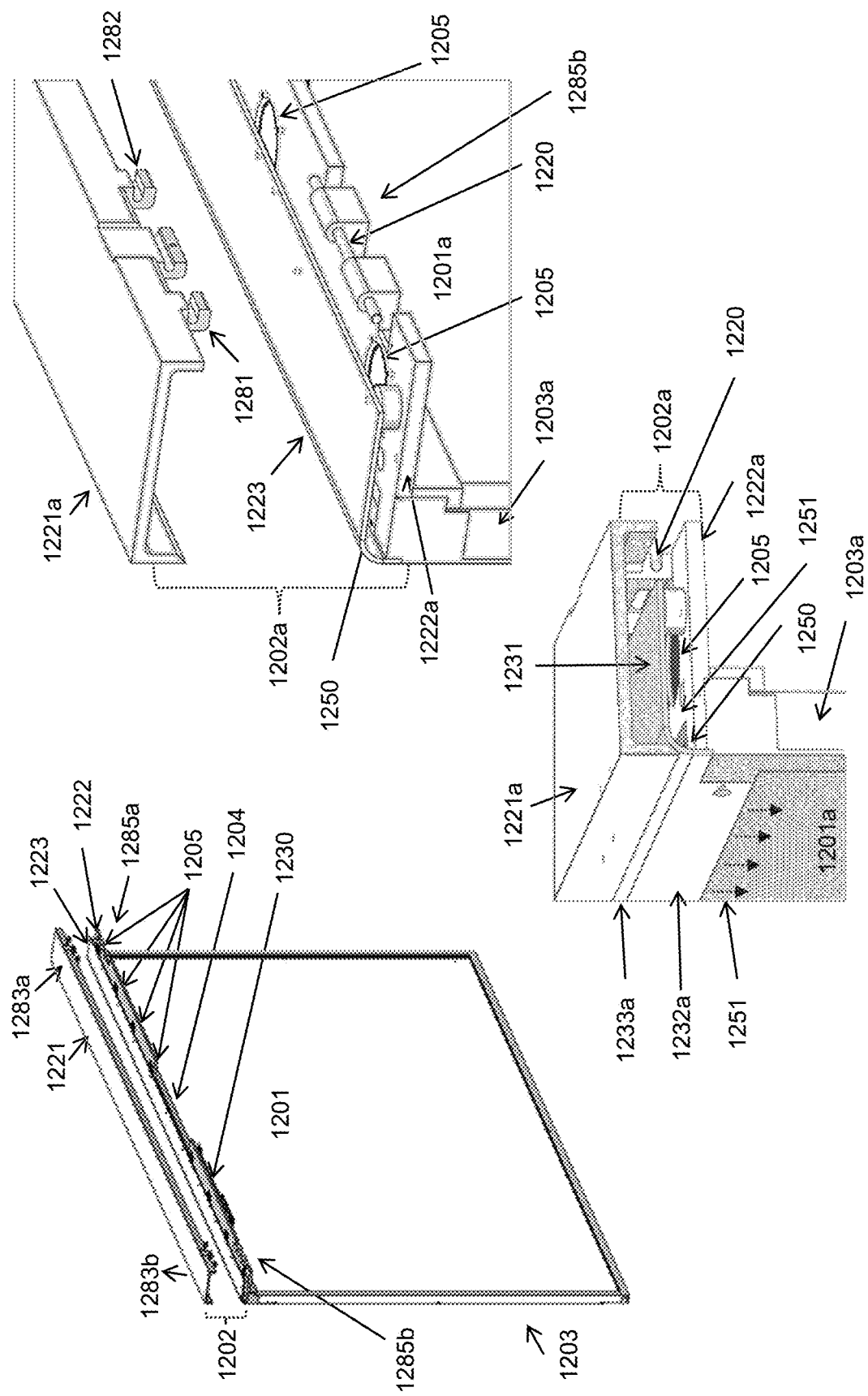
FIG. 37 schematically show various views of a display constructs and associated components (e.g., portions thereof)

In some embodiments, the fastener may comprise a plurality of components. The plurality of components may comprise a bracket, a cover, a hinge, and/or a board. The display construct may be coupled (e.g. connected) to a bracket and/or cover. The bracket and/or cover may be coupled to one leaf of the hinge. Another leaf of the hinge may be coupled to a fixture indirectly by coupling the other hinge leaf directly to a board that is directly connected to a fixture. The board may include any of the fastener material disclosed herein (e.g., elemental metal and/or metal alloy). The fastener can include a plurality of components of the same type. For example, the fastener can include a plurality of hinges, a plurality of brackets, a plurality of covers, and/or a plurality of boards. The plurality of fastener components can be at least 2, 3, 4, 5, 8, or 10 components (e.g., of the same type or of different types). The hinge may comprise hinge component set (e.g., knuckles and pintle). The fastener may comprise a plurality of hinge component sets. The hinge component sets may be aligned to have a single hinge axis. The fastener may be formed of two swiveling leaves about an axis of the hinge complement sets. AT least one (e.g., each) of the leaves may comprise a single slab incorporating half of the plurality of hinge components (e.g., knuckles)), such that when the two leaves are integrated, a plurality of functional hinge components sets are created (e.g., as shown in the example of FIG. 37). In some embodiments, two leaves having respective hinge components to form a plurality of operational hinge components, wherein each of the two leaves is formed of a single slap of material, form a fastener that is stronger and/or more durable as compared to coupling the display construct to a plurality of separate fasteners each having a single hinge set. In some embodiments, two leaves having respective hinge components to form a plurality of operational hinge component, wherein each of the two leaves is formed of a single slab of material, form a fastener that is easier to install, maintain, and/or replace as compared to coupling the display construct to a plurality of separate fasteners each having a single hinge set. In some embodiments, two leaves having respective hinge components to form a plurality of operational hinge component, wherein each of the two leaves is formed of a single slab, facilitate more accurate alignment of the display construct as compared to coupling the display construct to a plurality of separate fasteners each having a single hinge set. Such a single fastener offers additional advantages such as incorporating heat exchangers (e.g., fan), directing the heat exchange (e.g., within the fastener and/or along the display construct), and/or coupling one or more circuit boards to the fastener.

Figure 4:
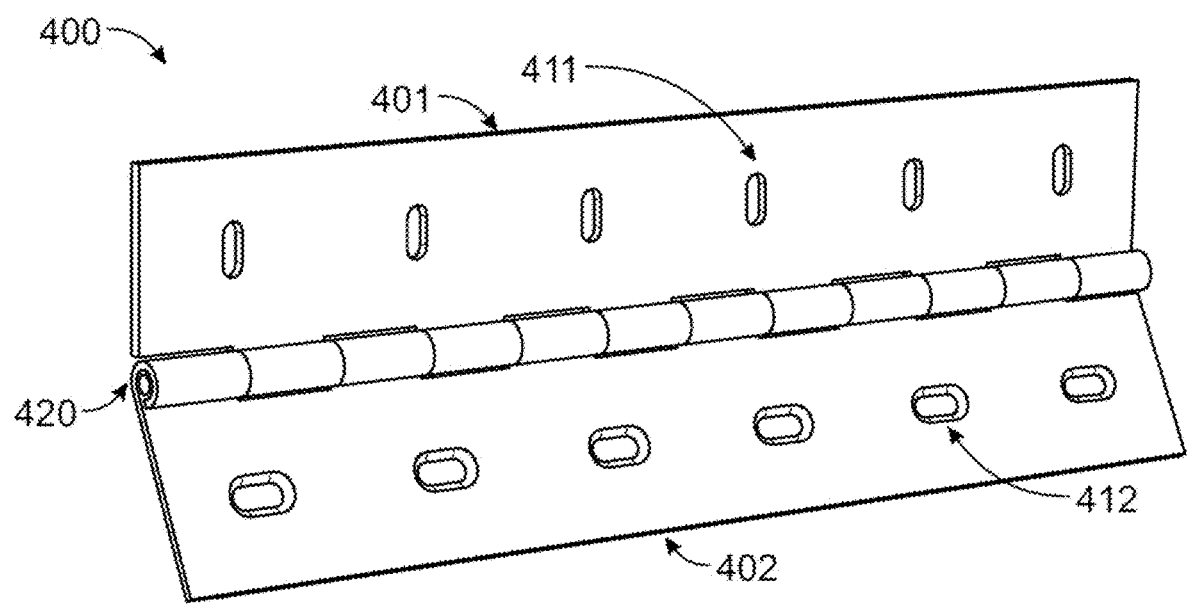
FIG. 4 schematically shows a hinge.

In some embodiments, at least one leaf of the hinge comprises one or more holes. At least one hole of the one or more holes is configured to allow a screw to pass through and connect (e.g., reversibly) the hinge to the fixture (e.g., window frame) and/or bracket. The connection of the fastener (or any component thereof) to the display construct and/or fixture (e.g., window frame) may be (I) irreversible (e.g., using the connecting material) or (II) reversible (e.g., using one or more screws). The fixture and/or board may use both irreversible and reversible connection between itself and the display construct. For example, the hinge may be connected reversibly to the window frame and irreversibly to the bracket. For example, the hinge may be connected reversibly to the bracket and irreversibly to the window frame. For example, the hinge may be connected reversibly to the window frame and reversibly to the bracket, which will be connected irreversibly (e.g., glued) to the display construct. For example, the hinge may be connected reversibly to the wall and reversibly to the cover, which will be connected irreversibly (e.g., glued) to the display construct. For example, the hinge may be connected reversibly to the board and reversibly to the cover, which will be connected irreversibly (e.g., glued) to the display construct. The board may be coupled reversibly (e.g., via screw(s)) or irreversibly (e.g., via binder (e.g., glue)) to the fixture. FIG. 4 shows a schematic example of a hinge 400 having a first leaf 401 having a plurality of holes (e.g., 411) that allow movement of a screw in one direction; and a second leaf 402 having a plurality of holes that allow movement of a screw in a second direction, which first direction may be perpendicular to the second direction. The hinge shown in FIG. 4 has a joint 420 that facilitates rotation of the first leaf with respect to the second leaf. In some embodiments, the first leaf has hole(s) having a long axis in a first direction, and the second leaf has hole(s) having a long axis in a second direction, which first direction forms an angle with the second direction that is non-zero (e.g., the first direction can be perpendicular to the second direction). Which relative direction of the long axis can be measured when the hinge is closed, and the two leaves lie one on top of the other. In some embodiments, the bracket may be an extension of a leaf of the hinge. In some embodiments, the bracket may be coupled (e.g., fastened) to the leaf of the hinge, e.g., reversibly (e.g., via crew(s)) or irreversibly (e.g., via adhesive). In some embodiments, the cover may be an extension of a leaf of the hinge. In some embodiments, the cover may be coupled (e.g., fastened) to the leaf of the hinge, e.g., reversibly (e.g., via crew(s)) or irreversibly (e.g., via adhesive).

In some embodiments, electrical circuitry is communicatively coupled to the display construct. The electrical circuitry may (i) boost the signal transmitted to the display matrix, and/or (ii) transmit power arriving from a power supply to the display matrix. In some embodiments, the circuitry may comprise touch screen circuitry. In some embodiments, the touch screen circuitry may be separate (e.g., and be disposed in a touch screen sensor cover). In some embodiments, the circuitry may connect touch screen sensor(s) to the power supply. In some embodiments, the touch screen circuitry may have a separate connector to the power supply.

Figure 5:
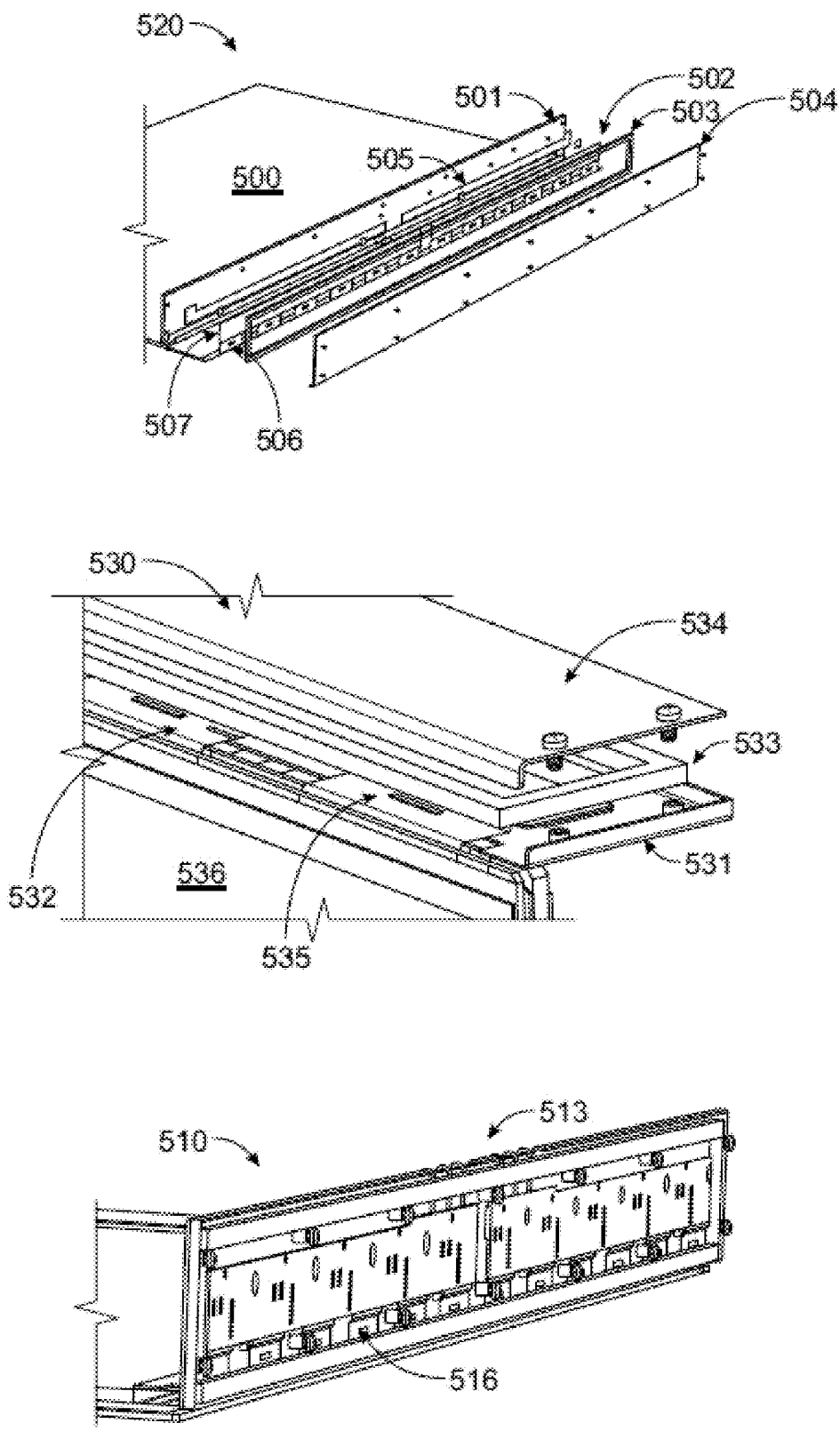
FIG. 5 schematically shows various fasteners and display construct assemblies.

FIG. 5 shows an example of an assembly 520 in which a display construct 500 (partial view shown) connected to a fastener that includes an L bracket that is the first cover portion 501, a thermal pad 505, flexible electrical connectors such as 506 (MXC) connector, a circuitry 502 (e.g., a booster board), a flexible insulator 503 and a second cover portion 504; and 510 shows a schematic bottom view of the circuitry board with screws and connectivity, which circuitry board is attached to a cover. The assembly 520 is shown from a different perspective in 530, indicating the display construct 536, flexible wiring (e.g., MXC) 535, a first portion of the cover 531 (partial view shown) that is a bracket, gasket (e.g., flexible insulator) 533 (partial view shown), circuitry 532 (partial view shown), and a second portion of the cover 534 (partial view shown). The flexible insulator can be a foam gasket (e.g., poron). The flexible insulator can have a least 25% compression. The bracket can have one or more thermal pads disposed on it. Referring to FIG. 5, in one embodiment, L-bracket 501 is seen to extend across a linear dimension of a transparent display (and affixed to cover glass 500), which L bracket 501 is the first cover. In one embodiment, the length of bracket 501 may be up to about 10 feet. The circuitry (e.g., signal booster) may be connected to the display matrix by one or more flexible wiring (e.g., MXC). At times a plurality of circuitry boards (e.g., at least 2, 3, or 4 boards) may be disposed in the fastener (e.g., between the first and second cover). FIG. 5 shown an example of two circuit boards 502 and 507. One or more (e.g., flexible) connectors may connect the circuitry board to the flexible display matrix. The number of flexible connectors (e.g., MXCs) may be at least 2, 5, 6, 8, or 10. FIG. 5 shows examples of flexible connectors 516, 535, and 506. One or more (micro) cable bundles and/or (e.g., micro) coaxial cables may couple (i) the circuitry (e.g., booster) disposed in the fastener with (ii) the controller (e.g., timing controller). One or more (micro) cable bundles and/or (e.g., micro) coaxial cables may be connected by a connector to the circuit board (e.g., the booster board). The number of electrical connectors (e.g., connector 630 (partial view shown), e.g., IPLEX connectors) between the circuit board and the controller may be at least 1, 2, 3, 4, or 5. FIG. 5 shows an example of the electrical cable 513 connecting the board (e.g., driver board) and the controller (e.g., timing controller). One or more fine wiring bundles may connect the controller (e.g., T-CON) to a booster board that is connected to flexible connectors (e.g., MXC cable) to the display matrix (e.g., TOLED). The fosterer may be configured to secure, house, and/or hide the cables and/or wiring from being viewed by a viewer of the display construct.

Figure 10:
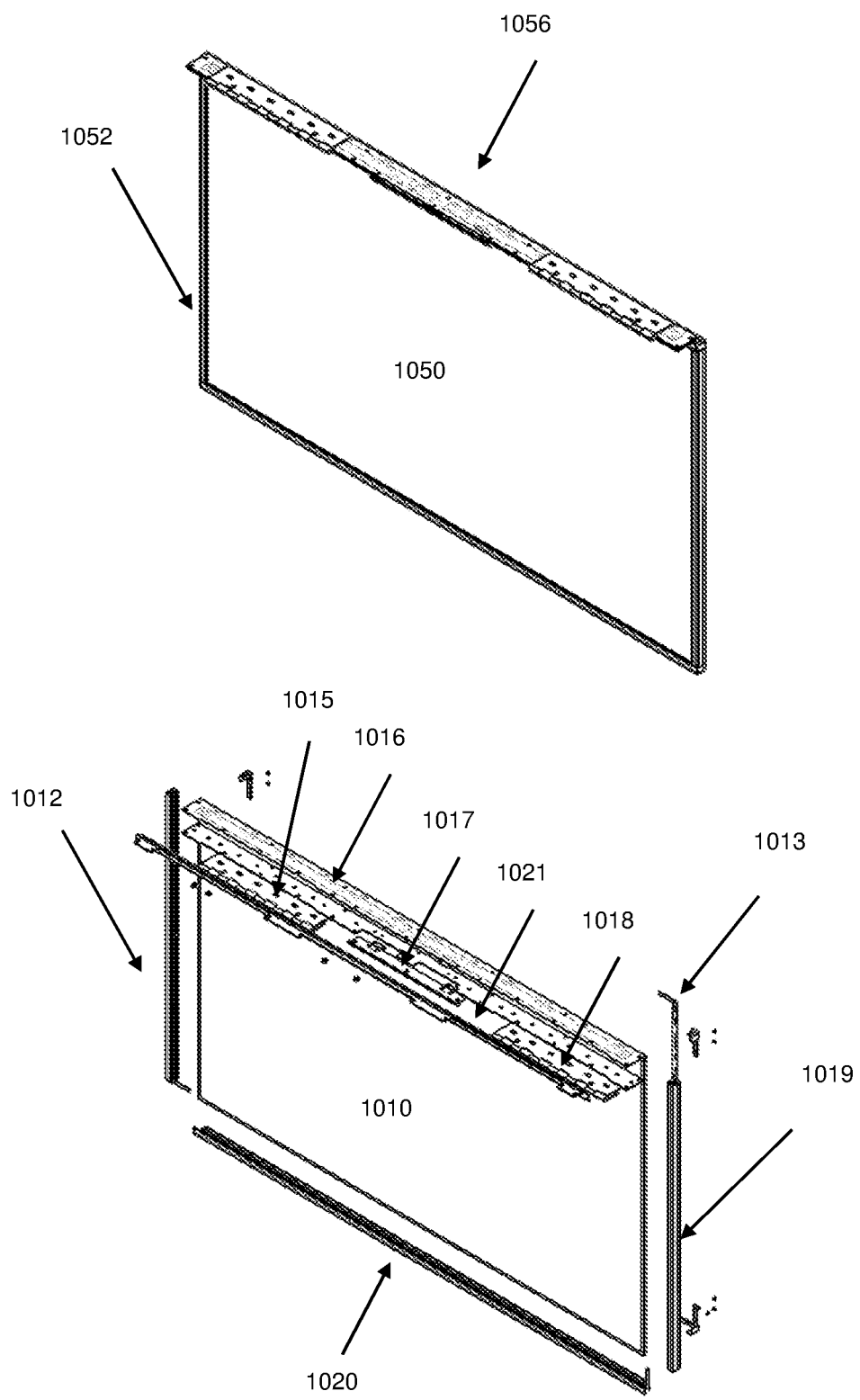
FIG. 10 schematically shows various fasteners options and display construct assemblies.

The electrical circuitry (e.g., and any connecting cables thereof) may be at least partially masked from view of a user by the fastener (or any component thereof, e.g., by the hinge and/or by the board). The electrical circuitry (e.g., and any connecting cables thereof) may be at least partially secured from contact by a user. The bracket, cover, board, and/or hinge may have an openable portion. The openable portion may swivel around an axis (e.g., the openable portion may swivel around a secondary hinge to facilitate its swiveling). The Fastener may have one or more of its component types (e.g., one or more brackets, one or more covers, one or more boards, one or more primary hinges, and/or one or more secondary hinges). One or more components of the fastener can span a FLS of the display construct and/or viewing window, or a portion thereof. The openable and/or removable portion may facilitate servicing the electrical circuitry (e.g., and any connecting cables thereof), e.g., without disassembling the fastener from the supporting structure to which it is coupled and/or from the display construct. Usage of the opening (coupled with the secondary hinge or without any secondary hinge) may facilitate (e.g., reversible) detachment of the connective cabling between (i) the E-box and/or power supply box and (ii) the circuitry attached to the display construct (e.g., display construct and/or touch screen related circuitry). Such (e.g., reversible) cabling attachment and detachment may allow replacement and/or servicing of the E-box and/or of the power supply, without disassembling the fastener from the supportive structure and/or from the display construct. Such (e.g., reversible) cabling attachment and detachment may allow replacement and/or servicing of the display construct and/or fastener, without disassembling the E-box and/or power supply unit. Such (e.g., reversible) cabling attachment and detachment may allow separation (e.g., disconnection) between (I) the display construct—fastener assembly, and (II) the E-box and/or power supply unit. The display construct—fastener assembly may optionally comprise touch screen facilitator (e.g., sensor and emitter panels). For example, the openable and/or removable portion (e.g., a secondary hinge) may facilitate servicing a booster board or any cables and/or connectors connected thereto. Servicing may include removing, repairing, replacing, and/or cleaning. For example, the board may have a secondary opening that facilitates exposing at least a portion of the controller and/or wiring. FIG. 10 shows an example of a secondary opening including portions 1017 and 1021 as part of the fastening system. A cushion may be disposed between the openable and/or removable portion and the electrical circuitry (e.g., and any connecting cables thereof). The cushion can protect the electrical circuitry (e.g., and any connecting cables thereof) and/or prevent its movement. Protection can be from light, temperature (e.g., heat or cold), contact, humidity, and/or oxygen. The cushion may comprise a polymeric foam (e.g., polyurethane). The cushion may comprise a foam gasket. This cushion may aid in maintaining a (e.g., reasonable) bending radius on the wire(s). The wiring may comprise microflex-complete (MXC) cable(s), e.g., to connect the circuitry to the controller (e.g., timing controller) and/or power source. The wiring may be coupled to the circuitry via one or more connectors (e.g., IPEX or micro connectors). The micro connectors may connect the circuitry (e.g., disposed in the fastener) to the display matrix. The circuitry may comprise a booster board. Micro connectors can have a plurality of wires, e.g., bonded in an envelope. The wiring may comprise coaxial cable(s).

In some embodiments, the fastener may comprise a regression forming an opening. The regression may be a secondary opening. The regression may be centered about the middle length of the fastener. The regression may or may not be covered. The covering of the regression may or may not be reversible. For example, the covering may be a secondary hinge leaf. The covering may be bolted to the fastener with screw(s) and/or clips. The fastener may comprise two hinge leaves that are coupled with knuckles and pintle mechanism to form a hinge. The regression may be covered when the fastener is in its closed hinge position. The regression may be (reversibly) covered when the (primary) fastener hinge(s) is in its closed position. The regression may be (reversibly) opened when the (primary) fastener hinge(s) is in its open position. FIG. 10 shows a cover 17017 that covers an opening in fastener 1021. The width of the regression (e.g., see FIG. 41, broken arrow $W_{opening}$) may extend to at most about 95%, 90%, 80%, 70%, 60%, 50%, 40%, or 30% of the hinge leaf width (e.g., see FIG. 41, broken arrow $W_{total}$). The regression may be from an edge from the hinge leaf towards its internal portion. The regression may be an opening within the hinge leaf (e.g., a window within the hinge leaf), e.g., having the above references extension as its width. The length of the opening (e.g., regression. E.g., see FIG. 41, broken arrow $L_{opening}$) may extend to at most about 60%, 50%, 40%, 30%, 20%, or 10% of the total length of the hinge leaf (e.g., see FIG. 41, broken arrow $L_{total}$). The regression may extend to a width and/or length that may facilitate connecting and/or disconnecting any connectors that couple a circuit board to the display construct and/or touch screen related apparatus (e.g., sensor and emitter panel). The opening (e.g., regression) may or may not be centered about a length and/or a width of the fastener (or any hinge leaf thereof).

In some embodiments, the controller may comprise a timing controller (abbreviated herein as "T-CON"). The timing controller may control operation timing of various components of the display matrix (e.g., when a LED is lit up in the display matrix). The timing controller can translate between a video signal and a row and a column driver signaling required by the display matrix. The media signal may be transmitted to the T-CON board over a communication interface such as Low-voltage differential signaling (LVDS), Embedded DisplayPort (eDP), Mobile Industry Processor Interface (MIPI®), Display Serial Interface (DSI), or VX1. The circuitry (e.g., chip therein and/or controller) may comprise a 60 Hz to 120 Hz frame rate converters. The timing controller may refresh a charge to minimize optical response decay of the LCD chemical(s) responding to electrical charge, e.g., at a rate to keep the signal uniform, avoid decay, and/or adequate update. The controller (e.g., T-CON) may be disposed at a distance from the display construct assembly that includes the display construct and the fastening system (e.g., fastener).

Figure 6:
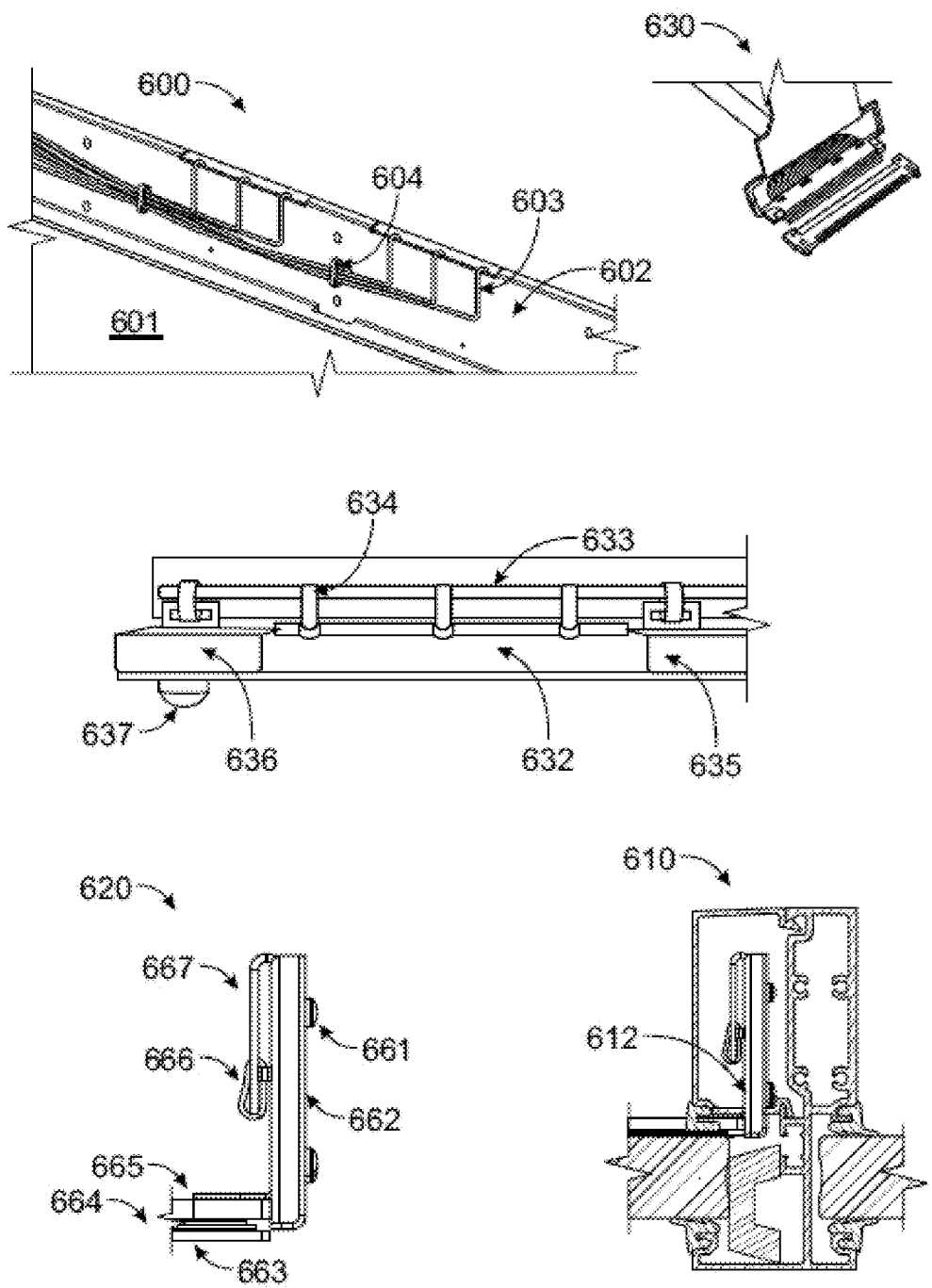
FIG. 6 schematically various fasteners, display construct assemblies, and wiring.

In some embodiments, the display construct is operatively coupled (e.g., connected by wiring) to a power supply. The circuitry is operatively coupled (e.g., connected by wiring) to a power supply. The connection may be direct or indirect. The indirect connection may be through the circuitry (e.g., booster). The power supply may be a secondary power supply. The power supply may be coupled to the municipal power source (e.g., power plant), and/or building power source (e.g., generator, solar cell(s), and/or wind turbine). Power source may be renewable and/or non-renewable. The power source may be coupled to the BMS. The power source may be coupled to a network infrastructure (e.g., as disclosed herein). The power source may supply power at about 240V or 120V (e.g., house current) AC. The secondary power source may comprise a converter reducing the voltage (e.g., to at most about 24V, 48V, or 54 Volts (V)). FIG. 6 shows an example of a perspective view of an assembly 600 including a display construct coupled to a fastener and a circuitry in which a fastener 602 (partial view shown) is coupled to a display construct 601 (partial view shown) that is connected through wiring 603 (partial view shown) to a circuitry (not shown) disposed in the fastener, which wiring is secured by hooks such as hook 604. The hook can be a tie mount. FIG. 6 shows a perspective view of a hinge leaf 634 to onto which wiring 633 are connected to, which wiring are connected to a circuitry 632, which hinge leaf 634 is joined with hinge leaf portion 635 (partial view shown) and hinge leaf 636 portion that is connected by a screw 637 to a fixture (not shown). Hinge leaf portions 635 and 636 are part of the same hinge leaf. FIG. 6 shows a side view example of an assembly 620 including a fastener 662 coupled with screws, e.g., 661, to a fixture (not shown), which fixture has dangling wiring 667 emerging from its body and fastened to a hook 666. The wiring 667 is connected (i) to a circuitry (not shown) disposed in the fastener body 662 and to (ii) a display construct (partial view shown) that includes a display matrix 664 that is disposed between a thicker glass 665 and a thinner glass 663. FIG. 6 shows a side view example of an assembly 612 (similar to 620) disposed in a vertical cross section of a window frame 610. FIG. 6 shows an example of electrical wiring 630 that can be utilized in the display construct assembly. The fastener may comprise a driver and/or booster board. The circuitry may facilitate data (e.g., network communication) and/or power transmission.

The secondary power source may supply a direct current (DC) voltage. The secondary power source may be disposed adjacent to the display construct and/or IGU. The secondary power source can be disposed in the window frame, in a wall, in a floor, or in a ceiling. The controller of the display construct can be disposed separately from its power supply. The shortest distance from (i) the display construct, booster board, driver board, and/or timing controller (e.g., T-CON) to (ii) the power supply can be at least about 0.25 m, 0.5 m, 1 m, 1.5 m, 2 m, 2.5 m, 3 m, 3.5 m, 4 m, 4.5 m, 5 m, 5.5 m, 6 m, 6.5 m, 7 m, 8 m, 10 m, or 20 meters (m). The shortest distance from (i) the display construct, booster board, driver board, and/or timing controller to (ii) the power supply can be of any value between the aforementioned values (e.g., from about 0.25 to about 20 m, from about 0.25 m to about 5 m, from about 5 m to about 7 m, or from about 7 m to about 20 m). For example, the shortest distance from (i) the driver and/or booster board to (ii) the power supply and/or T-CON can be at least about 1.5 m, 2 m, 2.5 m, 3 m, 3.5 m, 4 m, 4.5 m, 5 m, 5.5 m, 6 m, 6.5 m, 7 m, 8 m, or 10 m. The shortest distance from (i) the driver and/or booster board to (ii) the power supply and/or T-CON can be of any value between the aforementioned values (e.g., from about 1.5 to about 10 m, from about 1.5 m to about 5 m, or from about 5 m to about 10 m). The shortest distance from (i) the display construct and/or booster board to (ii) the power supply and/or T-CON can be of any value between the aforementioned values (e.g., from about 5' to about 30', from about 10' to about 25', or from about 15' to about 20'). For example, the shortest distance from (i) the driver board and/or display construct to (ii) the power supply and/or T-CON can be at least about 5', 10', 15', 20', 25', 25', 30', 50', 100', 200', or 300' (feet). The shortest distance from (i) the display construct, and/or booster board to (ii) the power supply and/or timing controller can be of any value between the aforementioned values (e.g., from about 5' to about 300', from about 10' to about 25', from about 15' to about 20', from about 20' to about 50', from about 50' to about 200', or from about 100' to about 300').

In some embodiments, a local controller may control the viewing (e.g., tintable) window (e.g., as part of the IGU) and/or the display construct. The local controller may be part of a control network. The control network may be a hierarchal control network (e.g., as disclosed herein). The hierarchy of the controllers in the control network may be static or dynamic. The local controller may be disposed adjacent to the display construct and/or IGU. The local controller can be disposed in the window frame, in a wall, in a floor, or in a ceiling. In some embodiments, one local controller controls the viewing (e.g., tintable) window and the display construct (e.g., the media displayed by the display construct). In some embodiments, separate controllers control the viewing (e.g., tintable) window and the display construct (e.g., the media displayed by the display construct). Communication between the local controller and other components of the network interface may be wired and/or wireless. The wired communication may include coaxial cable, twisted pair, NM cable, Underground Feeder (UF) cable, Thermoplastic High Heat-resistant Nylon-coated (THHN) wire, Thermoplastic Heat and Water-resistant Nylon-coated (THWN) wire, standard phone wire, or category 3 (Cat 3) cable, and/or category 5 (Cat 5) cable. The control system (e.g., the local controller) may be communicatively coupled to the display construct (e.g., via the timing controller (T-CON)) by wired and/or wireless communication. For example, the display construct may be connected to the local controller via one or more wires and/or wirelessly. For example, the T-CON may be connected to the local controller via one or more wires. The shortest distance from (i) the display construct and/or T-CON to (ii) the local controller can be at least about 0.25 m, 0.5 m, 1 m, 1.5 m, 2 m, 2.5 m, 3 m, 3.5 m, 4 m, 4.5 m, 5 m, 5.5 m, 6 m, 6.5 m, 7 m, 8 m, 10 meters (m). The shortest distance from (i) the display construct and/or T-CON to (ii) the local controller can be of any value between the aforementioned values (e.g., from about 0.25 to about 10 m, from about 0.25 m to about 5 m, from about 5 m to about 7 m, or from about 7 m to about 10 m). The distance may correspond to a minimal measure of the wire length (e.g., when the display construct is communicatively coupled to the local controller at least in part via wiring). The shortest distance (I) between the display construct and the local controller, and (II) between the local controller to the power supply, may be (e.g., substantially) equal. The shortest distance (I) between the display construct and the local controller, and (II) between the local controller to the power supply, may be (e.g., substantially) unequal. The shortest distance (I) between the timing controller and the local controller, and (II) between the local controller to the power supply, may be (e.g., substantially) equal. For example, the shortest distance (I) between the timing controller and the local controller, may be smaller than (II) between the local controller to the power supply. For example, the shortest distance (I) between the timing controller and the local controller, may be longer than (II) between the local controller to the power supply. The shortest distance (I) between the timing controller and the local controller, and (II) between the local controller to the power supply, may be (e.g., substantially) unequal. For example, the shortest distance (I) between the timing controller and the local controller, may be smaller than (II) between the local controller to the power supply. For example, the shortest distance (I) between the timing controller and the local controller, may be larger than (II) between the local controller to the power supply.

FIG. 7 shows an example of a vertical cross section of a display construct portions coupled to a circuitry and to a fastener, that includes: an L-bracket 701 is depicted in cross section, a circuitry 702 (e.g., a booster board), cable(s) 703, foam gasket 704, screw 705, tape 706, first glass pane 707, adhesive (e.g., OCA) 708, display matrix 709, second glass pane 710, cover 714, bumper 712, an adhesive 713, and 711 the viewing window (partial view shown). The display construct may comprise a flexible bumper (e.g., polymer or resin) that separates it from the window (e.g., 711). The bumper may prevent glass to glass contact between the display construct and the window (e.g., tintable window), which may lead to damage of the display construct and/or window (e.g., prevent cracks and/or breakage). The bumper may increase the safe operation of swiveling the display construct, e.g., about the hinge axis. In one embodiment in a cross-section, the L bracket is defined by one or more right angle, though the angle could be other than 90 degrees. In the embodiment depicted, L-bracket is affixed to a cover glass (e.g., 707) via an adhesive element. In embodiments, the adhesive element is an adhesive tape. In one embodiment, the adhesive tape comprises a VHB type tape. In one embodiment, the adhesive element is a liquid or gel adhesive that bonds the L-bracket to the cover glass. Cover glass (e.g., 707) may be plastic, glass or other transparent material. The thickness of the cover glass in one example can be about 4 mm, but it could be thicker or thinner than 4 mm. The cover glass may be part of the display construct (e.g., transparent display) and/or the display construct (e.g., transparent display) element may be laminated to the cover glass. In the example shown in FIG. 7, a second cover glass 710 is laminated to a transparent display element 709, that is, transparent display element 709 (e.g. a T OLED) is sandwiched between cover glass 707 and second cover glass 710. The laminate structure formed may rest against the viewing window (e.g., 711) or be parallel to but spaced apart from the viewing window. The laminate structure comprising the first glass pane 707, the display matrix 709 and the second glass pane 710 (e.g., second glass cover) may be considered a transparent display assembly (also termed herein "display construct").

In one embodiment, the adhesive element is of sufficient strength to support a weight of a transparent display assembly. As depicted, one face of L-bracket (e.g., 701) is used as a surface for the adhesive element and at least this much surface area is attached to the transparent display assembly, via the cover glass (e.g., 707).

As depicted in the example shown in FIG. 7, a cover 714 is attached to L-bracket 701. In this example, L-bracket 701 includes an overhang portion on the vertical leg. Together with cover 714, a chamber is formed, within which a circuitry 702 for the display matrix is housed. Circuitry 702 may be in the form of a circuit board (e.g., a driver and/or booster board). In one embodiment the cover seals the electronics from the environment via one or more gaskets. In one embodiment, the L-bracket 701 is configured to provide movement and/or physical connectivity between a frame of a window and the display construct (e.g. see FIG. 1A). In one embodiment, circuitry 702 is coupled to a display matrix via one or more conductors, e.g. ribbon cable, flex circuit and/or other wired connections 175. In certain embodiments, wired connections 175 (refer to FIG. 2b) may be micro-coaxial cable (e.g. see 802, FIG. 8). In embodiments, wired connections 802 may terminate at the L-bracket with multi-tipin connectors (see FIG. 8, 803).

In some embodiments, the display construct comprises a touch screen. The display construct may comprise at its edges one or more optical sensors to facilitate functionality of the touch screen by user(s). The touch screen can receive contact (e.g., touch) input from user(s) and deliver an output response. The response can be functional the response can include a change in visual, data, or sound. The touch screen can utilize the display matrix. The display construct can be operatively coupled to an information processing system (e.g., comprising one or more processors, and/or network interface). User(s) can the information processing system through simple (e.g., single) or multi-touch gestures by touching the display construct pane facing the user(s). Touch can be using a specialized device (e.g., stylus or electronic pen) or one or any portion of their body (e.g., more fingers). The specialized device may be adapted to the display construct. The touchscreen can be a resistive touchscreen, surface acoustic wave touchscreen (e.g., using ultrasonic waves), capacitive touchscreen, infrared grid touchscreen (e.g., using photodetectors), optical imaging (e.g., using CMOS sensors), infrared acrylic projection (e.g., comprising infrared LEDs), dispersive signal touchscreen, or acoustic pulse recognition touchscreen. The display construct is enhanced per requirements of the touch screen technology. For example, when sensors (e.g., COMS) and/or projectors (e.g., LEDs) are required for the touch screen, those are added to the display construct, e.g., by placing them inside a frame surrounding at least a portion of the display construct.

In some embodiments, the display construct can act as a touch screen. A frame may comprise one or more sensors disposed on or in the frame. The frame may include a circuitry, one or more connectors (e.g., to power supply and/or network system), and any optical component (e.g., reflector, mirror, prism, beam splitter, and/or lens). The sensors may be configured to detect a presence and position of a user's finger, stylus, marker, smart pen, and/or other marking and/or indicating device within an area bounded by the frame shape (e.g. an area spanned by a surface of a transparent display assembly). Sensors may be disposed along and/or within lengths of one or more frame portions (e.g., within a channel defined by one or more frame portion). One or more frame portions may comprise sensors, circuits, and/or connections. The one or more frame portions may include at least 1, 2, 3, or 4 frame portions (e.g., 1012, 1019, and 1020). The frame portion may be a bezel. The frame portion may comprise a groove. The frame portion may be configured to hold the display construct. The width of the frame portion groove may be configured to accommodate the width of the display construct. In some embodiments, all edges (e.g., sides) of the display construct may comprise touch screen frames. Circuits may process signals from sensors and output signals representative of a location of a marking or indicating device within an area bounded by a frame. A frame may comprise connections to other circuits, including circuits disposed on, or coupled to, the transparent display assembly (e.g. circuits on L-bracket). Circuits may comprise but are not limited to, one or more of: processor, memory, display, analog and/or digital circuits.

A frame may provide a transparent display assembly with interactive display functionality (e.g., white board functionality). A fixed or moving location of a user's finger or indicating device against a transparent display may be sensed by sensors of a frame within an area bounded by the frame, and signals representative of the location may be generated by circuits of the frame. Signals representative of a location within an area bounded by a frame may comprise signals compatible with display technology of a display. In some embodiments, signals representative of a location within an area bounded by a frame comprise, but are not limited to, universal serial bus (USB) and/or high definition multimedia interface (HDMI) signals. Signals representative of a fixed or moving location of a user's finger or indicating device within an area of a frame may be processed by software and/or circuits associated with the frame and/or transparent frame assembly. The processed signals may be displayed on a transparent display assembly, e.g., in the form of a representation of the fixed or moving location (e.g., as writing, printing, a shape). Software associated with the frame and/or transparent display may be configured to provide other functionality, including, but not limited to, (i) display of a sensed location of a user's finger, or other indicating device, on another display or device, (ii) interaction with the transparent display and frame by more than one user, (iii) export of displayed content, (iv) import of display content, (v) erase of displayed content, and/or (vi) selection of display colors. In one embodiment, a frame may comprise one or more commercially available touch screens (e.g. from FlatFrog USA Inc. 333 West San Carlos Street, San Jose CA 95110).

FIG. 10 shows an example of a display construct 1010, components of a fastener that includes leaf 1021, primary hinges 1018 and 1015 that allow swiveling of the display construct about their axis, secondary hinge (including portion 1017) that facilitates exposure of a portion of circuitry 1016 (e.g., of a booster board and/or driver board). Leaf 1021 has an opening that facilitates accessing the circuitry 1016 through the opening covered by hinge leaf 1017. Display construct 1010 is framed by touch screen sensor array 1013 and protective covers 1012 and 1019 that cover the sensor array in a protective framing. Display construct 1050 shows a touch screen sensor array covered and assembled 1052 with the display construct 1050, and well as an assembled fastener 1056. In some examples, the secondary hinge (e.g., 1017) is absent (e.g., as in example 3504). In some embodiments, the fastener (including the primary hinge) has an opening through which at least a portion of the circuitry (e.g., PCB) is viewable and/or accessible. For example, at least some of the connectors in the circuitry can be viewable and/or accessible through the opening. For example, at least some of the connectors between the circuitry and the display construct can be viewable and/or accessible through the opening (e.g., see FIG. 35 opening 3504 allowing viewing of connectors 3509 attached to circuitry 3530 (e.g., comprising the booster and/or driver board)).

In one embodiment, a fastener comprises one or more portion that is configured to provide physical connectivity of the transparent display to a window (e.g., a hinge). In one embodiment, one or more portion of a fastener is configured to provide movement between the transparent display and a lite of a window (e.g., using a hinge of the fastener).

With reference to FIG. 4, in one embodiment, L-bracket comprises one or hinges, e.g., hinge 400. In one embodiment, the hinge comprises a plurality of elongated holes or slots. In one embodiment, an axis of elongation of at least one of the plurality of holes is orthogonal to an axis of elongation of at least one other of the plurality of holes. This allows for a method of installation of the transparent display assembly to the window frame. For example, one or more hinges (e.g., 400) are mounted to the window frame via holes that provide a distance at which the transparent display assembly will be from the window (e.g., 711). Prior to its mounting, L-bracket (e.g., 701), pre-mounted to the transparent display assembly, can be affixed to the other leg of the one or more hinges (e.g., 400), which provides, via the other plurality of holes, orthogonal to those on the other leg of the hinge, centering the L-bracket/transparent display element within the viewable area of the window, between the framing elements.

With reference to FIG. 7, in one embodiment, one or more hinges having a joint 750 that connects a first hinge leaf 752 and a second hinge leaf 753 shown in a closed position 791. The open position is shown in 720, in which the dotted arrow 790 indicated the relative movement of the first hinge leaf can be termed herein as "first leg," and the second hinge leaf may be termed herein as a "second leg." The first leg can be coupled to or comprises the bracket. The fastener comprising the hinge leaves 752 and 753 is coupled to a display construct 754 (partial view shown), and to a window 751 (partial view shown). The second leg can be coupled to a window frame 755. In one embodiment, one or hinges are configured to enable movement of a transparent display assembly away or toward the viewing window. In one embodiment the movement is rotational about a longitudinal axis, i.e. a pivot. In one embodiment, during a movement of a transparent display relative to a viewing window, no movement of the transparent display assembly occurs relative to circuitry 757 (e.g., booster and/or driver board), conductors 758 such as a ribbon cable and/or other wiring elements used to couple the transparent display to the circuitry. FIG. 7 shows an example of a display construct 784 (partial view shown) coupled to a first hinge leaf 782. The hinge leaf 782 is joined by joint 780 to the second hinge leaf 783 that is coupled to cover 785 that is coupled to a window frame for window 781 (partial view shown).

This configuration provides for longer life to the electrical connections between the display and the controller (e.g., T-CON), because the connections are not subject to the movement and friction associated with movement of the transparent display and fastener (e.g., bracket) assembly.

Figure 8:
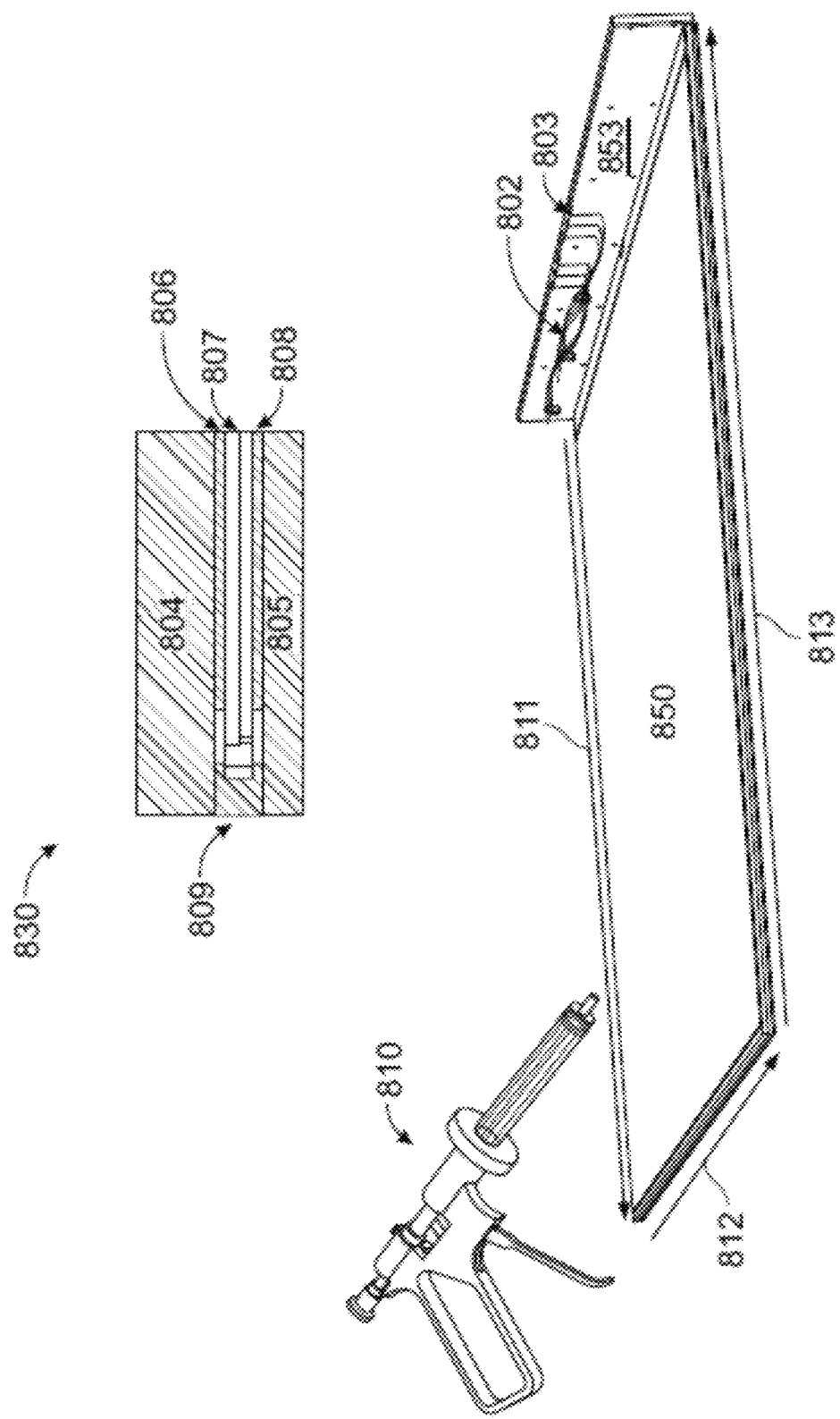
FIG. 8 schematically shows various views of a display construct assembly and applicator.

Referring to FIG. 8, in one embodiment, a seal is provided along at least 3 edges of a transparent display assembly, e.g., along the edge of a laminate assembly as described herein. In embodiments, the seal is in the form of a silicone or other transparent plastic, resin, or other polymer cap (or bumper) that fits over the laminate transparent assembly edges, sealing the unit. The seal may provide a bumper function between the second cover glass (e.g., FIG. 7, 710) and the window (e.g., FIG. 7, 711). FIG. 8 shows an example of a perspective view of display construct 850 and a seal that is applied according to arrows 811, 812, and 813 along three sides of display construct 850, e.g., by use of an applicator (e.g., syringe gun) 810. Display construct 850 is coupled to fastener 530 onto which wires 802 connect a display matrix in the display construct, with a circuitry disposed in the fastener (now shown). The display construct 850 is shown in the example of FIG. 8 also as a vertical cross section 830 of a portion of a display construct that includes a thicker glass pane 804, a thinner glass pane 805, adhesive layers 806 and 808, a display matrix 807, and a seal 809. The seal may protrude from the glass panes and/or serve as a bumper. The protrusion of the seal may be random, or directional. For example, the protrusion may be directed towards one side of the display construct (e.g., that is destined to touch the window). The protrusion of the seal may be (e.g., substantially) uniform or non-uniform (e.g., towards one side of the display construct).

FIG. 9 shows an example of a cover 903 (shown in cross section) that may be used to conceal L-bracket 904 from view. Cover 903 may be removably attached to window frame 905. Power and communications may be delivered to the transparent display assembly via wires 906, in this example housed within window frame 905. L-bracket may allow servicing of the transparent display or replacement, and/or servicing or replacement of any circuitry (e.g., disposed in a fastener of which the bracket is a part of). FIG. 9 shows an example of a transparent display assembly having a display construct including (e.g., glass) pane 907, display matrix 908, and (e.g., glass) pane 902, which display construct is coupled to, or be comprised of, a frame 905. A frame may comprise portions coupled, or configured to be coupled, to each other. A frame may comprise at least three (3) portions. A frame may comprise a shape that (e.g., approximates) matches a shape of at least a portion of a periphery of a display construct (e.g., transparent display assembly). A frame may be coupled or attached to sides (or to edges) of a display construct (e.g., transparent display assembly). In one embodiment, frame portions are coupled to each other to form a frame shape, e.g., after the frame portions have been coupled to a display construct (e.g., transparent display assembly). In one embodiment, frame portions may be coupled to each other to form a frame shape, e.g., before the frame portions are coupled to a display construct (e.g., transparent display assembly). A display construct (e.g., transparent display assembly) may be positioned within an area bounded by the frame shape. Frame portions may comprise channels (e.g., U-shaped channels) configured to receive and/or retain sides of a transparent display assembly therein.

FIG. 9 shows an example of a window frame (e.g., a mullion) portion 951 to which a fastener is attached 953 (which fastener includes a hinge/lock 952). Fastener 953 is coupled to a display construct 954 (partial view shown) and to an integrated glass unit 961 (IGU) (partial view shown) that includes: a first pane 955, an enclosed environment 957, a second pane 956, and an electrochromic construct 958 disposed on pane 956. The enclosed environment in the IGU can be an insulated, (e.g., hermetically) sealed, and/or inert environment. FIG. 9 shows an example of a power source unit and/or controller (e.g., timing controller) that are collectively designated as numeral 959, disposed in the frame portion 951, and electrical wiring and/or communication pathways 960 that travel from an environment external to the window frame 951 to the display construct 954. The electrical wiring and/or communication pathways can travel through the window frame to the IGU. The electrical wiring and/or communication pathways can travel to the IGU through the controller and/or power source assembly. The pane can be of a transparent hard material (e.g., glass or polymeric such as plastic). Transparent can be at least in the wavelengths sensitive to an average human viewer.

The present invention should not be limited by the embodiments, aspects and advantages disclosed above as other embodiments, aspects and advantages are within its scope, including one or more of those that follow. In one embodiment, the present invention comprises a structure (e.g., a fastener), wherein the structure (e.g., fastener) is comprised of a first portion and a second portion, the first and second portion configured to move relative to each other. In one embodiment, the structure comprises one or more bracket. In one embodiment, the structure comprises one or more hinge. In one embodiment, the structure comprises one or more electrical connector. In one embodiment, the electrical connector comprises a micro-coax cable. In one embodiment, the electrical connector comprises one or more ribbon cable. In one embodiment the structure is configured to be mounted to a display construct (e.g., comprising transparent display). In one embodiment, the transparent display is a T. OLED display. In one embodiment, the display construct (e.g., including the transparent display) comprises one or more optically clear glass, hardened polymer (e.g., plastic), or a hardened resin. In one embodiment, the structure comprises one or more electronic circuit configured to communicate with the display matrix (e.g., transparent display matrix). In one embodiment, the structure is configured to mount to a frame. In one embodiment, the frame comprises a window frame. In one embodiment, the structure is configured to be mounted to a FLS (e.g., a length) of the transparent display. In one embodiment, the structure comprises a length, wherein the length is from about 0.1 feet to about 10 feet. In one embodiment, a first portion of the fastener comprises at least one bracket and the second portion of the fastener comprises one or more hinges. In one embodiment, the structure comprises a display matrix, and an adhesive element, wherein the display matrix is mounted to the first portion and/or to second portion, e.g., via the adhesive element. In one embodiment, the adhesive elements comprise an adhesive tape. In one embodiment, the adhesive tape comprises VHB tape. In one embodiment, the first portion of the fastener and/or second portion of the fastener is configured to be mounted to a viewing window (e.g., tintable window). In one embodiment, the first portion of the fastener is configured to be mounted to a display construct and the second portion is configured to be mounted to a window (wherein the second portion comprise a hinge). In one embodiment, the hinge comprises a plurality of elongated holes, wherein an axis of elongation of at least one of the plurality of holes is orthogonal to an axis of elongation of at least one other of the plurality of holes.

In one embodiment, the present invention comprises a frame. The frame can be comprised of a transparent display and a fastener (comprising a bracket) configured to provide movement and physical connectivity between the frame and the display construct (e.g., comprising the transparent display). In one embodiment, the frame comprises a window frame. In one embodiment the bracket comprises an L-bracket, wherein the L-bracket is coupled to the frame and to the display construct (e.g., comprising the transparent display). In one embodiment, the bracket is coupled to the transparent display via an adhesive structure. In one embodiment, the adhesive structure comprises adhesive tape. In one embodiment, the bracket comprises one or more hinge. In one embodiment, the hinge is configured to provide the movement of the display construct (e.g., comprising the transparent display) relative to a fixture (e.g., window frame). In one embodiment, the movement comprises rotational movement. In one embodiment, the movement is about a horizontal axis. In one embodiment, the movement is about a vertical axis. In one embodiment, the frame comprises a lite (e.g., a windowpane). In one embodiment, the bracket is configured to move a face of the transparent display close to or against a face of the lite. In one embodiment, the frame defines an interior area (e.g., that is a surface of the window in the frame), wherein the transparent display comprises a height and a width that defines an area that fits within the interior area. In one embodiment, the area of the display construct (e.g., comprising the transparent display) fits (e.g., substantially) within all the interior area. In one embodiment, the area of the transparent display fits within one half or less than one half of the interior area. In one embodiment, the structure comprises one or more conductor, ribbon cable and/or connector, and the one or more conductor, ribbon cable and/or connector provides electrical connectivity between a control and the transparent display.

Figure 11:
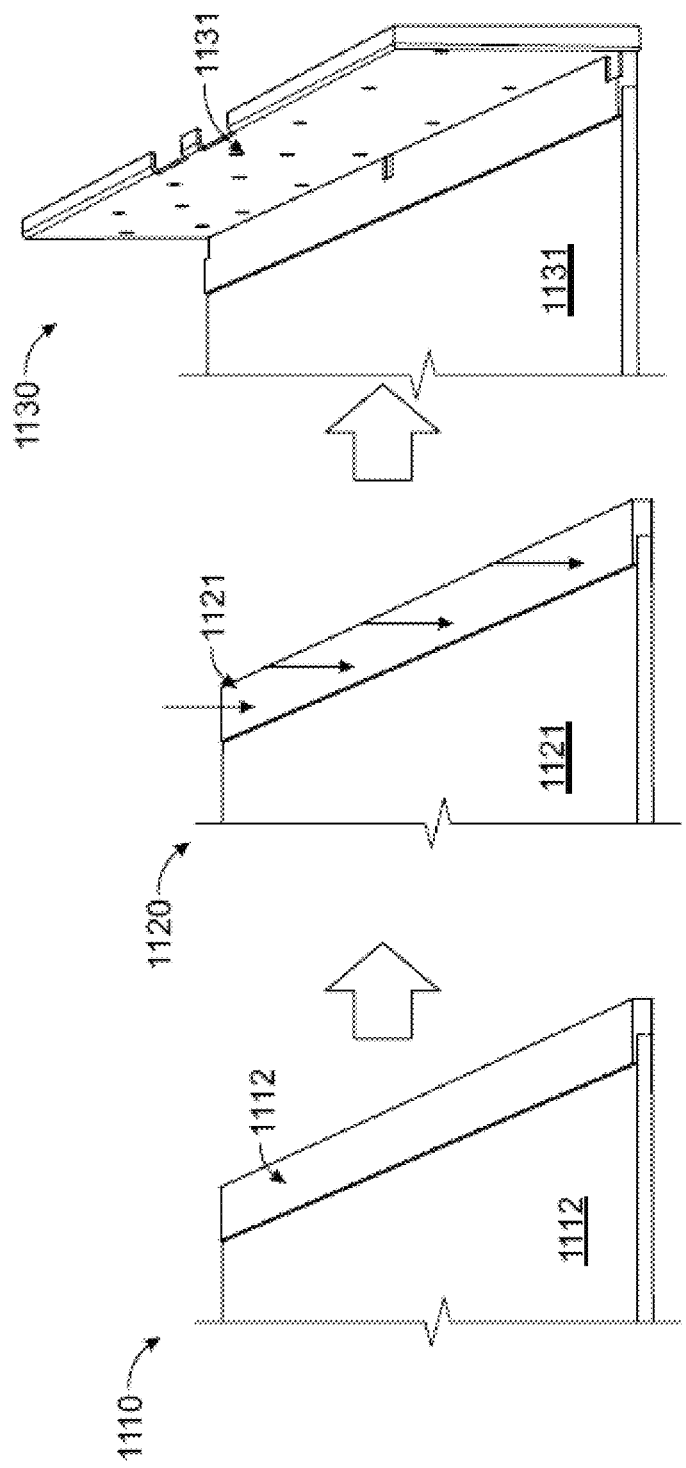
FIG. 11 schematically various operations in display construct assembly formation.
Figure 12:
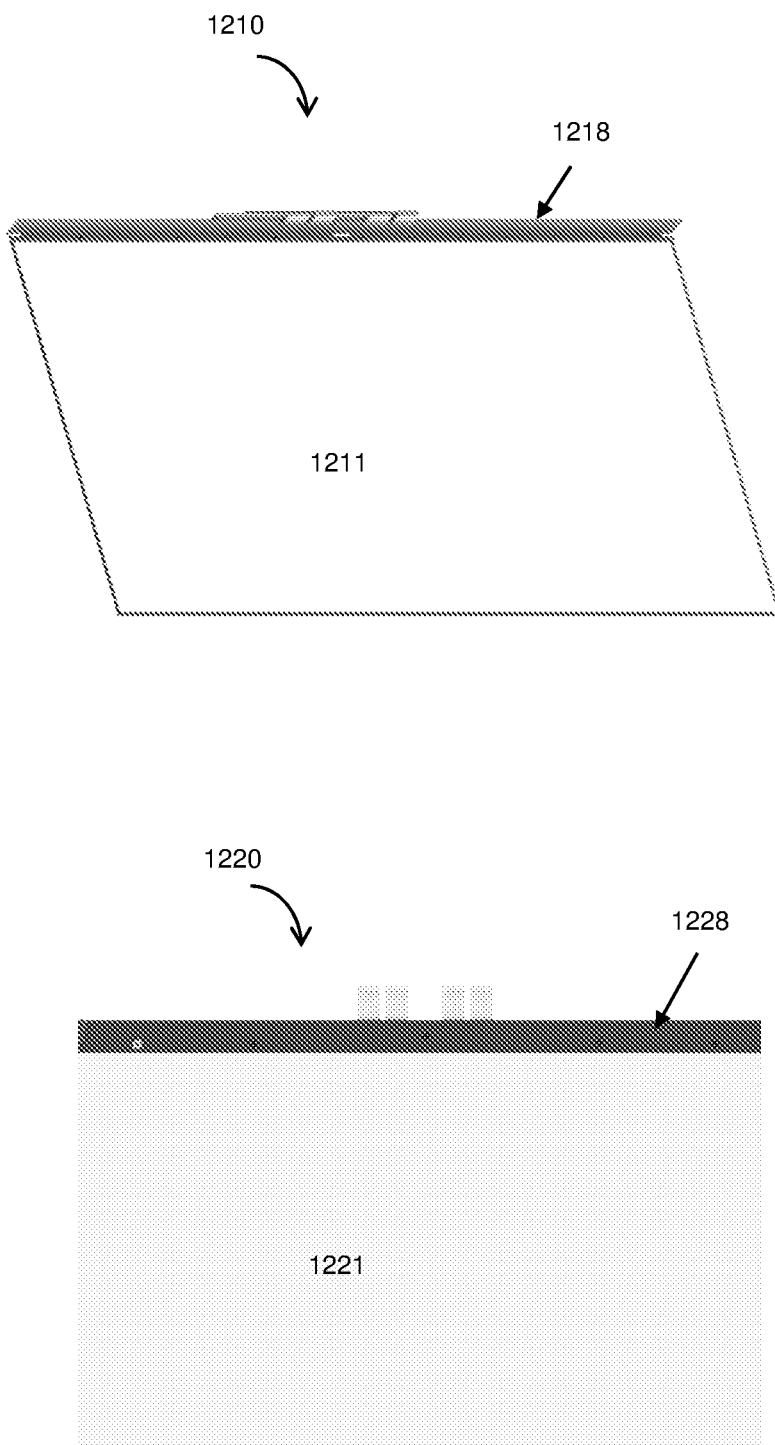
FIG. 12 schematically shows various fasteners and display construct assemblies.

In some embodiments, an assembly having a display construct and a fastener is formed. The display construct can be adhered to at least a component of the fastener, e.g., a bracket. FIG. 11 shows an example of stage in construction an assembly of a display construct and a fastener. In 1110, a display construct 1112 has an area 1112 designated for adhesive application. In 1120, an adhesive is applied on the adhesive designated area according to arrows the arrows, e.g., 1121. In 1130, a fastener 1131 (e.g., L bracket) is placed on the adhesive designated area having an applied adhesive placed thereon. Items 1121, 1131, and 1112 show portions of display constructs. The fastener and the display construct can be disposed in the same plane or in different planes. At least a portion of the fastener can be disposed in the same plane or in different planes relative to the display construct. The display construct can be coupled at an angle to the fastener (e.g., as shown in FIG. 12, 1210). The display construct and the fastener can form one plane (e.g., as shown in 1220). FIG. 12 shows an example of display construct 1211 forming an angle with fastener 1218, and display construct 1221 forming a planar plane with fastener 1228. The display construct may comprise irradiating entities (e.g., LEDs) that irradiate more in one direction than in another (e.g., more in a forward direction than in a back direction). An image displayed by a display matrix may be visible clearly from one side of the display matrix than from its opposing side. The display construct may comprise two display matrices of irradiating entities (e.g. LED matrices) disposed back to back. The at least one (e.g., each) of the two display matrices may be disposed with its more irradiating side facing away from the back (and towards a viewer), and its less irradiating side facing the back (and away from the viewer). The back to back arrangement of the display matrices in the display construct may facilitate clear image viewing from both sides of the display construct. A display construct having back to back display matrices may utilize a flat fasteners (e.g., 1228). In some embodiments, two display constructs may be disposed adjacent to each other in a back to back configuration, e.g., such that at least one (e.g., each) of the display constructs may have its more illuminating side facing away from the back (and towards a viewer), and its less irradiating side facing the back (and away from the viewer). The two back to back display constructs may utilize a flat fastener (e.g., 1228) to fasten both display constructs to a structure (e.g., fixture).

In some embodiments, the window is disposed in an enclosure. In some embodiments, an enclosure comprises an area defined by at least one structure. The at least one structure may comprise at least one wall. An enclosure may comprise and/or enclose one or more sub-enclosure. The at least one wall may comprise metal (e.g., steel), clay, stone, plastic, glass, plaster (e.g., gypsum), polymer (e.g., polyurethane, styrene, or vinyl), asbestos, fiber-glass, concrete (e.g., reinforced concrete), wood, paper, or a ceramic. The at least one wall may comprise wire, bricks, blocks (e.g., cinder blocks), tile, drywall, or frame (e.g., steel frame).

In some embodiments, the enclosure comprises one or more openings. The one or more openings may be reversibly closable. The one or more openings may be permanently open. A fundamental length scale of the one or more openings may be smaller relative to the fundamental length scale of the wall(s) that define the enclosure. A fundamental length scale may comprise a diameter of a bounding circle, a length, a width, or a height. A surface of the one or more openings may be smaller relative to the surface the wall(s) that define the enclosure. The opening surface may be a percentage of the total surface of the wall(s). For example, the opening surface can measure about 30%, 20%, 10%, 5%, or 1% of the walls(s). The wall(s) may comprise a floor, a ceiling or a side wall. The closable opening may be closed by at least one window or door. The enclosure may be at least a portion of a facility. The enclosure may comprise at least a portion of a building. The building may be a private building and/or a commercial building. The building may comprise one or more floors. The building (e.g., floor thereof) may include at least one of: a room, hall, foyer, attic, basement, balcony (e.g., inner or outer balcony), stairwell, corridor, elevator shaft, facade, mezzanine, penthouse, garage, porch (e.g., enclosed porch), terrace (e.g., enclosed terrace), cafeteria, and/or Duct. In some embodiments, an enclosure may be stationary and/or movable (e.g., a train, a plane, a ship, a vehicle, or a rocket).

Certain disclosed embodiments provide a network infrastructure in the enclosure (e.g., a facility such as a building). The network infrastructure is available for various purposes such as for providing communication and/or power services. The communication services may comprise high bandwidth (e.g., wireless and/or wired) communications services. The communication services can be to occupants of a facility and/or users outside the facility (e.g., building). The network infrastructure may work in concert with, or as a partial replacement of, the infrastructure of one or more cellular carriers. The network infrastructure can be provided in a facility that includes electrically switchable windows. Examples of components of the network infrastructure include a high speed backhaul. The network infrastructure may include at least one cable, switch, physical antenna, transceivers, sensor, transmitter, receiver, radio, processor and/or controller (that may comprise a processor). The network infrastructure may be operatively coupled to, and/or include, a wireless network. The network infrastructure may comprise wiring. One or more sensors can be deployed (e.g., installed) in an environment as part of installing the network and/or after installing the network. The network infrastructure may be configured to facilitate at least third generation (3G), fourth generation (4G), or fifth generation (5G) cellular communication. The network may be configured to facilitate media transmission (e.g., presentation, still, or video (e.g., movie) transmission). The network may be configured for simultaneous data and power communication (e.g., on the same cable such as a coaxial cable).

In some embodiments, an enclosure includes one or more sensors. The sensor may facilitate controlling the environment of the enclosure such that inhabitants of the enclosure may have an environment that is more comfortable, delightful, beautiful, healthy, productive (e.g., in terms of inhabitant performance), easer to live (e.g., work) in, or any combination thereof. The sensor(s) may be configured as low or high resolution sensors. Sensor may provide on/off indications of the occurrence and/or presence of a particular environmental event (e.g., one pixel sensors).

In various embodiments, a network infrastructure supports a control system for one or more viewing windows such as electrochromic (e.g., tintable) windows. The control system may comprise one or more controllers operatively coupled (e.g., directly or indirectly) to one or more windows. In some embodiments, electrochromic window is an example of optically switchable windows, tintable windows, and/or smart windows. The concepts disclosed herein may apply to other types of switchable optical devices including, for example, a liquid crystal device, or a suspended particle device. For example, a liquid crystal device and/or a suspended particle device may be implemented instead of, or in addition to, an electrochromic device.

In some embodiments, a tintable window exhibits a (e.g., controllable and/or reversible) change in at least one optical property of the window, e.g., when a stimulus is applied. The stimulus can include an optical, electrical and/or magnetic stimulus. For example, the stimulus can include an applied voltage. One or more tintable windows can be used to control lighting and/or glare conditions, e.g., by regulating the transmission of solar energy propagating through them. One or more tintable windows can be used to control a temperature within a building, e.g., by regulating the transmission of solar energy propagating through them. Control of the solar energy may control heat load imposed on the interior of the facility (e.g., building). The control may be manual and/or automatic. The control may be used for maintaining one or more requested (e.g., environmental) conditions, e.g., occupant comfort. The control may include reducing energy consumption of a heating, ventilation, air conditioning and/or lighting systems. At least two of heating, ventilation, and air conditioning may be induced by separate systems. At least two of heating, ventilation, and air conditioning may be induced by one system. The heating, ventilation, and air conditioning may be induced by a single system (abbreviated herein as "HVAC). In some cases, tintable windows may be responsive to (e.g., and communicatively coupled to) one or more environmental sensors and/or user control. Tintable windows may comprise (e.g., may be) electrochromic windows. The windows may be located in the range from the interior to the exterior of a structure (e.g., facility, e.g., building). However, this need not be the case. Tintable windows may operate using liquid crystal devices, suspended particle devices, microelectromechanical systems (MEMS) devices (such as micro shutters), or any technology configured to control light transmission through a window. Windows (e.g., with MEMS devices for tinting) are described in U.S. patent application Ser. No. 14/443,353 filed May 15, 2015, titled "MULTI-PANE WINDOWS INCLUDING ELECTROCHROMIC DEVICES AND ELECTROMECHANICAL SYSTEMS DEVICES," that is incorporated herein by reference in its entirety. In some cases, one or more viewing (e.g., tintable) windows can be located within the interior of a building, e.g., between a conference room and a hallway. In some cases, one or more viewing (e.g., tintable) windows can be used in automobiles, trains, aircraft, and other vehicles, e.g., in lieu of a passive and/or non-tinting window.

In some embodiments, the tintable window comprises an electrochromic device (referred to herein as an "EC device" (abbreviated herein as ECD), or "EC"). An EC device may comprise at least one coating that includes at least one layer. The at least one layer can comprise an electrochromic material. In some embodiments, the electrochromic material exhibits a change from one optical state to another, e.g., when an electric potential is applied across the EC device. The transition of the electrochromic layer from one optical state to another optical state can be caused, e.g., by reversible, semi-reversible, or irreversible ion insertion into the electrochromic material (e.g., by way of intercalation) and a corresponding injection of charge-balancing electrons. For example, the transition of the electrochromic layer from one optical state to another optical state can be caused, e.g., by a reversible ion insertion into the electrochromic material (e.g., by way of intercalation) and a corresponding injection of charge-balancing electrons. Reversible may be for the expected lifetime of the ECD. Semi-reversible refers to a measurable (e.g. noticeable) degradation in the reversibility of the tint of the window over one or more tinting cycles. In some instances, a fraction of the ions responsible for the optical transition is irreversibly bound up in the electrochromic material (e.g., and thus the induced (altered) tint state of the window is not reversible to its original tinting state). In various EC devices, at least some (e.g., all) of the irreversibly bound ions can be used to compensate for "blind charge" in the material (e.g., ECD).

In some implementations, suitable ions include cations. The cations may include lithium ions (Li+) and/or hydrogen ions (H+) (i.e., protons). In some implementations, other ions can be suitable. Intercalation of the cations may be into an (e.g., metal) oxide. A change in the intercalation state of the ions (e.g. cations) into the oxide may induce a visible change in a tint (e.g., color) of the oxide. For example, the oxide may transition from a colorless to a colored state. For example, intercalation of lithium ions into tungsten oxide (WO3-y (0<y≤~0.3)) may cause the tungsten oxide to change from a transparent state to a colored (e.g., blue) state. EC device coatings as described herein are located within the viewable portion of the tintable window such that the tinting of the EC device coating can be used to control the optical state of the tintable window.

Figure 13:
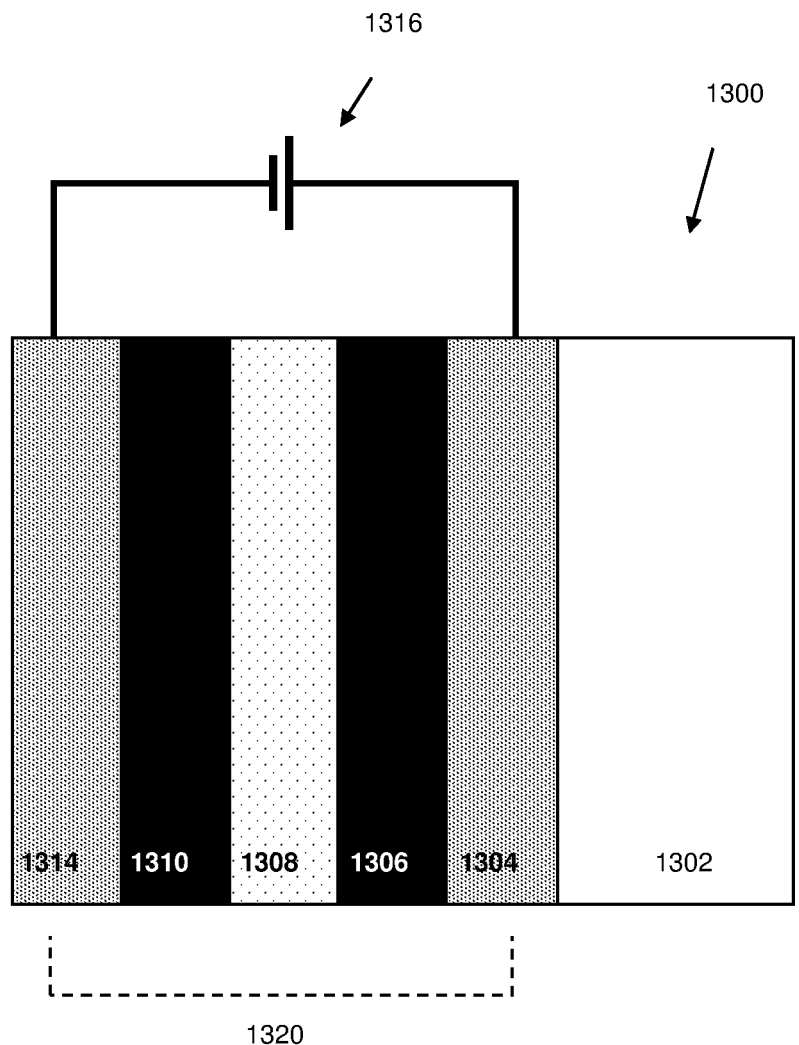
FIG. 13 schematically shows various layers in an electrochromic construct.

FIG. 13 shows an example of a schematic cross-section of an electrochromic construct 1300 in accordance with some embodiments. The EC device coating is attached to a substrate 1302, a transparent conductive layer (TCL) 1304, an electrochromic layer (EC) 1306 (sometimes also referred to as a cathodically coloring layer or a cathodically tinting layer), an ion conducting layer or region (IC) 1308, a counter electrode layer (CE) 1310 (sometimes also referred to as an anodically coloring layer or anodically tinting layer), and a second TCL 1314. Elements 1304, 1306, 1308, 1310, and 1314 are collectively referred to as an electrochromic stack 120. A voltage source 1316 operable to apply an electric potential across the electrochromic stack 1320 effects the transition of the electrochromic coating from, e.g., a clear state to a tinted state. In other embodiments, the order of layers is reversed with respect to the substrate. That is, the layers are in the following order: substrate, TCL, counter electrode layer, ion conducting layer, electrochromic material layer, TCL.

In various embodiments, the ion conductor region (e.g., 1308) may form from a portion of the EC layer (e.g., 1306) and/or from a portion of the CE layer (e.g., 1310). In such embodiments, the electrochromic stack (e.g., 1320) may be deposited to include cathodically coloring electrochromic material (the EC layer) in direct physical contact with an anodically coloring counter electrode material (the CE layer). The ion conductor region (sometimes referred to as an interfacial region, or as an ion conducting substantially electronically insulating layer or region) may form where the EC layer and the CE layer meet, for example through heating and/or other processing steps. Examples of electrochromic devices (e.g., including those fabricated without depositing a distinct ion conductor material) can be found in U.S. patent application Ser. No. 13/462,725, filed May 2, 2012, titled "ELECTROCHROMIC DEVICES," that is incorporated herein by reference in its entirety. In some embodiments, an EC device coating may include one or more additional layers such as one or more passive layers. Passive layers can be used to improve certain optical properties, to provide moisture, and/or to provide scratch resistance. These and/or other passive layers can serve to hermetically seal the EC stack 120. Various layers, including transparent conducting layers (such as 1304 and 1314), can be treated with anti-reflective and/or protective layers (e.g., oxide and/or nitride layers).

In certain embodiments, the electrochromic device is configured to (e.g., substantially) reversibly cycle between a clear state and a tinted state. Reversible may be within an expected lifetime of the ECD. The expected lifetime can be at least about 2 y, 5 y, 10 y, 15 y, 25 y, 50 y, 75 y, or 100 (y) years. The expected lifetime can be any value between the aforementioned values (e.g., from about 5 y to about 100 y, from about 2 y to about 25 y, from about 25 y to about 50 y, or from about 50 y to about 100 y). A potential can be applied to the electrochromic stack (e.g., 1320) such that available ions in the stack that can cause the electrochromic material (e.g., 1306) to be in the tinted state reside primarily in the counter electrode (e.g., 1310) when the window is in a first tint state (e.g., clear). When the potential applied to the electrochromic stack is reversed, the ions can be transported across the ion conducting layer (e.g., 1308) to the electrochromic material and cause the material to enter the second tint state (e.g., tinted state).

It should be understood that the reference to a transition between a clear state and tinted state is non-limiting and suggests only one example, among many, of an electrochromic transition that may be implemented. Unless otherwise specified herein, whenever reference is made to a clear-tinted transition, the corresponding device or process encompasses other optical state transitions such as non-reflective-reflective, and/or transparent-opaque. In some embodiments, the terms "clear" and "bleached" refer to an optically neutral state, e.g., untinted, transparent and/or translucent. In some embodiments, the "color" or "tint" of an electrochromic transition is not limited to any wavelength or range of wavelengths. The choice of appropriate electrochromic material and counter electrode materials may govern the relevant optical transition (e.g., from tinted to untinted state).

In certain embodiments, at least a portion (e.g., all of) the materials making up electrochromic stack are inorganic, solid (i.e., in the solid state), or both inorganic and solid. Because various organic materials tend to degrade over time, particularly when exposed to heat and UV light as tinted building windows are, inorganic materials offer an advantage of a reliable electrochromic stack that can function for extended periods of time. In some embodiments, materials in the solid state can offer the advantage of being minimally contaminated and minimizing leakage issues, as materials in the liquid state sometimes do. One or more of the layers in the stack may contain some amount of organic material (e.g., that is measurable). The ECD or any portion thereof (e.g., one or more of the layers) may contain little or no measurable organic matter. The ECD or any portion thereof (e.g., one or more of the layers) may contain one or more liquids that may be present in little amounts. Little may be of at most about 100 ppm, 10 ppm, or 1 ppm of the ECD. Solid state material may be deposited (or otherwise formed) using one or more processes employing liquid components, such as certain processes employing sol-gels, physical vapor deposition, and/or chemical vapor deposition.

Figure 14A:
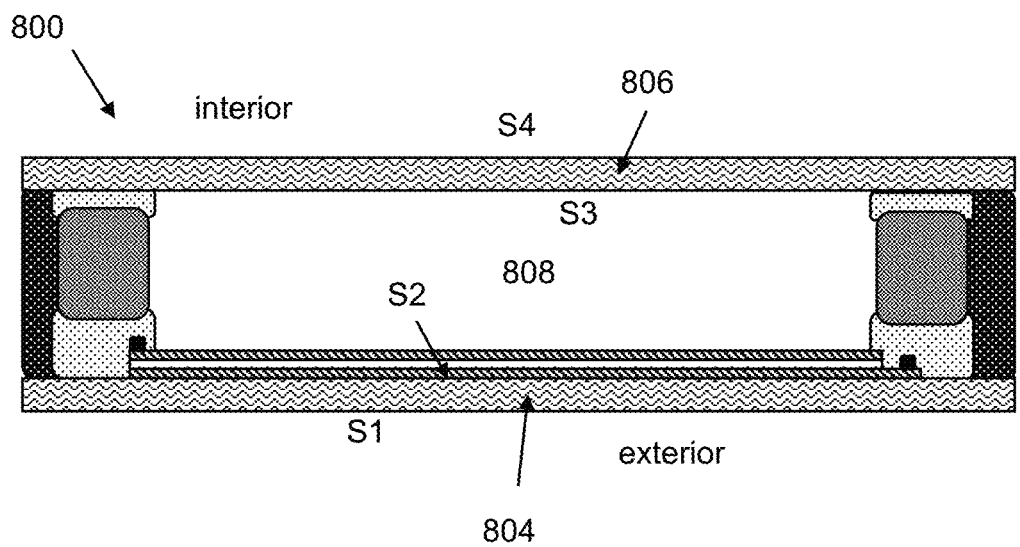
FIGS. 14A-B schematically show various views of integrated glass units.
Figure 14B:
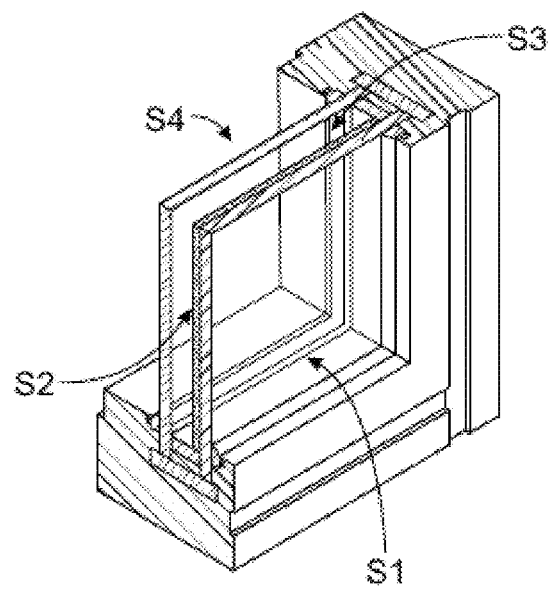

FIG. 14 show an example of a cross-sectional view of a tintable window embodied in an insulated glass unit ("IGU") 1400, in accordance with some implementations. It can be desirable to have IGUs serve as the fundamental constructs for holding electrochromic panes (also referred to herein as "lites" and in the singular "lite") when provided for installation in a building. An IGU lite may be a single substrate or a multi-substrate construct. The lite may comprise a laminate, e.g., of two substrates. IGUs (e.g., having double- or triple-pane configurations) can provide a number of advantages over single pane configurations. For example, multi-pane configurations can provide enhanced thermal insulation, noise insulation, environmental protection and/or durability, when compared with single-pane configurations. A multi-pane configuration can provide increased protection for an ECD. For example, the electrochromic films (e.g., as well as associated layers and conductive interconnects) can be formed on an interior surface of the multi-pane IGU and be protected by an inert gas fill in the interior volume (e.g., 1408) of the IGU. The inert gas fill may provide at least some (heat) insulating function for an IGU. Electrochromic IGUs may have heat blocking capability, e.g., by virtue of a tintable coating that absorbs (and/or reflects) heat and light.

In some embodiments, an "IGU" includes two (or more) substantially transparent substrates. For example, the IGU may include two panes of glass. At least one substrate of the IGU can include an electrochromic device disposed thereon. The one or more panes of the IGU may have a separator disposed between them. An IGU can be a hermetically sealed construct, e.g., having an interior region that is isolated from the ambient environment. A "window assembly" may include an IGU. A "window assembly" may include a (e.g., standalone) laminate. A "window assembly" may include one or more electrical leads, e.g., for connecting the IGUs and/or laminates. The electrical leads may operatively couple (e.g. connect) one or more electrochromic devices to a voltage source, switches and the like, and may include a frame that supports the IGU or laminate. A window assembly may include a window controller, and/or components of a window controller (e.g., a dock).

FIG. 14 shows an example implementation of an IGU 1400 that includes a first pane 1404 having a first surface S1 and a second surface S2. In some implementations, the first surface S1 of the first pane 1404 faces an exterior environment, such as an outdoors or outside environment. The IGU 200 also includes a second pane 1406 having a first surface S3 and a second surface S4. In some implementations, the second surface (e.g., S4) of the second pane (e.g., 1406) faces an interior environment, such as an inside environment of a home, building, vehicle, or compartment thereof (e.g., an enclosure therein such as a room).

In some implementations, the first and the second panes (e.g., 1404 and 1406) are transparent or translucent, e.g., at least to light in the visible spectrum. For example, each of the panes (e.g., 1404 and 1406) can be formed of a glass material. The glass material may include architectural glass, and/or shatter-resistant glass. The glass may comprise a silicon oxide (SOX). The glass may comprise a soda-lime glass or float glass. The glass may comprise at least about 75% silica ($SiO_2$). The glass may comprise oxides such as $Na_2O$, or CaO. The glass may comprise alkali or alkali-earth oxides. The glass may comprise one or more additives. The first and/or the second panes can include any material having suitable optical, electrical, thermal, and/or mechanical properties. Other materials (e.g., substrates) that can be included in the first and/or the second panes are plastic, semi-plastic and/or thermoplastic materials, for example, poly(methyl methacrylate), polystyrene, polycarbonate, allyl diglycol carbonate, SAN (styrene acrylonitrile copolymer), poly(4-methyl-1-pentene), polyester, and/or polyamide. The first and/or second pane may include mirror material (e.g., silver). In some implementations, the first and/or the second panes can be strengthened. The strengthening may include tempering, heating, and/or chemically strengthening.

Figure 15:
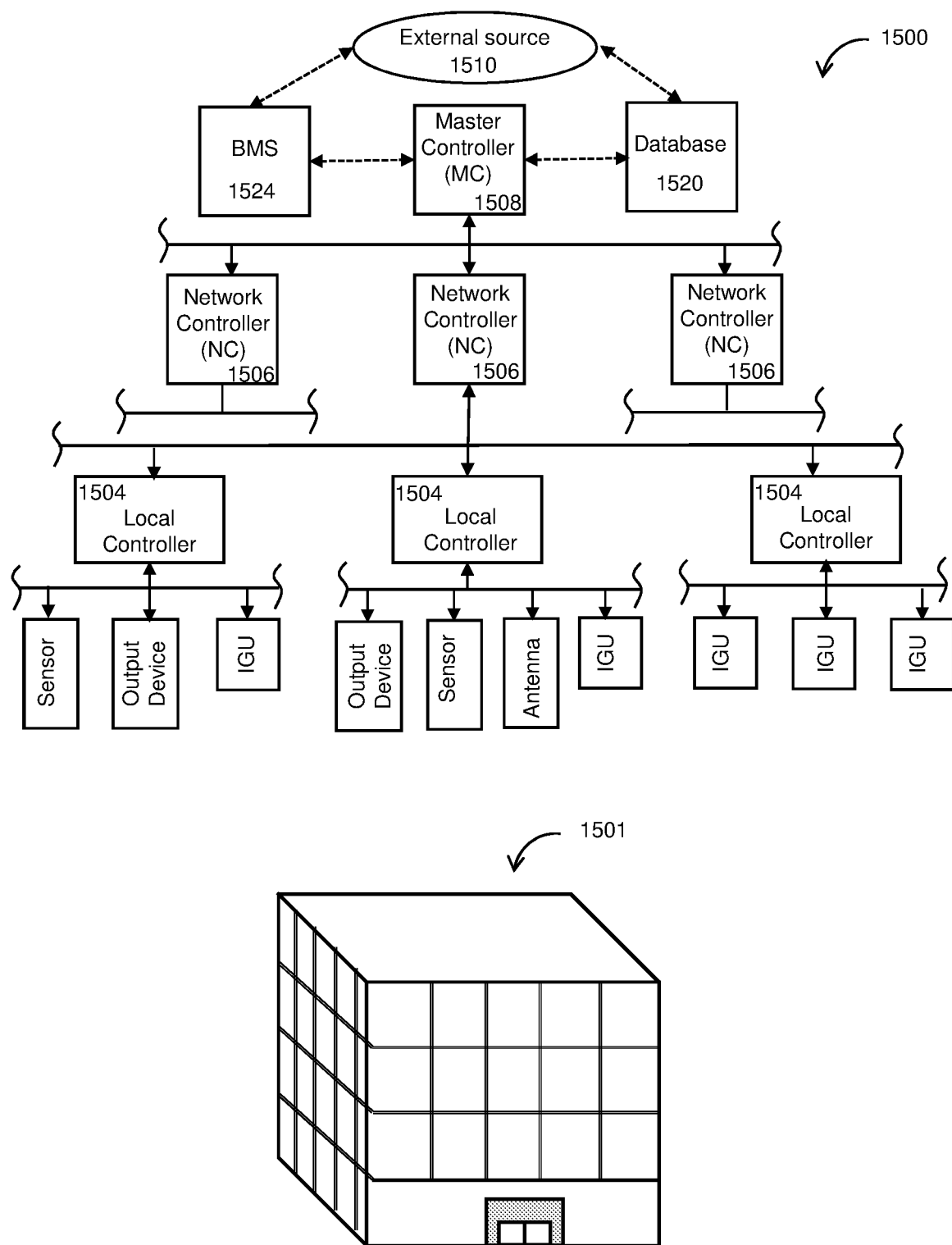
FIG. 15 schematically shows a control hierarchy scheme and a building.

In some embodiments, the sensor(s) are operatively coupled to at least one controller and/or processor. Sensor readings may be obtained by one or more processors and/or controllers. A controller may comprise a processing unit (e.g., CPU or GPU). A controller may receive an input (e.g., from at least one sensor). The controller may comprise circuitry, electrical wiring, optical wiring, socket, and/or outlet. A controller may deliver an output. A controller may comprise multiple (e.g., sub-) controllers. The controller may be a part of a control system. A control system may comprise a master controller, floor (e.g., comprising network controller) controller, a local controller. The local controller may be a window controller (e.g., controlling an optically switchable window), enclosure controller, or component controller. For example, a controller may be a part of a hierarchal control system (e.g., comprising a main controller that directs one or more controllers, e.g., floor controllers, local controllers (e.g., window controllers), enclosure controllers, and/or component controllers). A physical location of the controller type in the hierarchal control system may be changing. For example: At a first time: a first processor may assume a role of a main controller, a second processor may assume a role of a floor controller, and a third processor may assume the role of a local controller. At a second time: the second processor may assume a role of a main controller, the first processor may assume a role of a floor controller, and the third processor may remain with the role of a local controller. At a third time: the third processor may assume a role of a main controller, the second processor may assume a role of a floor controller, and the first processor may assume the role of a local controller. A controller may control one or more devices (e.g., be directly coupled to the devices). A controller may be disposed proximal to the one or more devices it is controlling. For example, a controller may control an optically switchable device (e.g., IGU), an antenna, a sensor, and/or an output device (e.g., a light source, sounds source, smell source, gas source, HVAC outlet, or heater). In one embodiment, a floor controller may direct one or more window controllers, one or more enclosure controllers, one or more component controllers, or any combination thereof. The floor controller may comprise a floor controller. For example, the floor (e.g., comprising network) controller may control a plurality of local (e.g., comprising window) controllers. A plurality of local controllers may be disposed in a portion of a facility (e.g., in a portion of a building). The portion of the facility may be a floor of a facility. For example, a floor controller may be assigned to a floor. In some embodiments, a floor may comprise a plurality of floor controllers, e.g., depending on the floor size and/or the number of local controllers coupled to the floor controller. For example, a floor controller may be assigned to a portion of a floor. For example, a floor controller may be assigned to a portion of the local controllers disposed in the facility. For example, a floor controller may be assigned to a portion of the floors of a facility. A master controller may be coupled to one or more floor controllers. The floor controller may be disposed in the facility. The master controller may be disposed in the facility, or external to the facility. The master controller may be disposed in the cloud. A controller may be a part of, or be operatively coupled to, a building management system. A controller may receive one or more inputs. A controller may generate one or more outputs. The controller may be a single input single output controller (SISO) or a multiple input multiple output controller (MIMO). A controller may interpret an input signal received. A controller may acquire data from the one or more components (e.g., sensors). Acquire may comprise receive or extract. The data may comprise measurement, estimation, determination, generation, or any combination thereof. A controller may comprise feedback control. A controller may comprise feed-forward control. Control may comprise on-off control, proportional control, proportional-integral (PI) control, or proportional-integral-derivative (PID) control. Control may comprise open loop control, or closed loop control. A controller may comprise closed loop control. A controller may comprise open loop control. A controller may comprise a user interface. A user interface may comprise (or operatively coupled to) a keyboard, keypad, mouse, touch screen, microphone, speech recognition package, camera, imaging system, or any combination thereof. Outputs may include a display (e.g., screen), speaker, or printer. FIG. 15 shows an example of a control system architecture 1500 comprising a master controller 1508 that controls floor controllers 1506, that in turn control local controllers 1504. In some embodiments, a local controller controls one or more IGUs, one or more sensors, one or more output devices (e.g., one or more emitters), or any combination thereof. FIG. 15 shows an example of a configuration in which the master controller is operatively coupled (e.g., wirelessly and/or wired) to a building management system (BMS) 1524 and to a database 1520. Arrows in FIG. 15 represents communication pathways. A controller may be operatively coupled (e.g., directly/indirectly and/or wired and/wirelessly) to an external source 1510. The external source may comprise a network. The external source may comprise one or more sensor or output device. The external source may comprise a cloud-based application and/or database. The communication may be wired and/or wireless. The external source may be disposed external to the facility. For example, the external source may comprise one or more sensors and/or antennas disposed, e.g., on a wall or on a ceiling of the facility. The communication may be monodirectional or bidirectional. In the example shown in FIG. 15 the communication all communication arrows are meant to be bidirectional. FIG. 15 shows an example of a perspective view of an enclosure 1501 (e.g., building).

The controller may monitor and/or direct (e.g., physical) alteration of the operating conditions of the apparatuses, software, and/or methods described herein. Control may comprise regulate, manipulate, restrict, direct, monitor, adjust, modulate, vary, alter, restrain, check, guide, or manage. Controlled (e.g., by a controller) may include attenuated, modulated, varied, managed, curbed, disciplined, regulated, restrained, supervised, manipulated, and/or guided. The control may comprise controlling a control variable (e.g. temperature, power, voltage, and/or profile). The control can comprise real time or off-line control. A calculation utilized by the controller can be done in real time, and/or offline. The controller may be a manual or a non-manual controller. The controller may be an automatic controller. The controller may operate upon request. The controller may be a programmable controller. The controller may be programed. The controller may comprise a processing unit (e.g., CPU or GPU). The controller may receive an input (e.g., from at least one sensor). The controller may deliver an output. The controller may comprise multiple (e.g., sub-) controllers. The controller may be a part of a control system. The control system may comprise a master controller, floor controller, local controller (e.g., enclosure controller, or window controller). The controller may receive one or more inputs. The controller may generate one or more outputs. The controller may be a single input single output controller (SISO) or a multiple input multiple output controller (MIMO). The controller may interpret the input signal received. The controller may acquire data from the one or more sensors. Acquire may comprise receive or extract. The data may comprise measurement, estimation, determination, generation, or any combination thereof. The controller may comprise feedback control. The controller may comprise feed-forward control. The control may comprise on-off control, proportional control, proportional-integral (PI) control, or proportional-integral-derivative (PID) control. The control may comprise open loop control, or closed loop control. The controller may comprise closed loop control. The controller may comprise open loop control. The controller may comprise a user interface. The user interface may comprise (or operatively coupled to) a keyboard, keypad, mouse, touch screen, microphone, speech recognition package, camera, imaging system, or any combination thereof. The outputs may include a display (e.g., screen), speaker, or printer.

The methods, systems and/or the apparatus described herein may comprise a control system. The control system can be in communication with any of the apparatuses (e.g., sensors) described herein. The sensors may be of the same type or of different types, e.g., as described herein. For example, the control system may be in communication with the first sensor and/or with the second sensor. The control system may control the one or more sensors. The control system may control one or more components of a building management system (e.g., lightening, security, and/or air conditioning system). The controller may regulate at least one (e.g., environmental) characteristic of the enclosure. The control system may regulate the enclosure environment using any component of the building management system. For example, the control system may regulate the energy supplied by a heating element and/or by a cooling element. For example, the control system may regulate velocity of an air flowing through a vent to and/or from the enclosure. The control system may comprise a processor. The processor may be a processing unit. The controller may comprise a processing unit. The processing unit may be central. The processing unit may comprise a central processing unit (abbreviated herein as "CPU"). The processing unit may be a graphic processing unit (abbreviated herein as "GPU"). The controller(s) or control mechanisms (e.g., comprising a computer system) may be programmed to implement one or more methods of the disclosure. The processor may be programmed to implement methods of the disclosure. The controller may control at least one component of the forming systems and/or apparatuses disclosed herein.

Figure 16:
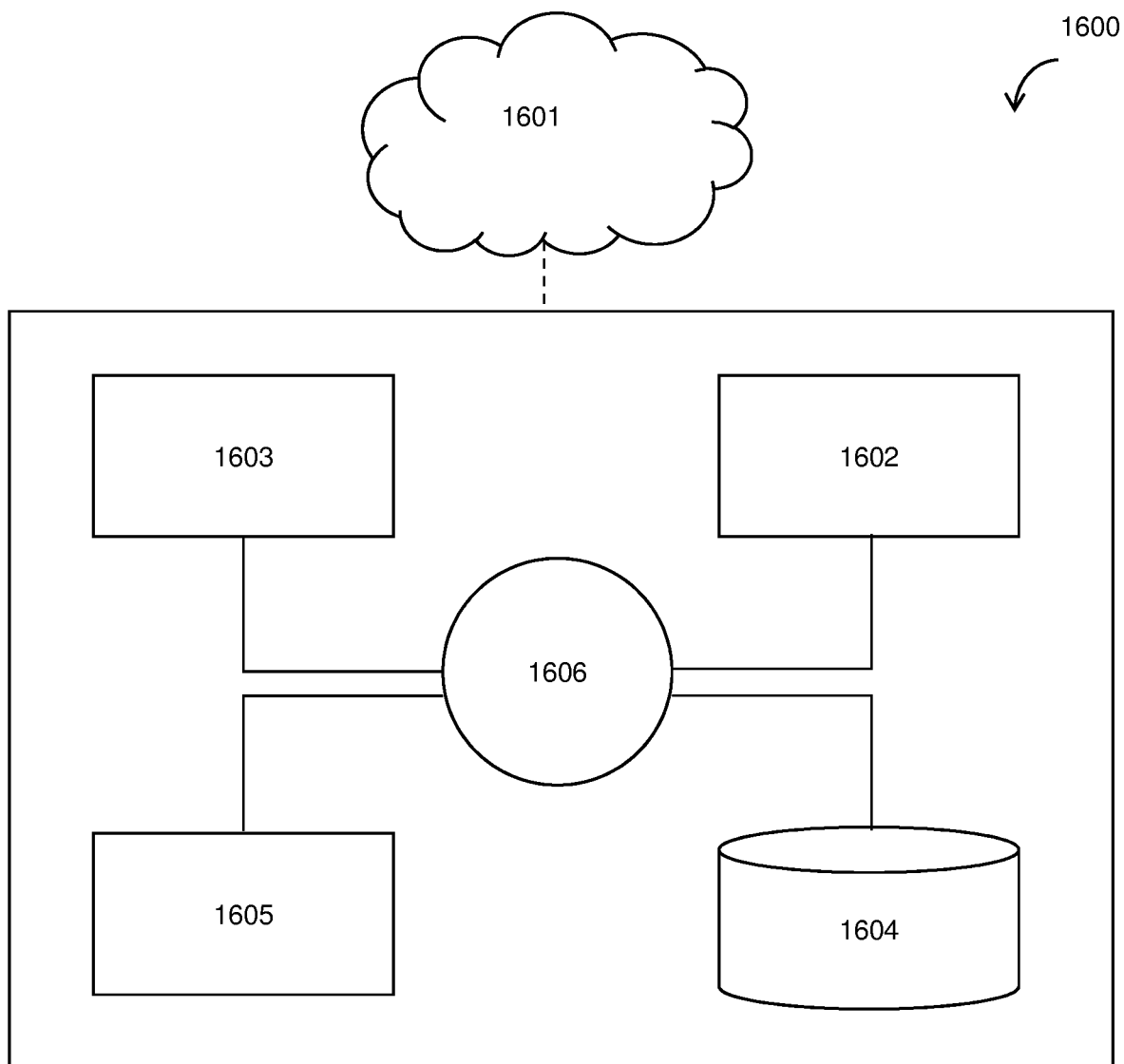
FIG. 16 schematically shows a processing system.

FIG. 16 shows a schematic example of a computer system 1600 that is programmed or otherwise configured to one or more operations of any of the methods provided herein. The computer system can control (e.g., direct, monitor, and/or regulate) various features of the methods, apparatuses and systems of the present disclosure, such as, for example, control heating, cooling, lightening, and/or venting of an enclosure, or any combination thereof. The computer system can be part of, or be in communication with, any sensor or device (e.g., including sensor and/or emitter) ensemble disclosed herein. The computer may be coupled to one or more mechanisms disclosed herein, and/or any parts thereof. For example, the computer may be coupled to one or more sensors, valves, switches, lights, windows (e.g., IGUs), motors, pumps, optical components, or any combination thereof.

In some embodiments, the circuitry is operatively (e.g., communicatively) coupled to a network of the enclosure (e.g., facility comprising a building). The circuitry may comprise a driver board, or a controller. The controller may be any controller disclosed herein (e.g., timing controller, touch screen controller, and/or any controller of the (e.g., hierarchical) control system). The controller may be operatively coupled to a device ensemble. The device ensemble may comprise a sensor or an emitter. For example, the device ensemble may comprise a plurality of sensors, a plurality of emitters, or any combination thereof. The emitter may be a light (e.g., LED) or a sound (e.g., buzzer or loudspeaker) emitter. The sensor may sense any environmental characteristic of the environment (e.g., light, temperature, chemical content (e.g., of the atmosphere), or sound). The chemical content may comprise volatile organic compounds (VOCs), carbon dioxide, oxygen, carbon monoxide, hydrogen sulfide, or humidity. The control system may be configured to control (e.g., via the network) the environment, e.g., using a building management system. The control system may be configured to control (e.g., via the network) a ventilation, heating, air conditioning, cooling, lighting, security, safety, fire, or sound system of the enclosure (e.g., facility). The control system may be configured to control (e.g., via the network) the at least one tintable window, display construct, and/or touch screen. The network may facilitate updating any of the software (e.g., non-transitory computer readable media) associated with the devices to which it is operatively (e.g., communicatively) coupled. The network may facilitate updating any of the logic (e.g., control logic) associated with the devices to which it is operatively (e.g., communicatively) coupled. The logic may be embedded in a software. The network may facilitate updating any of the data streams associated with the devices to which it is operatively (e.g., communicatively) coupled. The update may be in real-time. The network may facilitate a response time and/or update time having a delay of at most about 2 milliseconds (ms), 3 ms, 4 ms, 5 ms, 7 ms, 10 ms, or 15 ms. The network may facilitate low latency communication. The display construct, touch screen functionality, and/or tintable window may (e.g., each) have a unique identification (alphanumeric) code. The display construct, touch screen functionality, and/or tintable window may (e.g., each) be uniquely recognized by the network and/or control system. The display construct, touch screen functionality, and/or tintable window may (e.g., each) be uniquely identified as a device and/or node by the network and/or control system.

In some embodiments, the device (e.g., display construct, touch screen functionality, and/or tintable window) is communicatively coupled to the network. A third party device and/or data stream (e.g., third party media provider) may utilize a network authentication protocol, e.g., to communicate with the control system and/o with another device. The network authentication protocol may open one or more ports for network access. The port(s) may be opened when an organization and/or a facility authenticates (e.g., through network authentication) an identity of a device that attempts to operatively couple (and/or physically couples) to the network. Operative coupling may comprise communicatively coupling. The organization and/or facility may authorize (e.g., using the network) access of the device to the network. The access may or may not be restricted. The restriction may comprise one or more security levels. The identity of the device can be determined based on the credentials and/or certificate. The credentials and/or certificate may be confirmed by the network (e.g., by a server operatively coupled to the network). The authentication protocol may or may not be specific for physical communication (e.g., Ethernet communication) in a local area network (LAN), e.g., that utilizes packets. The standard may be maintained by the Institute of Electrical and Electronics Engineers (IEEE). The standard may specify the physical media (e.g., target apparatus) and/or the working characteristics of the network (e.g., Ethernet). The networking standard may support virtual LANs (VLANs) on a local area (e.g., Ethernet) network. The standard may support power over local area network (e.g., Ethernet). The network may provide communication over power line (e.g., coaxial cable). The power may be direct current (DC) power. The power may be at least about 12 Watts (W), 15 W, 25 W, 30 W, 40 W, 48 W, 50 W, or 100 W. The standard may facilitate mesh networking. The standard may facilitate a local area network (LAN) technology and/or wide area network (WAN) applications. The standard may facilitate physical connections between target apparatuses and/or infrastructure devices (hubs, switches, routers), e.g., by various types of cables (e.g., coaxial, twisted wires, copper cables, and/or fiber cables). Examples of network authentication protocols can be 802.1X, or KERBEROS. The network authentication protocol may comprise secret-key cryptography. The network can support (e.g., communication) protocols comprising 802.3, 802.3af (PoE), 802.3at (PoE+), 802.1Q, or 802.11s. The network may support a communication protocol for Building Automation and Control (BAC) networks (e.g., BACnet). The protocol may define service(s) used to communicate between various devices coupled to the network. The one or more devices include sensors, emitters, tintable windows, display constructs, touch screen functionality, controllers, transceivers, antennas, third party media provider related equipment, personal computers, mobile circuitry (e.g., laptop, cellular phone, touch pad), and/or any other (e.g., third party) devices. The protocol services may include device and object discovery (e.g., Who-Is, I-Am, Who-Has, and/or I-Have). The protocol services may include Read-Property and Write-Property (e.g., for data sharing). The network protocol may define object types (e.g., that are acted upon by the services). The protocol may define one or more data links and/or physical layers (e.g., ARCNET, Ethernet, BACnet/IP, BACnet/IPv6, BACnet/MSTP, Point-To-Point over RS-232, Master-Slave/Token-Passing over RS-485, ZigBee, and/or LonTalk). The protocol may be dedicated to devices (e.g., Internet of Things (IoT) devices and/or machine to machine ($M^2M$) communication). The protocol may be a messaging protocol. The protocol may be a publish—subscribe type protocol. The protocol may be configured for messaging transport. The protocol may be configured for remote devices. The protocol may be configured for devices having a small code footprint and/or minimal network bandwidth. The small code footprint may be configured to be handled by microcontrollers. The protocol may have a plurality of quality of service levels including (i) at most once, (ii) at least once, and/or (iii) exactly once. The plurality of quality of service levels may increase reliability of the message delivery in the network (e.g., to its target). The protocol may facilitate messaging (i) between device to cloud and/or (ii) between cloud to device. The messaging protocol is configured for broadcasting messages to groups of devices (e.g., as described herein) such sensors, and/or emitters. The protocol may comply with Organization for the Advancement of Structured Information Standards (OASIS). The protocol may support security schemes such as authentication (e.g., using tokens). The protocol may support access delegation standard (e.g., OAuth). The protocol may support granting a first application (and/or website) access to information on a second application (and/or website) without providing the second with a security code (e.g., token and/or password) relating to the first application. The protocol may comprise a Message Queuing Telemetry Transport (MQTT) or Advanced Message Queuing Protocol (AMQP) protocol. The protocol may be configured for a message rate of at least one (1) message per second (e.g., per publisher), or more messages per second (e.g., per publisher). The protocol may be configured to facilitate a message payload size of at most about 64, 86, 96, or 128 bytes. The protocol may be configured to communicate with any device (e.g., from a microcontroller to a server) that operates a protocol compliant (e.g., MQTT) library and/or connects to compliant broker (e.g., MQTT broker) over a network. Each device (e.g., target apparatus, sensor, or emitter) can be a publisher and/or a subscriber. At least one broker can handle millions of concurrently connected devices, or less than millions. The broker can handle at least about 100, 10000, 100000, 1000000, or 10000000 concurrently connected devices. In some embodiments, the broker is responsible for receiving at least a portion (e.g., all) of the messages, filtering the messages, determining who is interested in each message, and/or sending the message to these subscribed device (e.g., broker client). The protocol may require internet connectivity to the network. The protocol may facilitate bi-directional, and/or synchronous peer-to-peer messaging. The protocol may be a binary wire protocol. Examples of such network protocol, control system, and network can be found in U.S. Provisional Patent Application Ser. No. 63/000,342, filed Mar. 26, 2020, titled "MESSAGING IN A MULTI CLIENT NETWORK," which is incorporated herein by reference in its entirety.

The computer system can include a processing unit (e.g., 1606) (also "processor," "computer" and "computer processor" used herein). The computer system may include memory or memory location (e.g., 1602) (e.g., random-access memory, read-only memory, flash memory), electronic storage unit (e.g., 1604) (e.g., hard disk), communication interface (e.g., 1603) (e.g., network adapter) for communicating with one or more other systems, and peripheral devices (e.g., 1605), such as cache, other memory, data storage and/or electronic display adapters. In the example shown in FIG. 16, the memory 1602, storage unit 1604, interface 1603, and peripheral devices 1605 are in communication with the processing unit 1606 through a communication bus (solid lines), such as a motherboard. The storage unit can be a data storage unit (or data repository) for storing data. The computer system can be operatively coupled to a computer network ("network") (e.g., 1601) with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory 1602. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 1600 can be included in the circuit.

The storage unit can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet.

The computer system can communicate with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user (e.g., client) can access the computer system via the network.

Methods as described herein can be implemented by way of machine (e.g., computer processor) executable code stored on an electronic storage location of the computer system, such as, for example, on the memory 1602 or electronic storage unit 1604. The machine executable or machine-readable code can be provided in the form of software. During use, the processor 1606 can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code or can be compiled during runtime. The code can be supplied in a programming language that can be selected to enable the code to execute in a pre-compiled or as-compiled fashion.

In some embodiments, the processor comprises a code. The code can be program instructions. The program instructions may cause the at least one processor (e.g., computer) to direct a feed forward and/or feedback control loop. In some embodiments, the program instructions cause the at least one processor to direct a closed loop and/or open loop control scheme. The control may be based at least in part on one or more sensor readings (e.g., sensor data). One controller may direct a plurality of operations. At least two operations may be directed by different controllers. In some embodiments, a different controller may direct at least two of operations (a), (b) and (c). In some embodiments, different controllers may direct at least two of operations (a), (b) and (c). In some embodiments, a non-transitory computer-readable medium cause each a different computer to direct at least two of operations (a), (b) and (c). In some embodiments, different non-transitory computer-readable mediums cause each a different computer to direct at least two of operations (a), (b) and (c). The controller and/or computer readable media may direct any of the apparatuses or components thereof disclosed herein. The controller and/or computer readable media may direct any operations of the methods disclosed herein.

In some embodiments, at least one display construct and associated integrated glass unit(s) are operated in coordination with one another. Control of the at least one display construct and associated tintable window (e.g., integrated glass unit(s)) may be via integration of the display construct control with control of the tintable window. For example, the display construct and the tintable glass may be operatively (e.g., communicatively) coupled to the control system, e.g., via the network. Control of the at least one display construct may be via Ethernet. A tint level of the tintable window(s) may be adjusted when one or more associated display constructs are in use. The tint level of the tintable window may automatically change (e.g., darken) when the one or more display constructs are in use. Automatically changing (e.g., darkening or lightening) the tint level of the tintable window(s) may be based at least in part on outside radiation and/or display contrast. Automatically changing the tint level of the tintable window may be based at least in part on privacy (e.g., limiting an ability to see the display construct from someone outside of the facility). When the tintable window(s) is in use, a zone of tintable windows may have its tint level (automatically) altered (e.g., darkened or lightened). A zone of tintable windows may comprise a plurality of tintable windows. The zone may comprise (i) tintable windows facing a particular direction of an enclosure (e.g., facility), (ii) a plurality of tintable windows on a particular face (e.g., facade) of a facility, (iii) a tintable windows on a particular floor of a facility, (iv) a plurality of tintable windows in a particular type of room and/or activity (e.g., open space, office, conference room, lecture hall, corridor, reception hall, or cafeteria), (v) tintable windows disposed on the same fixture (e.g., internal or external wall), and/or (vi) a plurality of tintable windows that are user defined (e.g., a group of tintable windows in a room or on a facade that are a subset of a larger group of tintable windows, for example, a conference room with a display construct on one of eight tintable windows may darken the tint of eight tintable windows—the zone). The (automatic) tinting of the tintable window may be based at least in part on whether the display construct is showing active content (e.g., content intended for user viewing) or inactive content. The automatic changing of the tint level of the tintable window when the at least one display construct is in use, may be overridden by a user (e.g., by manually adjusting the tint level). A user may override the automatic tinting of the tintable window(s) using mobile circuitry (e.g., a remote controller, a virtual reality controller, a cellular phone, an electronic notepad, a laptop computer and/or by a similar mobile device).

In some embodiments, at least one display construct and associated tintable window(s) may be adjacent to a heat dissipation system (e.g., heater). Heat adjacent to the display construct (e.g., heat generated by the display construct, any touch screen, circuitry, power supply, adjacent sensors, adjacent emitters, and/or sun radiation (e.g., transmitted through the tintable window)) may be dissipated. The heat may be transferred via conduction, convection, and/or electromagnetic waves (radiation). The heat may be actively or passively removed. Heat may be removed via convection and/or conduction. The active heat removal may be controlled (e.g., using the control system). Active (e.g., forced) convection (e.g., fans) may create air flow to dissipate heat adjacent to the display construct(s). The air flow may be in gaps (e.g., between the tintable window(s) and the display construct(s)). One or more temperature sensor(s) adjacent to the display construct(s) and/or operatively coupled to the display construct may sense a temperature and signal to initiate forced convection when a first (high) temperature threshold is reached. The temperature sensor(s) may (automatically) shut down the display construct(s) when a second (higher) temperature threshold is reached (e.g., to prevent malfunction and/or damage). The damage may be permanent or temporary. The first temperature threshold may be of a lower temperature value than the second temperature threshold. The threshold may depend on ambient temperature. Ambient temperature may include temperature external to the enclosure in which the display construct is disposed, or temperature in the enclosure in which the display construct is disposed. Thermal heat penetrating through the tintable window(s) may be limited (e.g., via a use of low emissivity (Lo-E) glass), e.g., to reduce a thermal load on the display construct(s).

In some embodiments, an operation of at least one display construct and associated tintable window(s) includes maintenance tasks associated with the display construct(s). Control of maintenance tasks of the display construct (e.g., pixel compensation, temperature, usage and/or resetting) may be automatic (e.g., using the control system). Pixel compensation may include adjusting a brightness of a pixel in the display construct based at least in part on how that pixel has been used over its lifetime. For example, what wavelength and/or intensity the pixel emitted, and optionally for how long. For example, how frequently was the wavelength and/or intensity projected by the pixel. For example, what has been displayed by that pixel (e.g., video with motion or static display). The display construct temperature, the fan speed, the extent of display construct usage, and/or the type of display construct usage, may be monitored over time. Monitoring may by a control system. Monitoring may utilize a sensor coupled to the network (e.g., and to the control systems). The monitoring may be in situ and/or in real time while the display construct is projecting media. The control system may utilize image processing to assess the status of one or more emitting entities (e.g., LEDs or other lights) of the display construct. The sensor may comprise a camera (e.g., stills or video camera). The camera may comprise a pixel array (e.g., charge-coupled device (CCD) camera). The camera may be configured for digital imaging (e.g., CCD or a complementary metal-oxide-semiconductor (CMOS) camera). The camera may comprise a photographic plate. The camera may be sensitive to color gamut (e.g., the full range of colors visible to an average human eye). The control system may monitor the display construct continuously and/or intermittently (e.g., at predetermined intervals). The control system may record data relating to monitoring the display construct continuously or intermittently. The data may be recorded at predetermined intervals and/or when a threshold has been reached. The threshold may be thermal, electrical, and/or optical threshold. The threshold may be time dependent (e.g., temperature of over 50° C. for more than about 1 minute). The display construct adjustment (e.g., reset) may be based at least in part on such monitoring of the display construct (e.g., optical, thermal, and/or electrical) properties (e.g., depending on a time threshold). The threshold may be a value or a function (e.g., time and/or space dependent function). Space may relate to a type of enclosure in which the display construct is disposed. For example, a display construct in a conference room may have a lower error tolerance than a display construct in a corridor. The monitoring of the display construct may provide predictions regarding the life of component(s) of the display construct (e.g., pixels, electrical circuitry, filter and/or fan). Monitoring the display construct (e.g., over time) may proactively compensate for any predicted decay in components related to, or of, the display construct (e.g., pixels, electrical circuitry, filter and/or fan). Monitor and/or diagnostics of the display construct may be via a network (e.g., a network disposed, at least in part, in a skin of the facility). Monitoring and/or diagnostics of the display construct may be by a control system. Adjusting (e.g., resetting) the display construct may include (automatically and/or controllably) turning the display construct off and on. The display construct may be cycled once per time interval (e.g., every at least about 24 hours, 36 hours, 48 hours, or 72 hours), e.g., if the pixels of the display construct may be susceptible to malfunction (e.g., burn failures). The time interval may depend on the type of predicted failure and/or its extent (e.g., predicted failure of one pixel, or predicted failure of a group of pixels). The time interval for cycling may depend on the type of viewing of the display construct. For example, static viewing done for longer than a predetermined threshold of time (e.g., use the display construct as a sign) may increase the risk of pixel malfunction (e.g., failure). More frequent on/off cycling when the display construct is used for static viewing as opposed to video with movement, may reduce the risk of pixel malfunction in static viewing. The control system may predict (e.g., via a software module) maintenance and/or replacement of the display construct or any of its components (e.g., based on the monitored pixel status). The predictions may be based at least in part on real-time sensor measurements of an output of the display construct (e.g., as compared to an expected output). The predictions may be based at least in part on prior sensor measurements of an output of the display construct (e.g., as compared to an expected output), e.g., done in a laboratory or other test facility (e.g., fatigue tests). The predictions may be based at least in part on observation of the display construct to be maintained/replaced. The predictions may be based at least in part on observation of other display construct (e.g., a test display construct) than the one to be maintained/replaced. The predictions may be based at least in part on average pixel status, e.g., considering the irradiation profile of the display construct and/or any of its individual pixels. The control system may provide notification regarding anticipated replacement and/or maintenance. Such predictions may allow performance of proactive maintenance and/or replacement. Such predictions may allow prospective stocking of respective display constructs to be maintained and/or replaced. Such predictions may allow for timely scheduling of personnel that would perform such maintenance and/or replacement.

Figure 18:
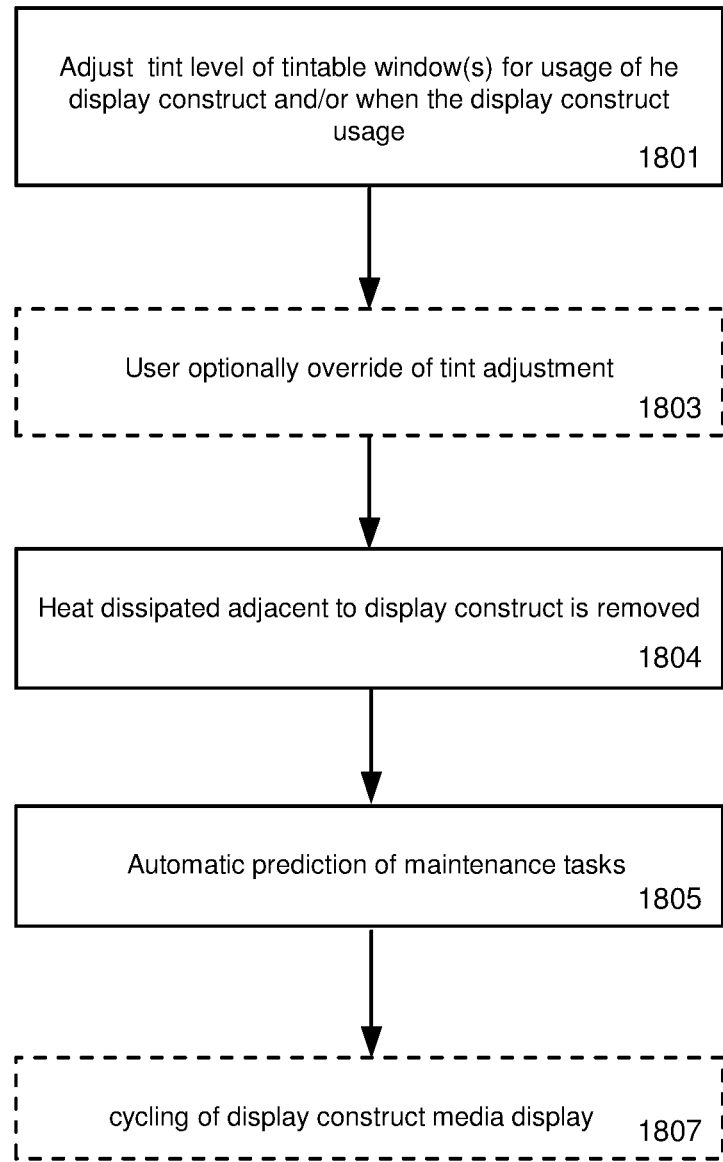
FIG. 18 is a flow chart showing an example of an operating method for a display construct.

FIG. 18 shows an example of operations related to at least one display construct and associated tintable window(s). Control of the at least one display construct and associated tintable window(s) may be via integration of the display construct control with control of the tintable window(s). Control of the at least one display construct may be via the network. In block 1801, a tint level of at least one tintable window is adjusted when one or more associated display construct(s) is in use and/or in preparation for the display construct's usage. For example, the tint level of the tintable window(s) may automatically darken when the one or more display construct(s) is in use. Automatically darkening the tint level of the at least one tintable window may be based at least in part on (i) outside radiation, (ii) media displayed on the display contrast, (iii) type of media displayed (e.g., static or changing), and/or (iv) privacy request. Automatically darkening the tint level of the tintable window(s) may be based at least in part on privacy (e.g., limiting an ability to see the display construct from someone outside of the facility). When one or more display constructs is in use, a zone of tintable windows may have their tint level altered (e.g., darkened). A zone of tintable windows may include a plurality of tintable windows facing a particular direction in a facility, may be a plurality of tintable windows on a particular face of a facility, may be a plurality of tintable windows on a particular floor of a facility, may be a plurality of tintable windows in a particular type of room (e.g., open space, office, conference room, lecture hall, cafeteria), and/or may be a plurality of tintable windows that are user defined (e.g., a group of tintable windows in a room or on a facade that are a subset of a larger group of tintable windows, for example, a conference room with a display construct on one of eight tintable windows may darken the tint of eight tintable windows—the zone). The zone may be any zone disclosed herein. The automatic tinting of the tintable window may be based at least in part on whether the display construct is showing active content (e.g., content intended for user viewing) or inactive content. In block 1803, the automatic darkening of the tint level of the tintable window may be overridden by a user manually adjusting the tint level of the one or more tintable windows. A user may override the automatic tinting of the tintable window(s) using mobile circuitry (e.g., a remote controller, a virtual reality controller, a cellular phone, an electronic notepad and/or a laptop computer). In block 1804, heat adjacent to the display construct (e.g., heat generated by any components related to the display construct and/or sun radiation transmitted through the tintable window) may be dissipated and passively and/or actively (e.g., controllably) removed (e.g., using automatic actuation of fans or any other heat exchangers). A temperature sensor adjacent to the display construct may sense the temperature and signal to start the active heat exchange operation (e.g., initiating forced convection) when a first high temperature threshold is reached. The temperature sensor may shut down the display construct(s) when a second higher temperature threshold is reached.

Operation 1805 shows (e.g., automating) prediction and/or anticipation of maintenance task(s) of the display construct (e.g., pixel compensation, temperature, usage and/or resetting). Pixel compensation may include adjusting a brightness of a pixel in the display construct based at least in part on how much that pixel has been used, how often that pixel has been used and/or what has been displayed by that pixel (e.g., video with motion or static display). The display construct temperature, the active heat exchange intensity (e.g., fan speed) and/or the amount of display construct usage, may be monitored. The display construct adjustment (e.g., reset) may be based at least in part on the monitoring of the display construct properties. As the pixels deteriorate, they may require more current and/or voltage to produce a requested output. The display construct adjustment may comprise adjusting intensity of one or more pixels of the display construct to generate the requested output. The monitoring of the display construct may provide predictions regarding the status and/or predicted lifespan of components in the display construct (e.g., pixels, electrical circuitry, filter and/or fan). The control system may notify and/or proactively compensate for any predicted decay in components related to the display construct. Monitoring and/or diagnostics of the display construct may be via a network, which may be disposed, at least in part, in a skin of the facility. In block 1807 the display construct is optionally adjusted and/or reset. The adjustment and/or resent may include automatically turning the display construct off and on, e.g., to crease pixel lifespan and/or reduce pixel output malfunction.

In some embodiments, an operation of at least one display construct and associated tintable window(s) is based at least in part on a status of at least one display construct. A status of the display construct may be examined, monitored, and/or verified as to whether the at least one display construct is on. If the at least one display construct is not on, then a default and/or manual tint level of the tintable window(s) may be activated. The (e.g., on/off) status of the display construct may be periodically checked. If the at least one display construct is on (e.g., operating), then a determination may be made whether the display construct is displaying active or passive content. If the display construct is not on (e.g., not displaying media), then a default or manual tint level of the tintable window(s) may be activated. If the display construct is displaying active content, (i) a zone of tintable windows in proximity to the display construct(s) displaying active content may be identified, (ii) may have the tint level identified of the windows in the zone (e.g., different tint level based at least in part on presence of sun radiation, sun glare and/or desired contrast) and/or (iii) may adjust the tint levels of the tintable windows in the identified zone.

Figure 19:
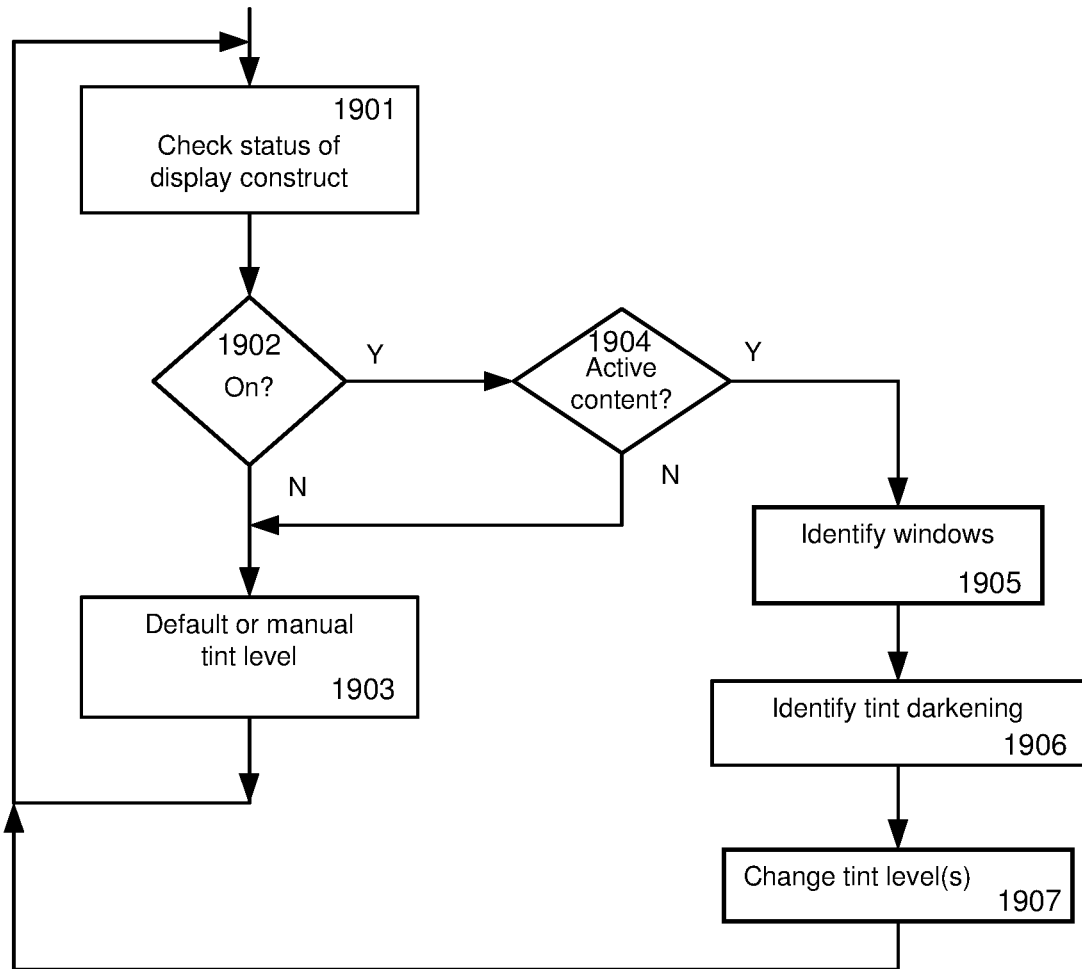
FIG. 19 is a flow chart showing an example of an operating method for a display construct.

FIG. 19 shows an example of control operations relating to at least one display construct and associated tintable window(s). A status of the at least one display construct is checked in block 1901. In block 1902, the control system determines whether the at least one display construct is on (e.g., at least one pixel is controllably emitting radiation). If the at least one display construct is not on, then a default or manual tint level of the tintable window(s) is activated in block 1903, and the status of the display construct is periodically checked. If the at least one display construct is on, then a determination may be made whether the display construct is displaying active content in block 1904. If not, then a default or manual tint level of the tintable window(s) may be activated in block 1903, and the status of the display construct is periodically checked. If the display construct is displaying active content, tintable window(s) in proximity to the display construct(s) displaying active content is identified in block 1905. The tintable window(s) may have their tint level identified (e.g., different tint level based at least in part on presence of sun/glare and desired contrast) in block 1906, and any tint level adjustment is made to the tintable windows in block 1907. The tintable windows may be part of the zone (e.g., and the zone may be identified by the controller), or not part of the zone. If a first tintable window coupled to a display construct is part of a zone that comprises at least one second tintable window not coupled to a display construct. The tint of the second tintable window may or may not be altered to the tint of the first tintable window. Altering tint of other windows in the zone in concert with alteration of the tint of the tintable window that is coupled with the display construct, may be predetermined, and/or determined by a user.

In some embodiments, a plurality of display constructs is connected together in a control scheme. A plurality of display constructs may be mounted adjacent to one or tintable windows. The tintable windows may be connected (e.g., wired or wirelessly), via local (e.g., window) controllers as part of a control system. The control system may comprise a distributed network of controllers coupled to a power and/or communication network. The control system can control various functions (e.g., functions of a facility (e.g., office building, warehouse, etc.)), which may include adjusting the tint of the tintable window(s) and/or displaying media content on the display construct. The display constructs may be connected (e.g., wired or wirelessly), via a display interface that may be housed in one or more housings. The display interface housing may be referred to herein as electrical-box ((E)-box) e.g., 2006. The E-Box may be operatively coupled (e.g., for power and/or communication) to the network. The network may provide data and/or power to the display constructs. A user content server may provide data through the network to be displayed on the display constructs and/or may provide data and power to the display interface via one or more connections to the display interface. The display interface may include an adapter (e.g., Ethernet adapter (e.g., RS-485-to-ethernet)) and/or the E-boxes may include native adapter (e.g., Ethernet/IP) support. The E-box may send prompts and/or respond to queries from the network. The connection of devices for data transmission may include, for example, Ethernet, HDMI, Display Port, RS-485 and/or other types of connections for data and/or media transmission. Power may be provided to the E-boxes via power-over-internet and/or via separate power cables. The plurality of display constructs may show different content on each display construct, may show the same (e.g., duplicate) content, or may be configured to show one image across multiple display constructs (e.g., such that a section of the image with be shown on each of the plurality of display construct). The connection of display constructs may allow for small numbers (e.g., at most 10, 9, 8, 5, 6, or 4) of display constructs to be controlled via a local controller. In some embodiments, a larger number (e.g., more than 10) display constructs may be coupled via a network (e.g., floor) controller or may allow for all display constructs in a facility to be controlled by a main controller. The display constructs may display media individually (e.g., independent of other display constructs) or a group of display constructs (e.g., at least 2, 4, 6, 8, 10, 20, 25, 50, or 75 display constructs may be arranged in a group (set) of displays), e.g., that may be controlled to display data as if a single display construct (e.g., one media that is respectively parceled among the displays in a display group). The display constructs may form a video wall. The video wall may comprise a plurality of display construct tiled together (e.g., contiguously, or overlapped), in order to form one large screen. The controller controlling the video wall controller may parcel a single image to be projected on the video wall into parts to be displayed on individual display constructs that constitute the video wall. Display constructs may be coupled to a wall (e.g., opaque or transparent), or to a tintable window. The video wall controller may comprise hardware-based controller, or software-based & media-card controller. The hardware based controller may comprise media processing chipsets and may be devoid of an operating system. The software-based & media-card controller may be disposed in a processor having an operating system. The processor may be a server or may be local. The processor may be configured with multiple-output graphic cards and/or video capture input cards.

The display constructs may be configured in layouts. The layouts may comprise matrix grid layouts (e.g., 2×2, 3×3, or 4×4.) of identical display geometries (e.g., having the same aspect ratio). The layouts can comprise layouts of non-identical display geometries (e.g., having different aspect ratios), e.g., in configurations other than symmetrical matrixes. The media content in displayed may be identical, parceled, or entirely different. For example, at least two different parallel contents may be displayed on the video wall of the display constructs.

Figure 20:
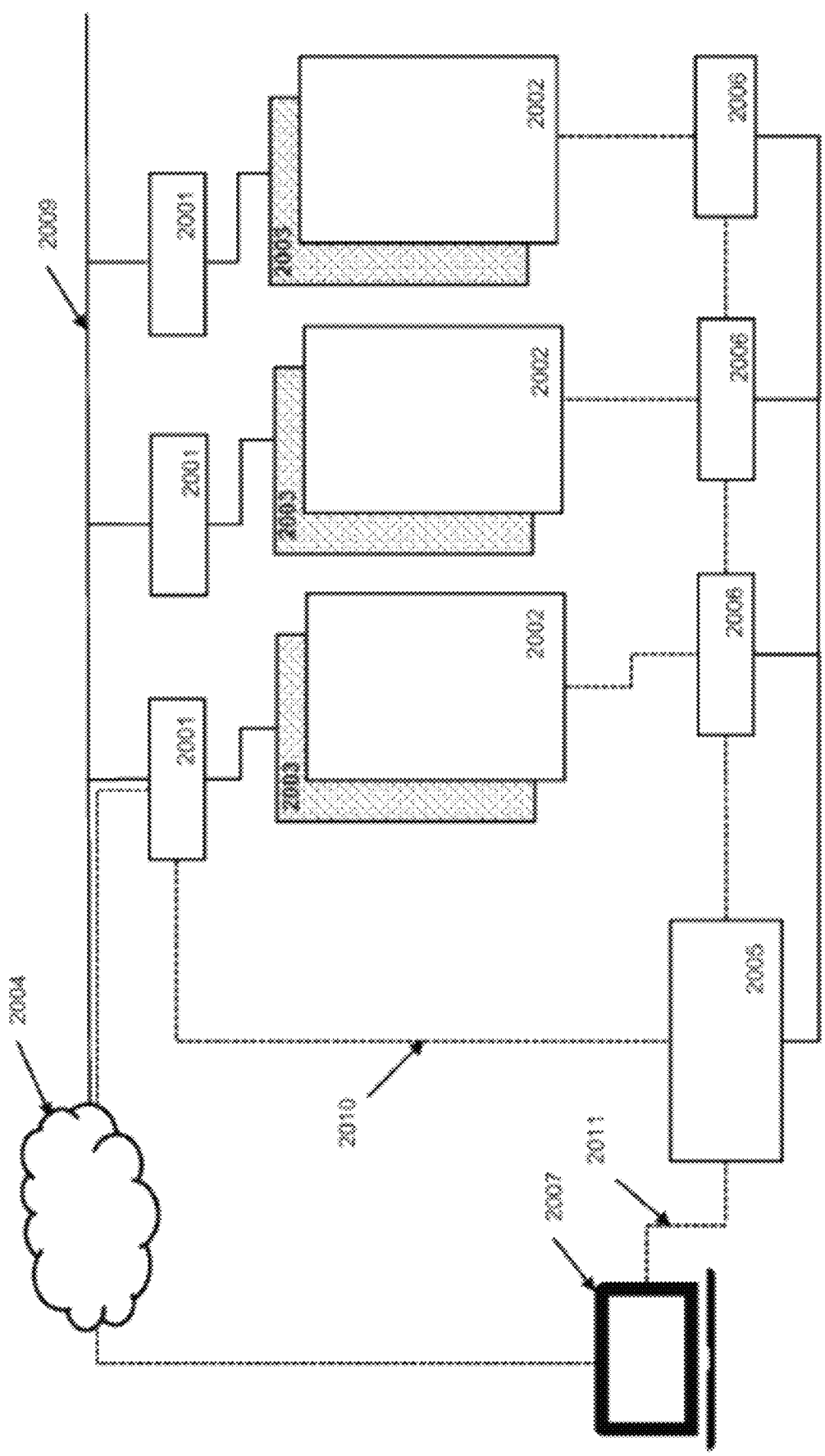
FIG. 20 schematically shows a control scheme for display constructs.

FIG. 20 shows an example of a control scheme for a plurality of display constructs. A plurality of display constructs 2002 may be mounted adjacent to a plurality of tintable windows 2003. The tintable windows 2003 may be connected (e.g., wired and/or wirelessly) 2009, via local (window) controllers 2001, to a control network 2004 that controls various functions of a facility (e.g., office building, warehouse, etc.), which may include adjusting the tint of the tintable windows 2003. The display constructs 2002 may be connected (e.g., wired and/or wirelessly) 2010, via a display interface 2005 and controllers housed within housings (also referred to herein as electrical (E)-boxes) 2006, to control network 2004 (comprising the control system). The control network may be couple via wiring network to the tintable windows and/or display construct, which wiring (e.g., coaxial cables) may provide data and/or power to the display constructs 2002. A user content server 2007 may provide data (e.g., through the wiring and/or control network) to be displayed on the display constructs 2002 and/or may provide data and power to the display interface 2005 via one or more connections 2011 to the display interface 2005. The display interface may include an Ethernet adapter (e.g., RS-485-to-ethernet). The E-boxes 2006 may include native Ethernet/IP support. The E-boxes 2006 may send prompts and/or respond to queries from the network 2004. The connection of devices for data transmission may include, for example, Ethernet, HDMI, Display Port, RS-485 and/or other types of connections for data transmission. Power may be provided to the E-boxes 2006 via power-over-internet and/or via separate power cables. The plurality of display constructs 2002 may show different content, the same content, or may be employed to show one image across multiple display constructs 2002 (e.g., as in a video wall).

In some embodiments, a display construct is utilized to display various media in a facility. The display construct may include one or more media displays that may be at least partially transparent, e.g., when the display construct is not operating (e.g., TOLED display). The display construct may be coupled to (e.g., directly or indirectly) to a hard surface such as a wall, a board, or a window (e.g., vision window). The hard surface may be of a fixture. The window may be a tintable window (e.g., an electrochromic window). The window may be disposed in the building, or in an envelope of the building. The vision window may comprise a tintable window that includes an electrochromic widow that can tint (e.g. darken, lighten, and/or alter its color (e.g., hue)), which can provide a background for contrasting the media displayed by the display construct.

In some embodiments, one or more display constructs may be operatively coupled (e.g., mounted) to the hard surface (e.g., window, wall, or board). The coupling may be via a hinge, adhesive, fasteners, and/or by other suitable mechanisms. The coupling may be at least partially disposed within one or more window frame portions. The window frame(s) may include vertical portions (e.g., mullions) and may include horizontal portions (e.g., transoms). The display construct may be directly adhered (e.g., using an adhesive) to the hard surface. The adhesive may or may not contact the window frame (or portion thereof). The hard surface may comprise of a hardened material (e.g., glass, metal, or polymer). The hard surface may comprise a solid (e.g., gypsum, ceramic, concrete and/or stone). Multiple display constructs may be mounted (e.g. via a hinge, adhesive, fasteners, and/or by other mechanism).

In some embodiments, the display construct is controlled by at least one controller. The controller may be part of the control system. The controller may comprise a controller than directly couples (e.g., connects) to the display construct. The connection between the controller and the display construct may be using wired and/or wireless communication. The controller may be coupled to the display construct via a plurality of wiring (e.g., for communication and/or power). The controller may be disposed in a housing. The housing may comprise one or more materials. The material may include elemental metal, metal alloy, polymer (e.g., plastic), resin, wood, glass, composite and/or other materials. The materials may comprise transparent or opaque materials. The material may comprise conductive or insulating (e.g., dielectric) material. The housing may comprise a dispersing or specular material. The housing may have a plurality of faces. At least two (e.g., all) of the plurality of the wiring may extend from one face of the plurality of faces of the controller housing. At times, one controller housing (e.g., comprising one or more controllers) may be coupled to a plurality of display construct. At times, one controller may be (e.g., directly) operatively coupled to one display construct. At times, one controller may be (e.g., directly) operatively coupled to two or more display constructs. Direct coupling may comprise a wire that connects the controller and the display construct. The wire may be an uninterrupted wire. The controller and/or housing may comprise wiring inlets. The wiring inlets may or may not be in the same face as the wiring outlets in the controller housing. At times, a plurality of control housings may be disposed adjacent to each other (e.g., contact each other, or may be directly coupled to each other (e.g., via wiring). At least two of the wiring (e.g., all of the wiring) connecting the controller(s) in at least two different housings (e.g., all of the housings) with at least two (e.g., all) of the display constructs (e.g., in a set of display constructs), may extend (i) from the same face type of the housings and/or (ii) to the same general direction (e.g., upwards, downwards, left, or right). The face type may be assigned according to the direction in which the face faces (e.g., downward face, upward face, eastward face, westward face, northward face, eastward face, or any combination thereof). The directions may be relative to a user facing the display construct, and relative to a gravitational center.

In some embodiments, the controller housing is mounted in a frame portion. The controller housing may be mounted within at least a portion of the window, board, or wall frame. The portion of the frame may be an upper horizontal mullion(s) (transom(s)), within lower horizontal mullion(s) (transom(s)), and/or within the vertical (side) mullions, or a combination of the mullions that form the window frame(s). Upper and lower are relative to the gravitational center. Display connectors may connect a controller to a display construct via one or more cables and/or wires. The display connectors connecting controllers to respective display constructs, which may be via cables, may extend from one face of the plurality of faces of the controller housing or may extend from more than one face of the plurality of faces of the controller housing. At least two (e.g., all) of the cables that connect the controllers to the corresponding display constructs may be (e.g., substantially) of the same length. The cable may extend at least partially within the window frame(s). The cables that connect the controller to the display construct may be of different lengths. The cable may extend at least partially within and/or outside of the window frame(s). The (e.g., local) controller may include power supply connector that may connect, e.g., to one or more electric power supply. Power supply connectors may be disposed in the same face or in a different face from the face from which the data cables to the display construct(s) extend from. The different faces may form an angle, the angle may be (e.g., substantially) a right angle. The different faces may be parallel to each other. Data (e.g., communication and/or media) cable(s) may connect from one or more sources of data (e.g. server(s)) to the controllers. The data cables may connect to a media content provider server and/or a server that controls a level of tint of the window(s). In some embodiments, the power and data are coupled to the display construct via the same cable (e.g., coaxial cable).

In some embodiments, a plurality of devices (e.g., including a sensor and/or emitter) is integrated into a common housing. The housing may include one or more circuit boards. The housing may integrate an ensemble of devices. The ensemble may have a single housing (e.g., cover). One or more circuit boards (e.g., printed circuit boards PCB) may be disposed in the single housing. At least one controller may be disposed in the housing. The housing may be adapted to mount to a window, wall, ceiling, or any other structure and/or fixture in an enclosure (e.g., a facility, building, or room) to perform various functions. The common assembly of devices (e.g., the ensemble of devices) may include power conditioning components, circuitry (e.g., a processing unit), memory, and/or a network interface. The housing may comprise mounting adapters that can be provided for installing an assembly to at least a portion of a fixture such as a window mullion. The housing may comprise one or more features desirable for optimal performance, such as (I) one or more opening for admitting external environmental characteristic(s) into the housing, (II) electrical and/or electromagnetic (e.g., radio frequency) shielding, and/or (III) heat exchangers (e.g., passive or active). For example, the housing may comprise one or more openings (e.g., holes) that facilitate air flow past the circuit board. The housing may comprise a heat sink. The heat exchangers and/or shields may shield the circuitry from external influences and/or may shield between the circuit boards encapsulated in the housing. The housing may comprise an open body and a lid. The lid may comprise the one or more openings (e.g., holes). The lid may snap into the open body to close the casing. The housing may comprise openings for receiving cabling.

FIG. 21A shows an example of a hard surface 2101 (e.g. a tintable window) mounted (e.g. via a hinge and/or adhesive) within a frame 2102. The frame 2102 includes mullions 2103*a* and 2103*b* that are vertical, and transoms 2104*a* and 2104*b* (sometimes referred to as horizontal mullions). Two display constructs 2105*a* and 2105*b* are mounted (e.g. via a hinge and/or adhesive) within the frame 2102 and cover (e.g., all of) the viewable surface of hard surface 2101 (e.g., viable surface of a board, or of a window such as a tintable window). Two controllers housed within housings (also referred to herein as electrical (E-)boxes) 2106*a* and 2106*b* are mounted in a portion of the frame 2102 within the upper (relative to the gravitational center towards which vector 2100 is pointing to) transom 2104*a*. The circuitry in E-Box 2106*a* (e.g., including timing controller, network communication (e.g., router), and/or media related circuitry) is connected via wiring 2109*a* to display construct 2105*a*. The circuitry in E-Box 2106*b* is connected via wiring 2109*b* to display construct 2105*b*. The display connectors 2108*a* extend from the housings 2106*a* in the same downward direction. The display connectors 2108*b* extend from the housings 2106*b* in the same downward direction. The connectors 2108*a* and 2108*b* are arranged to point to the same downward direction. The cables 2109*a* and are (e.g., substantially) the same length from each E-box 2106*a* and 2106*b* to the respective display constructs 2105*a* and 2105*b*, and extend within a portion of the frame 2102. E-box 2106*a* is configured to connect (e.g., via a connector) to power supply cable 2110*a*. E-box 2106*b* is configured to connect (e.g., via a connector) to power supply cable 2110*b*. At least one power supply cables supplying power to the E-Box circuitry can connect its own power supply sources. At least two power supply cables supplying power to the E-Box circuitry can connect one power supply source. FIG. 21A shows an example in which two power supply cables 2110a and 2110b connect to the same power supply source 2111. The power supply cables 2110a and 2110b extend from each of the E-boxes (e.g., substantially) perpendicular to the direction that the display connectors 2108a and 2108b extend from the E-boxes (e.g., the connectors extend to the same side of the E-box). Media wiring 2112a connect from a source of data (e.g. server) to the circuitry housed in the E-box (e.g., media circuitry board) 2106b. Media wiring 2112b is connected to E-box 2106a and (via E-box 2106b) to cable 2112a and to the source of data 2115. The media cables 2112a and 2112b can connect to a media content provider server. The E-box may be operatively coupled (e.g., wirelessly and/or wired) to the network that is coupled to at least one controller that controls that facility or any controllable device within the facility. For example, in the event that the hard surface 2101 is a tintable window, any (e.g., all) of the E-box may be operatively coupled to the at least one controller that controls a level of tint of this window, e.g., via the media cables (e.g., 2112a and/or 2112b) or via dedicated cables (not shown in FIG. 21A).

FIG. 21B shows an example of a hard surface 2121 (e.g. a tintable window) mounted (e.g. via a hinge and/or adhesive) within a frame 2122. The frame 2122 includes mullions 2123a and 2123b that are vertical, and transoms 2124a and 2124b (sometimes referred to as horizontal mullions). Four display constructs 2125a, 2125b, 2125c and 2125d are mounted (e.g. via a hinge and/or adhesive) within the frame 2122 and cover all of the viewable surface of hard surface 2121 (e.g., viable surface of a board, or of a window such as a tintable window). Four controllers housed within housings (also referred to herein as electrical (E)-boxes) 2126a, 2126b, 2126c and 2126d are mounted in a portion of the frame 2122 within the upper (relative to the gravitational center towards which vector 2120 is pointing to) transom 2124a. The circuitry in E-Box 2126a (e.g., including timing controller, network and/or media related circuitry) is connected via wiring 2129a to display construct 2125a. The circuitry in E-Box 2126b is connected via wiring 2129b to display construct 2125b. The circuitry in E-Box 2126c (e.g., including timing controller and media related circuitry) is connected via wiring 2129c to display construct 2125c. The circuitry in E-Box 2126d is connected via wiring 2129d to display construct 2125d. The display connectors 2128a extend from the housings 2126a in the same downward direction. The display connectors 2128b extend from the housings 2126b in the same downward direction. The display connectors 2128c extend from the housings 2126c in the same downward direction. The display connectors 2128d extend from the housings 2126d in the same downward direction. The connectors 2128a, 2128b, 2128c and 2128d are arranged to point to the same downward direction. The cables 2129a and are (e.g., substantially) the same length from each E-box 2126a, 2126b, 2126c and 2126d to the respective display constructs 2125a, 2125b, 2125c and 2125d, and extend within a portion of the frame 2102. E-box 2126a is configured to connect (e.g., via a connector) to power supply cable 2130a. E-box 2126b is configured to connect (e.g., via a connector) to power supply cable 2130b. E-box 2126c is configured to connect (e.g., via a connector) to power supply cable 2130c. E-box 2126d is configured to connect (e.g., via a connector) to power supply cable 2130d. At least one power supply cables supplying power to the E-Box circuitry can connect its own power supply sources. At least two or more power supply cables supplying power to the E-Box circuitry can connect one power supply source. FIG. 21B shows an example in which four power supply cables 2130a, 2130b, 2130c and 2130d connect to the same power supply source 2131. The power supply cables 2130a, 2130b, 2130c and 2130d extend from each of the E-boxes (e.g., substantially) perpendicular to the direction that the display connectors 2128a, 2128b, 2128c and 2128d extend from the E-boxes. Media wiring 2132a connect from a source of data (e.g. server) to the circuitry housed in the E-box (e.g., media circuitry board) 2126d. Media wiring 2132b is connected to E-box 2126c and (via E-box 2126d) to cable 2132a and to the source of data 2135. Media wiring 2132c is connected to E-box 2126b and (via E-boxes 2126d and 2126c) to cable 2132a and to the source of data 2135. Media wiring 2132d is connected to E-box 2126a and (via E-boxes 2126d, 2126c and 2126b) to cable 2132a and to the source of data 2135. The media cables 2132a, 2132b, 2132c and 2132d can connect to a media content provider server. The E-box may be operatively coupled (e.g., wirelessly and/or wired) to the network that is coupled to at least one controller that controls that facility or any controllable device within the facility. For example, in the event that the hard surface 2121 is a tintable window, any (e.g., all) of the E-box may be operatively coupled to the at least one controller that controls a level of tint of this window, e.g., via the media cables (e.g., 2132a, 2132b, 2132c and/or 2132d) or via dedicated cables (not shown in FIG. 21B).

Figure 22A:
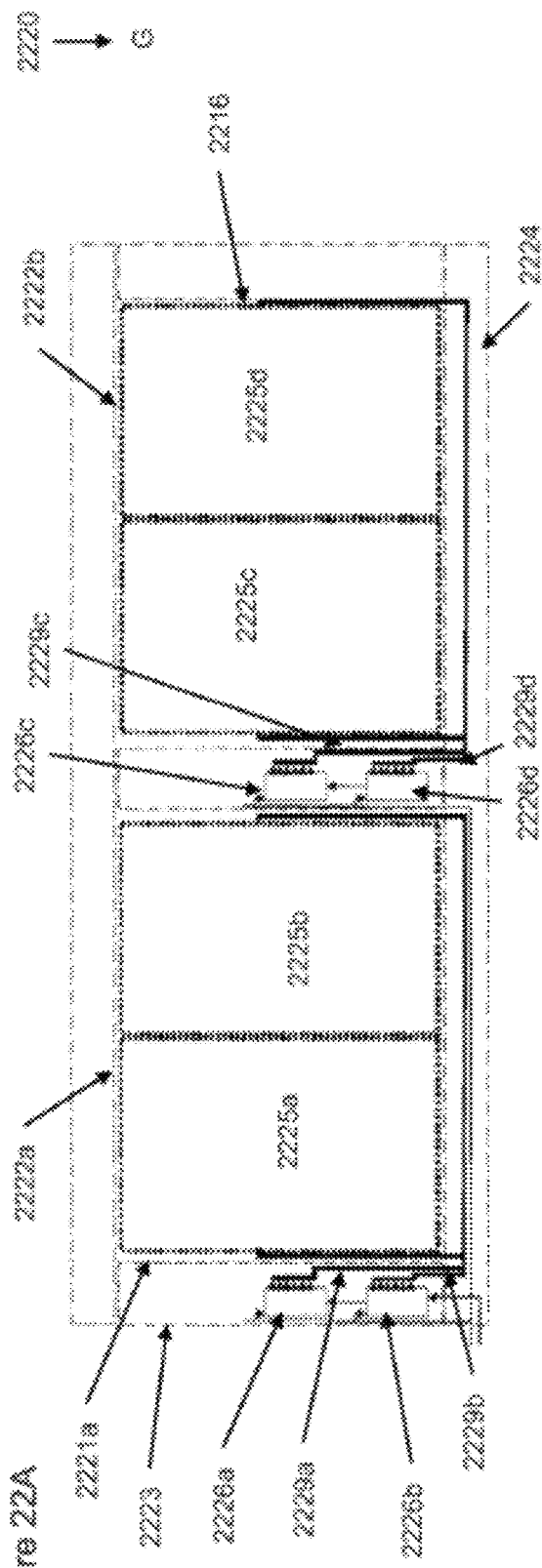
FIGS. 22A-B schematically show various windows and display constructs.

FIG. 22A shows an example of hard surfaces 2221a and 2221b (e.g. tintable windows) mounted (e.g. via a hinge and/or adhesive) within frames 2222a and 2222b. The frames 2222a and 2222b include mullions 2223 that are vertical, and transoms 2224 (sometimes referred to as horizontal mullions). Two display constructs 2225a, 2225b are mounted within frame 2222a, and two display constructs 2225c and 2225d are mounted within the frame 2222b and cover all of the viewable surface of hard surfaces 2221a and 2221b (e.g., viable surface of a board, or of a window such as tintable windows). Four controllers housed within housings (also referred to herein as electrical (E)-boxes) 2226a, 2226b, 2226c and 2226d are mounted in a portion of the frames 2222a and 2222b within the vertical side (relative to the gravitational center towards which vector 2220 is pointing to) mullions 2223. The circuitry in E-Box 2226a (e.g., including timing controller and media related circuitry) is connected via wiring 2229a to display construct 2225a. The circuitry in E-Box 2226b is connected via wiring 2229b to display construct 2225b. The circuitry in E-Box 2226c (e.g., including timing controller, network components and/or media related circuitry) is connected via wiring 2229c to display construct 2225c. The circuitry in E-Box 2226d is connected via wiring 2229d to display construct 2225d. The display connectors 2228a, 2228b, 2228c and 2228d extend from the respective housings 2226a, 2226b, 2226c and 2226d in the same horizontal direction. The connectors 2228a, 2228b, 2228c and 2228d are arranged to point to the same horizontal direction. The cables 2229a, 2229b, 2229c, and 2229d are (e.g., substantially) the same length from each E-box 2226a, 2226b, 2226c and 2226d to the respective display constructs 2225a, 2225b, 2225c and 2225d, and extend within portions of the frames 2222a and 2222b. The E-boxes may be operatively coupled (e.g., wirelessly and/or wired) to the network that is coupled to at least one controller that controls that facility or any controllable device within the facility. For example, in the event that the hard surfaces 2221a and 2221b are one or more tintable windows, any (e.g., all) of the E-boxes may be operatively coupled to the at least one controller that controls a level of tint of these windows.

Figure 22B:
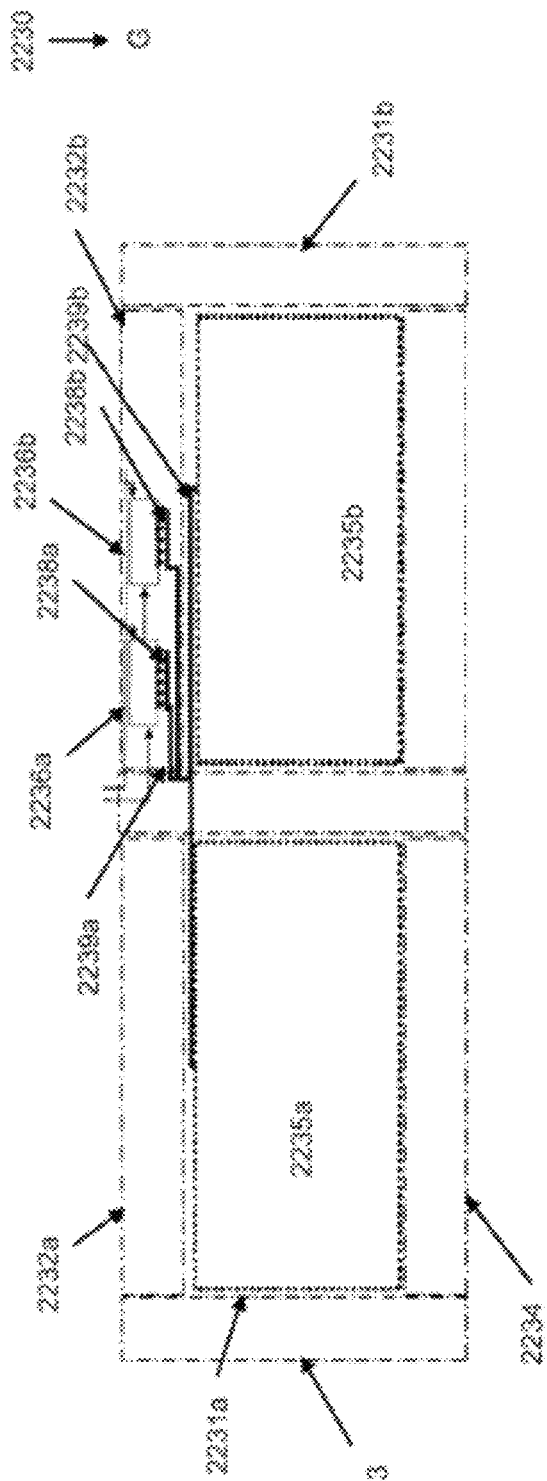

FIG. 22B shows an example of hard surfaces 2231a and 2231b (e.g. tintable windows) mounted (e.g. via a hinge and/or adhesive) within frames 2232a and 2232b. The frames 2232a and 2232b include mullions 2233 that are vertical, and transoms 2234 (sometimes referred to as horizontal mullions). A display construct 2235a is mounted within frame 2232a, and a display construct 2235b is mounted within the frame 2232b and cover all of the viewable surface of hard surfaces 2231a and 2231 b (e.g., viable surface of a board, or of a window such as tintable windows). Two controllers housed within housings (also referred to herein as electrical (E)-boxes) 2236a and 2236b are mounted in a portion of the frames 2232a and 2232b within the upper (relative to the gravitational center towards which vector 2230 is pointing to) transom 2234. The circuitry in E-Box 2236a (e.g., including timing controller, network components and/or media related circuitry) is connected via wiring 2239a to display construct 2235a. The circuitry in E-Box 2236b is connected via wiring 2239b to display construct 2235b. The display connectors 2238a and 2238b extend from the respective housings 2236a and 2236b in the same downward direction. The connectors 2238a and 2238b are arranged to point to the same downward direction. The cables 2239a and 2239b are (e.g., substantially) the same length from each E-box 2236a and 2236b to the respective display constructs 2235a and 2235b, and extend within portions of the frames 2232a and 2232b. The E-boxes may be operatively coupled (e.g., wirelessly and/or wired) to the network that is coupled to at least one controller that controls that facility or any controllable device within the facility. For example, in the event that the hard surfaces 2231a and 2231b are one or more tintable windows, any (e.g., all) of the E-boxes may be operatively coupled to the at least one controller that controls a level of tint of these windows.

FIG. 23 shows an example of hard surfaces 2321a, 2321b and 2321c (e.g. tintable windows) mounted (e.g. via a hinge such as 2370 and/or adhesive) within frames 2322a, 2322b and 2322c. The frames 2322a, 2322b and 2322c include mullion 2323 that is vertical, and transoms 2324 (also referred to as horizontal mullion). Four display constructs 2325a, 2325b, 2325c and 2325d are mounted within frame 2322a, two display constructs 2325e and 2325f are mounted within the frame 2322b, and two display constructs 2325g and 2325h are mounted within frame 2322c and may cover (e.g., substantially) all (or only a portion) of the viewable surface of respective hard surfaces 2321a, 2321b and 2321c (e.g., visible surface of a board, or of a window such as tintable windows). For example, surface 2380 of the tintable window is not covered by a display construct. Four controllers housed within housings (E-boxes) 2326a, 2326b, 2326c and 2326d are mounted in a portion of the frame 2322a within the upper (relative to the gravitational center towards which vector 2320 is pointing to) mullions 2323. The circuitry in E-Box 2326a is connected via wiring 2329a to display construct 2325a. The wiring may be configured to transmit data and/or power (e.g., to the touch screen). The circuitry in E-Box 2326b is connected via wiring 2329b to display construct 2325b. The circuitry in E-Box 2326c is connected via wiring 2329c to display construct 2325c. The circuitry in E-Box 2326d is connected via wiring 2329d to display construct 2325d. The display connectors 2328a, 2328b, 2328c and 2328d extend from the respective housings 2326a, 2326b, 2326c and 2326d in the same downward direction. The connectors 2328a, 2328b, 2328c and 2328d are arranged to point to the same downward direction. The cables 2329a, 2329b, 2329c, and 2329d are (e.g., substantially) the same length from each E-box 2326a, 2326b, 2326c and 2326d to the respective display constructs 2325a, 2325b, 2325c and 2325d, and extend within portions of the frames 2322a. The E-boxes may be operatively coupled (e.g., wirelessly and/or wired) to the network that is coupled to at least one controller that controls that facility or any controllable device within the facility. For example, in the event that the hard surfaces 2321a, 2321b and 2321c are one or more tintable windows, any (e.g., all) of the E-boxes may be operatively coupled to the at least one controller that controls a level of tint of these windows. A controller housed within a housing 2330 is mounted in a portion of the frame 2322b within the upper (relative to the gravitational center towards which vector 2320 is pointing to) mullions 2323. The circuitry in controller 2330 (e.g., including timing controller, network components and/or media related circuitry) is connected via wiring 2329e to display construct 2325e. The circuitry in controller 2330 is connected via wiring 2329f to display construct 2325f. The circuitry in controller 2330 (e.g., including timing controller, network components and/or media related circuitry) is connected via wiring 2329g to display construct 2325g. The circuitry in controller 2330 is connected via wiring 2329h to display construct 2325h. The cables 2329e, 2329f, 2329g, and 2329h are (e.g., substantially) the same length from controller 2330 to the respective display constructs 2325e, 2325f, 2325g and 2325h, and extend within portions of the frames 2322b and 2322c. The controllers 2330 may be operatively coupled (e.g., wirelessly and/or wired) to the network that is coupled to at least one controller that controls that facility or any controllable device within the facility. For example, in the event that the hard surfaces 2321a, 2321 b and 2321c are one or more tintable windows, any (e.g., all) of the controller may be operatively coupled to the at least one controller that controls a level of tint of these windows.

Figure 24:
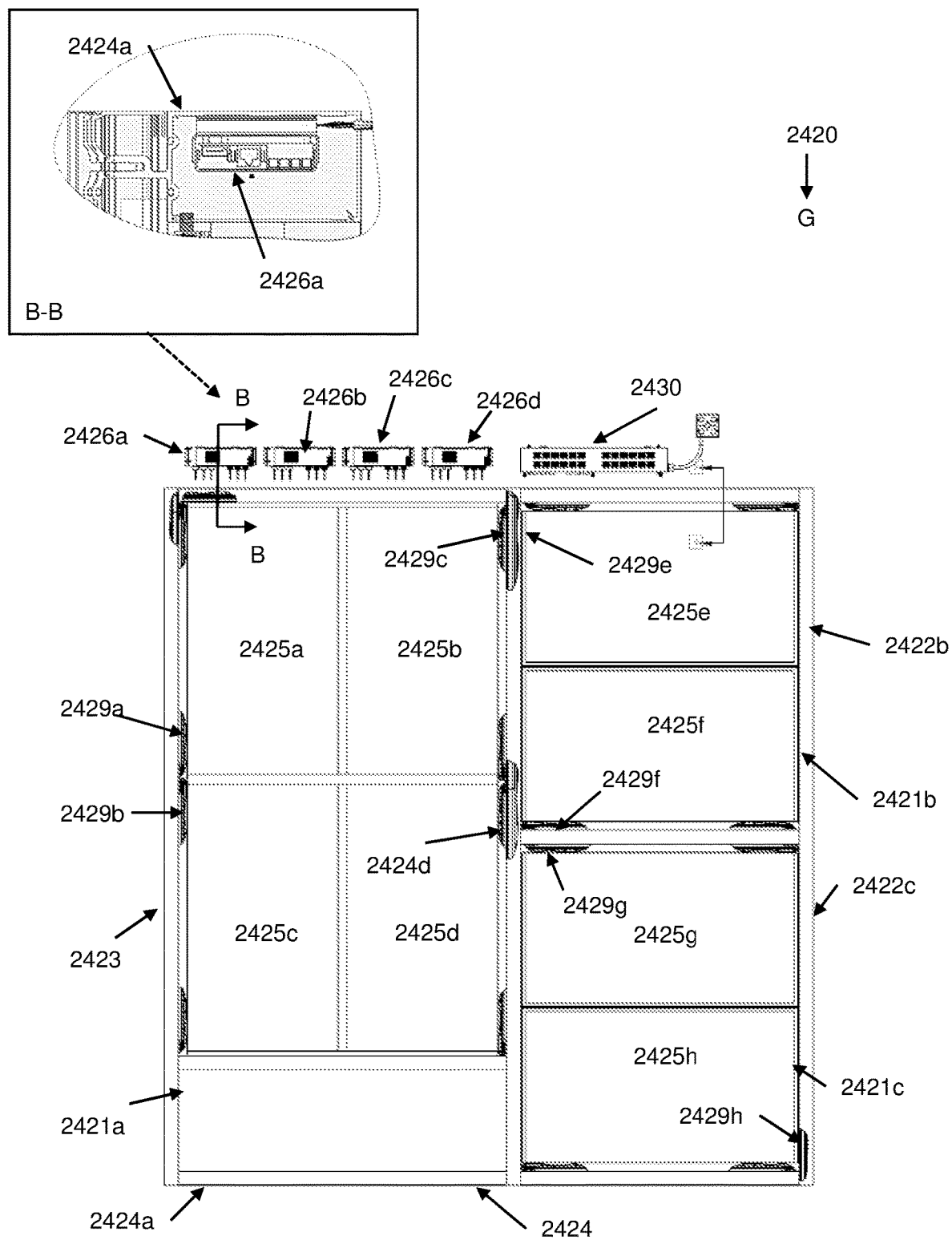
FIG. 24 schematically shows various windows and display constructs.

FIG. 24 shows an example of hard surfaces 2421a, 2421b and 2421c (e.g. tintable windows) mounted (e.g. via a hinge and/or adhesive) within frames 2422a, 2422b and 2422c. The frames 2422a, 2422b and 2422c include mullions 2423 that are vertical, and transoms 2424 (sometimes referred to as horizontal mullions). Four display constructs 2425a, 2425b, 2425c and 2425d are mounted within frame 2422a, two display constructs 2425e and 2425f are mounted within the frame 2422b, and two display constructs 2425g and 2425h are mounted within frame 2422c and may cover all (or only a portion) of the viewable surface of respective hard surfaces 2421a, 2421b and 2421c (e.g., visible surface of a board, or of a window such as tintable windows). Four controllers housed within housings (also referred to herein as electrical (E)-boxes) 2426a, 2426b, 2426c and 2426d are mounted in a portion of the frame 2422a within the upper (relative to the gravitational center towards which vector 2420 is pointing to) mullions 2423. The circuitry in E-Box 2426a (e.g., including timing controller, network components and/or media related circuitry) is connected via wiring 2429a to display construct 2425a. The circuitry in E-Box 2426b is connected via wiring 2429b to display construct 2425b. The circuitry in E-Box 2426c (e.g., including timing controller, network components and/or media related circuitry) is connected via wiring 2429c to display construct 2425c. The circuitry in E-Box 2426d is connected via wiring 2429d to display construct 2425d. The cables 2429a, 2429b, 2429c, and 2429d are (e.g., substantially) the same length from each E-box 2426a, 2426b, 2426c and 2426d to the respective display constructs 2425*a*, 2425*b*, 2425*c* and 2425*d*, and extend within portions of the frames 2422*a*. The E-boxes may be operatively coupled (e.g., wirelessly and/or wired) to the network that is coupled to at least one controller that controls that facility or any controllable device within the facility. For example, in the event that the hard surfaces 2421*a*, 2421*b* and 2421*c* are one or more tintable windows, any (e.g., all) of the E-boxes may be operatively coupled to the at least one controller that controls a level of tint of these windows. A controller housed within a housing 2430 is mounted in a portion of the frame 2422*b* within the upper (relative to the gravitational center towards which vector 2420 is pointing to) mullions 2423. The circuitry in controller 2430 (e.g., including timing controller, network components and/or media related circuitry) is connected via wiring 2429*e* to display construct 2425*e*. The circuitry in controller 2430 is connected via wiring 2429*f* to display construct 2425*f*. The circuitry in controller 2430 (e.g., including timing controller, network components and/or media related circuitry) is connected via wiring 2429*g* to display construct 2425*g*. The circuitry in controller 2430 is connected via wiring 2429*h* to display construct 2425*h*. The cables 2429*e*, 2429*f*, 2429*g*, and 2429*h* are (e.g., substantially) the same length from controller 2430 to the respective display constructs 2425*e*, 2425*f*, 2425*g* and 2425*h*, and extend within portions of the frames 2422*b* and 2422*c*. The controllers 2430 may be operatively coupled (e.g., wirelessly and/or wired) to the network that is coupled to at least one controller that controls that facility or any controllable device within the facility. For example, in the event that the hard surfaces 2421*a*, 2421*b* and 2421*c* are one or more tintable windows, any (e.g., all) of the controller may be operatively coupled to the at least one controller that controls a level of tint of these windows.

Figure 25:
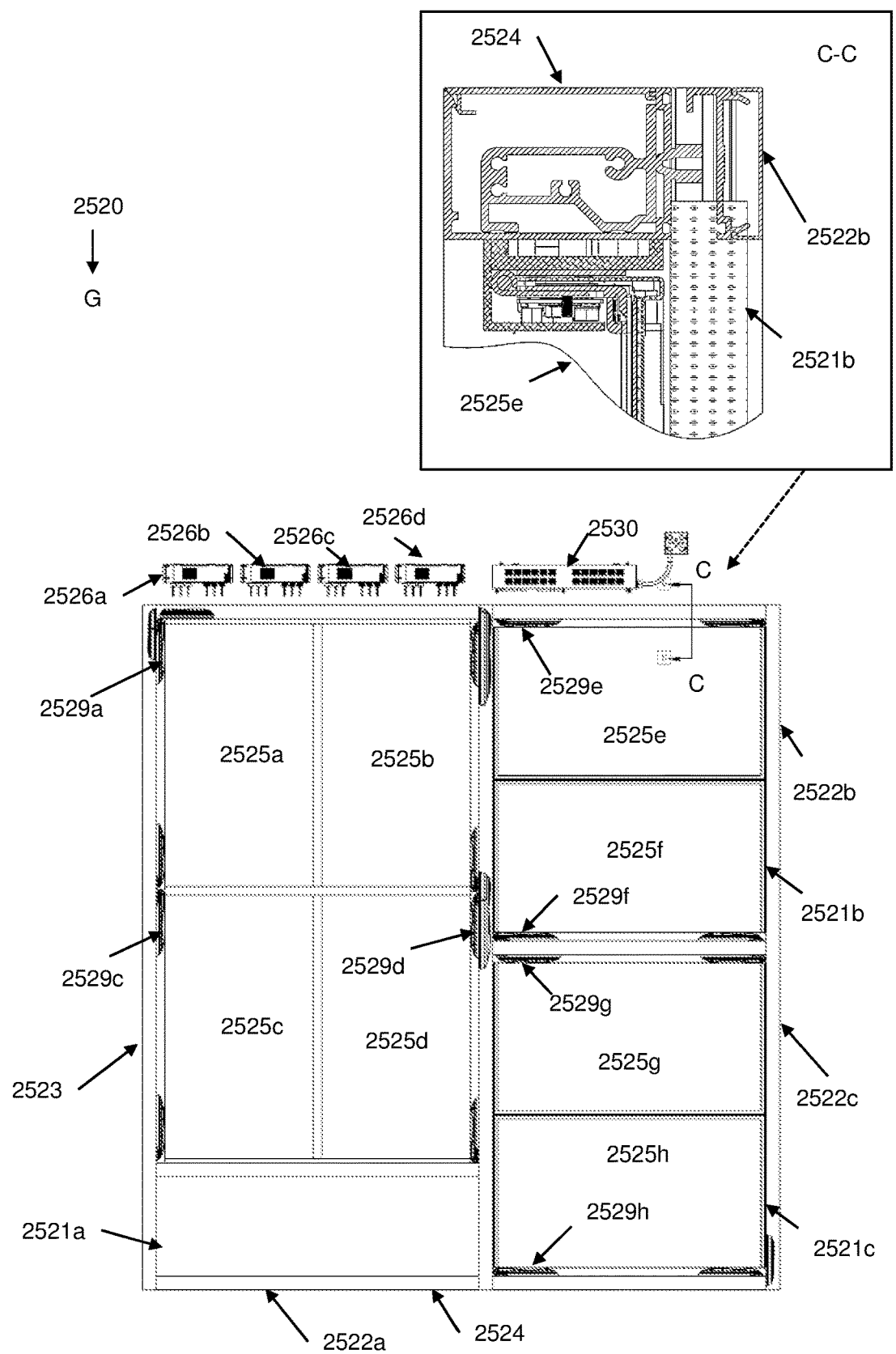
FIG. 25 schematically shows various windows and display constructs.

FIG. 25 shows an example of hard surfaces 2521*a*, 2521*b* and 2521*c* (e.g. tintable windows) mounted (e.g. via a hinge and/or adhesive) within frames 2522*a*, 2522*b* and 2522*c*. The frames 2522*a*, 2522*b* and 2522*c* include mullions 2523 that are vertical, and transoms 2524 (sometimes referred to as horizontal mullions). Four display constructs 2525*a*, 2525*b*, 2525*c* and 2525*d* are mounted within frame 2522*a*, two display constructs 2525*e* and 2525*f* are mounted within the frame 2522*b*, and two display constructs 2525*g* and 2525*h* are mounted within frame 2522*c* and may cover all (or only a portion) of the viewable surface of respective hard surfaces 2521*a*, 2521*b* and 2521*c* (e.g., visible surface of a board, or of a window such as tintable windows). Four controllers housed within housings (also referred to herein as electrical (E)-boxes) 2526*a*, 2526*b*, 2526*c* and 2526*d* are mounted in a portion of the frame 2522*a* within the upper (relative to the gravitational center towards which vector 2520 is pointing to) mullions 2523. The circuitry in E-Box 2526*a* (e.g., including timing controller, network components and/or media related circuitry) is connected via wiring 2529*a* to display construct 2525*a*. The circuitry in E-Box 2526*b* is connected via wiring 2529*b* to display construct 2525*b*. The circuitry in E-Box 2526*c* (e.g., including timing controller, network components and/or media related circuitry) is connected via wiring 2529*c* to display construct 2525*c*. The circuitry in E-Box 2526*d* is connected via wiring 2529*d* to display construct 2525*d*. The cables 2529*a*, 2529*b*, 2529*c*, and 2529*d* are (e.g., substantially) the same length from each E-box 2526*a*, 2526*b*, 2526*c* and 2526*d* to the respective display constructs 2525*a*, 2525*b*, 2525*c* and 2525*d*, and extend within portions of the frames 2522*a*. The E-boxes may be operatively coupled (e.g., wirelessly and/or wired) to the network that is coupled to at least one controller that controls that facility or any controllable device within the facility. For example, in the event that the hard surfaces 2521*a*, 2521*b* and 2521*c* are one or more tintable windows, any (e.g., all) of the E-boxes may be operatively coupled to the at least one controller that controls a level of tint of these windows. A controller housed within a housing 2530 is mounted in a portion of the frame 2522*b* within the upper (relative to the gravitational center towards which vector 2520 is pointing to) mullions 2523. The circuitry in controller 2530 (e.g., including timing controller, network components and/or media related circuitry) is connected via wiring 2529*e* to display construct 2525*e*. The circuitry in controller 2530 is connected via wiring 2529*f* to display construct 2525*f*. The circuitry in controller 2530 (e.g., including timing controller, network components and/or media related circuitry) is connected via wiring 2529*g* to display construct 2525*g*. The circuitry in controller 2530 is connected via wiring 2529*h* to display construct 2525*h*. The cables 2529*e*, 2529*f*, 2529*g*, and 2529*h* are (e.g., substantially) the same length from controller 2530 to the respective display constructs 2525*e*, 2525*f*, 2525*g* and 2525*h*, and extend within portions of the frames 2522*b* and 2522*c*. The controllers 2530 may be operatively coupled (e.g., wirelessly and/or wired) to the network that is coupled to at least one controller that controls that facility or any controllable device within the facility. For example, in the event that the hard surfaces 2521*a*, 2521*b* and 2521*c* are one or more tintable windows, any (e.g., all) of the controller may be operatively coupled to the at least one controller that controls a level of tint of these windows.

In some embodiments, one or more controllers in housings ((E)-boxes) provides functionality to one or more display constructs. The E-box may have a cover bracket that may be secured to a mounting bracket. The cover bracket and mounting bracket may mount within a portion of a window frame and/or to other structure. The E box may have a length, width, and height. The length of the E-box may be at most 15 inch ("), 14", 13", 12", 11", or 10". The length of the E-box may have any value between the aforementioned values (e.g., between about 15" and 10", e.g., about 12.5". The width of the E-box may be at most 5 inch ("), 4", 3.5", 3", 2.5", 2", or 1.5". The width of the E-box may have any value between the aforementioned values (e.g., between about 5" and 1.5", e.g., about 3.75". The height of the E-box may be at most 3", 2.5", 2", 1.5", or 1". The height of the E-box may have any value between the aforementioned values (e.g., between about 3" and 1", e.g., 1.75". The E-box may include an analog-to-digital converter circuit board, which may mount to one or both of the cover bracket and mounting bracket. The circuit board may include terminals for connecting to a power supply (e.g., AC or DC electrical source) via cables, which provide electric power to the E-box, the circuit board may include at least one data input connector(s) (e.g., Display port, HDMI, Ethernet or other type of connector for data transmission), which may receive data for display on an associated display construct, and may include at least one E-box connector(s) (e.g., Display port, HDMI, Ethernet or other type of connector for data transmission), which may transmit data to another E-box. The E-box may include a controller board, which may operatively engage the circuit board. The controller board may include a timing controller, network components, and/or media related circuitry. The timing controller may be employed for precise coordination of the timing altering various positions (e.g., LEDs) in the display construct. The controller board may include connectors that connect to cabling, which may connect to a display construct. The cabling may transmit data between the E-box and the display construct. The connectors from the e-box to the display construction (e.g., transmitting power and/or data) may extend in the same direction from the E-box or may extend from the E-box in different directions. For example, all power connectors from the E-box to the display construct may extend to the same direction and emerge from the same side of the E-box and/or PCB disposed therein. For example, all communication connectors from the E-box to the display construct may extend to the same direction and emerge from the same side of the E-box and/or PCB disposed therein. The power connectors supplying power from the PCB of the E-box to the display construct may reside on the same PCB side as the data connectors from the PCB of the E-box to the display construct (e.g., and extend to the same direction, e.g., towards the display construct and away from the E-box). The connectors of data and/or power between the E-box and the display construct, may reside in the E-box at a first side that has an angle (is perpendicular) to a second side of that E-Box in which the connectors for the incoming power supply cables reside. The connectors of data and/or power between the E-box and the display construct, may reside in the E-box at a first side that has an angle (is perpendicular) to a third side of that E-Box in which the connectors for the incoming data and/or media communication cables reside. The connector for (i) incoming power supply, (ii) incoming data (e.g., media) communication, and (iii) power and/or data to the display construct reside, may or may not reside on one PCB. The E-box may be operatively coupled (e.g., wirelessly and/or wired) to the network that is coupled to at least one controller that controls a facility or any controllable device within the facility. The E-box may have a unique network identifier (ID), e.g., for communication with the at least one controller that controls the facility.

In some embodiments, a plurality of cabling extends from the E-box to the display construct. The cabling is connected via connectors to the circuitry in the E-box. The circuitry can be in one or more printed circuit boards (PCBs). The cabling may be connector to the circuit boar via connectors. The connectors may connect a plurality of wires bundled into a cable. The number of connectors may be at least 2, 4, 6, or 8. The number of connectors may be an even number. The cabling may have the same of different functionality. The functionality can include transmission of data and/or transmission of electricity (e.g., electrical power). For example, a connector may connect cabling that transmits data from the PCB to the display construct. For example, a connector may connect cabling that transmits electricity from the PCB to the display construct. The connectors may form two groups of connectors. The members of the connector groups may be identical or different. For example, a connector group may comprise a data connector and a power connector. Respective arrangement of the connector types in the groups of connectors may follow a mirror symmetry, inversion symmetry, and/or rotational (e.g., C$_2$) symmetry. The mirror, rotational axis, and/or inversion point for the applicable symmetry operation may be disposed between the two connector groups.

Figure 26:
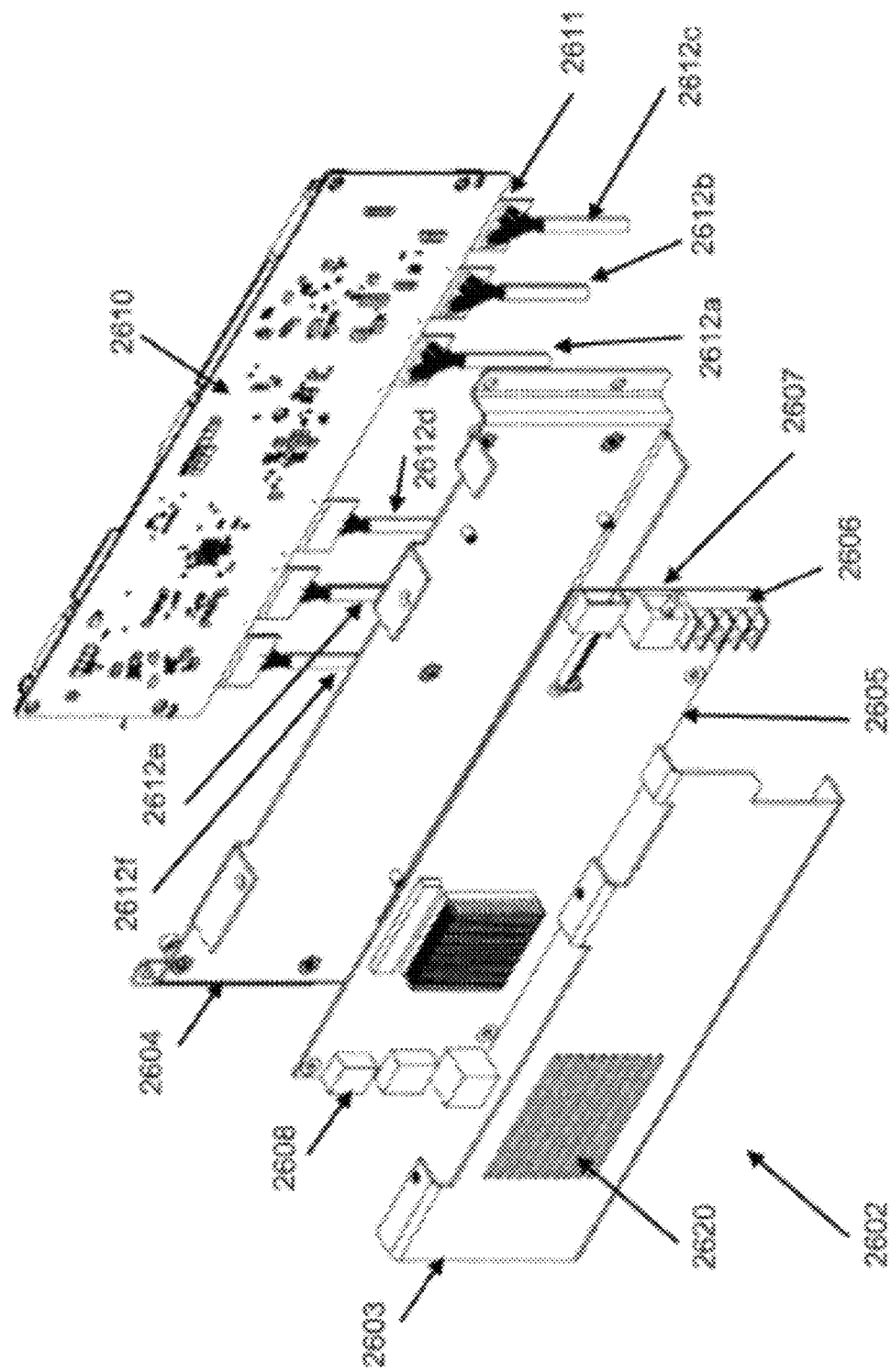
FIG. 26 schematically shows a disassembled (e.g., exploded) view of a box comprising circuitry.

FIG. 26 shows an exploded view of an example of a controller in a housing (E-box) 2602. The E-box 2602 has a cover bracket 2603 that is secured to a mounting bracket 2604. The cover bracket 2603 has a plurality of slits 2620 (e.g., for ventilation and/or heat exchange). The cover bracket 2602 and mounting bracket 2604 may mount within a portion of a window frame (not shown in this figure) or to other structure (e.g., fixture). The E-box 2602 includes an analog-to-digital converter circuit board 2605, which may mount to one or both of the cover bracket 2603 and the mounting bracket 2604. The circuit board 2605 may include terminals 2606 for connecting to (e.g., AC) power supply cables, which provide electric power to the E-box 2602, at least one data input connector(s) (e.g., Display port, HDMI, Ethernet or other type of connector for data transmission) 2607, which may receive data for display on an associated display construct, and at least one E-box connector(s) (e.g., Display port, HDMI, Ethernet or other type of connector for data transmission) 2608, which may transmit data to another E-box. The E-box 2602 includes a controller board 2610, which operatively engages the circuit board 2605. The controller board 2610 may include a timing controller and/or media related circuitry. The timing controller may be employed for (e.g., precise) coordination of the timing altering various positions (e.g., LEDs) of the display construct. The circuit board (e.g., controller board) 2610 includes connectors (e.g., 2611) that connect to cabling 2612a-f, which connects to a display construct. The cabling 2612a-f may transmit data and/or power between the E-box 2602 and the display construct. For example, some of the cabling 2612a-f can transmit data and some of the cabling can transmit power. For example, the two outer most cabling 2612c and 2612f can transmit power, and the four inner cabling 2612e, 2612d, 2612a, and 2612b can transmit data. For example, the two inner most cabling 2612d and 2612a can transmit power, and the four outer cabling 2612e, 2612f, 2612c, and 2612b can transmit data. For example, the two intermediate cabling 26123 and 2612b can transmit power, and the four other cabling 2612d, 2612f, 2612c, and 2612a can transmit data. Two of the cabling 2612a-f can transit power and four of the cabling 2612a-f can transmit data. The connectors may extend in the same direction from the E-box or may extend from the E-box in different directions. In the example shown in FIG. 26, the connectors 2611 extend in the same direction from the E-box 2602. The connectors may extend from the E-box at a right angle from the direction that the (e.g., AC) power supply cables extend or may extend at any other angle from the direction that the power supply cables extend. The E-box may be operatively coupled (e.g., wirelessly and/or wired) to the network that is coupled to at least one controller that controls a facility or any controllable device within the facility. The E-box may have a unique network ID for communication with the at least one controller that controls the facility.

Figure 27A:
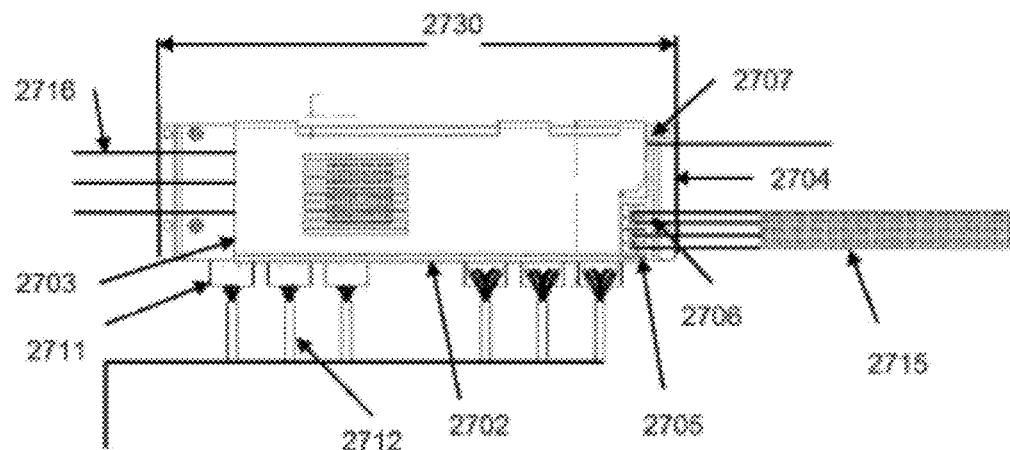
FIGS. 27A-B schematically show various views of a box comprising circuitry.
Figure 27B:
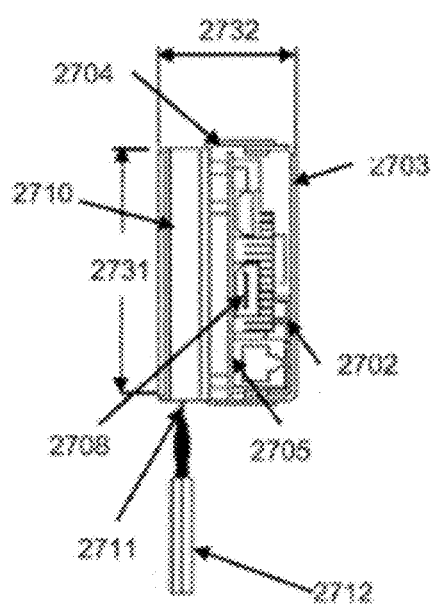

FIGS. 27A and 27B show various views of an assembled E-box 2702 shown in FIG. 26 as an exploded view. The E-box 2702 has a cover bracket 2703 that is secured to a mounting bracket 2704. The cover bracket 2702 and mounting bracket 2704 may mount within a portion of a window frame (not shown in this figure) or to other structure. The E-box 2702 may have dimensions (e.g., as disclosed herein) for fitting within a structure (e.g., a length 2730, a width 2731, and a thickness 2732). The structure may be any structure disclosed herein. The E-box 2702 includes a (e.g., an analog-to-digital converter) circuit board 2705, which may mount to one or both of the cover bracket 2703 and the mounting bracket 2704. The circuit board 2705 includes terminals 2706 for connecting to (e.g., AC) power supply cables 2715, which provide electric power to the E-box 2702, at least one data input connector(s) (e.g., Display port, HDMI, Ethernet or other type of connector for data transmission) 2707, which may receive data for display on an associated display construct, and at least one E-box connector(s) (e.g., Display port, HDMI, Ethernet or other type of connector for data transmission) 2708, which transmit data via cables 2716, e.g., to another E-box or to the network. The E-box 2702 includes a controller board 2710, which operatively engages the circuit board 2705. The controller board 2710 may include a timing controller and media related circuitry. The timing controller may be employed for precise coordination of the timing altering various positions (e.g., LEDs) in the display construct. The controller board 2710 includes connectors 2711 that connect to cabling 2712, which connects to a display construct. The cabling 2712 may transmit data and/or power between the E-box 2702 and the display construct. The connectors 2711 extend in the same direction from the E-box 2702.

Figure 32:
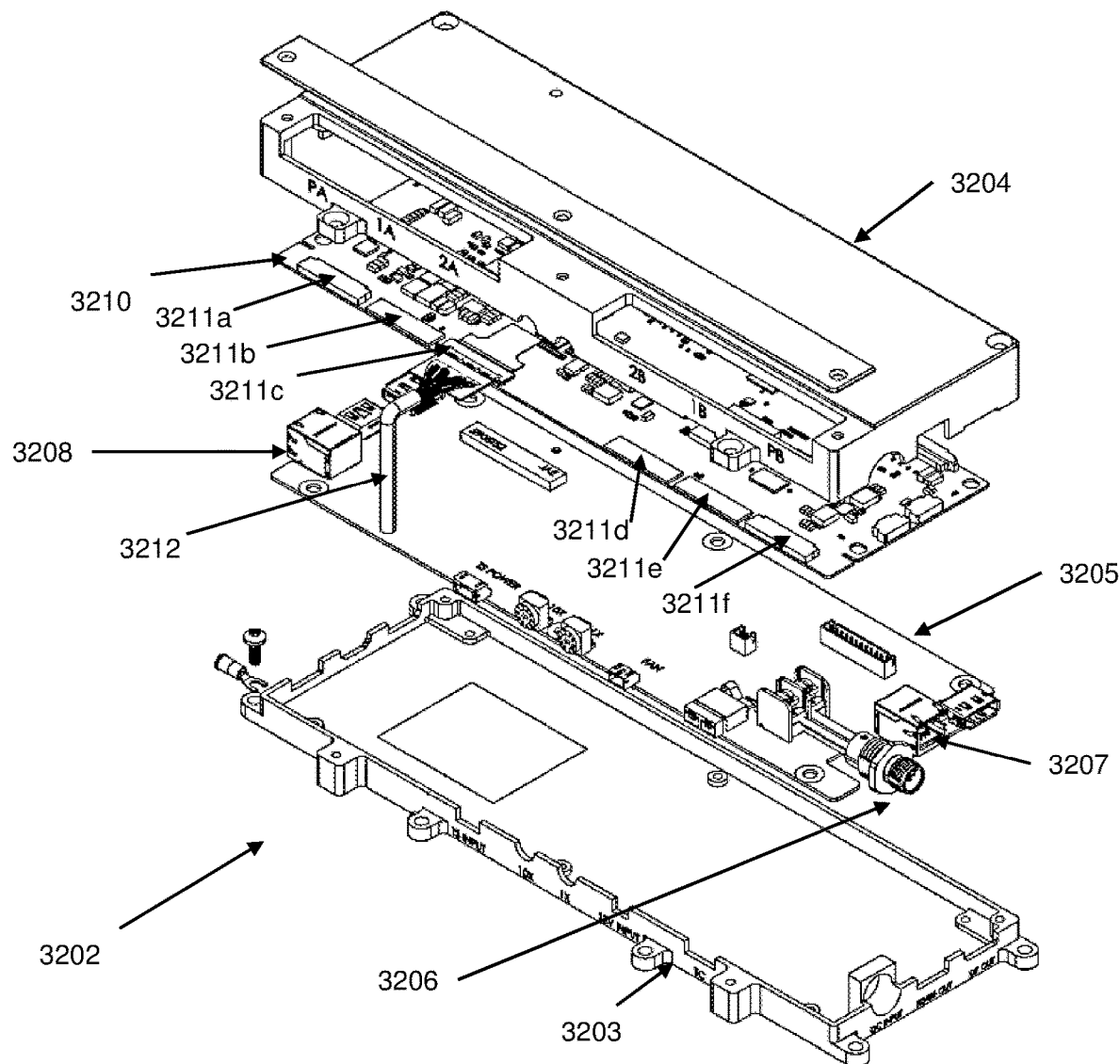
FIG. 32 schematically shows a disassembled (e.g., exploded view) of a box comprising circuitry.
Figure 33C:
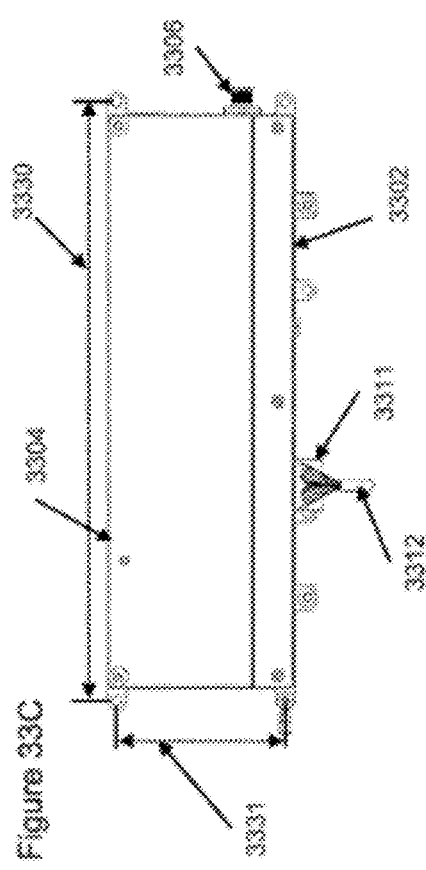
FIGS. 33A-D schematically show various views of a box comprising circuitry.
Figure 33D:
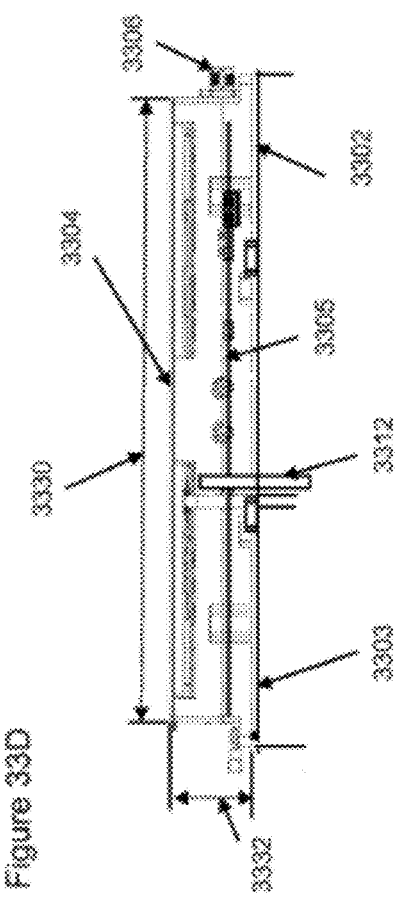
Figure 33A:
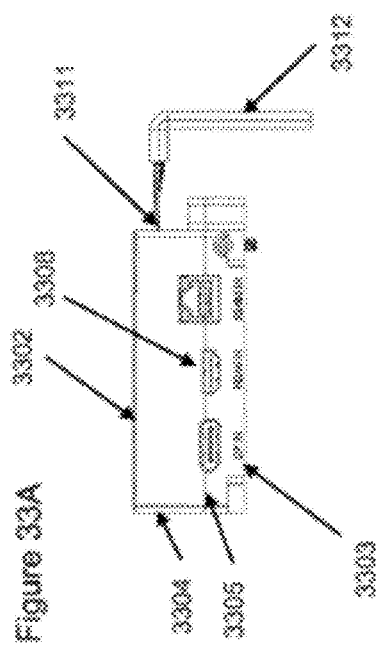
Figure 33B:
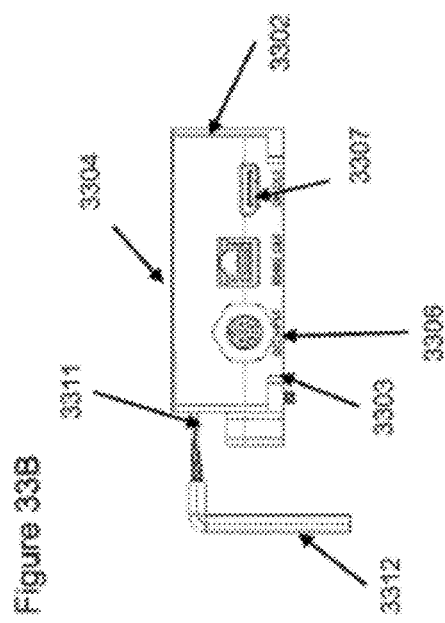
Figure 34C:
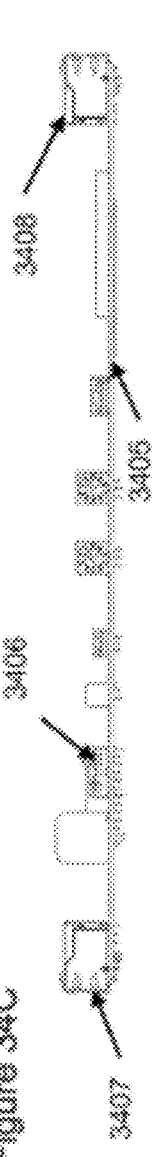
FIGS. 34A-E schematically show various views of a box comprising circuitry.
Figure 34D:
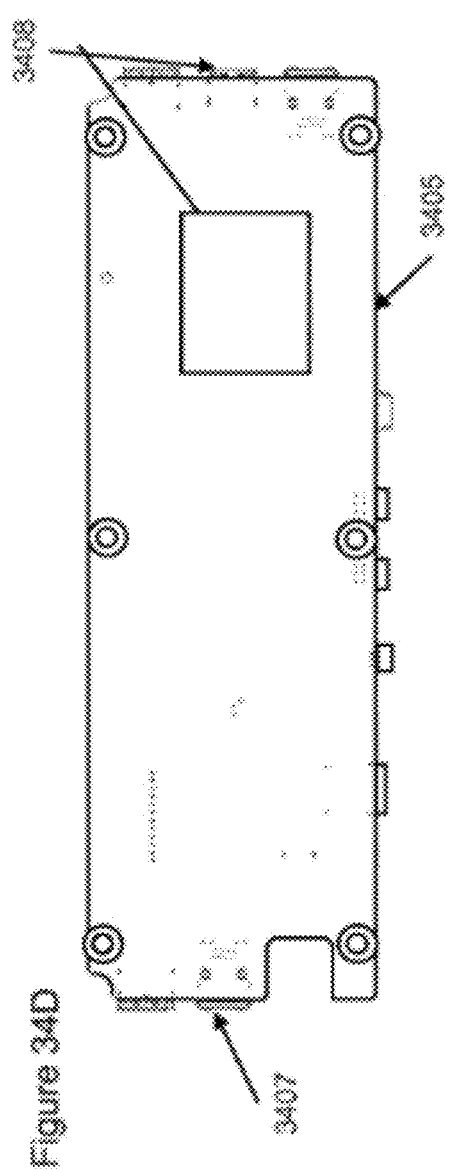
Figure 34E:
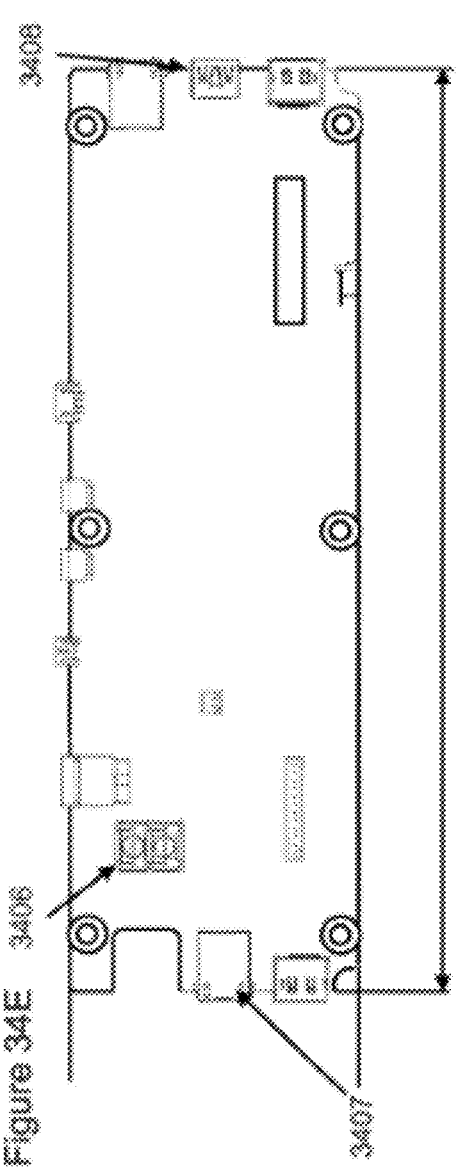
Figure 34A:
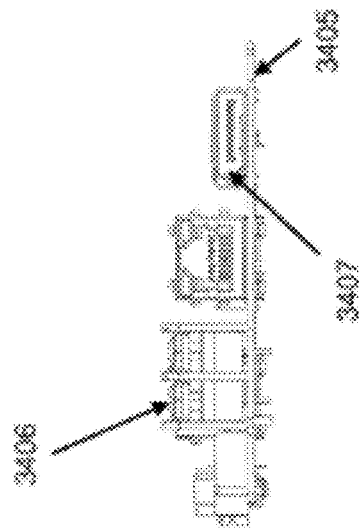
Figure 34B:
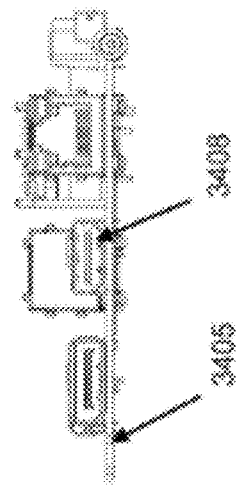

FIG. 32 shows an example of an exploded view of an E-box 3202. The E-box 3202 has a cover bracket 3203 that is secured to a mounting bracket 3204. The cover bracket 3202 and mounting bracket 3204 may mount within a portion of a structure such as a fixture, e.g., a window frame (not shown in this figure). The E-box 3202 may have dimensions consistent with fitting the E-box 3202 into a portion of the structure or may have other dimensions that are larger or smaller than these dimensions (e.g., as disclosed herein). The E-box 3202 includes a (e.g., an analog-to-digital converter) circuit board 3205, which may mount to one or both of the cover bracket 3203 and the mounting bracket 3204. The circuit board 3205 may include one or more terminal(s) 3206 for connecting to (e.g., AC) power supply cable(s), which provide electric power to the E-box 3202 (e.g., via a coaxial cable), at least one data input connector(s) (e.g., Display port, HDMI, Ethernet and/or other type of connector for data transmission) 3207, which may receive data for display on an associated display construct, and at least one E-box connector (e.g., Display port, HDMI, Ethernet and/or other type of connector for data transmission) 3208, which may transmit data to another E-box and/or to the network. The E-box 3202 includes a (e.g., controller) circuit board 3210, which operatively engages the circuit board 3205. The circuit board 3210 may include a timing controller, network components, and/or media related circuitry. The timing controller may be employed for precise coordination of the timing altering various positions (e.g., LEDs) in the display construct. The circuit board 3210 includes connectors 3211a-f that connect to cabling (e.g., 3212), which connect in turn to a display construct. The cabling 3212 may transmit data and/or power between the E-box 3202 and the display construct. The E-box 3202 may be operatively coupled (e.g., wirelessly and/or wired) to the network that is coupled to at least one controller that controls a facility or any controllable device of the facility. The E-box 3202 may have a unique network ID for communication with the at least one controller that controls the facility.

FIGS. 33A through 33D show various views of an E-box. The E-box 3302 has a cover bracket 3303 that is secured to a mounting bracket 3304. The cover bracket 3303 and mounting bracket 3304 may mount within a structure or a portion of the structure (e.g., a fixture such as a window frame (not shown in this figure)). The E-box 3302 may have dimensions for mounting within the structure (e.g., having a length 3330, a width 3331, and a thickness 3332), e.g., any dimensions disclosed herein. The E-box 3302 includes a (e.g., an analog-to-digital converter) first circuit board, which may mount to one or both of the cover bracket 3303 and the mounting bracket 3304. The first circuit board includes one or more terminal(s) (e.g., 3306) for connecting to (e.g., AC) power supply cables (e.g., comprising coaxial cable or twisted wire), which provide electric power to the E-box 3302; one or more data input connector(s) (e.g., Display port, HDMI, Ethernet and/or other type of connector for data transmission) 3307, which may receive data for display on an associated display construct, and one or more E-box connector(s) (e.g., Display port, HDMI, Ethernet and/or other type of connector for data transmission) 3308, which may transmit data to another E-box. The E-box 3302 includes a second (e.g., controller) circuit board 3305, which operatively engages the first circuit board. In some embodiments, the first circuit board and the second circuit board are one circuit board (e.g. and reside on the same or on different sides of the circuit board). In some embodiments, the first circuit board and the second circuit board are separate circuit boards, that are separated by a distance that facilitates heat exchange and/or shielding (e.g., electronic and/or electro-magnetic (e.g., radio frequency) shielding). The heat exchanger and/or shield may comprise elemental metal or metal alloy. The heat exchanger may exchange heat passively and/or actively. The heat exchanger may comprise a heat pipe, a slab, or a mesh. The heat exchanger may comprise a heat sink. The second circuit board 3305 may include a timing controller, network components, and/or media related circuitry. The timing controller may be employed for precise coordination of the timing altering various positions (e.g., LEDs) in the display construct. In the example shown in FIGS. 33A-D, the second circuit board includes one or more connector(s) 3311 that connect to cabling 3312, which in turn connects to a display construct. The cabling 3312 may transmit data and/or power between the E-box 3302 and the display construct. There may be additional cabling connecting the E-box with the display construct (not shown). The E-box 3302 may be operatively coupled (e.g., wirelessly and/or wired) to the network that is coupled to at least one controller that controls a facility or any controllable device within the facility. The E-box 3302 may have a unique network ID for communication with the at least one controller that controls the facility.

FIG. 34A through 34E show various view examples of circuit board 3405, which may mount to within an E-box. The circuit board 3405 may include one or more terminal(s) 3406 for connecting to AC power supply cable(s), which provide electric power to the circuit board 3405, at least one data input connector(s) (e.g., Display port, HDMI, Ethernet and/or other type of connector for data transmission) 3407, which may receive data for display on an associated display construct, and at least one E-box connector(s) (e.g., Display port, HDMI, Ethernet and/or other type of connector for data transmission) 3408, which may transmit data to another E-box. The circuit board 3405 may operatively engage a controller board, which may include a timing controller and media related circuitry, and connectors that connect to cabling, which connects to a display construct.

In some embodiments, certain apparatus, non-transitory computer readable media, and/or methods described herein comprise techniques that pass gas (e.g., air) over at least one lite of a tintable window. The tintable window may comprise an insulated glass unit, e.g., a tinted electrochromic coated lite of an IGU. Passing of the gas (e.g., air) may be in order to remove heat and/or lessen the heat load on the lite, e.g., and any optically switchable device (e.g., electrochromic coating) on the substrate of the lite, and/or other components (e.g., display construct). Passing the gas (e.g., air) may be for removal of heat via, e.g., convection. The heat may be removed via conduction and/or radiation. In some embodiments, gas that has been heated by and/or through the IGU lite may be passed such as by pumping, pushing and/or suction. The flow of gas may be to the internal environment of the facility and/or to the exterior of the facility (e.g., building) having the IGU lite. For example, the heated gas may be used to warm the interior of the facility. In some embodiments, the heated gas may be used to drive a turbine to generate electricity. The electricity thus generated may be stored in a battery on the forced air window assembly.

In some embodiments, a forced gas tintable (e.g., electrochromic) window may comprise two or more vent modules in communication with an interior space between an electrochromic lite of an IGU subassembly and a third lite. In some cases, one or more of these vent modules may comprise one or more air movement devices, e.g., one or more fans, for actively moving the gas (e.g., air) through the interior space between an electrochromic lite and a third lite. In one case, the one or more air movement devices (e.g., fans) may comprise one of a blade fan, a bladeless fan, or an air pump. In some cases, one or more air movement devices from the structure and outside the forced air tintable window may be configured to feed air into one or more of the vent modules or output air from one or more of the vent modules. In certain embodiments, the vented air may be used to generate electricity by turning a turbine connected to a generator. The generated electricity may be stored in a battery, e.g. in one of the venting modules. Examples of forced air tintable windows, their usage, and control thereof can be found in PCT/US15/14453 (WO 2015/120045A1), filed on Feb. 4, 2015, titled "Forced Air Smart Windows," which is incorporated herein by reference in its entirety.

FIG. 28 shows an example of a display construct 2801 coupled to a fastener 2802, which display construct is framed by sensor and emitter panels, e.g., 2803. The display construct is coupled (e.g., via wiring and/or cabling not shown in FIG. 28) to an E-box 2811 and to a power source 2810. The E-box and the power source can be disposed adjacent to the display construct, or further away, e.g., as disposed herein (e.g., in a fixture cavity such as in window frame, or in a wall cavity). The fastener 2802 includes a hinge having a first leaf 2821 comprising a bracket, and a second leaf 2822, coupled by a knuckles and pintle arrangement. The fastener 2802 includes a gas guide 2823 (partial view shown) that facilitates directional flow of gas through a set of fans 2805 coupled to respective holes in leaf portion 2821 (partial view shown). The gas directing components is configured to attach a circuit board 2830 having connectors 2831 that connect the circuit board to the display construct 2801. The circuit board may comprise a controller and/or a driver board.

In some embodiments, a display construct includes touch screen functionality. In some embodiments, a plurality of display constructs may be arranged adjacent to each other (e.g., to form a display wall such as a video wall). The display constructs may be arranged in a matrix (also called herein group or set of display constructs). There may be a gap between two immediately adjacent display constructs. Immediately adjacent display constructs exclude another display construct therebetween. The gap may be masked or unmasked. The gap masking may comprise a flexible filler such as a transparent polymer and/or resin. The flexible filler may comprise a carbon-based or a silicon-based polymer or resin. The filler may comprise an optical grade material. The filler may polymerize and/or cure by mixing at least two components. At least one of the at least two component and/or the filler may have a viscosity of at least about 400 millipascals second (mPa*s), 1000 mPa*s, 2000 mPa*s, 3000 mPa*s, 5000 mPa*s, 6000 mPa*s, 7000 mPa*s, 8000 mPa*s, 9000 mPa*s, 10000 mPa*s, 25000 mPa*s, or 50000 mPa*s. The density of the filler may be at least about 0.9 grams per centimeter cubed (g/cm$^3$), 0.95 g/cm$^3$, 0.97 g/cm$^3$, 0.98 g/cm$^3$, or 0.99 g/cm$^3$. The filler may have low shrinkage after curing (e.g., shrinkage of at most about 0.2%, 0.1%, or 0.5% volume per volume after curing relative to before curing). The filler may have a dielectric constant of at most about 2.5, 2.6, 2.7, 2.8, or 2.9. The filler may have a dielectric constant between any of the aforementioned dielectric constants (e.g., from 2.5 to 2.9, or from 2.7 to 2.8). The filler may be optically clear (e.g., to an average human). The filler may have a pulls strength of at least 2 Kilogram force per centimeter squared (Kgf/cm$^2$), 2.2 Kgf/cm$^2$, 2.5 Kgf/cm$^2$, 3 Kgf/cm$^2$, 3.5 Kgf/cm$^2$, 4.0 Kgf/cm$^2$, 4.5 Kgf/cm$^2$, 5.0 Kgf/cm$^2$ 5.5 Kgf/cm$^2$, or 6 Kgf/cm$^2$. The filler may have a transmittance of at least about 98%, 98.5, 99%, 99.2%, 99.4%, or 99.5% of the (e.g., visible) light. The filler may have a refractive index of at most about 1.9, 1.7, 1.6, 1.5, 1.4, or 1.3, e.g., at 25° C., at 23° C., or at 20° C. For example, the filler may be a Wacker Lumisil® (WL) filler (e.g., of the WL 100, 200, or 300 series). The flexible filler may be configured to allow for expansion and/or contraction of the displays (e.g., due to temperature change). The flexible filler may be configured to bind the immediately adjacent display to each other and/or to a structure. The structure may be a tintable window, board, or wall. A mounting bracket and/or hinge may be secured to the display construct and may mount to a structure. The structure may comprise a frame or wall portion. The structure may comprise a fixture. The frame may comprise a vertical mullion and a horizontal mullion (transom). The fixture (e.g., frame) may be mounted (e.g., bonded, fastened and/or by other attachment means) to various surfaces (e.g., a wall, a board, glass internal to a facility and/or other mounting location). In some embodiments, the display construct may be directly attached to the structure (e.g., tintable window). Direct attachment may be using the polymer and/or resin. Direct attachment may be using bonding. The bonding may utilize an adhesive polymer and/or resin (e.g., as disclosed herein). The bonding material may have a state in which it is more malleable than the other (e.g., rigid) state. The rigid state may be prevalent at ambient conditions. The malleable state may be in specific controllable conditions that differ from ambient conditions. The change between malleable and rigid states may be triggered by external stimulus (e.g., heat, magnetic field, electric field, and/or chemical stimulus). For example, the filler (e.g., adhesive polymer and/or resin) may be heat sensitive. For example, the filler may be more malleable in a non-ambient condition (e.g., in a heated environment), e.g., and facilitates detachment of the display construct(s) from their supporting structure (e.g., for maintenance or exchange). Division between the display constructs and/or touch screens in the set may be masked, e.g., due to the proximity of the display constructs and lack of emitter-sensor panel between two immediately adjacent display constructs. The flexible filler may be disposed between two immediately adjacent display constructs.

In some embodiments, the display construct may be fastened to a side bracket. The side bracket may be fastened to a structure (e.g., fixture such as a frame portion or a wall). The side bracket may be secured to the display construct (e.g., via an adhesive and/or screws). The side bracket is operatively coupled to at least one pair (e.g., two pair) of an emitter panel and a sensor panel. A first sensor and emitter panel pair may be disposed orthogonal to a second sensor and emitter panel pair. The two orthogonal sensor and emitter panel pairs may facilitate operation of at least one touch screen.

In some embodiments, a plurality of display constructs is arranged to form a display construct wall. The display construct wall may or may not comprise touch screen capability. For example, at least one (e.g., all) display construct in the display construct wall may have touch screen capability. A touch screen may be facilitated by at least one pair of sensor and emitter panels. A touch screen may comprise two orthogonal pairs of sensor and emitters, e.g., arranged orthogonally (e.g., as disclosed herein). A distance between an emitter panel and its sensor panel may span one or more display constructs. The display constructs may be disposed in a matrix arrangement (e.g., in a 2×2 display constructs may form a display construct set). In some embodiments, at least one (e.g., each) display construct in the set comprises its dedicated touch screen having at least one set (e.g. two sets) of sensor and emitter panel. In some embodiments, at least two display constructs in the set comprises its dedicated touch screen having at least one set (e.g. two sets) of sensor and emitter panel. Signal from an emitter in the emitter panel travels until it reaches a sensor in the sensor panel. If a signal does not reach the sensor, then the touch screen controller may interpret such disturbance as a touch of the touch screen. Thus, the path between the emitter and the sensor should not be unintentionally disturbed.

In some embodiments, the display construct and/or set of display constructs is (e.g., substantially) planar. The tolerance for planarity variation of the display construct be limited (e.g., to facilitate operation of the sensor-emitter panels disposed adjacent to the display construct). The tolerance for planarity variation between the display constructs in the set may be limited (e.g., to facilitate operation of the sensor-emitter panels disposed adjacent to the display construct set). The variation from planarity may be stricter towards a viewer than away from the viewer. The variation from planarity may be stricter towards a side of the display construct adjacent to which the touch screen is disposed (e.g., the sensor and emitter panel are disposed). For example, the display construct can be convex toward the viewer and/or touch screen with a deviation of a predetermined distance or less. The display construct can be convex away from the viewer and/or touch screen by more than that predetermined distance. The touch screen may be configured to show display data as if a single display construct (e.g., one media that is respectively parceled among the displays in a display set such that each display in the set displays a portion of the screen image). A user may use a selector (e.g., cursor and/or a touch screen) to control the plurality of display constructs as if the set of display constructs was a single display. The tolerance may allow planarity deviation of any display construct disposed between the sensor-emitter panel by at most about 100 micrometers (μm), 300 μm, 500 μm, 700 μm, or 900 μm. The planarity deviation limit may be in the direction towards the sensor-emitter panel. The display construct may be a (e.g., slightly) concave, convex, or rippled display (e.g., within the tolerance mentioned herein). The gap between two immediately adjacent display may be at most about 0.1 inches ("), 0.2", 0.3", 0.4", or 0.5". The gap may have any value between the aforementioned values (e.g., from about 0.1" to about 0.5"). The display construct set may have a glass panel that is common to a plurality of displays (e.g., TOLEDS). The display constructs can each have a glass panel that is supports the display (e.g., TOLED).

Figure 29C:
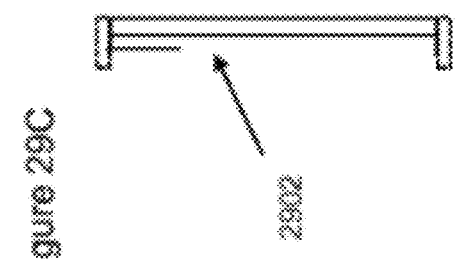
FIGS. 29A-D schematically show various display constructs.
Figure 29D:
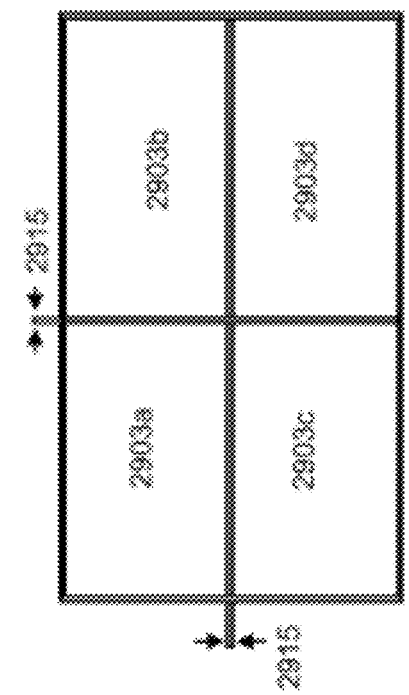
Figure 29A:
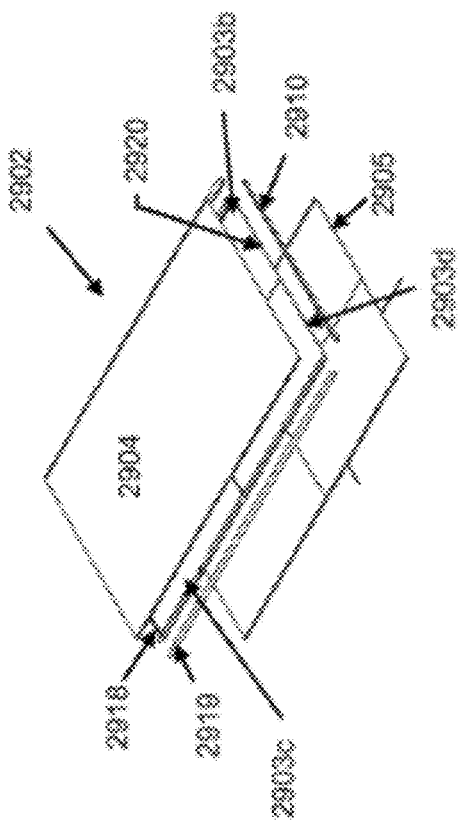
Figure 29B:
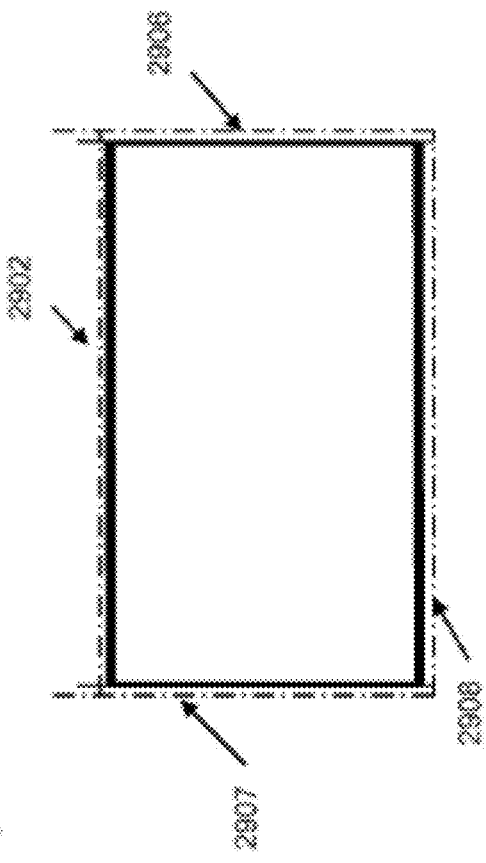

FIGS. 29A-29D show examples of various display constructs including touch screen functionality. FIG. 29A shows an example of four displays (e.g., OLEDs) 2903a, 2903b, 2903c and 2903d sandwiched between a front glass 2904 (that may be tempered) that is common to the four displays and four back glass panels (e.g., 2905) that each individually supports a display. The displays together form a display construct set. The four displays in FIGS. 29A and 29B are arranged as a two by two matrix (also called herein group or set) with a gap (e.g., 2915) between two immediately adjacent displays. The gap 2915 may be masked (e.g., by a flexible filler such as a transparent polymer and/or resin disposed between the displays (e.g., to allow for expansion and contraction of the displays due to temperature and/or to bond the display constructs and/or glass panels together)). A sensor-emitter panel 2918 is secured to the display construct 2902 and mounts to a framing cap 2919. The display construct is secured with a hinge (not shown) to a structure that is a window frame 2906 having a vertical mullions 2907 and horizontal mullions 2908 (transom). The frame 2906 may be mounted (e.g., bonded) to various surfaces (e.g., a wall, a board, glass internal to a facility or other mounting location). The bonding may be with an adhesive polymer and/or resin, which may or may not have a state in which it is more malleable than the other (e.g., rigid) state, which rigid state may be prevalent at ambient conditions. FIG. 29A shows an example of a side framing cap 2910 that is configured to secure the sensor-emitter panel to the display construct 2902 a side 2920 of the display construct set, with the sensor and emitter panel configured to operate as a touch screen. The set of displays 2903a-2903d has two sets of sensor-emitter panels that are normal to each other, which sensor-emitter panels border the set of display constructs (rather than bordering each of the displays). The tolerance for height differences between the displays 2903a-2903d in the display construct 2902 may be limited (e.g., none of the displays can protrude at most a tolerance threshold (e.g., as disclosed herein) from the sensor-emitter panel towards the viewer), so that the signal from the emitter will be able to reach unobstructed the sensor on the opposite side of the display construct set (e.g., the display within the set cannot be convex toward the viewer with a deviation of more than the tolerance threshold but may be concave away from the viewer by more than the tolerance threshold).

Figure 36:
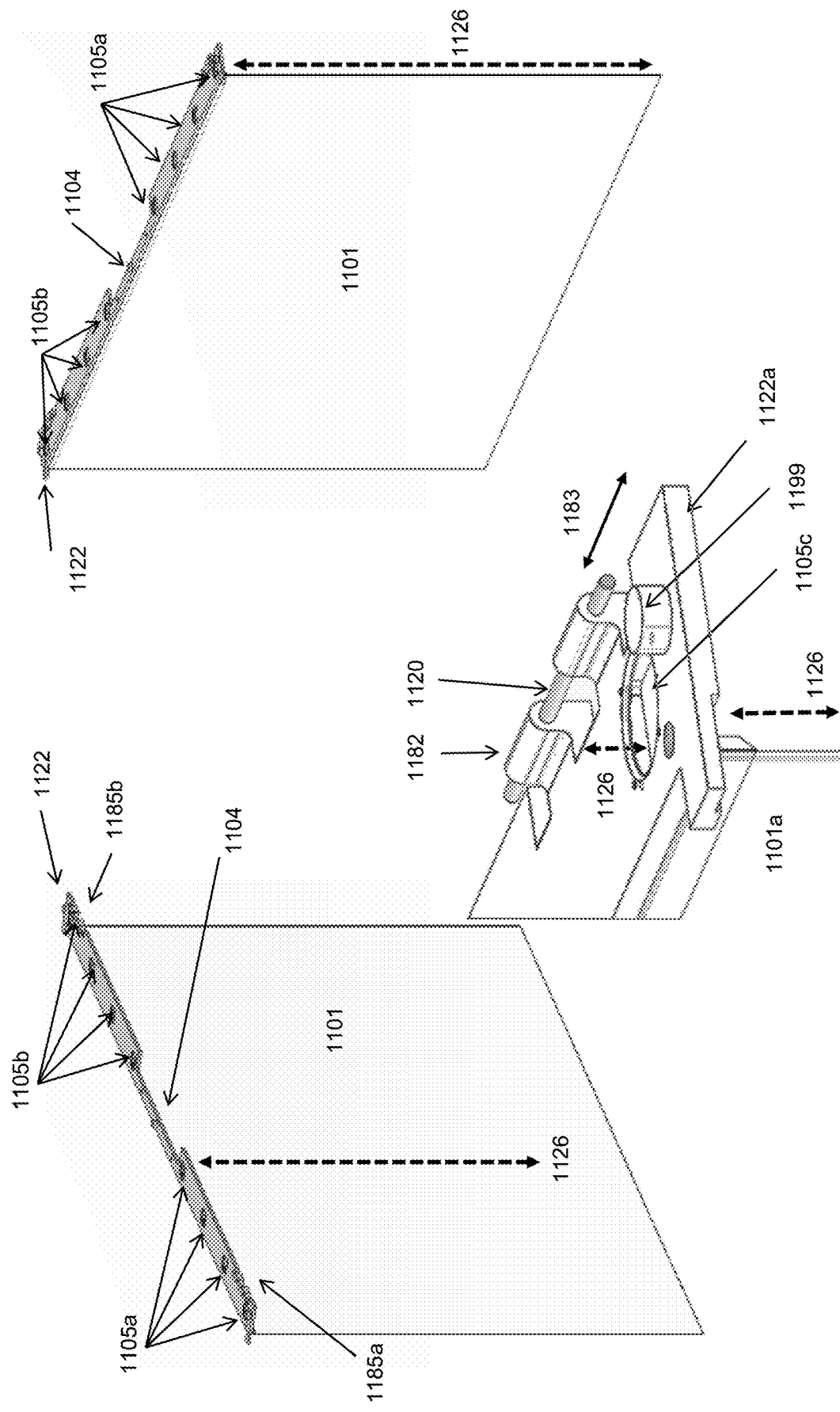
FIG. 36 schematically show various views of a display constructs and associated components (e.g., portions thereof)

In some embodiments, a fastener is configured to couple the display construct to a supporting structure. The display construct may or may not be equipped with touch screen capability. The supporting structure can be a fixture. For example, the supporting structure can be a frame portion of a window (e.g., tintable window). The structure can be any structure disclosed herein (e.g., a wall, an arch, a door frame, or any other structural frame). In some embodiments, the fastener comprises a hinge configured to allow swiveling (e.g., of the coupled display construct) about its axis. The fastener may comprise a movable joint (e.g., a hinge). The fastener may allow swinging of at least one of its portions about an axis. The fastener may comprise a mechanical bearing that connects two solid objects. At least one of the solid objects can swing about an axis (e.g., pin, pintle, or rod, e.g., cylindrical rod). The swinging motion may be to a limited angle of rotation between the two solid portions (e.g., hinge leaves). The angle may be at most about 270 degrees (°), 180°, 90°, 60°, 45°, or 30°. The angle may facilitate reaching any circuitry and/or (e.g., electrical) connections coupled to the fastener. The angle may facilitate attaching and/or detaching the display construct from the fastener. The angle may facilitate attaching and/or detaching the fastener to the supporting structure. The fastener may comprise a barrel hinge, butt hinge, Mortise hinge, concealed hinge (e.g., cup hinge or euro hinge), continuous hinge (e.g., piano hinge), flag hinge, H-Hinge, HL hinge, pivot hinge (e.g., double acting hinge), self-closing hinge, spring hinge, or living hinge (e.g., devoid of knuckles or pins). The swiveling may be of the hinge leaves (e.g., any anything attached to the hinge leaves). The hinge axis may be of the same material as the fastener body (e.g., hinge leaves), or of a different material. For example, the hinge axis can be of a harder material as compared to the hinge body (e.g., hinge leaves). The hinge axis and/or leaves can comprise metal (e.g., comprise elemental metal or metal alloy). The fastener may include knuckles and/or an axis (e.g., a pin). The leaf may extend from a set of knuckles that hold the hinge axis. For example, the fastener may comprise two sets of knuckles and/or two pins. The knuckles may be part of the leaf of the fastener (e.g., an integral part of the leaf, made of the same material piece). Any part of the hinge may comprise a composite material (e.g., comprising carbon fiber). The hinge may comprise a ceramic material. The hinge may be made of a heat conductive material such as metal (e.g., copper and/or aluminum). The metal may comprise an elemental metal or a metal alloy. The hinge axis (e.g., pintle) can be of a durable material. The durable material may comprise stainless steel, titanium, plane steel, iron, Inconel, Hastelloy, Waspaloy, Rene alloy, Incoloy, MP98T, TMS alloy, or CMSX single crystal alloy. The durable material may comprise a superalloy (e.g., high performance alloy). The hinge (e.g., any of its components such as its axis (e.g., pintle)) can comprise the durable material (e.g., superalloy). The knuckle of the hinge may have a hollow cylindrical cavity (e.g., having a circular cross section). The cavity may form the joint of the hinge through which the hinge axis is set. The knuckles of either leaf can alternate and interlock with the axis (e.g., pintle) passing through the knuckles. The knuckle can form a closed cylindrical cavity. The knuckle can form an open cavity. FIG. 37 shows an example of a hinge leaf 3721 having knuckle (e.g., 3781) that forms an open cavity configure to accommodate the hinge axis 3720. The open cavity of the knuckle facilitates attachment and/or detachment of its leaf (e.g., 3721) from the axis. In the knuckle example having an open cavity, the knuckle may separate from the pintle by (i) moving the knuckles away from the pintle in a direction normal to the pintle (e.g., and in the direction opposite to the chuckle cavity opening (e.g., 3782) that extends along the pintle axis, and/or (ii) extracting the pintle by moving it along its axis. FIG. 36 shows an example of a knuckle 3682 having a closed cylindrical cavity through which axis (e.g., pintle) 3620 traverses. In a closed knuckle example, the pintle may be able to move (i) along its axis (e.g., 3683) and in a circular motion about its axis. In a closed knuckle scenario, the knuckle may detach from the pintle by extracting the pintle by moving it along its axis (e.g., 3683).

Figure 40:
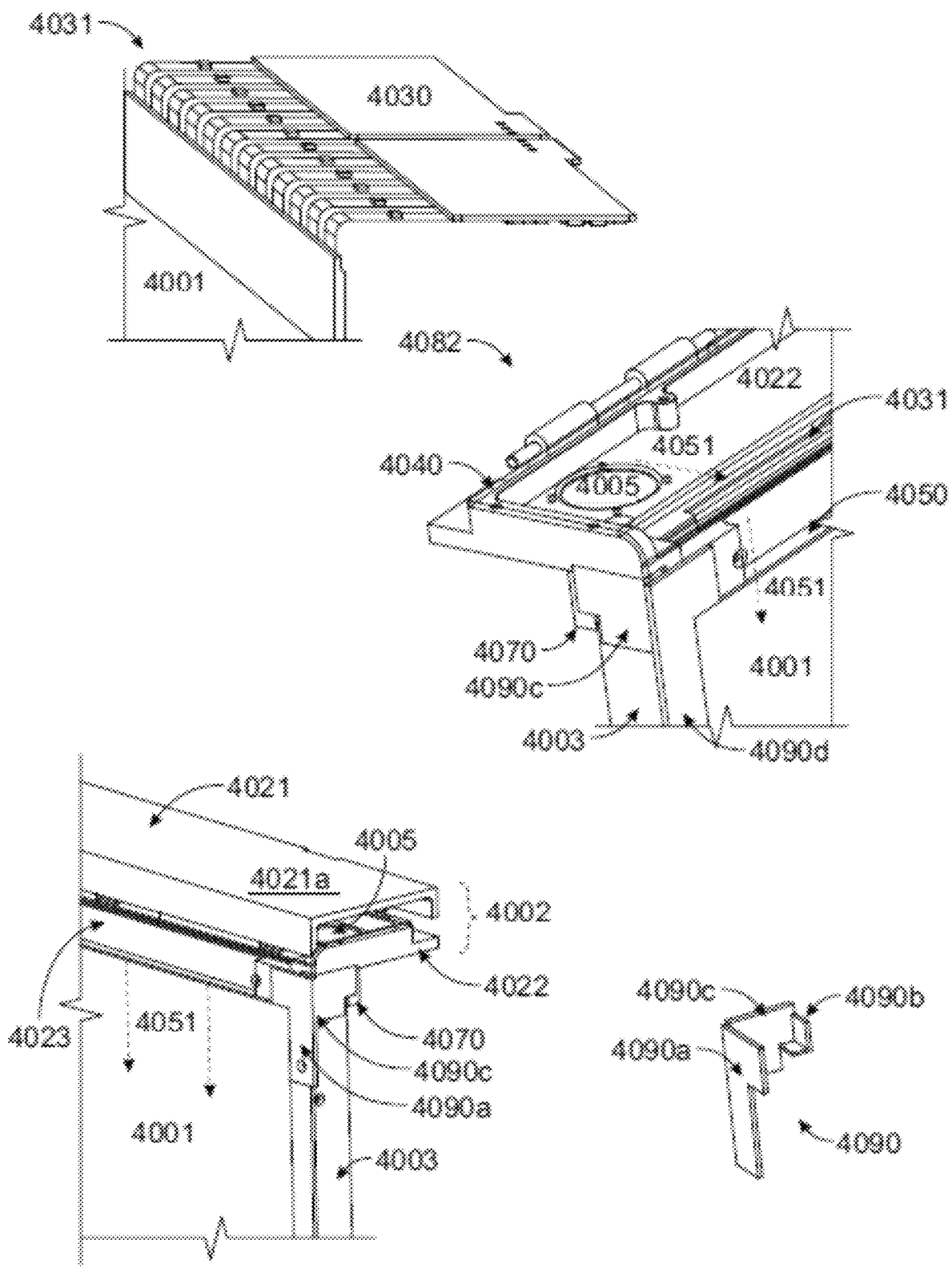
FIG. 40 schematically show various views of portions of a display constructs and associated components (e.g., portions thereof)
Figure 41:
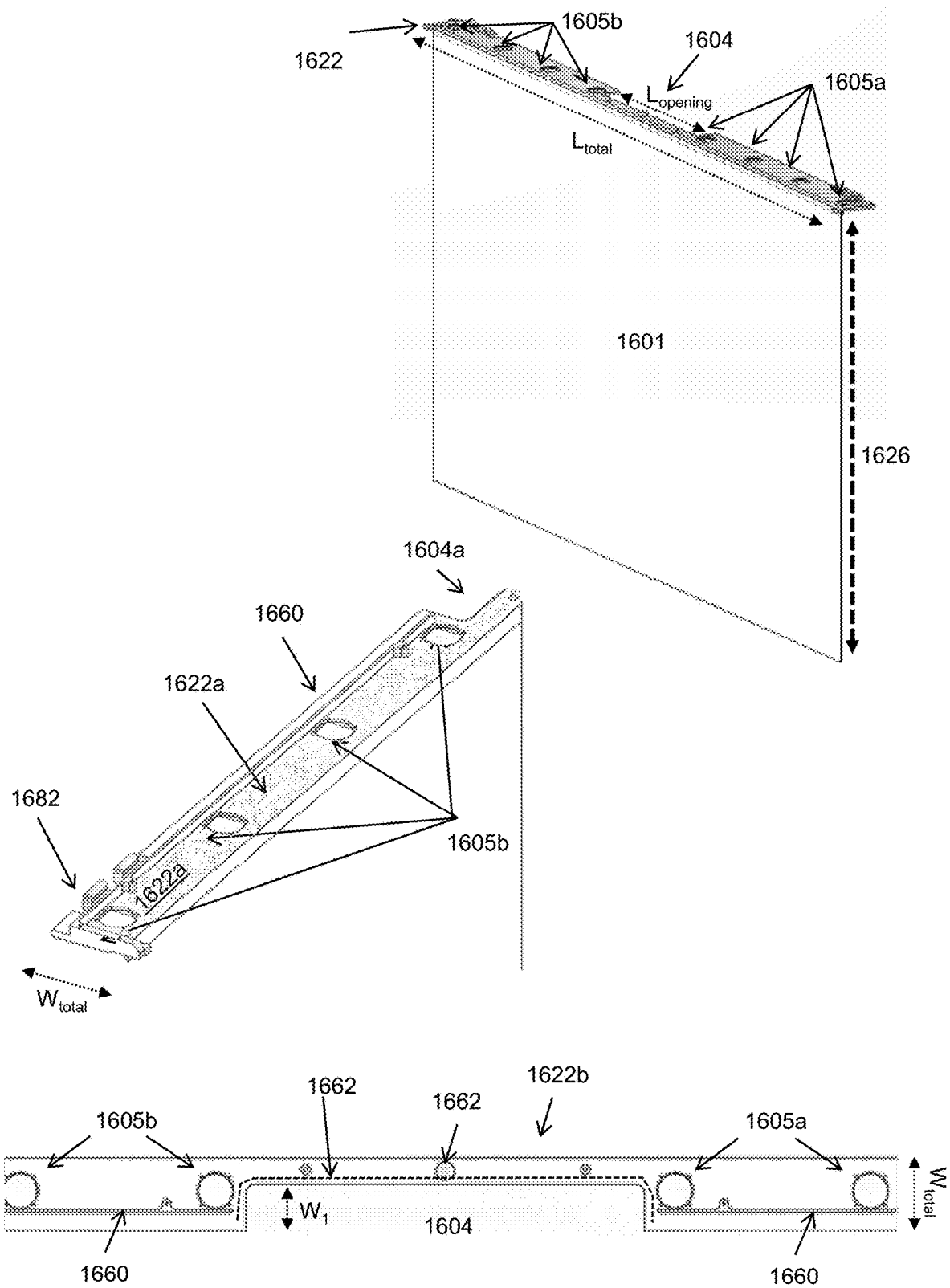
FIG. 41 schematically show various views of a display constructs and associated components (e.g., portions thereof)

In some embodiments, a plane of the hinge leaf face is (e.g., substantially) planar. In some embodiments, a plane of the hinge leaf face is devoid of curvature (e.g., concave, convex, or rippled). FIG. 40 shows perspective view examples of hinge leaf 4021 having a planar hinge leaf face surface 4021a. FIG. 41 shows an example of hinge leaf 4122 having a planar hinge leaf face surface 4122a (partial view shown).

In some embodiments the fastener is configured to accommodate various components. The fastener (e.g., comprising the hinge) may be configured to accommodate one or more circuitry boards. For example, the fastener may be configured to accommodate a circuit board comprising a booster and/or driver board for the display to which it is configured to connect to. For example, the fastener may be configured to accommodate a circuit board of the touch screen functionality (e.g., sensor and emitter panels). The fastener may be configured to allow easy installation, removal, and/or maintenance (e.g., as disclosed herein). Easy may refer to low labor cost, low labor grade (e.g., low labor qualification), and/or short labor time. At least one of the hinge leaves can comprise an opening through which at least a portion of the circuitry (e.g., PCB) is viewable and/or accessible. At least one of the hinge leaves may be configure to facility viewing, access to, and/or manipulation of, at least one connector. For example, at least some of the connectors in the circuitry (or coupled to the circuitry) can be viewable, accessible, and/or manipulatable through the opening. For example, at least some of the connectors between the circuitry and the display construct can be viewable and/or accessible through the opening. The opening may facilitate removal of cable(s) coupled to the connector. The opening may facilitate attachment and detachment of the cables, e.g., for maintenance, replacement, and/or removal (e.g., of the cabling, of the circuitry, and/or of the display construct). The fastener may snap and/or be screwed to the structure. The circuit board may snap into the fastener, attached to the fastener (e.g., using an adhesive), or snap to the fastener. At times, the display construct may require replacement before replacement of any portion of the support structure (e.g., and/or tintable glass) to which it is coupled. The fastener may or may not have magnetic components. The fastener may be coupled to a supporting structure. The fastener may or may not be attached to a window. The fastener may or may not be bolted into a window (e.g., using through holes in the window). In some embodiments, the fastener is not directly coupled to the window (e.g., using any through holes in the window and/or using an adhesive). In some embodiments, the display construct is not directly coupled to the window (e.g., using any through holes in the window and/or using an adhesive).

Figure 35:
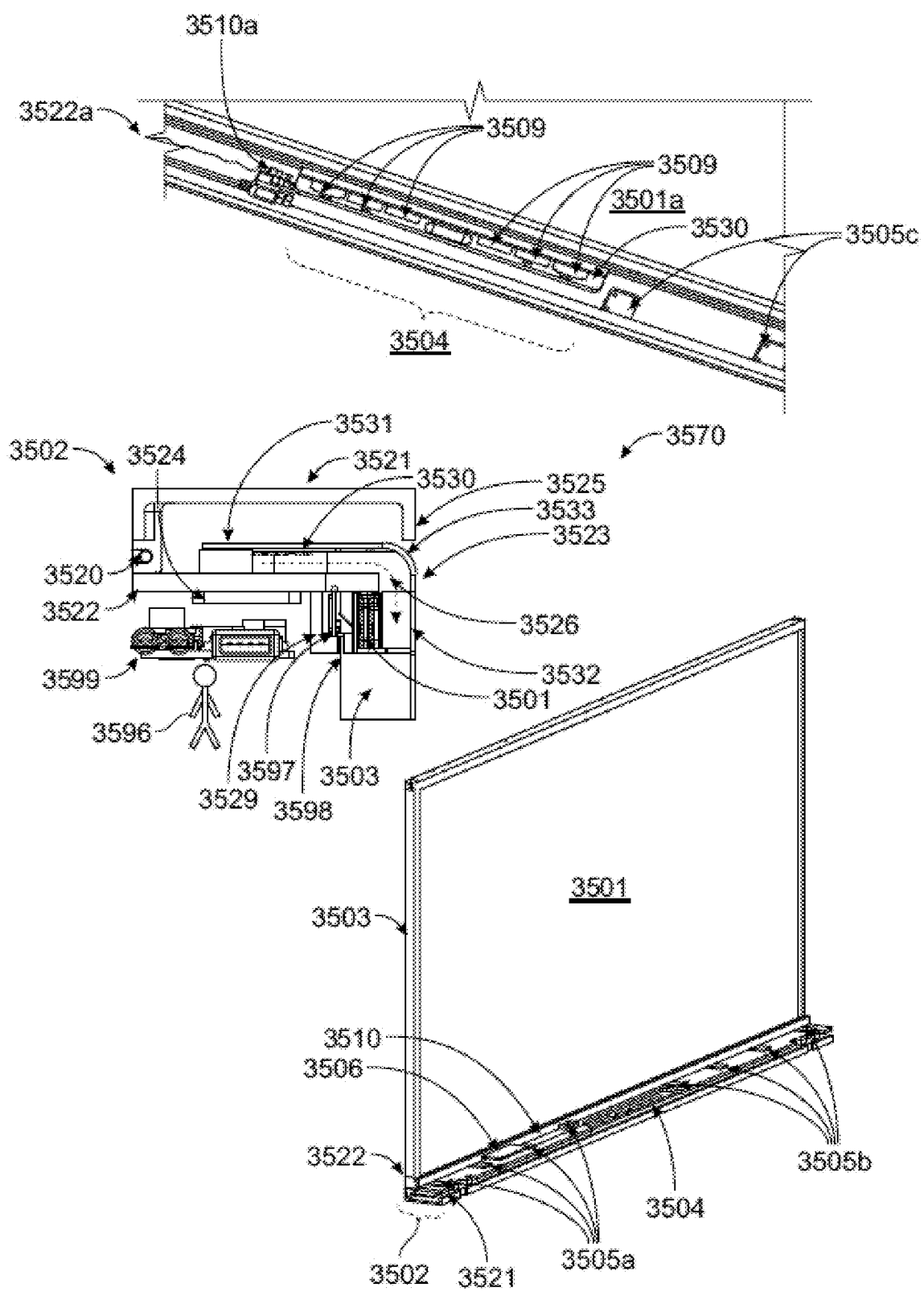
FIG. 35 schematically show various views of a display constructs and associated components (e.g., portions thereof)

FIG. 35 shows example views of a fastener 3502 that is coupled to a display construct 3501 bordered by sensor-emitter panels housed in a protective framing such as 3503 to facilitate touch screen capability. The fastener 3502 has an opening 3504 through which a portion of a circuit board 3530 can be viewed. The circuit board can incorporate a booster and/or driver board coupled with the display emitters (e.g., LEDs). The circuit board 3530 comprises six connectors 3509. The connectors can facilitate transmittance of data (including media and/or control related data) and/or power from the power source and/or E-Box (compositing the circuit board (e.g., timing controller)) to the display construct. The fastener may comprise a hinge axis 3520 coupled to hinge leaves 3521 and 3522. A first hinge leaf 3521 comprises a bracket configured to attach to the structure (e.g., frame portion). A second hinge leaf 3522 comprises the opening 3504 for the circuitry and/or connectors. Any of the hinge leaves can be made from a single piece of material (e.g., from a single slab), or can be made of portions attached together to form a single piece. Attached can comprise stitched, welded, interlocked, or screwed.

In some embodiments, the fastener is configured to extend along a side of the display construct. The fastener can comprise a single unit that extends to the at least a portion of the side length of the display construct. The single unit may be of a single material (e.g., a single slab). The single unit may or may not have one or more openings. The extension of the unit (e.g., hinge leaf) may be of at least about 30%, 40%, 50%, 60%, 70%, 80%, 90%, 95%, or 95% of the length of the display construct side. In some embodiments, at least a portion of the fastener (e.g., at least one hinge leaf) extends to the full length of a side of the display construct. In some embodiments, the fastener extends (e.g., slightly) beyond the full length of the side of the display construct. In some embodiments, the fastener accommodates the side of the display construct. FIG. 35 shows an example of fastener 3502 having a portion (e.g., hinge leaf) 3522 that extends to at least the full length of display construct 3501, which hinge leaf 3522 has an opening 3504 that facilitate access to at least a portion of the circuitry 3530 (e.g., connectors 3509 thereof) as well as a plurality of openings that facilitate air flow and/or heat exchange, which hinge leaf is formed of a single portion (e.g., single slab).

In some embodiments, the fastener may be configured to facilitate heat exchange. The fastener may be configured to accommodate any of the heat exchange devices and/or technologies disclosed herein. For example, the fastener may be configured to accommodate one or more fans for active gas (e.g., air) conduction. The fastener may be configured to accommodate at least 1, 2, 3, 4, 5, 6, 7, 8, 9, 10, or 20 fans. The fastener may be configured to accommodate a number of fans between any of the aforementioned number of fans (e.g., from 1 to 20, from 1 to 10, or from 10 to 20). The number of fans may be an even number. The number of fans may be (e.g., evenly) distributed on both sides of the opening. The opening to the circuitry may be centered along a length of the fastener. The openings for the gas flow (e.g., and placement of the fans) may be disposed along the fastener and further away from the opening. Every two fans may be symmetrically aligned along the middle portion of the fastener length (e.g., leaf length). FIG. 35 shows an example of a fastener 3502 having a leaf with an opening 3504 centered along its length, which leaf has a plurality of openings 3505*a* and 3505*b* (eight openings in total) that facilitate gas exchange and accommodation of fans (e.g., 3524). The plurality of openings may be vent holes. The openings can be arranged symmetrically along the length center of the fastener and extend along the fastener leaf away from the opening. The openings in each of the opening groups 3505*a* and 3505*b* are distributed evenly (e.g., are evenly spaced) along the fastener (e.g., hinge leaf) portion and arranged symmetrically as two groups, with respect to the center of the fastener length. Fastener leaf 3522 is coupled to a corner 3529 configured to hold a circuit board 3597. The circuit board can be coupled to the sensor and emitter panel disposed in a protective framing cover 3503. The framing cover protects at least a portion of a transparent material (e.g., 3598) configured to allow the emitted radiation (e.g., infrared radiation) of the touch screen functionality to travel therethrough.

In some embodiments, the display construct fastener comprises a plurality of circuit boards. The circuit boards may include a booster and/or driver board, and/or at least one circuitry facilitating the touch screen functionality. For example, there could be two circuit boards facilitating the touch screen functionality. At least one of the plurality of circuit boards may be attached to the fastener. FIG. 35 shows an example of a touch screen circuitry 3597 coupled to the hinge leaf 3522 by a connective piece (e.g., L bracket 3529. An additional circuitry 3599 (e.g., facilitating the touch screen functionality) (e.g., 3599) may or may not be coupled to the fastener (e.g., to hinge leaf 3522).

In some examples, the fastener facilitates cooling and/or air flow on one side of the display construct, and touch screen functionality on the opposing side of the display construct. FIG. 35 shows an example of touch screen 3501 coupled to fastener 3502 such that an air flow 3536 is directed to the back side of the display construct 3501 that would be further away from a viewer, and a touch screen functionality (e.g., including transparent material 3598) disposed on the opposing side of the display construct 3501 that is closer to the viewer (e.g., and accessible to the viewer for touch screen functionality). The viewer is displayed schematically as figurine 3596 to designate the viewer side of display construct 3501 (e.g., which scale may be disproportional, e.g., to the display construct).

In some embodiments, the fastener may be configured to facilitate heat exchange. The fastener may be configured to facilitate active heat conduction from the external atmosphere towards the display construct (e.g., gas pushing). The fastener may be configured to facilitate active heat conduction from the display construct towards the external atmosphere (e.g., gas suction). For example, the fastener may be configured to accommodate one or more fans configured to direct gas (e.g., air) from the ambient atmosphere around the fastener, towards a designated path. The path may be designated by a directing structure. The directing structure may at least one planar and/or a curved portion. FIG. 35 shows an example of a gas directing structure 3523 having planar portions 3531 and 3532, and curved portion 3533. The gas directing structure may be formed of one piece of material (e.g., one slab), or a plurality of attached (e.g., stitched, soldered, interlocked, and/or fastened) portions. The gas directing portion may be configured to direct the gas along path 3526. FIG. 35 shows various views of a fastener and associated components. The gas may be directed from the external environment (e.g., atmosphere of the enclosure) towards the display construct, e.g., through the gas directing path (e.g., formed by the gas directing structure and/or the fastener. The gas directing structure may be part of the fastener or coupled thereto. The gas directing structure may be coupled (e.g., fastened to or be a part of) to a first leaf of the fastener. The gas directing structure may not be part of (or coupled to) the other (e.g., second) leaf. The gas directing structure may be coupled (e.g., fastened to or be a part of) to a first leaf of the fastener configured to attach to the display construct. The gas directing structure may not be part of (or not be coupled to) the other (e.g., second) leaf configured to attach to the supportive structure (e.g., fixture such as a frame portion or a wall). The supportive structure may be part of the enclosure (e.g., a fixture of the enclosure). The fans may comprise an actuator. The fans may be controlled by the controller (e.g., any controller disclosed herein). The fans may be controller locally (e.g., in the controller of the fastener and/or the E-box). The fans may be controlled remotely (e.g., by the BMS, and/or by higher hierarchy controller such as a floor controller or a master controller). The fans may be controller by a controller configured to control a sensor and/or emitter (e.g., a device ensemble).

FIG. 36 shows perspective view examples of a display construct coupled to a portion of the fastener. FIG. 36 shows an example of hinge leaf 3622 having two knuckle groups 3685*a* and 3685*b*. Each knuckle group has a hinge (e.g., 3620) inserted therethrough. Each knuckle group is part of a knuckle assembly forming a hinge. The knuckle groups 3685*a* and 3685*b* form an integral portion of the hinge leaf 3622 that has a plurality of openings arranged in two symmetric groups 3605*a* and 3605*b* about the center of the length of hinge leaf 3622. The hinge leaf 3622 has an egressed portion 3604 centered about the length of the hinge length. The hinge leaf 3622 is formed of a single piece (e.g., single slab, slice, strip, or plate). The hinge leaf 3622 extends along the full length of the side of display construct 3601. The display construct 3601 is devoid of a frame surrounding all its sides. The openings (e.g., 3605*c*) are configured to allow gas (e.g., air) to pass therethrough from one side of the display construct 3601, e.g., along path 3626. Hinge leaf 3622 also comprises a protruding feature (e.g., boss) 3699. The ending "a" in numerals 3601*a* and 3622*a* designates that a portion of the respective items without the ending "a" is shown (e.g., 3601*a* is a portion of display construct 3601).

FIG. 37 shows perspective view examples of display construct 3701 framed by sensor-emitter panel e.g., 3703. The display construct is coupled to a fastener 3702 having two hinge leaves 3721 and 3722. The hinge leaf 3721 is configured to couple to a supporting structure. The hinge leaf 3721 has two sets of open knuckles 3783*a* and 3783*b* configured to attach or detach to hinge leaf 3722, by integrating with the closed cavity knuckles 3785*a* and 3785*b* respectively, each holding a hinge pintle. The hinge leaf 3721 is formed in a shape of a bracket. Hinge leaf 3722 comprises an opening 3704 (e.g., carved out portion, or egress) centered along its length, which opening extends to a portion of the hinge leaf width. The opening is configured to facilitate access to a portion of any attached circuitry (e.g., booster and/or driver board) and/or connectors that would be attached to hinge leaf 3722 and/or coupled to (e.g. and communicating with) the display construct and to the E-box and power source. Hinge leaf 3722 has a plurality of openings (e.g., 3705) arranged as two groups about the length of the leaf hinge 3722. The openings in each group are evenly spaced. The openings allow exchange of gas (e.g., air). Hinge leaf 3722 is coupled to a gas directing structure (e.g., gas guide) 3723. The gas guide is configured to direct any incoming gas (e.g., air) through the openings (e.g., 3705) to one side of the display construct through cavity 3750, such that the gas will flow, e.g., in the direction depicted in broken arrows 3751 (or in a reverse direction). Portion 3732 covers (and forms) the cavity 3750, which portion 3732, 3733, and 3731 are part of the gas guide portion 3723. The ending "a" in numerals 3701*a*, 3702*a*, 3703*a*, 3721*a*, 3722*a*, 3723*a*, and 3733*a* designates that a portion of the respective items without the ending "a" is shown (e.g., 3701*a* is a portion of display construct 3701).

In some embodiments, the fastener is configured to facilitate heat exchange. The heat exchange may be active. The heat exchange may be facilitated by one or more fans, gas (e.g., air) directing component, and/or gas channel. The paths formed in the fastener for the gas flow may be designed to accommodate the flow of air without forming excessive or reduced pressure in the faster, e.g., as compared to ambient pressure. The area through which the gas is allowed to flow in the fastener may be greater that the area through which the gas flows in the fans. For example, the total horizontal cross sectional area of the fan openings (e.g., 3805) may be smaller than the total horizontal cross sectional area between the gas guide (e.g., 3823) and the plate (e.g., 3855) that together form the gas channel directing the gas (e.g., 3851) towards the outer portion of the display construct (e.g., 3801).

Figure 38:
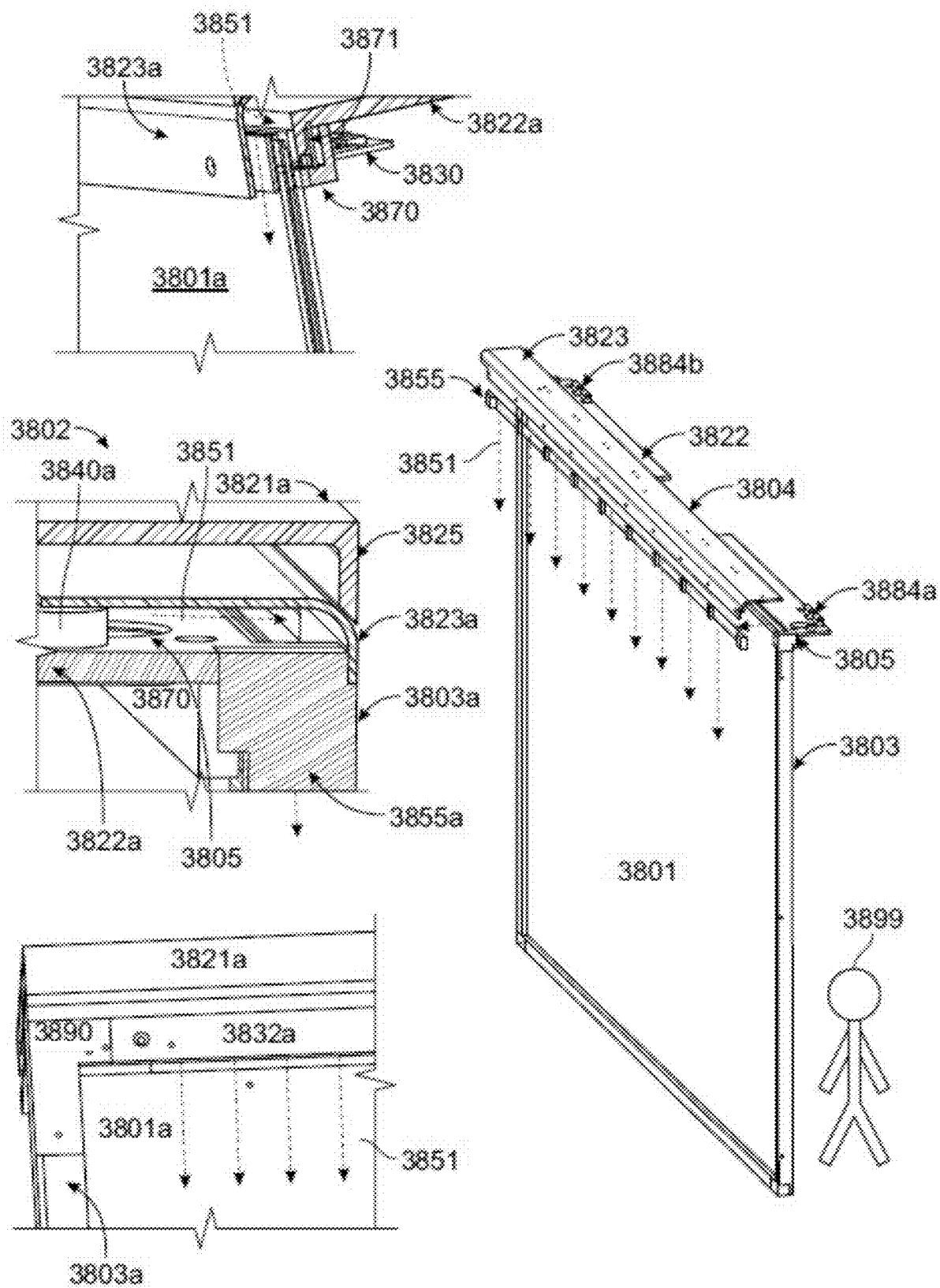
FIG. 38 schematically show various views of a display constructs and associated components (e.g., portions thereof)

FIG. 38 shows perspective view examples of display construct 3801 coupled to portions of a fastener 3822 (e.g., hinge leaf) having an opening (e.g., regression, carveout, or egress) 3804 that extends to a portion of its width, which opening is centered along its length. The opening 3804 is configured to allow access to a portion of the circuitry 3830 and/or connectors thereof. Hinge leaf 3822 has two sets of knuckles 3884*a* and 3884*b*, and a plurality of openings (e.g., 3805) that facilitates flow of gas (e.g., air) therethrough. Hinge leaf 3822 is coupled to a gas guide 3823 that is configured to guide gas flowing through (e.g., incoming or outgoing) the openings (e.g., 3805). The gas guide is coupled to a plate 3855 having ten protrusions. The protrusions are evenly spaced along the length of the plate. The plate is coupled with the gas guide 3823 to form a gas passage (e.g., between every two protrusions). The protrusions are configured to prevent bending (e.g., collapse) of the gas guide and/or the plate. The protrusions are configured to ensure that the gas passages remain operational and/or intact over time. The gas guide 3823 and the plate 3855 guide the gas in the direction depicted by the broken arrows (e.g., 3851). Gas guide 3832 (e.g., that is attached to, or as part of, hinge leaf 3822) is configured to engage with hinge leaf 3821 comprising a bracket. The display construct 3801 is framed by sensor-emitter panels (e.g., 3803) that facilitate touch screen capability. The bracket portion of the fastener can have at least one pointed end (e.g., 3821) or at least one non-pointed end portion (e.g., 3525). At least one end of the bracket may be disposed close to the gas guide, e.g., when the hinge of the fastener is in a closed position. At least one end of the bracket may or may not contact the gas guide. The fastener may be configured to allow a gas passage (e.g., and a gap) between the bracket portion of the fastener and the gas guide, e.g., when the fastener is in a closed position. FIG. 35 shows an example of a gap between the gas guide 3523 and the non-pointed bracket end 3525 of leaf 3921 of the fastener. FIG. 38 shows an example of a gap between a pointed bracket end 3825 of leaf 3821 of the fastener and its complementary portion gas guide 3823 that is part of the bent portion 3533. At least one end of the bracket may form a right angle or a non-right angle with a side of the bracket. At least one end of the bracket may have an angle and/or curvature that is complementary to the gas guide portion immediately adjacent to it, e.g., when the fastener is in a closed position (e.g., shown in the example of 3802). Hinge leaf 3822 is configured to mount a circuitry 3871 (e.g., facilitating the touch screen functionality), which mounting is by using a mounting structure that in the shape of an L bracket 3870. The mounting structure can be an integral part of the hinge leaf 3822, or may be a separate portion that is snapped, interlocked, soldered, glued, bolted, or otherwise attached to hinge leaf 3822. The ending "a" in numerals 3801*a*, 3803*a*, 3821*a*, 3822*a*, 3832*a*, 3821*a*, 3823*a*, 3840*a*, and 3855*a* designates that a portion of the respective items without the ending "a" is shown (e.g., 3801*a* is a portion of display construct 3801). Item 3890 is a connective piece (e.g., 4090). The gas guide can be coupled (e.g., attached) to the fastener by any attachment (e.g., coupling) method disclosed herein (e.g., snapping, soldering, gluing, bolting, interlocking, or screwing). At the closed position of the fastener, the first leaf and the second leaf (and any objects attached thereto) maintain a separation (e.g., gap) from each other (e.g., do not contact each other). The separation (e.g., gap) can be of at most about 0.2 millimeters (mm), 0.3 mm, 0.4 mm, 0.5 mm, 0.8 mm, 1 mm, 3 mm, or 5 mm. The separation (e.g., gap) can be between any of the aforementioned values (e.g., from about 0.2 mm to about 5 mm, from about 0.2 mm to about 0.5 mm, from about 0.3 mm to about 1 mm, or from about 0.8 mm to about 5 mm). The gap may be between the tip of the bracket portion (e.g., 3525) of the first hinge leaf and its complementary portion that is part of the second hinge leaf (e.g., attached to or an integral part of), such as the gap guide (e.g., 3523) complementary portion (e.g., 3533) to the bracket tip portion (e.g., 3525). The ending "a" in numerals 3501*a*, 3510*a*, and 3522*a*, designates that a portion of the respective items without the ending "a" is shown (e.g., 3501*a* is a portion of display construct 3501). Item 3505*c* represent a portion of fans 3505*b*. The fastener and associated components are represented as a side view in 3570.

In some embodiments, the fastener is masked from the viewer by a cap (e.g., beauty cap). The cap can serve as a protective lid or cover for the fastener. The cap can mask the fastener in the supportive structure (e.g., fixture) in which it is installed. For example, the cap can mimic a portion of a framing (e.g., window framing), or a portion of a wall. The cap can be camouflaged in its surrounding (e.g., in the supportive structure). The cap can attach to the supportive structure, e.g., using any of the attachments disclosed herein, e.g., bolting, screwing, snapping, or adhering (e.g., using an adhesive). The supportive structure may be configured to facilitate such attachment (e.g., by incorporating a complementary structure to which the cap would attach to).

In some embodiments, the gas guide is configured to guide the gas along a side of the display construct. The side of the display construct along which the gas is guided to, may be closest to the supportive structure (e.g., wall, tintable glass, and/or framing). The side of the display construct along which the gas is guided to, may be further away from a viewer. The side of the display construct along which the gas is guided to, may be opposite to a side of the display construct having the touch screen capability. The side of the display construct along which the gas is guided to, may be opposition to the side along which emitters are emitting radiation as part of the touch screen functionality. FIG. 38 shows an example of a display construct 3801 having gas flow directed on one side of display construct 3801, illustrated by broken arrows, e.g., 3841, which side of the display construct is opposite to the side viewed and/or accessed by a viewer illustrated schematically by figurine 3899 (e.g., which scale may be unproportioned, e.g., to the display construct).

In some embodiments, the gas guide may be separated from a hinge leaf by a protruded feature (e.g., a boss). The protruding feature may protrude from the gas guide or from the hinge leaf. The protruding feature may be an integral part of the gas guide or hinge leaf. The protruding feature may be a separate piece that is attached to the gas guide or hinge leaf (e.g., using any of the attachment methods disclosed herein). FIG. 38 shows an example of a protruding feature 3840 (e.g., boss) that protrudes from hinge leaf 3822. The protruding feature may offer structural support to portion(s) of the fastener.

In some embodiments, initiation of active heat exchange may be controlled by a controller. The controller may utilize a feedback control scheme. The feedback control scheme may utilize temperature data. The temperature data may derive from at least one temperature sensor. The temperature data may relate to the temperature at one or more positions of the display construct. The fastener may be configured to accommodate and/or connect to at least one temperature sensor (e.g., thermocouple or IR sensor). The at least one temperature sensor may be configured to sense a temperature of the display construct. The at least one temperature sensor may be disposed such that it will contact a side (e.g., rim) of the display construct away from the viewer, closest to the supporting structure, and/or closest to a window to which it is coupled. The at least one sensor may be disposed in a framing (e.g., sensor and emitter protective framing) and/or any portion (e.g., component) of the fastener. The control scheme may direct activation of the active heat exchange system (e.g., fans and/or cooler) when the temperature reaches first threshold (e.g., as disclosed herein). The control scheme may direct shutting off operation of the display construct when the temperature reaches a second threshold (e.g., as disclosed herein). The control scheme may direct de-activation of the active heat exchange system (e.g., fans and/or cooler) when the temperature reaches a third threshold (e.g., as disclosed herein). In some embodiments, the second threshold is higher than the first threshold (e.g., has a higher temperature value). In some embodiments, the third threshold is lower than the first threshold (e.g., has a lower temperature value). At times, the active heat exchange is always in an "on" mode, and is shut down if the temperature exceeds a threshold (e.g., the second threshold delineated herein). The (e.g., any of the high temperature) threshold may be of a temperature having a value of at least about 40° C., 43° C., 45° C., 47° C., 49° C., 50° C., 53° C., 55° C., or 57° C. The lowest threshold may be of a temperature having a value of at most about 25° C., 30° C., 35° C., 40° C., or 45° C. The high temperature threshold may be a temperature at which the light emitting entities are likely to be (e.g., permanently) damages (e.g., burn out).

Figure 39:
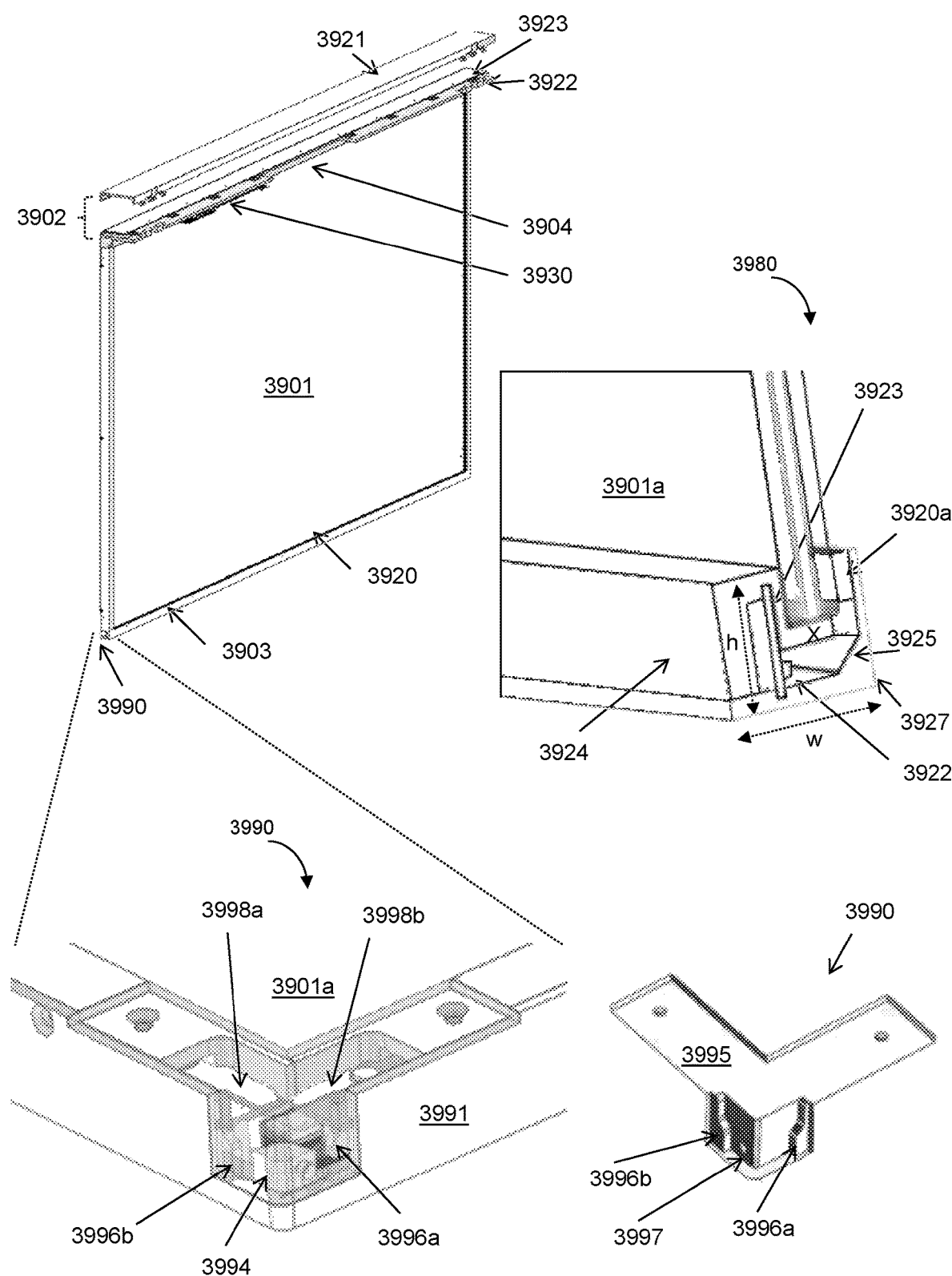
FIG. 39 schematically show various views of a display constructs and associated components (e.g., portions thereof)

FIG. 39 shows perspective view examples of various portions of display construct 3901 having touch screen capability, coupled to a fastener 3902. The fastener has a hinge having a first hinge leaf 3921 and a second hinge leaf 3922, which leaves are configured to swing about an axis. Item 3980 shows a portion of the display construct bordered by a portion of the sensor-emitter panel and its housing. The fastener includes a gas guide 3923, a plurality of holes that facilitate egress and/or ingress of gas therethrough, and a first circuitry 3930. The hinge leaf 3922 has a depression 3904. The depression can be configured to facilitate access to a second circuitry and/or connectors (not shown in FIG. 39) configured to be coupled to the display construct and to the E-box (e.g., timing controller therein) and/or power source. The first circuitry 3930 may be disposed on (or be otherwise coupled to) a side of the hinge leaf 3922. The first circuitry may be configured to facilitate operation of the touch screen functionality, which includes sensor and emitter panels bordering the display construct, e.g., 3903. The sensor and emitter panel comprises a circuitry 3923 to which the sensors and emitters (e.g., 3922 are coupled to, a reflective surface (e.g., mirror) 3925, a protecting framing including 3924 and 3927, and transparent material 3920 configured to allow radiation from the emitters to travel therethrough (and optionally protect the circuitry from the ambient environment such as from humidity). The framing portion 3924 is configured to support the display construct 3901 above a portion of sensor and emitter assembly (e.g., above reflecting surface 3925). The protecting framing (and the components therein) extends along a side of the display construct 3901. Every two perpendicular protecting framings meet at a connection corner 3990 at an edge of the display construct 3901. The connecting corner comprises a body 3991 and a cover 3995 of the body. The body may be a single piece faceplate. The cover (e.g., corner cover) is a tripoded cover 3995. The tripoded cover has three extensions that together form the tripod. Two of the three extensions are disposed on a plane, and the third extension is disposed normal to the plane. The third extension comprises two wavy structures. The tripoded cover 3995 is configured to seal the connector of the two normal protecting frames at their meeting edge 3990. The body of the connecting corner is configured to house circuit boards 3998*a* and 3998*b* of the sensor-emitter circuitry. 3901*a* is a portion of display construct 3901. The circuit boards are connected to each other at the corner (not shown). One of the two circuit boards is connected to the touch screen circuit board 3930. The body is configured to house an internal connector 3094 that has two curved edges, and two pointy edges forming a cross section akin to an eye or an almond. The internal connector 3994 comprises housing configured to accommodate a screw. The integral connector may be part of the single piece faceplate 3991.

In some embodiments, the framing of the display construct is configured to (i) support the display construct and (ii) separate the display construct from the sensor and emitter assembly, and (iii) protect the sensor and emitter assembly from the ambient environment. The display construct is configured to be located in a cavity that is horizontally and/or vertically within of the sensor and emitter assembly. The display construct is separated from a cavity holding the sensor and emitter assembly at least in part by a framing (e.g., 3924) and/or by an adhesive. FIG. 39 shows an example of display construct 3901 held by framing portion 3924 and an adhesive (e.g., double sided tape) that contacts the display construct with the transparent material 3920. The framing comprising 3924 and 3927 forms an internal cavity for the sensor and emitter assembly (e.g., 3922 and 3925), and an external cavity housing the display construct (e.g., 3901). The transparent material 3920 of the sensor-emitter assembly caps (at least in part, e.g., with the adhesive material) this internal cavity from external influences (e.g., humidity and/or debris). 3920a is a portion of transparent material 3920. Position X on which the display construct 3901 is disposed, is vertically and horizontally within the height of the framing h and the width of the framing w. The adhesive material can be a very bonding (VHB) adhesive material (e.g., VHB double side tape of 3M).

In some embodiments, two orthogonal sensor and emitter panels are held together by a corner assembly piece. The corner assembly piece may comprise guiding features configured to guide two orthogonal circuitry of the sensors and emitters and align them (e.g., vertically) with respect to each other, e.g., within a tolerance. The corner piece may have step guides, or wavy guides. FIG. 39 shows an example of a corner assembly 3940 comprising a body 3991 and a corner cover 3995, which corner assembly has two guides 3996a and 3996b, each guiding a sensor and emitter circuitry. The guide (e.g., self-guiding feature) may be configured to hold the circuit board in place (e.g., within a tolerance). The tolerance may allow vertical and/or horizontal displacement of the circuit board of at most about 0.5 millimeter (e.g., mm), 0.4 mm, 0.3 mm, 0.2 mm, or 0.1 mm.

In some embodiments, the framing of the display construct is coupled to the fastener using at least one connective piece. The connective piece may comprise a tripod. The connective piece may have three planes facing three orthogonal directions. The connective piece may be configured to connect the fastener with the protective framing of the sensor-emitter panel. The connective piece may be configured to engulf three orthogonal sides of a portion of (e.g., an edge of) the fastener. FIG. 40 shows perspective view examples of various portions of a display construct and associated components. FIG. 40 shows an example of an entire connective piece 4090 having three orthogonal sides 4090a, 4090b, and 4090c (4090d is a partial view of 4090a). The connective piece 4090 is configured to connect to the gas direction portion 4032 (shown in a partial view thereof) that directs gas through a first opening 4005, a second opening 4050 and onto the rear side of display construct 4001 (shown as a portion of the display construct), e.g., along broken arrows 4051. The connective piece 4090 is configured to seal a circuitry held by supporting portion 4070, and couple to (e.g., connect to) the supporting portion, and to a side of the protective framing of the sensor-emitter assembly 4003 (partial view shown) at its 4090a side. The fastener comprises at least one hinge having knuckles and pintle (e.g., 4082), a first hinge leaf 4021 (partial view shown) comprising a bracket that is configured to mount on a supportive structure (e.g., fixture), and a second hinge leaf 4022 (partial view shown). The second hinge leaf having at least one gas opening such as 4005, comprises an elevated structure 4040 that reduces escape of gas between the leaf of the hinge, when the hinge is at its closed position. The fastener 4002 is configured to house at least one circuit board, e.g., 4030 (shown as the entire circuit board). Circuit board 4030 (e.g., comprising the driver and/or booster board) is configured to connect to the display construct 4001 and provide data and/or power via cabling 4031. Circuit board 4030 is also configured to connect the E-box (e.g., comprising the timing controller) and/or to the power supply via (e.g., six) other cables not shown in FIG. 40. The other cables may extend from the face of board 4030 that is opposite to the one shown in FIG. 40.

In some embodiments, the fastener is configured to direct a flow of gas. The flow of gas can be directed along designated openings in the fastener and/or formed by the fastener. The fastener, e.g., at its operational and/or closed position, may reduce the probability of gas flow in directions other than the designated openings. The operational position of the fastener can be a position that facilitates operation of the display construct for its intended purpose (e.g., projecting media). The fastener may comprise a hinge having two leaves (e.g., joined by knuckles and pintle arrangement). At least one of the leaves may comprise an elevated rim to reduce gas from in that direction, e.g., when the fastener is closed and/or operational. At least one of the leaves may comprise a gasket to reduce gas from in that direction, e.g., when the fastener is closed and/or operational. FIG. 41 shows perspective and top view examples of display construct 4101 coupled to a portion of a fastener 4122 having a plurality of holes 4105b and 4105a configured to facilitate gas flowing therethrough. The hinge leaf 4122 comprises knuckles 4182. The hinge leaf comprises an elevated portions 4160 that reduces flow of gas through the elevated portion, which flow of gas is between the interior of the fastener (e.g., when closed and/or operational) and the ambient environment. The elevated portion may comprise a gasket; or be devoid of a gasket. The hinge leaf 4122 comprises a depression 4104 that extends to a portion of its width and is centered at its length. 4104a is a portion of 4104. Items 4122a and 4122b are portions of 4122. A gasket may be placed along the 4122 rim of the opening 4104, as depicted in broken line 4162. Hinge leaf 4122 comprises a protruding feature (e.g., boss) 4162. The protruding feature may offer structural support to component(s) of the hinge. The protruding feature may be an integral part of the fastener (e.g., of the hinge leaf). The protruding feature may be a separate piece that is attached to the fastener (e.g., of the hinge leaf), e.g., using any of the attachment methods disclosed herein. The protruding feature may be configured to prevent bending (e.g., collapse) of the fastener portion(s) (e.g., hinge leaf). The gasket may be formed of a polymer and/or resin. The polymer and/or resin may comprise a carbon or a silicon based material. For example, the polymer may be a polyurethane polymer. The gasket may comprise a foamy material. The gasket may comprise gas pockets, or may be devoid of (e.g., detectable) gas pockets. The gasket may comprise a flexible material (e.g., rubber or latex). The gasket may comprise a material that is opaque or transparent to visible light.

In some embodiments, the circuitry contacts and/or attached to the gas guide. For example, the circuitry can be disposed and/or attach to the gas guide, e.g., above the gas guide. Above may be in a direction opposite to a gravitational center (e.g., opposite to the direction of the gravitational vector 4200 that points to the gravitational center). The circuitry may be configured to facilitate gas flow through the gas channels. FIG. 42 shows various portions of the display construct and associated fastener assembly as perspective views. FIG. 42 shows an example of a circuit board 4230 (e.g., comprising the driver and/or booster board) that is configured to connect to the display construct (shown as portion 4201) and provide data and/or power via cabling 4231. Circuit board 4230 (partial view shown) is also configured to connect the E-box (e.g., comprising the timing controller) and/or to the power supply via (e.g., six) other cables not shown in FIG. 42. The other cables may extend from the face of board 4230 that is opposite to the one shown in FIG. 42. FIG. 42 shows an example of integration of the circuit board 4230 into the fastener that comprises a first portion 4222 (partially shown) and a second portion 4221 (partial view shown) held by hinges 4285. Hinge leaf 4222 is coupled to a gas guide 4223 that is configured to guide gas flowing through (e.g., incoming or outgoing) the openings (not shown in FIG. 42). The gas guide is coupled to a plate 4255 (partial view shown) having ten protrusions. The protrusions can be evenly spaced along the length of the plate. The plate is coupled with the gas guide 4223 to form a gas passage (e.g., between every two protrusions). The protrusions are configured to prevent bending (e.g., collapse) of the gas guide and/or the plate. The protrusions are configured to ensure that the gas passages remain operational and/or intact over time. The gas guide 4223 and the plate 4255 guide the gas in the direction depicted by the broken arrows (e.g., 4251). The hinge leaf 4222 is configured to engage with hinge leaf 4221 comprising a bracket. The display construct 4201 (partial view shown) is framed by sensor-emitter panels (e.g., 4203, partial view shown) that facilitate touch screen capability. 4299 shows a portion view of the fastener, display construct, and associated components. At least one gas passages may be aligned with a fan. The gas passage may be configured to facilitate a flow of gas that is at least as the flow of gas generated by the fan e.g., that is aligned to the gas passage). The gas passage may be configured to prevent a pressure in the fasteners that differs from ambient pressure, e.g., during operation of the fan(s). The ambient pressure may be of about 1 atmosphere. A pressure differing from ambient pressure comprises over or under pressure.

In some embodiments, the two portions of the fastener (e.g., first and second hinge leaves) are configured to reversibly engage and disengage from each other. For example, one hinge leaf may comprise knuckles having a closed cavity that hold a pintle, and the other leaf may comprise complementary knuckles having open cavity and are devoid of a pintle. The two complementary sets of knuckles may engage. The engagement may comprise a snap (e.g., slip in and snap). The engagement may press a spring. The engagement may be detected by a compression of a spring and/or by a sensor (e.g., pressure sensor). Once the complementary sets of knuckles are engaged, they may be affixed to prevent disengagement. The Affixing may be by utilizing a screw and/or a pin. Affixing may be automatically initiated on engagement of the two sets of complementary knuckles (e.g., using the sensor and/or spring). The Affixing may be manual. Affixing the two hinge leaves (e.g., by affixing the knuckles) may be reversible (e.g., automatic and/or manual). The knuckles may comprise an indentation on their surface (e.g., a notch or an incision). The screw and/or pin may engage with the indentation, e.g., upon affixing (e.g., securing) the knuckles and pintle mechanism. Affixing the knuckles and pintle may prevent the hinge to open. At least one of the hinges may comprise the fixating (e.g., affixing) mechanism. Fixating may be (e.g., automatically and/or manually) reversible (e.g., become unfixed). The unfixed hinge can open and close. The fixed hinge may remain in one position (e.g., closed position). Automatic fixation of the hinge may be controller by a controller (e.g., of the control system, or by a separate controller operatively coupled to the hinge).

Figure 43:
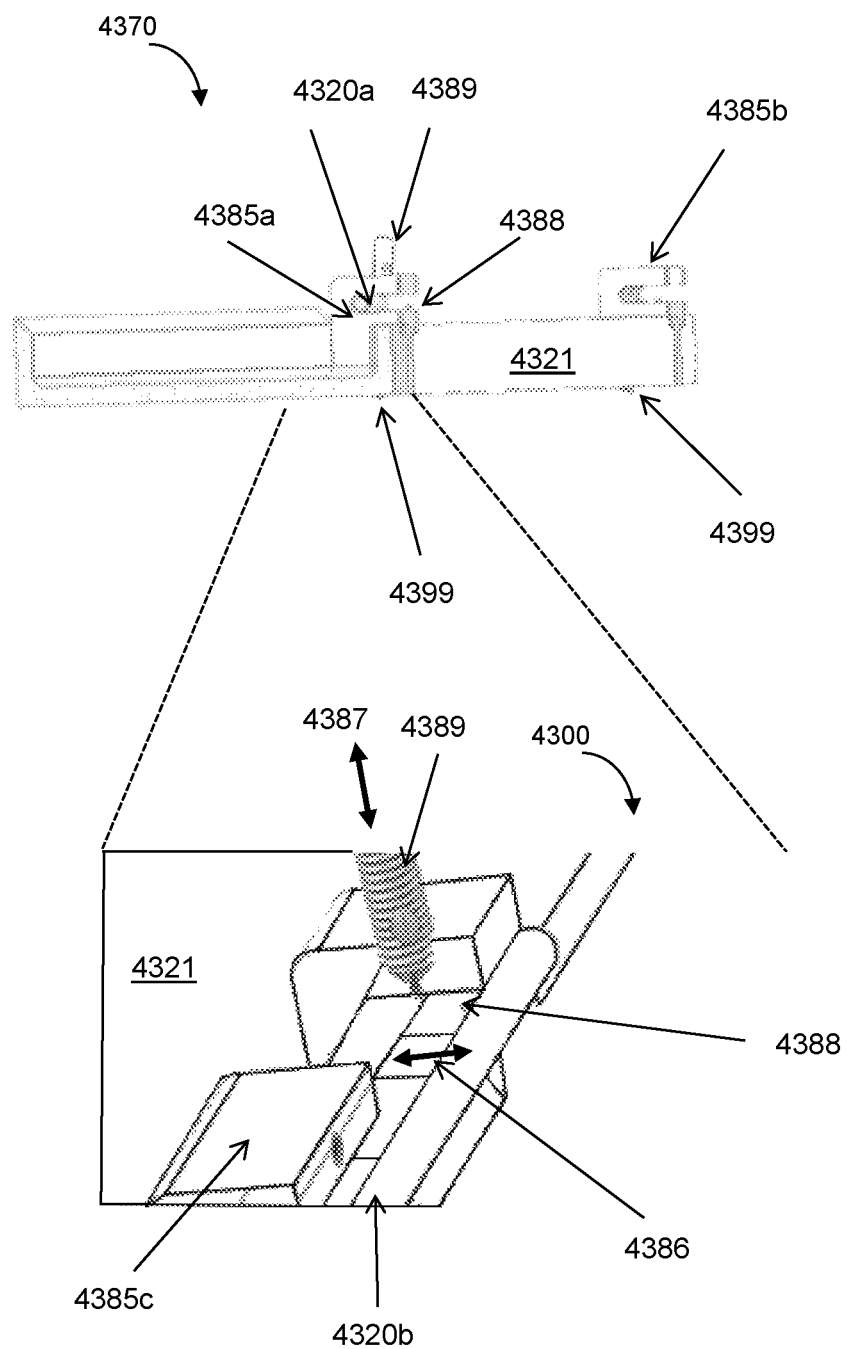
FIG. 43 schematically show various views of portions of a fastener and associated components.

FIG. 43 shows an example of a hinge leaf 4321 having two sets of open cavity knuckles 4385a and 4385b. Pintle 4320a is shown as engaged with knuckle set 4385a, which pintle simulates the complementary set of closed cavity knuckles and pintle assembly (e.g., 4082) of the complementary hinge leaf (e.g., 4022 shows a portion of a hinge leaf). Screw 4389 is engaged with knuckles 4385a. FIG. 43 shows a protrusion 4388 representing a snap spring. Screw 4389 can be engaged or disengaged with the knuckle in the direction 4387. Pintle 4320b (partial view shown) can engage or disengage from knuckle 4385c (partial view shown) by moving in direction 4386. 4300 shows a portion view of hinge leaf 4321, knuckle set 4851a, and screw 4389. Fastener portion 4321 is shown as perspective view in 4370.

In some embodiments, a user controls a set of displays via a touch screen as if the set of displays was a single display (e.g., screen division of an image). The screen division of the displayed image among the display set may be effectuated via software (e.g., non-transitory computer readable medium). The software may read inputs (e.g., via the network and/or USB) from each touch display and, knowing where each display is located in the set (also called group), may compute the location of the user touch in the set. For example, assuming the set has a Cartesian coordinate system where 0, 0 is located at a lower left corner (as viewed by a viewer of the displays) and 100%, 100% is located at the upper right corner (as viewed from a viewer of the displays), for a 2×2 display group the lower left corner of a display set is 0, 0 and the upper right corner of the display set is 100%, 100%. For this example of a 2×2 display set, the transformation of the touch on any display is represented by: X=(0.5*(X of one of the left side displays) or (0.5+(0.5*(X of one of the right side displays))); and Y=(0.5*(Y of one of the lower displays) or (0.5+(0.5*(Y of one of the upper displays))); where X is in a horizontal direction relative to a display viewer and Y is in a vertical direction relative to a display viewer. Adjustments may be made to the transformation of the coordinate system to account for screen gap between the touch displays. Each of the four displays may include its own two sets of sensor and emitter panel (e.g., around the edge of each display) to detect user touch for touch screen functionality. Each of the displays may have only two of the four sensor and emitter panels attached, which panels may be attached around the outer edges of the display set.

FIG. 30A shows an example of four displays 3002a, 3002b, 3002c and 3002d that form a display set 3003. Each of the displays 3002a-d displays the same image. FIG. 30A shows an example of four displays 3022a, 3022b, 3022c and 3022d that form a display set 3023. Each of the displays 3022a-d displays together the image displayed in, e.g., 3002c. If a user will want to click on the surfer displayed in the display set 3003, the user will be able to do so by clicking on any position 3008a-d of display set 3003. If a user will want to click on the surfer displayed in the display set 3023, the user will be able to do so by clicking on position 3029 of display set 3023, but not on, e.g., position 3028 (that is analogous to position 3008c). The screen division of the image among the display set 3023 may be effectuated via software. The software may read inputs (e.g., from the touch screen or curser) and, knowing how the image is parceled among the displays, compute a location that the user points to. For example, assuming the set has a Cartesian coordinate system where 0, 0 is located at a lower left corner (as viewed by a viewer of the displays) and 100%, 100% is located at the upper right corner (as viewed from a viewer of the displays), for a 2×2 display group the lower left corner of display 3002c is 0, 0 and the upper right corner of display 3002b is 100%, 100%. For this example of a 2×2 display set, the transformation of the touch on any display is represented by: X=(0.5*(X of display 3002a or 3002c) or (0.5+(0.5*(X of display 3002b or 3002d))); and Y=(0.5*(Y of display 3002c or 3002d) or (0.5+(0.5*(Y of display 3002a or 3002b))); where X is in a horizontal direction relative to a display viewer and Y is in a vertical direction relative to a display viewer. Adjustments may be made to the transformation of the coordinate system to account for screen gap 3005 between the touch displays. FIG. 30A shows an example of gaps 3005 and 3025 between two immediately adjacent displays, which gaps may be filled with a polymer and/or resin.

FIG. 30B shows an example of four displays 3010a, 3010b, 3010c and 3010d (shown by the left four displays shown in FIG. 30B) in a display set 3011, wherein the image is displayed across the four displays 3010a-3010d as if they were as singled display (shown by the right four displays shown in FIG. 30B). Each of the displays can have its own identification (e.g., shown as numbers 1, 2, 3, and 4).

Figure 31A:
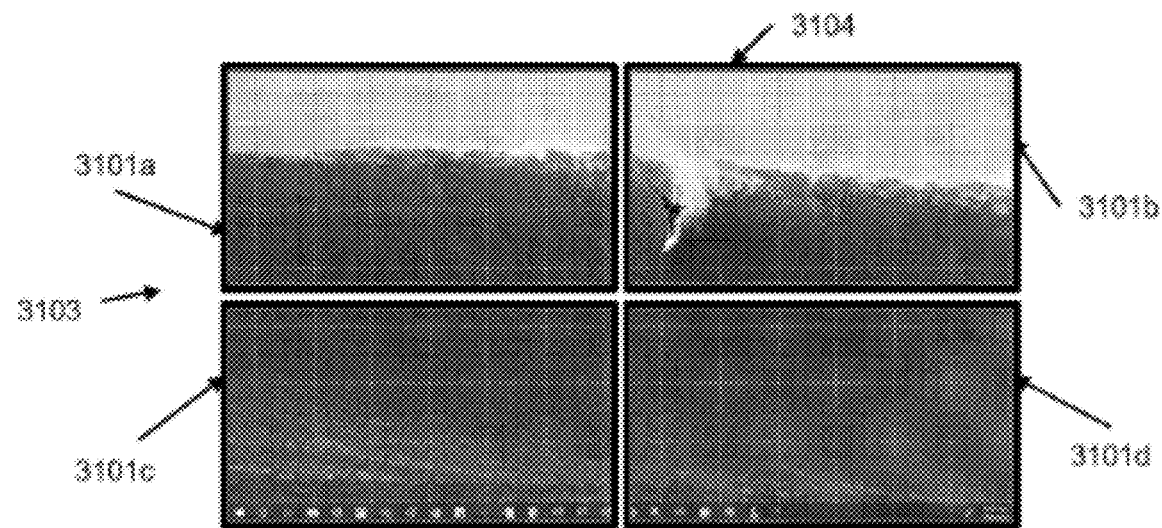
FIGS. 31A-B schematically show various display constructs.

FIG. 31A shows an example of four display constructs 3101a, 3101b, 3101c and 3101d in a 2×2 display construct set 3103. Each of the four displays 3101a-3101d includes its own two sets of sensor and emitter panel 3104 (shown around the edge of each display) to detect user contact for touch screen functionality.

Figure 31B:
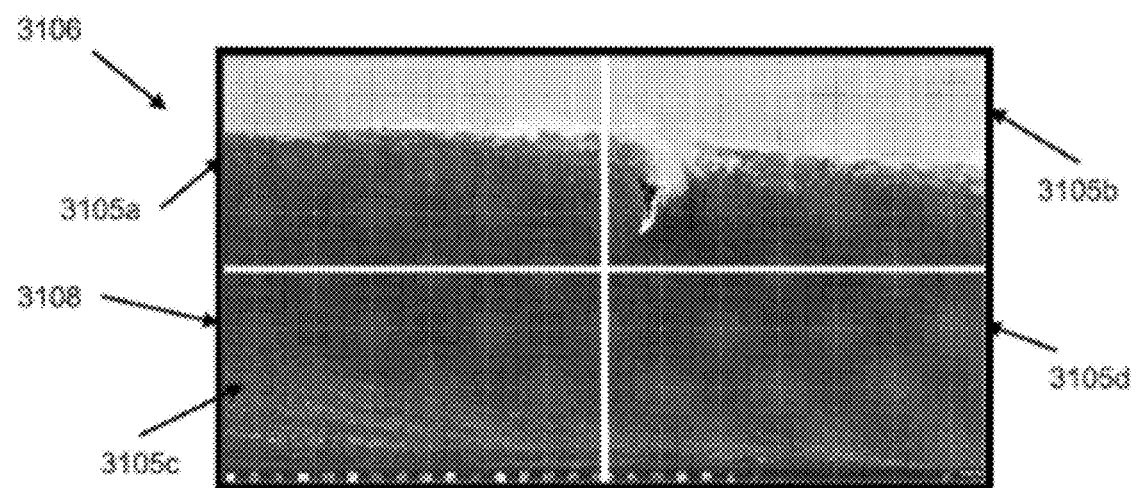

FIG. 31B sows an example of four display constructs 3105a, 3105b, 3105c and 3105d in a 2×2 display construct set 3106 that engulf the display construct set. The set of display constructs 3106 collectively has two perpendicular sensor and emitter panels attached in frame 3108, which panels are attached around the outer edges of the display set 3106. Thus, each of the display constructs 3105a-d has two sides on which a sensor emitter panel portion is disposed (e.g., the external matrix sides), and two sides devoid of a sensor and emitter panel (e.g., the internal matrix sides).

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A system comprising:
    a transparent organic light emitting diode (TOLED) display, including a TOLED panel with a front side and a back side,
    a touch sensor coupled with the front side of the TOLED panel, and
    an electrochromic (EC) device configured to control light transmission through a window and coupled with the back side of the TOLED panel, wherein the EC device is a solid state inorganic electrochromic device, a liquid crystal device, a suspended particle device, or a polymer dispersed liquid crystal device;
    a support structure; and
    a hinge assembly coupled to the TOLED display to enable the TOLED display to be mounted to the support structure.

2. The system of claim 1, wherein the hinge assembly comprises:
    a first hinge leaf coupled to the support structure; and
    a second hinge leaf coupled to the TOLED display, wherein:
        the second hinge leaf includes a first component configured to secure and unsecure the TOLED display,
        the second hinge leaf includes a snap spring configured to assist with coupling the second hinge leaf to the first hinge leaf.

3. The system of claim 1, wherein the second hinge leaf includes a snap spring configured to assist with coupling the second hinge leaf to the first hinge leaf.

4. The system of claim 3, wherein the TOLED panel and the EC device are substantially transparent, at least when the TOLED panel is turned off and the EC device is not fully tinted.

5. The system of claim 1, wherein the TOLED panel and the EC device are configured to allow content displayed on the TOLED panel to be visible.

6. The system of claim 5, wherein the TOLED panel and the EC glass are configured to allow content displayed on the TOLED panel to be visible when the TOLED panel is turned on and the EC glass is tinted.

7. The system of claim 1, further comprising electronic components to control and power the TOLED panel, wherein the electronic components are housed inside the support structure.

8. The system of claim 7, wherein, at least during operation and/or after installation, the system is configured to make the electronic components viewable and accessible by a user.

9. The system of claim 1, wherein the TOLED display includes a capacitive touchscreen and a controller configured to facilitate touch control.

10. The system of claim 1, wherein at least one touch screen is disposed proximate to the TOLED display, such that the at least one touch screen overlaps at least a portion of a viewing surface of the TOLED display.

11. The system of claim 1, wherein the TOLED display is configured to be detachable from the support structure.

12. The system of claim 1, wherein the TOLED display is communicatively coupled to a network that is communicatively coupled to a building management system.

13. The system of claim 1, further comprising a controller configured to control or direct control of the TOLED display and/or the electrochromic device.

14. The system of claim 13, wherein the controller is part of a hierarchical control system.

15. The system of claim 13, wherein the controller is configured to operatively couple to at least one touch screen disposed proximate to the TOLED display and to adjust, or direct adjustment of, media displayed on the TOLED display based at least in part on user tactile interaction with the at least one touch screen.

16. The system of claim 1, wherein the EC device comprises:
   a substrate,
   a first transparent conductive layer,
   a second transparent conductive layer between the substrate and the first transparent conductive layer,
   an electrochromic layer between the first transparent conductive layer and the second transparent conductive layer, and
   an anodic layer between the first transparent conductive layer and the second transparent conductive layer.

17. The system of claim 16, wherein the substrate comprises glass, a plastic, a thermoplastic, a semi-plastic, polystyrene, polycarbonate, polyester, polyamide, a polymer, float glass, silica, or a combination thereof.

18. The system of claim 16, wherein the controller is positioned in a portion of the support structure below the substrate, on a side of the substrate, or above the substrate.

* * * * *